United States Patent
Ishikura et al.

(10) Patent No.: US 12,319,524 B2
(45) Date of Patent: Jun. 3, 2025

(54) SHEET CONTAINING APPARATUS AND IMAGE FORMING APPARATUS

(71) Applicant: FUJIFILM Business Innovation Corp., Tokyo (JP)

(72) Inventors: Kenichi Ishikura, Kanagawa (JP); Naoyuki Kato, Kanagawa (JP); Kenji Yamada, Kanagawa (JP); Satoshi Noda, Kanagawa (JP); Shinya Hasegawa, Kanagawa (JP); Kota Tomioka, Kanagawa (JP); Hiroyuki Tanaka, Kanagawa (JP); Yoichi Yamakawa, Kanagawa (JP); Tomonori Sato, Kanagawa (JP); Ryusuke Nakata, Kanagawa (JP); Kazuyuki Koda, Kanagawa (JP); Isamu Adachi, Kanagawa (JP); Miho Morita, Kanagawa (JP); Tomomi Ishida, Kanagawa (JP); Shinnosuke Kondo, Kanagawa (JP); Yuya Shiokawa, Kanagawa (JP); Daisuke Ishihara, Kanagawa (JP); Kohei Tachibana, Kanagawa (JP); Takahiro Iizuka, Kanagawa (JP); Shinichi Ohba, Kanagawa (JP); Taisuke Endo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/714,152

(22) Filed: Apr. 6, 2022

(65) Prior Publication Data
US 2023/0055327 A1 Feb. 23, 2023

(30) Foreign Application Priority Data

Aug. 23, 2021 (JP) .................................. 2021-135289
Aug. 23, 2021 (JP) .................................. 2021-135290
(Continued)

(51) Int. Cl.
*B65H 1/04* (2006.01)
*B65H 3/06* (2006.01)
(Continued)

(52) U.S. Cl.
CPC ................. *B65H 1/04* (2013.01); *B65H 3/06* (2013.01); *G03G 21/1633* (2013.01);
(Continued)

(58) Field of Classification Search
CPC .. B65H 1/04; B65H 2402/10; B65H 2402/44; B65H 2402/441; B65H 2402/442;
(Continued)

(56) References Cited

U.S. PATENT DOCUMENTS 5,614,991 A 3/1997 Moro et al.
5,764,385 A 6/1998 Ohyama
(Continued)

FOREIGN PATENT DOCUMENTS

EP 0452931 10/1991
EP 1553462 7/2005
(Continued)

OTHER PUBLICATIONS

Merriam-Webster Dictionary (Year: 2024).*
(Continued)

*Primary Examiner* — Prasad V Gokhale
(74) *Attorney, Agent, or Firm* — JCIPRNET

(57) ABSTRACT

A sheet containing apparatus includes a first container unit that contains a sheet having a first size and that tilts with
(Continued)

respect to a horizontal direction such that a first end and a second end in a width direction of the apparatus are located at different heights with the first container unit installed in a sheet containing apparatus body when viewed in a first direction, and a covering portion that is movable to a covering position at which the covering portion covers at least a part of the first container unit in the first direction and an open position at which the covering portion uncovers the first container unit in the first direction. When viewed in the first direction, a tilting division line is adjacent to the first container unit and tilts with respect to the horizontal direction, and at least a whole of the tilting division line is covered by the single covering portion in the first direction with the covering portion positioned at the covering position.

20 Claims, 78 Drawing Sheets

(30) Foreign Application Priority Data

| Aug. 23, 2021 | (JP) | 2021-135424 |
|---|---|---|
| Aug. 23, 2021 | (JP) | 2021-135483 |
| Aug. 23, 2021 | (JP) | 2021-135487 |
| Aug. 23, 2021 | (JP) | 2021-135489 |
| Aug. 23, 2021 | (JP) | 2021-135490 |
| Aug. 23, 2021 | (JP) | 2021-135491 |
| Jan. 12, 2022 | (JP) | 2022-003296 |

(51) Int. Cl.
  *G03G 21/16* (2006.01)
  *H04N 1/00* (2006.01)
(52) U.S. Cl.
  CPC ..... *H04N 1/00546* (2013.01); *B65H 2402/45* (2013.01); *B65H 2405/11151* (2013.01); *B65H 2801/03* (2013.01)
(58) Field of Classification Search
  CPC ........ B65H 2402/45; B65H 2405/1115; B65H 2405/11151; B65H 2405/332; G03G 21/16; G03G 21/1633; H04N 1/00546; H04N 1/00564
  See application file for complete search history.

(56) References Cited

U.S. PATENT DOCUMENTS

| 5,805,272 | A | 9/1998 | Nozawa et al. |
| 5,940,128 | A | 8/1999 | Morimura |
| 6,011,635 | A | 1/2000 | Bungo et al. |
| 6,371,476 | B2 | 4/2002 | Isogai et al. |
| 2002/0000689 | A1* | 1/2002 | Isogai ................ G03G 15/6594 271/3.14 |
| 2003/0230841 | A1 | 12/2003 | Hiramoto et al. |
| 2005/0074266 | A1* | 4/2005 | Hiramoto ............... B65H 1/266 399/391 |
| 2007/0071492 | A1 | 3/2007 | Ito |
| 2007/0076268 | A1 | 4/2007 | Shojo et al. |
| 2007/0183810 | A1 | 8/2007 | Kamiya |
| 2013/0342878 | A1 | 12/2013 | Larson et al. |
| 2015/0139685 | A1 | 5/2015 | Hoshino et al. |
| 2016/0156247 | A1 | 6/2016 | Ishida et al. |
| 2019/0185279 | A1* | 6/2019 | Ando ..................... B65H 5/062 |
| 2020/0019354 | A1 | 1/2020 | Tsuchiya |
| 2021/0120137 | A1 | 4/2021 | Okamoto et al. |
| 2021/0218850 | A1 | 7/2021 | Ogawa |
| 2023/0053735 | A1* | 2/2023 | Shinoto .............. G03G 15/6502 |
| 2023/0230841 | A1 | 7/2023 | Lin |

FOREIGN PATENT DOCUMENTS

| EP | 1562081 | 8/2005 |
| EP | 1793579 | 6/2007 |
| EP | 2911010 | 8/2015 |
| EP | 2962450 | 1/2016 |
| JP | H09222762 | 8/1997 |
| JP | H11278742 | 10/1999 |
| JP | 2003312870 | 11/2003 |
| JP | 2007214836 | 8/2007 |
| JP | 1358358 | 5/2009 |
| JP | 2010176104 | 8/2010 |
| JP | 2017175594 | 9/2017 |
| JP | 2020137163 | 8/2020 |
| JP | 2021068980 | 4/2021 |

OTHER PUBLICATIONS

"Search Report of Europe Counterpart Application No. 22169617.2", issued on Oct. 5, 2022, pp. 1-9.
"Search Report of Europe Related Application No. 22169619.8", issued on Oct. 27, 2022, pp. 1-9.
"Search Report of Europe Related Application No. 22169618.0", issued on Oct. 21, 2022, pp. 1-11.
"Search Report of Europe Related Application No. 22169627.1", issued on Oct. 6, 2022, pp. 1-9.
"Search Report of Europe Related Application No. 22169652.9", issued on Oct. 5, 2022, pp. 1-10.
"Search Report of Europe Related Application No. 22169633.9", issued on Oct. 13, 2022, pp. 1-10.
"Search Report of Europe Related Application No. 22169624.8", issued on Oct. 6, 2022, pp. 1-9.
"Search Report of Europe Related Application No. 22169641.2", issued on Oct. 13, 2022, pp. 1-13.
"Office Action of Europe Related Application No. 22169627.1", issued on Apr. 2, 2024, pp. 1-4.
"Office Action of Europe Related Application No. 22169652.9", issued on Apr. 2, 2024, pp. 1-6.
"Office Action of Europe Related Application No. 22169624.8", issued on Apr. 2, 2024, pp. 1-6.
"Office Action of Europe Related Application No. 22169641.2", issued on Apr. 2, 2024, pp. 1-7.
"Summaries with Thumbnails", InnovationQ+, Jul. 16, 1996-Mar. 26, 2024, pp. 1-127.
"Office Action of Related, U.S. Appl. No. 17/714,110", issued on Sep. 13, 2024, p. 1-p. 25.
"Office Action of Related, U.S. Appl. No. 17/715,021", issued on Nov. 1, 2024, p. 1-p. 24.
"Office Action of Related, U.S. Appl. No. 17/715,062", issued on Nov. 27, 2024, p. 1-p. 36.
"Summaries with Thumbnails", InnovationQ Plus, retrieved on Dec. 11, 2024, pp. 1-127.
Proquest, "Search Strategy from Dialog", retrieved on Dec. 10, 2024, pp. 1-4.
"Notice of allowance of U.S. Related Application, U.S. Appl. No. 17/714,110", issued on Dec. 16, 2024, p. 1-p. 14.
"Office Action of U.S. Related Application, U.S. Appl. No. 17/715,025", issued on Mar. 11, 2025, p. 1-p. 41.
"Office Action of U.S. Related Application, U.S. Appl. No. 17/711,040", issued on Mar. 14, 2025, p. 1-p. 52.
"Office Action of U.S. Related Application, U.S. Appl. No. 17/714,123", issued on Apr. 22, 2025, p. 1-p. 44.

* cited by examiner

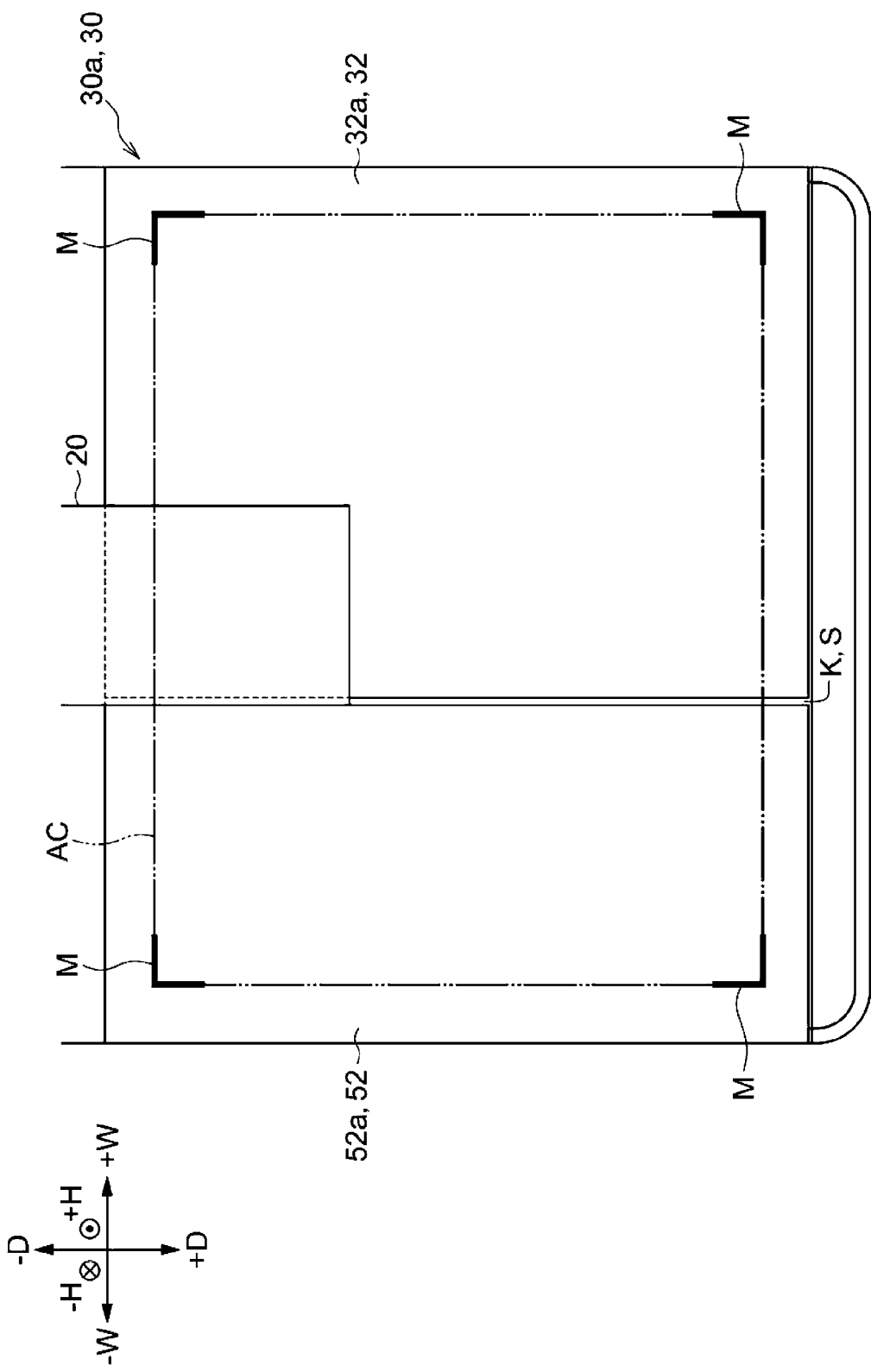

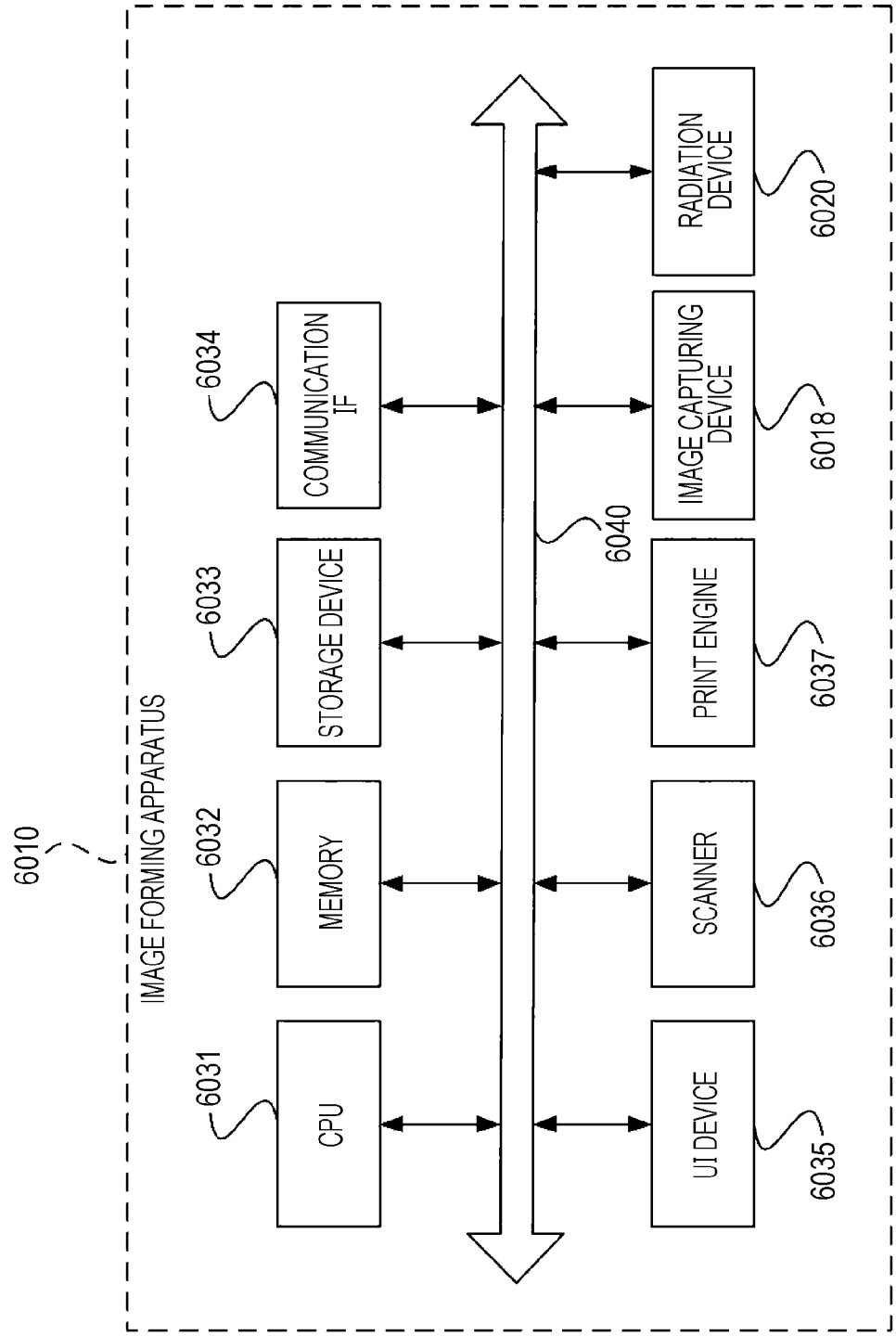

USER SIDE

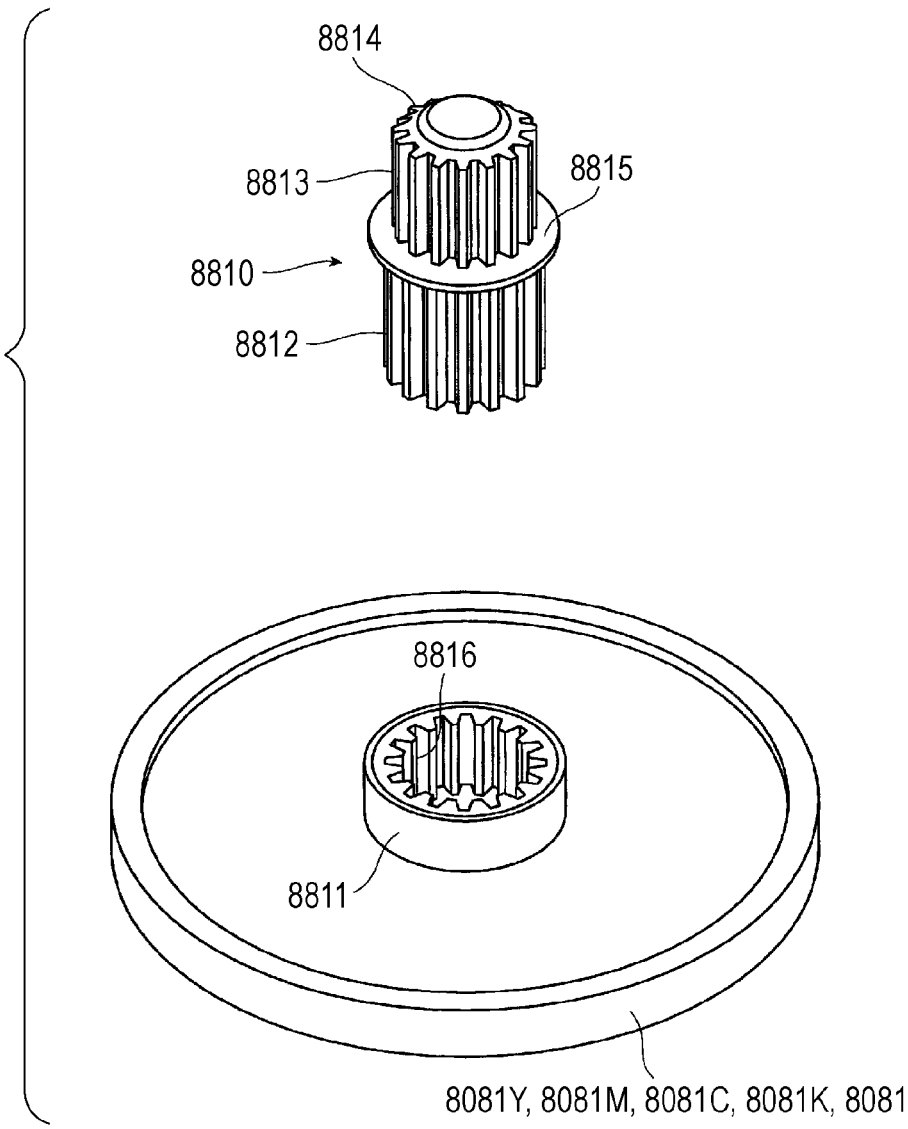

SHEET CONTAINING APPARATUS AND IMAGE FORMING APPARATUS

CROSS-REFERENCE TO RELATED APPLICATIONS

This application is based on and claims priority under 35 USC 119 from Japanese Patent Application No. 2021-135289 filed Aug. 23, 2021, Japanese Patent Application No. 2021-135290 filed Aug. 23, 2021, Japanese Patent Application No. 2021-135424 filed Aug. 23, 2021, Japanese Patent Application No. 2021-135483 filed Aug. 23, 2021, Japanese Patent Application No. 2021-135487 filed Aug. 23, 2021, Japanese Patent Application No. 2021-135489 filed Aug. 23, 2021, Japanese Patent Application No. 2021-135490 filed Aug. 23, 2021, Japanese Patent Application No. 2021-135491 filed Aug. 23, 2021, and Japanese Patent Application No. 2022-003296 filed Jan. 12, 2022.

BACKGROUND

(i) Technical Field

The present disclosure relates to a sheet containing apparatus that contains a sheet and an image forming apparatus that includes the sheet containing apparatus.

(ii) Related Art

Japanese Unexamined Patent Application Publication No. 2003-312870 discloses that a cassette unit of a paper feeding device is obliquely disposed, a cassette having the maximum size (for example, A3) is disposed along a diagonal, and cassettes that are smaller than the cassette are disposed above and below the cassette.

See also Design Registration No. 1358358.

SUMMARY

A sheet containing apparatus includes a container unit that contains a sheet. In some cases, the container unit tilts with respect to the horizontal direction such that a first end and a second end in the width direction of the apparatus are located at different heights when viewed in the depth direction of the apparatus. In these cases, a division line that divides the container unit and an apparatus body tilts. The tilting division line that is directly visible from a user reduces the sense of beauty.

Aspects of non-limiting embodiments of the present disclosure relate to a sheet containing apparatus that includes a container unit tilting with respect to the horizontal direction, that inhibits a tilting division line from being exposed, and that inhibits a division line from being present due to a covering portion, unlike the case where there is no covering portion that covers a container unit and that is movable and the case where the tilting division line of a container unit is covered by multiple covering portions.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a sheet containing apparatus that includes a first container unit that contains a sheet having a first size and that tilts with respect to a horizontal direction such that a first end and a second end in a width direction of the apparatus are located at different heights with the first container unit installed in a sheet containing apparatus body when viewed in a first direction, and a covering portion that is movable to a covering position at which the covering portion covers at least a part of the first container unit in the first direction and an open position at which the covering portion uncovers the first container unit in the first direction, wherein when viewed in the first direction, a tilting division line is adjacent to the first container unit and tilts with respect to the horizontal direction, and at least a whole of the tilting division line is covered by the single covering portion in the first direction with the covering portion positioned at the covering position.

BRIEF DESCRIPTION OF THE DRAWINGS

Exemplary embodiments of the present disclosure will be described in detail based on the following figures, wherein:

FIG. 1-2 schematically illustrates a front view of the configuration of the image forming apparatus according to the first exemplary embodiment;

FIG. 1-3 schematically illustrates a front view of the configuration of a document reading member according to the first exemplary embodiment;

FIG. 1-4 schematically illustrates a front view of a state in which a loading portion of the document reading member according to the first exemplary embodiment is uncovered;

FIG. 1-5 is a front sectional view of a placing portion according to the first exemplary embodiment;

FIG. 1-6 is a plan view of the placing portion according to the first exemplary embodiment viewed from above;

FIG. 1-7 is a block diagram illustrating the hardware configuration of a document reading device according to the first exemplary embodiment;

FIG. 1-8 is a front sectional view of a placing portion according to a first comparative exemplary embodiment relative to the first exemplary embodiment;

FIG. 1-9 is a front sectional view of a placing portion according to a second comparative exemplary embodiment relative to the first exemplary embodiment;

FIG. 1-10 is a front sectional view of a placing portion according to a third comparative exemplary embodiment relative to the first exemplary embodiment;

FIG. 1-11 is a front sectional view of a placing portion according to a modification to the first exemplary embodiment;

FIG. 1-12 is a front sectional view of a placing portion according to a modification to the first exemplary embodiment;

FIG. 2-1 is a perspective view of an image forming apparatus according to a second exemplary embodiment;

FIG. 2-2 schematically illustrates a front view of the configuration of the image forming apparatus according to the second exemplary embodiment;

FIG. 2-3 schematically illustrates a front view of the configuration of a document reading device according to the second exemplary embodiment;

FIG. 2-4 schematically illustrates a front view of a state in which a loading portion of the document reading device according to the second exemplary embodiment is uncovered;

FIG. 2-5 is a plan view of a placement portion according to the second exemplary embodiment viewed from above;

FIG. 2-6 is a block diagram illustrating the hardware configuration of the document reading device according to the second exemplary embodiment;

FIG. 3-1 schematically illustrates an image reading apparatus according to a third exemplary embodiment;

FIG. 3-2 is a perspective view of the image reading apparatus according to the third exemplary embodiment;

FIG. 3-3 is a perspective view of the configuration illustrated in FIG. 3-2 with a document table moved to an open position;

FIG. 3-4 is a sectional view of an upper portion of the image reading apparatus according to the third exemplary embodiment;

FIG. 3-5 is a sectional view of the configuration illustrated in FIG. 3-4 with the document table moved to the open position;

FIG. 3-6 is a plan view of the image reading apparatus according to the third exemplary embodiment;

FIG. 3-7 is a plan view of the configuration illustrated in FIG. 3-6 with the document table moved to the open position;

FIG. 3-8 is a sectional view of a movement mechanism in the image reading apparatus according to the third exemplary embodiment;

FIG. 3-9 is a sectional view of the configuration illustrated in FIG. 3-8 with the document table moved to the open position;

FIG. 4-1 schematically illustrates the configuration of an image forming apparatus according to a fourth exemplary embodiment;

FIG. 4-2 illustrates the configuration of an image forming member of the image forming apparatus according to the fourth exemplary embodiment;

FIG. 4-3 illustrates the configuration of a container apparatus according to the fourth exemplary embodiment;

FIG. 4-4A and FIG. 4-4B illustrate perspective views of the container apparatus according to the fourth exemplary embodiment with a container unit installed in an apparatus body and with the container unit separated therefrom;

FIG. 4-5A and FIG. 4-5B illustrate perspective views of the image forming apparatus according to the fourth exemplary embodiment with a covering closed and with the covering opened;

FIG. 4-6A and FIG. 4-6B illustrate perspective views of a container apparatus according to a first comparative exemplary embodiment relative to the fourth exemplary embodiment with a container unit installed in an apparatus body and with the container unit separated therefrom;

FIG. 4-7 schematically illustrates the configuration of the image forming apparatus according to a second comparative exemplary embodiment relative to the fourth exemplary embodiment;

FIG. 4-8 illustrates the configuration of an image forming apparatus according to a modification to the fourth exemplary embodiment;

FIG. 5-1 illustrates the configuration of an image forming apparatus according to a fifth exemplary embodiment;

FIG. 5-2 illustrates the configuration of an image forming member of the image forming apparatus according to the fifth exemplary embodiment;

FIG. 5-3A and FIG. 5-3B illustrate perspective views of a sheet containing apparatus and the image forming apparatus according to the fifth exemplary embodiment with a covering portion opened and with the covering portion closed;

FIG. 5-4A and FIG. 5-4B illustrate front views of the sheet containing apparatus and the image forming apparatus according to the fifth exemplary embodiment with the covering portion opened and with the covering portion closed;

FIG. 5-5 is a perspective view of a container unit of the sheet containing apparatus according to the fifth exemplary embodiment;

FIG. 5-6A and FIG. 5-6B illustrate perspective views of the sheet containing apparatus and the image forming apparatus according to the fifth exemplary embodiment with the container unit installed and with the container unit removed;

FIG. 5-7A and FIG. 5-7B illustrate front views of the sheet containing apparatus according to the fifth exemplary embodiment with the container unit installed and with the container unit removed;

FIG. 5-8A and FIG. 5-8B illustrate perspective views of the sheet containing apparatus and the image forming apparatus according to the fifth exemplary embodiment with another covering portion opened and with the other covering portion closed;

FIG. 5-9 is a plan view of the sheet containing apparatus and the image forming apparatus according to the fifth exemplary embodiment and illustrates trajectories of the covering portion and the other covering portion;

FIG. 6-1A is a side view of an image forming apparatus according to a sixth exemplary embodiment;

FIG. 6-1B is a front view of the image forming apparatus in FIG. 6-1A;

FIG. 6-2 is a block diagram illustrating the hardware configuration of a control device that is used for the image forming apparatus according to the sixth exemplary embodiment;

FIG. 6-3 is a block diagram illustrating the functional configuration of the image forming apparatus according to the sixth exemplary embodiment;

FIG. 6-4 illustrates a placement portion in the image forming apparatus according to the sixth exemplary embodiment viewed from above;

FIG. 6-5 illustrates a state in which a user operates the image forming apparatus according to the sixth exemplary embodiment;

FIG. 6-6A and FIG. 6-6B illustrate diagrams for describing reflected light distribution of a radiation device in the image forming apparatus according to the sixth exemplary embodiment;

FIG. 6-7 is a diagram for describing the amount of light that enters an image capturing device in the image forming apparatus according to the sixth exemplary embodiment;

FIG. 6-8A and FIG. 6-8B illustrate diagrams for describing the movable ranges of light sources in the image forming apparatus according to the sixth exemplary embodiment;

FIG. 6-9 illustrates a placement portion in an image forming apparatus according to another sixth exemplary embodiment viewed from above;

FIG. 6-10 illustrates the image forming apparatus according to the other sixth exemplary embodiment;

FIG. 7-1 is a perspective view of an image forming apparatus according to a first aspect of a seventh exemplary embodiment;

FIG. 7-2 is a perspective view of the image forming apparatus in FIG. 7-1 with a front opening-closing covering opened;

FIG. 7-3 is a schematic front view of the image forming apparatus in FIG. 7-2;

FIG. 7-4 is a perspective view of the image forming apparatus in FIG. 7-1 viewed in another direction;

FIG. 7-5 is a perspective view of the image forming apparatus in FIG. 7-4 with a side opening-closing covering opened;

FIG. 7-6 is a block diagram illustrating the configuration of a control system in FIG. 7-1;

FIG. 7-7 is a perspective view of an image forming apparatus according to a second aspect of the seventh exemplary embodiment;

FIG. 7-8 is a perspective view of the image forming apparatus in FIG. 7-7 with a front opening-closing covering opened;

FIG. 7-9 is a schematic front view of the image forming apparatus in FIG. 7-7;

FIG. 7-10 is a perspective view of an image forming apparatus in a reference example;

FIG. 7-11 is a perspective view of an image forming apparatus in a first comparative example;

FIG. 7-12 is a perspective view of an image forming apparatus in a second comparative example;

FIG. 8-1 illustrates the overall configuration of an image forming apparatus that uses a drive device according to an eighth exemplary embodiment of the disclosure;

FIG. 8-2 illustrates the configuration of an imaging device of the image forming apparatus according to the eighth exemplary embodiment of the disclosure;

FIG. 8-3 illustrates the configuration of an image formation unit of the image forming apparatus according to the eighth exemplary embodiment of the disclosure;

FIG. 8-4 illustrates the configuration of the imaging device of the image forming apparatus according to the eighth exemplary embodiment of the disclosure;

FIG. 8-5 illustrates the configuration of the imaging device of the image forming apparatus according to the eighth exemplary embodiment of the disclosure;

FIG. 8-6 is a perspective view of the configuration of an inner frame of the image forming apparatus according to the eighth exemplary embodiment of the disclosure;

FIG. 8-7 is a sectional view of the configuration of the drive device according to the eighth exemplary embodiment of the disclosure;

FIG. 8-8 is a back view of the configuration of the drive device according to the eighth exemplary embodiment of the disclosure;

FIG. 8-9 is a perspective view of an exterior covering of the image forming apparatus according to the eighth exemplary embodiment of the disclosure and a back surface with the drive device removed;

FIG. 8-10 illustrates the configuration of the drive device according to the eighth exemplary embodiment of the disclosure;

FIG. 8-11 is a side view of the configuration of a drive motor;

FIG. 8-12 is a perspective view of the configuration of the drive device according to the eighth exemplary embodiment of the disclosure;

FIG. 8-13 is a sectional view of the configuration of a coupling;

FIG. 8-14 is an exploded perspective view of the coupling;

FIG. 8-15 is a sectional view of the configuration of the drive device according to the eighth exemplary embodiment of the disclosure;

FIG. 8-16 is an exploded perspective view of a coupling; and

FIG. 8-17 schematically illustrates an existing drive device.

DETAILED DESCRIPTION

First Exemplary Embodiment

An image forming apparatus 100 according to a first exemplary embodiment will be described with reference to the drawings.

In the following description, a vertical direction of the apparatus (a vertical direction), a width direction of the apparatus (a horizontal direction), and a depth direction of the apparatus (a horizontal direction) are respectively described as a H direction, a W direction, and a D direction in a front view of the image forming apparatus 100 from a position at which a user (not illustrated) stands. In the case where it is necessary to distinguish between one direction and the other direction of the vertical direction of the apparatus, the width direction of the apparatus, and the depth direction of the apparatus, an upward direction is described as a +H direction, a downward direction is described as a −H direction, a right-hand direction is described as a +W direction, a left-hand direction is described as a −W direction, a rear direction is described as a −D direction, and a front direction is described as a +D direction in a front view of the image forming apparatus 100.

Image Forming Apparatus

Figure 1:
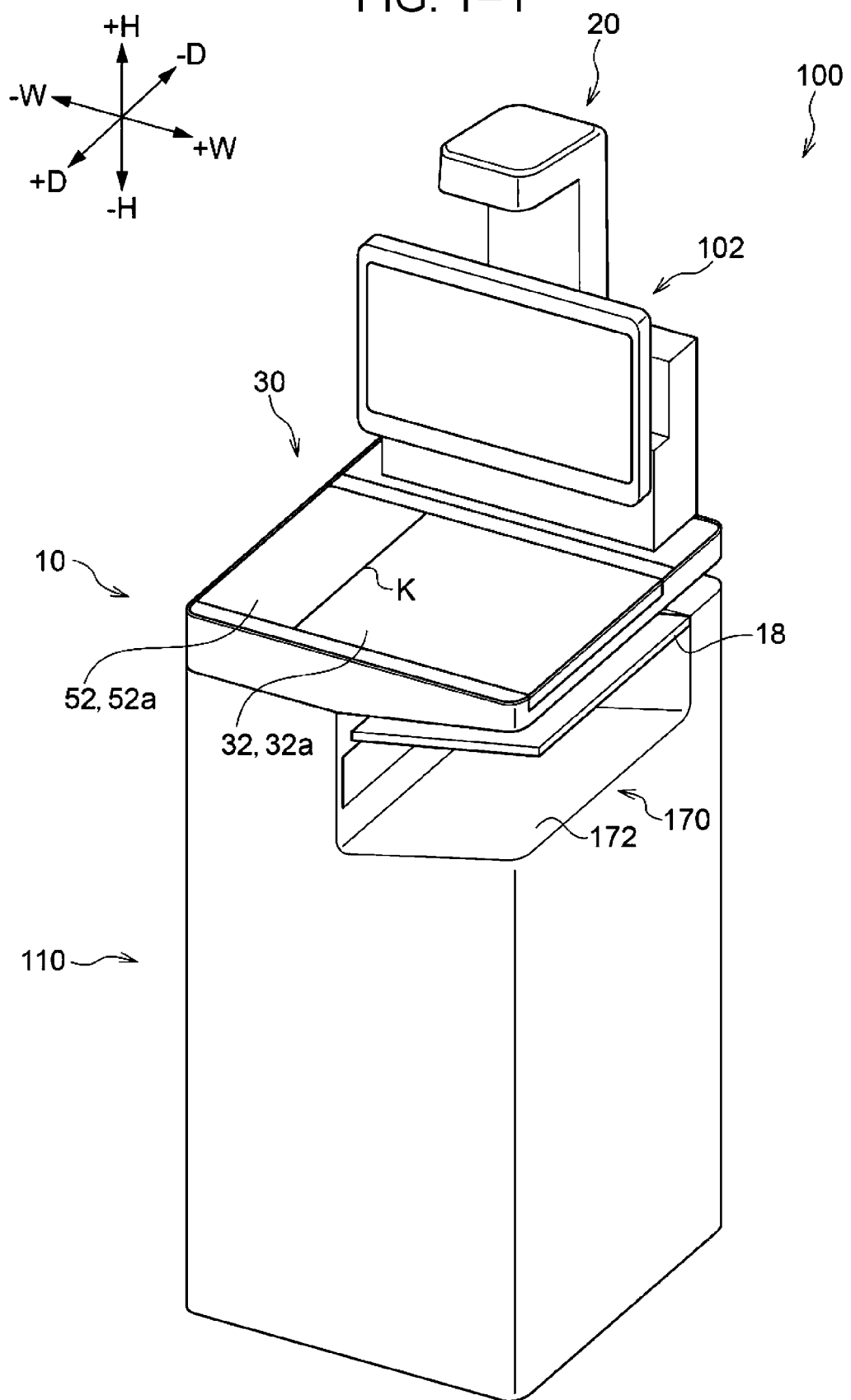
FIG. 1-1 is a perspective view of an image forming apparatus according to a first exemplary embodiment.

As illustrated in FIG. 1-1, the image forming apparatus 100 according to the present exemplary embodiment includes a document reading device 10, a formation device 110, a panel member 102, and a controller (not illustrated). The document reading device 10 reads images that are formed on a front surface and a back surface of a document G (not illustrated) and converts the read images into electronic data. The formation device 110 is disposed below the document reading device 10, forms a copy image of the document G, based on the electronic data of the images that is converted by the document reading device 10, and records the copy image on a sheet material P as a medium. The panel member 102 is disposed between a camera unit 20 and a document table 30 described later and is a touch screen display that allows the user to perform a touch input operation and that displays information about the image forming apparatus 100 in the +D direction. The panel member 102 is an example of a display unit. The controller (not illustrated) controls the operation of components of the image forming apparatus 100. The document reading device 10 will be described in detail later.

Formation Device

Figures 1, 2:
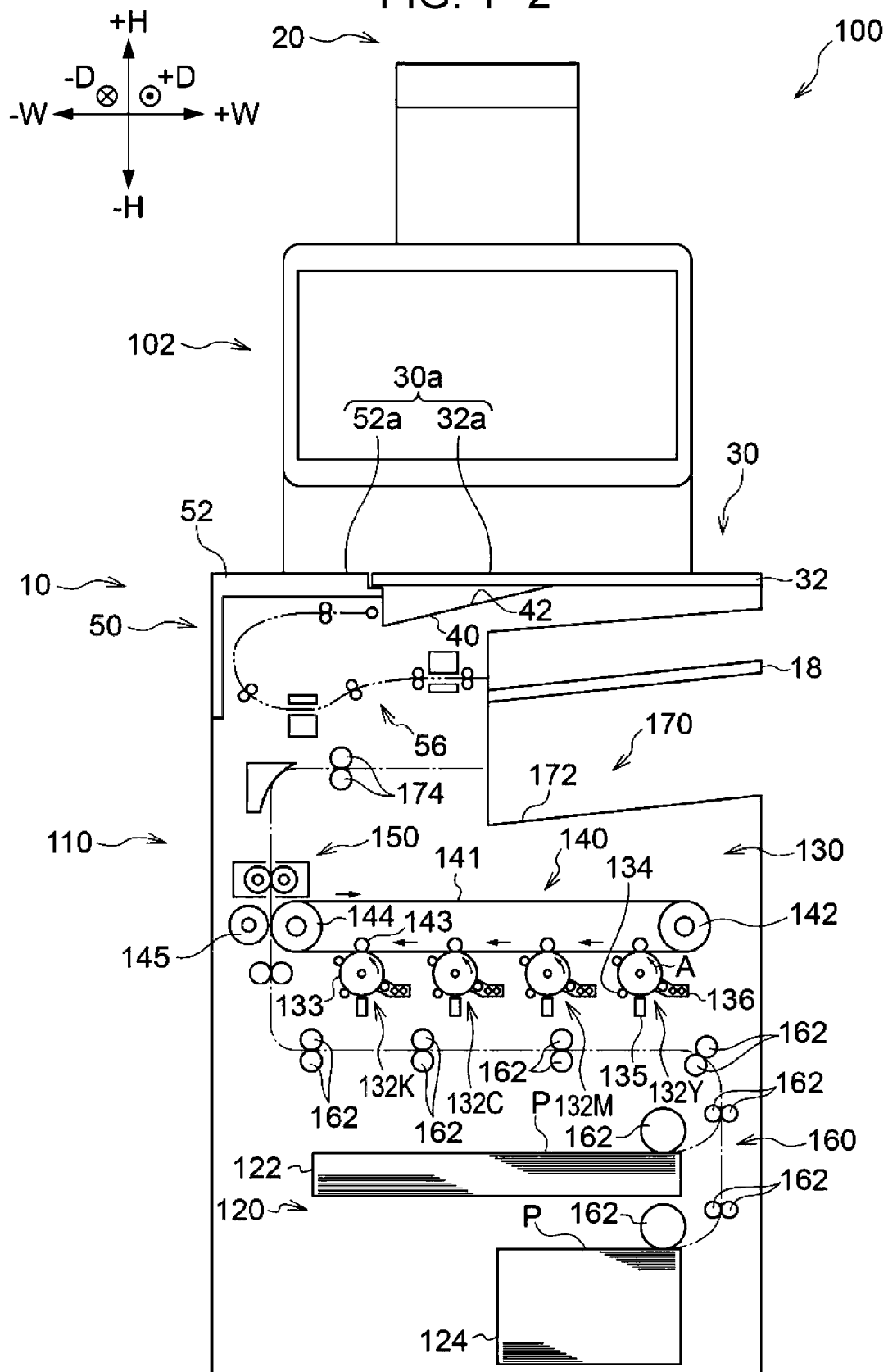

As illustrated in FIG. 1-2, the formation device 110 includes a container unit 120, a transport unit 160, a formation member 130, and a discharge portion 170.

The container unit 120 contains sheet materials P having different sizes and supplies the sheet materials P to the formation member 130. The container unit 120 according to the present exemplary embodiment includes a first container unit 122 and a second container unit 124. The first container unit 122 is capable of containing up to 500 sheet materials P having an A3 size or smaller. The second container unit 124 is capable of containing up to 1500 sheet materials P having an A4 size or smaller. That is, the size of the largest number of sheet materials P that are containable in the container unit 120 is the A4 size. The sheet materials P are selectively fed from the container unit 120 by using the controller (not illustrated).

The transport unit 160 is configured d so as to include multiple roller members 162 and transports the sheet material P that is selectively fed by using the controller (not illustrated) toward the formation member 130.

The formation member 130 has a function of forming an image on the sheet material P by using an electrophotographic system. The formation member 130 includes photoconductor member units 132 that form toner images in multiple colors, a transfer member 140 that transfers the toner images that are formed by the photoconductor member units 132 to the sheet material P, and a fixing portion 150 that fixes the toner images that are transferred to the sheet material P to the sheet material P.

The photoconductor member units 132 are provided so as to form the toner images in the respective colors. According to the present exemplary embodiment, the photoconductor member units 132 for four colors of yellow (Y), magenta (M), cyan (C), and black (K) are provided. FIG. 1-2 illustrates Y, M, C, and K that represent components associated with the colors described above. In the case where the colors (Y, M, C, and K) are not particularly distinguished, the end of an alphabet is omitted for description.

The photoconductor member units 132Y to 132K (132Y, 132M, 132C, and 132K) basically have the same configuration except for toner that is used.

As illustrated in FIG. 1-2, the photoconductor member units 132Y to 132K are arranged along an outer circumferential portion of a transfer belt 141 (described in detail later) of the transfer member 140.

As illustrated in FIG. 1-2, each of the photoconductor member units 132 includes a photoconductor drum 133 that rotates in the direction of an arrow A in the figure and a charger 134 that charges the photoconductor drum 133. Each of the photoconductor member units 132 also includes an exposure device 135 that exposes the photoconductor drum 133 charged by the charger 134 to light and that forms an electrostatic latent image and a developing device 136 that develops the electrostatic latent image by using toner and that forms the toner image.

The transfer member 140 has a function of first-transferring the toner images in the respective colors on the photoconductor drums 133 such that the toner images are superposed on an intermediate transfer body and second-transferring the superposed toner images to the sheet material P. Specifically, as illustrated in FIG. 1-2, the transfer member 140 includes the transfer belt 141 that serves as the intermediate transfer body, a drive roller 142, first transfer rollers 143, a second transfer roller 144, and a backup roller 145.

The transfer belt 141 extends in the width direction of the apparatus, has no ends, and is wound around the drive roller 142 that is disposed at a folded portion in the +W direction and the second transfer roller 144 that is disposed in the −W direction. The drive roller 142 is connected to a drive unit such as a motor, not illustrated, and has a function of turning the transfer belt 141 by being rotated by the drive unit.

The first transfer rollers 143 are roll members that are disposed opposite the photoconductor drums 133 for the respective colors with the transfer belt 141 interposed therebetween. The first transfer rollers 143 have a function of transferring the toner images that are formed on the photoconductor drums 133 to the transfer belt 141 at first transfer positions T between the photoconductor drums 133 and the first transfer rollers 143.

The second transfer roller 144 is a roll member that is disposed inside a folded portion of the transfer belt 141 opposite the drive roller 142. The backup roller 145 is a roll member that is disposed opposite the second transfer roller 144 with the transfer belt 141 interposed therebetween. The second transfer roller 144 and the backup roller 145 have a function of transferring the toner images that are transferred to the transfer belt 141 to the sheet material P at a second transfer position NT between the transfer belt 141 and the backup roller 145.

The fixing portion 150 heats and compresses the sheet material P that is transported from the formation member 130 and consequently fixes the images that are transferred to the sheet material P by using the formation member 130 to the sheet material P. The fixing portion 150 transports the sheet material P to which the images are fixed to the discharge portion 170.

The discharge portion 170 is configured d so as to include a discharge table 172 that is located below a discharge portion 18 (described in detail later) of the document reading device 10 and a pair of discharge rollers 174 that is disposed between the discharge table 172 and the fixing portion 150. The discharge portion 170 discharges the sheet material P that is transported from the fixing portion 150 to the discharge table 172 by using the pair of discharge rollers 174.

Document Reading Device

The configuration of the document reading device 10 according to the present exemplary embodiment will now be described. The document reading device 10 is disposed above the formation device 110. The document reading device 10 includes the camera unit 20 and the document table 30 that is disposed below the camera unit 20. The document reading device 10 also includes a loading portion 40 that is disposed below the document table 30, a reading member 50, and the discharge portion 18.

The document reading device 10 has a function of reading the image that is formed on an upper surface (the front surface) of the document G by imaging the document G that is placed on the document table 30 by using the camera unit 20. The document reading device 10 has a function of reading the document G that is placed on the loading portion 40 by using the reading member 50 while transporting the document G and discharging the document G to the discharge portion 18. The document G has ground color, brightness of which is high. The ground color of the document G according to the present exemplary embodiment is white color.

FIG. 1-7 is a block diagram illustrating the hardware configuration of the document reading device 10. As illustrated in FIG. 1-7, the document reading device 10 includes a central processing unit (CPU) or a processor 11, a read only memory (ROM) 12, a random access memory (RAM) 13, and a storage 14.

Camera Unit

The camera unit 20 is a so-called document camera and has a function of imaging the document G that is placed on the document table 30 described later. The camera unit 20 is an example of an imaging unit.

As illustrated in FIG. 1-6, the imaging range (the angle of view) AC of the camera unit 20 overlaps four marks M (described in detail later) that are formed on the document table 30 in association with the document G having the A3 size the longitudinal direction of which coincides with the width direction of the apparatus. According to the present exemplary embodiment, the document G having the A3 size is a document having the maximum size that the camera unit 20 is capable of imaging.

Document Table

As illustrated in FIG. 1-2, the document table 30 is disposed below the camera unit 20 and is an example of a placing portion on which the document G to be imaged by the camera unit 20 is placed. The document table 30 is configured d by using a covering 52 of the reading member 50 that is disposed in the −W direction and that will be described later and a flat plate 32 that is disposed next to the covering 52 in the +W direction and that extends along a D-W plane. The covering 52 is an example of a first placing portion. The flat plate 32 is an example of a second placing portion. As illustrated in FIG. 1-6, the covering 52 and the flat plate 32 have a rectangular shape when viewed in the vertical direction of the apparatus. The document table 30 extends along the D-W plane and has a placing surface 30a on which the document G is placed. The placing surface 30a is formed when an edge of the flat plate 32 in the −W direction and an edge of the covering 52 in the +W direction are adjacent to each other so as to meet with a gap S (described in detail later) interposed therebetween and is surrounded by the four marks M. That is, the placing surface 30a corresponds to a portion that is surrounded by the four marks M in an upper surface 52a of the covering 52 and an upper surface 32a of the flat plate 32 adjacent to the covering 52 such that the flat plate 32 and the covering 52 meet with the gap S interposed therebetween. The placing surface 30a matches the imaging range (the angle of view) AC of the camera unit 20.

The document G may be placed on the document table 30 such that the position of the center of the document G overlaps that of the center of the imaging range (the angle of view) AC of the camera unit 20. In particular, the document G having the A4 size may be placed on the document table 30 such that the position of the center of the document G overlaps that of the center of the imaging range (the angle of view) AC of the camera unit 20.

The document table 30 has the four marks M for adjusting the position of the document G to be placed on the placing surface 30a. The four marks M are associated with the document G having the A3 size the longitudinal direction of which coincides with the width direction of the apparatus. The marks M are formed by painting the upper surface 52a of the covering 52 and the upper surface 32a of the flat plate 32.

Each mark M has a L-shape when viewed in the vertical direction of the apparatus, and the four marks are formed at respective associated four corners of the document G having the A3 size the longitudinal direction of which coincides with the width direction of the apparatus. Among the four marks M, the marks M in the −W direction are formed on the upper surface 52a of the covering 52 of the reading member 50, and the marks M in the +W direction are formed on the upper surface 32a of the flat plate 32. The four marks M define the placing surface 30a when the covering 52 and the flat plate 32 are adjacent to each other so as to meet with the gap S interposed therebetween. The position of the center of the document G having the A3 size associated with the four marks M in the width direction of the apparatus overlaps that of the center of the capturing range (the angle of view) AC of the camera unit 20.

As illustrated in FIG. 1-3 and FIG. 1-4, the flat plate 32 is a plate member that is disposed so as to be slidable in the width direction of the apparatus with respect to the covering 52 of the reading member 50 by using a guide mechanism, not illustrated. The flat plate 32 configurated s the placing surface 30a and has the upper surface 32a that faces upward. The upper surface 32a of the flat plate 32 is an example of a second surface. The flat plate 32 has a function of uncovering an upper surface of the loading portion 40 described later (see FIG. 1-4) by sliding in the +W direction from a state in which the flat plate 32 is adjacent to the covering 52 so as to form the placing surface 30a (see FIG. 1-3). When the flat plate 32 is adjacent to the covering 52 so as to form the placing surface 30a, the flat plate 32 blocks the upper surface of the loading portion 40. The length of the flat plate 32 in the width direction of the apparatus is greater than half of the length of the placing surface 30a in the width direction of the apparatus.

Detector

As illustrated in FIG. 1-7, the CPU 11 is a central processing unit, runs various programs, and controls components. That is, the CPU 11 reads a program from the ROM 12 or the storage 14 and runs the program with the RAM 13 used as a work area. The CPU 11 controls the components described above and performs various kinds of arithmetic processing in accordance with the program that is recorded in the ROM 12 or the storage 14. According to the present exemplary embodiment, the ROM 12 or the storage 14 stores a document detection program for detecting an edge of the document G by performing a process of detecting a color difference or a luminance difference on the image that is imaged by the camera unit 20. The ROM 12 or the storage 14 stores a recognition reading program for recognizing the document G, based on the edge of the document G that is detected by the document detection program and reading the image that is formed on the upper surface (the front surface) of the document G. The document detection program causes the CPU 11 to function as a detector 11a that detects the edge of the document G that is placed on the document table 30 from the image that is imaged by the camera unit 20 by using the color difference or the luminance difference between the placing surface 30a and the document G. The recognition reading program causes the CPU 11 to function as a recognition reading unit 11b that recognizes the document G, based on the edge of the document G that is detected by the document detection program and reading the image that is formed on the document G.

The configuration to detect the edge of the document G that is placed on the document table 30 from the image that is imaged by the camera unit 20 is that the luminance difference between the color of the placing surface 30a and the color of the document G is a predetermined value or more, and the color difference therebetween is a predetermined value or more. However, the exemplary embodiment is not a limitation, provided that the edge of the document G is detectable. For example, even when the color difference between the color of the placing surface 30a and the color of the document G is the predetermined value or less, the luminance difference that is the predetermined value or more suffices provided that the edge of the document G is detectable. Specifically, for example, in the case of an 8-bits environment, the luminance difference may be 50 LSB or more, and at least a luminance difference of 20 LSB or more suffices. In contrast, even when the luminance difference between the color of the placing surface 30a and the color of the document G is the predetermined value or less, the color difference that is the predetermined value or more suffices provided that the edge of the document G is detectable.

The ROM 12 stores various programs and various kinds of data. The RAM 13 serves as a work area and temporarily stores a program or data. The storage 14 is configured d by using a hard disk drive (HDD) or a solid state drive (SSD) and stores various programs including an operating system and various kinds of data.

Loading Portion

Figures 1, 2, 3:
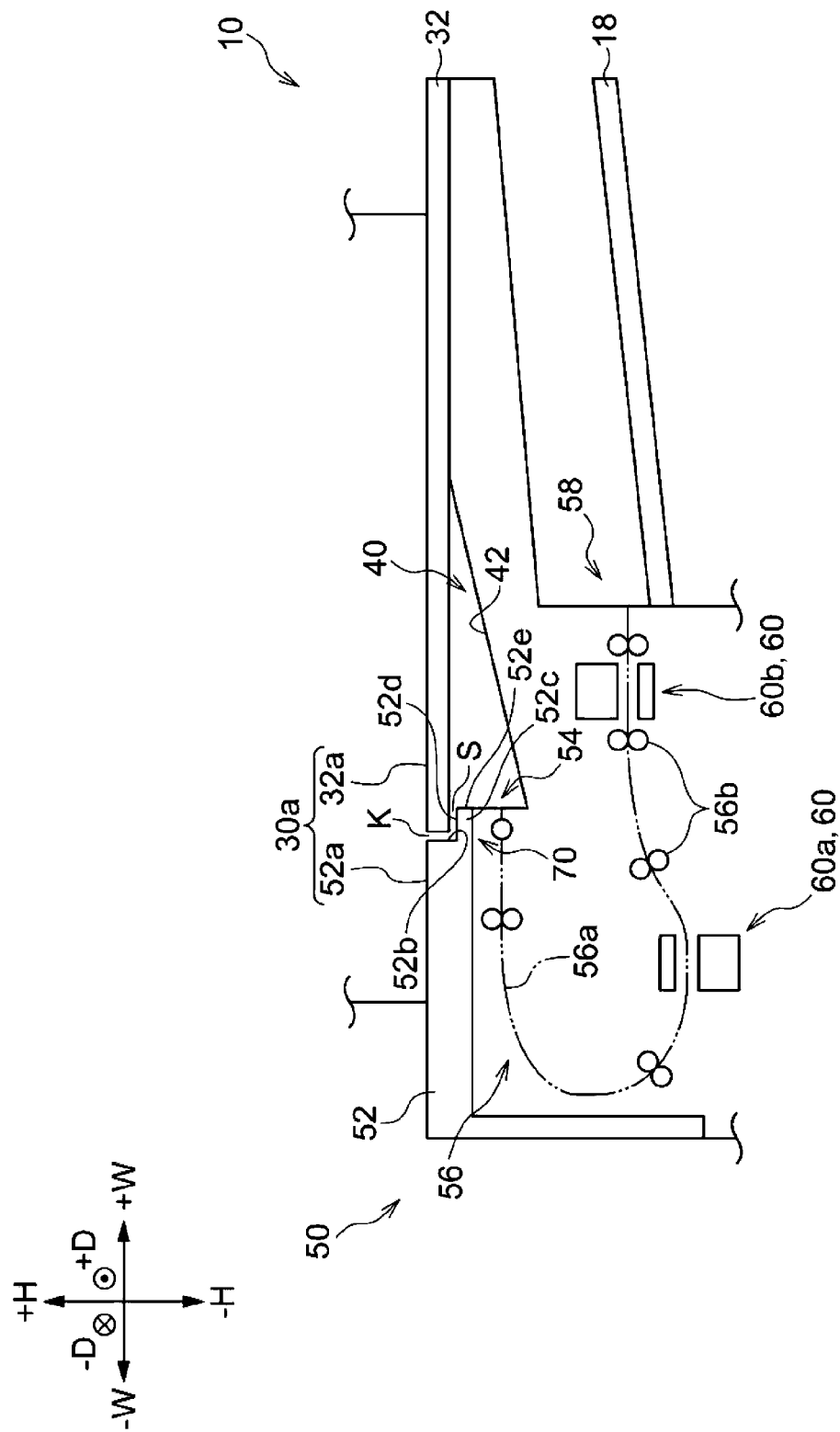

As illustrated in FIG. 1-3, the loading portion 40 is disposed below the document table 30 and is a part of the housing of the document reading device 10 that has a bottom surface 42 that is dented from the placing surface 30a and that has a rectangular shape. As for an end portion of the bottom surface 42 in the −W direction, the position in the width direction of the apparatus overlaps that of an end surface 52e of the covering 52 described later. The bottom surface 42 tilts with respect to the horizontal direction such that the end portion in the −W direction is lower than an end portion in the +W direction.

As illustrated in FIG. 1-4, the loading portion 40 has a function of enabling multiple documents G to be loaded on the bottom surface 42 in a state in which an end portion of the flat plate 32 in the −W direction slides to a location away from the loading portion 40 in the +W direction and uncovers the upper surface of the loading portion 40. In this state, the loading portion 40 has a function of enabling the document G that has a length in the width direction of the apparatus greater than that of A4 (a short side) to be placed thereon with the document G extending across the upper surface 32a of the flat plate 32 slid and the bottom surface 42.

Reading Member

The reading member 50 is an auto document feeder (a so-called ADF) and has a function of reading the document G that is placed on the loading portion 40 while transporting the document G. The reading member 50 includes the covering 52, an intake port 54, a transport unit 56, a reading unit 60, and an outlet 58.

The intake port 54 is adjacent to the loading portion 40 in the −W direction. The intake port 54 is an example of an opening. As for the outlet 58, the position in the vertical direction of the apparatus is lower than that of the intake port 54 and is higher than that of the discharge portion 170 of the formation device 110. The outlet 58 is adjacent to the discharge portion 18 in the −W direction.

The transport unit 56 includes a transport path 56a that extends from the intake port 54 to the outlet 58 and that has a substantially U-shape and multiple roller members 56b that are disposed along the transport path 56a. The transport unit 56 takes in the document G that is placed on the loading portion 40 via the intake port 54 by using the roller members 56b and transports the document G toward the outlet 58 along the transport path 56a.

The reading unit 60 is a stationary contact image sensor that is disposed along the transport path 56a and has a function of reading the images that are formed on the front surface and the back surface of the document G that is transported by the transport unit 56. The reading unit 60 includes a front surface reading member 60a that reads the image that is formed on the front surface of the document G and a back surface reading member 60b that reads the image that is formed on the back surface of the document G.

The covering 52 is a panel member that has an L-shaped section when viewed in the depth direction of the apparatus and that covers an upper surface of the reading member 50. The covering 52 has the upper surface 52a that configurated s the placing surface 30a and that faces upwards. The upper surface 52a of the covering 52 is an example of a first surface. The covering 52 has an end surface 52b that faces the end surface of the flat plate 32 in the −W direction and includes a projecting portion 52c that projects from the end surface 52b below the flat plate 32 into a rectangular shape. That is, the projecting portion 52c is integrally formed with the covering 52. The projecting portion 52c has an upward surface 52d that faces upward and the end surface 52e that faces in the +W direction.

As illustrated in FIG. 1-3, when the covering 52 and the flat plate 32 form the placing surface 30a, the projecting portion 52c is located below the end portion of the flat plate 32 in the −W direction. That is, when the placing surface 30a is formed, the projecting portion 52c of the covering 52 and the end portion of the flat plate 32 in the −W direction overlaps in the vertical direction of the apparatus. In other words, when the placing surface 30a is formed, the covering 52 and the flat plate 32 form an overlapping portion 70 by using the projecting portion 52c of the covering and a part of the end portion of the flat plate 32 in the −W direction. At this time, the upward surface 52d of the projecting portion 52c faces a lower surface of the flat plate 32. At this time, the projecting portion 52c supports the flat plate 32 from below by using a support unit (not illustrated) such as a rib that is disposed on the upward surface 52d. That is, the projecting portion 52c is capable of supporting the flat plate 32 from below.

According to the present exemplary embodiment, the end surface 52e of the covering 52 extends toward the flat plate 32 (that is, in the +W direction) beyond an end surface 32e of the flat plate 32 in the −W direction. The end surface 52e of the covering 52 is an example of an "end portion of the first placing portion adjacent to the second placing portion", and the end surface 32e of the flat plate 32 in the −W direction is an example of an "end portion of the second placing portion adjacent to the first placing portion".

As illustrated in FIG. 1-5, when the covering 52 and the flat plate 32 form the placing surface 30a, the flat plate 32 is disposed on an imaginary straight line KC that connects a lower edge 52f of the end surface 52e of the covering 52 and the camera unit 20 to each other. At this time, the flat plate 32 is disposed on an imaginary straight line that is located above an upper edge 52g of the end surface 52e of the covering 52 and that connects the upper edge 52g and the camera unit 20 to each other. In other words, when the overlapping portion 70 is formed, the flat plate 32 shields the end surface 52e of the covering 52 from the camera unit 20. When the overlapping portion 70 is formed, the flat plate 32 shields the lower edge 52f of the end surface 52e of the covering 52 from the camera unit 20. The lower edge 52f of the end surface 52e of the covering 52 is an example of a lower edge of the overlapping portion 70.

Gap

When the covering 52 and the flat plate 32 form the placing surface 30a, the gap S is formed between the covering 52 and the flat plate 32. The end surface 52b and the upward surface 52d of the covering 52 and the lower surface and the end surface of the flat plate 32 that faces in the −W direction form the gap S that has an L-shape when viewed in the depth direction of the apparatus. In other words, when the overlapping portion 70 is formed, the overlapping portion 70 has the gap S that nonlinearly extends from the placing surface 30a to the upper edge 52g of the covering 52 that is disposed below the flat plate 32 when viewed in the depth direction of the apparatus. The gap S includes a vertical gap TS that extends in the vertical direction of the apparatus from the placing surface 30a to the lower edge of the end surface of the flat plate 32 in the −W direction and a lateral gap YS that extends in the width direction of the apparatus below the lower edge of the end surface of the flat plate 32 in the −W direction when viewed in the depth direction of the apparatus. The lower edge of the end surface of the flat plate 32 in the −W direction corresponds to the lower edge of the vertical gap TS. The vertical gap TS is covered by the projecting portion 52c from below. In other words, the lower edge of the end surface of the flat plate 32 in the −W direction is covered by the projecting portion 52c from below. In FIG. 1-2, FIG. 1-3, FIG. 1-5, and FIG. 1-6, the gap S is emphatically illustrated so as to be formed between the covering 52 and the flat plate 32.

When the covering 52 and the flat plate 32 form the placing surface 30a, the flat plate 32 is disposed on an imaginary straight line that connects the lower edge of the end surface of the flat plate 32 in the −W direction and the camera unit 20 to each other. In other words, when the overlapping portion 70 is formed, the flat plate 32 shields the lower edge of the end surface of the flat plate 32 in the −W direction from the camera unit 20.

The gap S forms a boundary line K on the placing surface 30a. In other words, as illustrated in FIG. 1-5, the boundary line K is formed by the gap S between the upper surface 52a of the covering 52 and the upper surface 32a of the flat plate 32. As illustrated in FIG. 1-6, the single boundary line K linearly extends in the depth direction of the apparatus when viewed in the vertical direction of the apparatus.

The surfaces of the covering 52 and the flat plate 32 are colored in unbright color. According to the present exemplary embodiment, the color of the surfaces of the covering 52 and the flat plate 32 is black color. That is, the color of the surface of the projecting portion 52c is the black color. For this reason, according to the present exemplary embodiment, the color differences between the overlapping portion 70 and the covering 52 and between the overlapping portion 70 and the flat plate 32 are smaller than the color differences between the covering 52 and the document G and between the flat plate 32 and the document G, where the surfaces of the overlapping portion 70, the covering 52, and the flat plate 32 have the black color, and the ground color of the document G is the white color.

The surfaces of the covering 52 and the flat plate 32 may be colored, for example, in bright color (specifically, such as the white color). In this case, the ground color of the document G may be, for example, unbright color (specifically, such as the black color). Various colors may be used as the colors of the document G, the covering 52, and the flat plate 32, provided that there is a color difference between the placing surface 30a and the document G.

The color of the placing surface 30a is a color that is detected as the color of the placing surface 30a by using the camera unit 20 (an example of the imaging unit) and is not necessarily the color of the placing surface 30a itself. The color of the document G is a color that is detected as the color of the document G by using the camera unit 20 and is not necessarily the color of the document G itself.

The covering 52 is configurated d so as to be capable of uncovering the upper surface of the reading member 50 by using an opening-closing mechanism, not illustrated, and exposing the transport path 56a. The reading member 50 has a function of uncovering the upper surface of the reading member 50 by using the opening-closing mechanism of the covering 52 and enabling the document G that is jammed on the transport path 56a to be manually taken out when the document G is jammed on the transport path 56a due to a transport failure of the transport unit 56.

As illustrated in FIG. 1-2, the discharge portion 18 is a tray member that is disposed below the outlet 58 and above the discharge portion 170 of the formation device 110. The discharge portion 18 has a function of receiving the document G that is transported by the transport unit 56 and that is discharged via the outlet 58.

Action and Effect

Action and effect according to the present exemplary embodiment will now be described. In the case where the same component as that of the image forming apparatus 100 according to the present exemplary embodiment, for example, is used in the description when a comparative exemplary embodiment relative to the present exemplary embodiment is described, the reference character and name of the component, for example, are used as they are for the description.

The document table 30 of the document reading device 10 according to the present exemplary embodiment includes the overlapping portion 70 at which the covering 52 and the flat plate 32 overlap in the vertical direction of the apparatus below the placing surface 30a. The document reading device 10 according to the present exemplary embodiment is compared with a document reading device 210 according to a first comparative exemplary embodiment described below.

As illustrated in FIG. 1-8, the document reading device 210 according to the first comparative exemplary embodiment includes a covering 252 instead of the covering 52 according to the present exemplary embodiment. The covering 252 does not have a configuration that corresponds to the projecting portion 52c of the covering 52 according to the present exemplary embodiment. Specifically, an end surface of the covering 252 in the +W direction and an end surface of a flat plate 232 in the −W direction according to the first comparative exemplary embodiment face each other in the width direction of the apparatus and do not overlap in the vertical direction of the apparatus. That is, the document reading device 210 according to the first comparative exemplary embodiment does not have a configuration that corresponds to the overlapping portion 70 according to the present exemplary embodiment. When the placing surface 30a is formed, a gap S2 is formed between the end surface of the covering 252 in the +W direction and the end surface of the flat plate 232 in the −W direction instead of the gap S according to the present exemplary embodiment. The gap S2 linearly extends in the vertical direction of the apparatus from the placing surface 30a to the back surfaces (surfaces opposite the placing surface 30a) of the covering 252 and the flat plate 232 when viewed in the depth direction of the apparatus. Except for the matters described above, the document reading device 210 according to the first comparative exemplary embodiment has the same configuration as that of the document reading device 10 according to the present exemplary embodiment.

The document reading device 210 according to the first comparative exemplary embodiment does not have a configuration that corresponds to the overlapping portion 70 according to the present exemplary embodiment. Therefore, as for the document reading device 210 according to the first comparative exemplary embodiment, light that passes through the gap S2 and that is subsequently reflected from a member that is disposed below the flat plate 232 reaches the camera unit 20. In this case, there is a possibility that the gap S2 is imaged by the camera unit 20 such that the luminance difference or the color difference between the gap S2 and the document table 30 is large depending on the color of the member that is disposed below the flat plate 232. For this reason, as for a configuration for detecting the edge of the document G from the luminance difference or the color difference between the document G and the document table 30 regarding an image that is imaged by the camera unit 20 and that represents the document G that is placed on the document table 30, there is a possibility that the detector 11*a* mistakenly detects the gap S2 as the edge of the document G.

Since the document table 30 of the document reading device 10 according to the present exemplary embodiment includes the overlapping portion 70, visible light L reaches the upward surface 52*d* of the projecting portion 52*c* that is higher than the lower edge 52*f* of the covering 52 even when the visible light L enters the gap S from the placing surface 30*a*. For this reason, as for the document reading device 10 according to the present exemplary embodiment, the gap S is imaged by the camera unit 20 such that the color difference between the gap S and the document table 30 is small, and the possibility that the detector 11*a* mistakenly detects the gap S2 as the edge of the document G is lower than that in the case of the document reading device 210 according to the comparative exemplary embodiment. In this way, the document reading device 10 according to the present exemplary embodiment that is configured d such that the edge of the document G that is placed on the document table 30 is detected by using the color difference between the placing surface 30*a* and the document G may inhibit the detector 11*a* from failing to detect the edge of the document G, unlike the document reading device 210 according to the first comparative exemplary embodiment.

The document reading device 10 according to the present exemplary embodiment is configured d so as to include the flat plate 32 that is disposed on the imaginary straight line KC that connects the lower edge 52*f* of the projecting portion 52*c* of the covering 52 and the camera unit 20 to each other. The document reading device 10 according to the present exemplary embodiment is compared with a document reading device 310 according to a second comparative exemplary embodiment described below.

As illustrated in FIG. 1-9, the document reading device 310 according to the second comparative exemplary embodiment includes a covering 352 and a flat plate 332 instead of the covering 52 and the flat plate 32 according to the present exemplary embodiment. An end surface 352*b* of the covering 352 in the +W direction and an end surface 332*b* of the flat plate 332 in the −W direction face each other at a position away from the camera unit 20 in the −W direction. The end surface 352*b* of the covering 352 in the +W direction and the end surface 332*b* of the flat plate 332 in the −W direction tilt in the −W direction from an upper side to a lower side when viewed in the depth direction of the apparatus. When the covering 352 and the flat plate 332 form the placing surface 30*a*, the end portion of the covering 352 in the +W direction is disposed above the end portion of the flat plate 332 in the −W direction, and these overlap in the vertical direction of the apparatus. That is, the document reading device 310 according to the second comparative exemplary embodiment includes an overlapping portion. A gap S3 that is formed between the end surface 352*b* of the covering 352 in the +W direction and the end surface 332*b* of the flat plate 332 in the −W direction linearly extends so as to tilt in the −W direction from the upper side to the lower side when viewed in the depth direction of the apparatus. As for the document reading device 310 according to the second comparative exemplary embodiment, in the case where the visible light L is incident from the camera unit 20 toward the gap S3, the visible light L linearly reaches the lower edge of the end surface 352*b* of the covering 352 and the lower edge of the end surface 332*b* of the flat plate 332. That is, the document reading device 310 according to the second comparative exemplary embodiment is configured d so as to enable the visible light L to linearly reach the lower edge of the overlapping portion from the camera unit 20. Except for the matters described above, the document reading device 310 according to the second comparative exemplary embodiment has the same configuration as that of the document reading device 10 according to the present exemplary embodiment.

The document reading device 310 according to the second comparative exemplary embodiment is configured d so as to enable the visible light L to linearly reach the lower edge of the overlapping portion from the camera unit 20, and consequently, the visible light L that enters the gap S3 from the camera unit 20 is not shielded but reaches a position below the covering 352 and the flat plate 332. In this case, there is a possibility that the gap S3 is imaged by the camera unit 20 such that the color difference between the gap S3 and the document table 30 is large. For this reason, as for a configuration for detecting only the edge of the document G from the color difference between the document G and the document table 30 regarding the image that is imaged by the camera unit 20 and that represents the document G that is placed on the document table 30, there is a possibility that the detector 11*a* mistakenly detects the gap S3 as the edge of the document G.

The document reading device 10 according to the present exemplary embodiment is configured d such that the flat plate 32 is disposed on the imaginary straight line KC that connects the lower edge 52*f* of the projecting portion 52*c* of the covering 52 and the camera unit 20 to each other. For this reason, the visible light L that travels from the camera unit 20 toward the lower edge 52*f* along the imaginary straight line KC that connects the lower edge 52*f* of the projecting portion 52*c* of the covering 52 is shielded by the flat plate 32. The visible light L that enters the gap S from the camera unit 20 reaches the upward surface 52*d* of the projecting portion 52*c* as described above. In this way, the document reading device 10 according to the present exemplary embodiment that is configured d such that the edge of the document G that is placed on the document table 30 is detected by using the color difference between the placing surface 30*a* and the document G may inhibit the detector 11*a* from failing to detect the edge of the document G, unlike the document reading device 310 according to the second comparative exemplary embodiment.

The overlapping portion 70 of the document reading device 10 according to the present exemplary embodiment has the gap S that nonlinearly extends from the placing surface 30*a* to a position below the document table 30 when viewed in the depth direction of the apparatus. The document reading device 10 according to the present exemplary embodiment is compared with a document reading device 410 according to a third comparative exemplary embodiment described below.

As illustrated in FIG. 1-10, the document reading device 410 according to the third comparative exemplary embodiment includes a covering 452 and a flat plate 432 instead of the covering 52 and the flat plate 32 according to the present exemplary embodiment. An end surface 452*b* of the covering 452 in the +W direction and an end surface 432*b* of the flat plate 432 in the −W direction face each other at a position away from the camera unit 20 in the −W direction. The end surface 452*b* of the covering 452 in the +W direction and the end surface 432*b* of the flat plate 432 in the −W direction tilt in the +W direction from an upper side to a lower side when viewed in the depth direction of the apparatus. When the covering 452 and the flat plate 432 form the placing surface 30*a*, the end portion of the covering 452 in the +W direction is disposed below the end portion of the flat plate 432 in the −W direction, and these overlap in the vertical direction of the apparatus. That is, the document reading device 410 according to the third comparative exemplary embodiment includes an overlapping portion. A gap S4 that is formed between the end surface 452b of the covering 452 in the +W direction and the end surface 432b of the flat plate 432 in the −W direction linearly extends so as to tilt in the +W direction from the upper side to the lower side when viewed in the depth direction of the apparatus. Except for the matters described above, the document reading device 410 according to the third comparative exemplary embodiment has the same configuration as that of the document reading device 10 according to the present exemplary embodiment.

As for the document reading device 410 according to the third comparative exemplary embodiment, the visible light L that travels along an imaginary straight line KC4 that connects the camera unit 20 and the lower edge of the gap S4 to each other toward the lower edge is shielded by the flat plate 432. However, light that enters the gap S4 from the camera unit 20 is diffracted along the gap S4 that linearly extends and reaches a position below the covering 452 and the flat plate 432, and consequently, there is a possibility that the detector 11a mistakenly detects the gap S4 as the edge of the document G.

The document reading device 10 according to the present exemplary embodiment has the gap S that nonlinearly extends from the placing surface 30a to a position below the document table 30 when viewed in the depth direction of the apparatus. In this way, the document reading device 10 according to the present exemplary embodiment that is configurated d such that the edge of the document G that is placed on the document table 30 is detected by using the color difference between the placing surface 30a and the document G may inhibit the detector 11a from failing to detect the edge of the document G, unlike the document reading device 410 according to the third comparative exemplary embodiment. The third comparative exemplary embodiment described above is included in the technical idea of the exemplary embodiment of the present disclosure as a modification to the present exemplary embodiment.

As for the document reading device 10 according to the present exemplary embodiment, the projecting portion 52c is integrally formed with the covering 52 of the document table 30. Therefore, the document reading device 10 according to the present exemplary embodiment has a smaller number of components than that in a configuration in which the projecting portion 52c is separated from the covering 52.

The projecting portion 52c according to the present exemplary embodiment is integrally formed with the covering 52 and contains the same material as that of the covering 52. That is, the projecting portion 52c according to the present exemplary embodiment has the same surface roughness and the same surface color as those of the covering 52. Therefore, the color difference between the surface of the projecting portion 52c and the upper surface 52a of the covering 52 is smaller than the color difference between a projecting portion that is disposed separately from the covering 52 and the covering 52. For this reason, the color difference between the surface of the projecting portion 52c and the document G is equal to the color difference between the upper surface 52a of the covering 52 and the document G. In this way, the document reading device 10 according to the present exemplary embodiment may inhibit the detector 11a from failing to detect the edge of the document G, unlike a configuration in which the material of projecting portion 52c differs from that of the covering 52.

As for the document reading device 10 according to the present exemplary embodiment, the color differences between the overlapping portion 70 and the covering 52 and between the overlapping portion 70 and the flat plate 32 are smaller than the color differences between the covering 52 and the document G and between the flat plate 32 and the document G, where the surfaces of the overlapping portion 70, the covering 52, and the flat plate 32 have the black color, and the ground color of the document G is the white color. In this way, the document reading device 10 according to the present exemplary embodiment may inhibit the detector 11a from failing to detect the edge of the document G, unlike a configuration in which the color difference between the overlapping portion 70 and the document table 30 is larger than the color difference between the document table 30 and the document G.

The document reading device 10 according to the present exemplary embodiment also includes the reading member 50. Therefore, the document reading device 10 according to the present exemplary embodiment is capable of using the reading member 50 in addition to the camera unit 20 when the document G is read.

As for the document reading device 10 according to the present exemplary embodiment, the covering 52 of the reading member 50 configurated s the document table 30. In this way, the document reading device 10 according to the present exemplary embodiment may have a compact size, unlike the case where a member of two members that configurated the document table 30 is disposed between the flat plate 32 and the covering 52 of the reading member 50.

The document reading device 10 according to the present exemplary embodiment includes the reading member 50 that transports the document G via the intake port 54 adjacent to the loading portion 40 in the −W direction and the flat plate 32 that is capable of moving in the +W direction with respect to the reading member 50 and uncovering the upper surface of the loading portion 40. In this way, the document reading device 10 according to the present exemplary embodiment that is configurated d so as to include the reading member 50 may load the document G having an increased size across the loading portion 40 and the flat plate 32 that moves in the +W direction, unlike the case where the flat plate 32 moves in the depth direction of the apparatus.

The document reading device 10 according to the present exemplary embodiment is configurated d such that the flat plate 32 moves by sliding in the width direction of the apparatus. In this way, the document reading device 10 according to the present exemplary embodiment may facilitate movement of the flat plate 32 to uncover the upper surface of the loading portion 40, unlike the case where the flat plate 32 moves by rotating.

The document reading device 10 according to the present exemplary embodiment includes the projecting portion 52c that enables the covering 52 of the reading member 50 to support the flat plate 32 from below. In this way, the document reading device 10 according to the present exemplary embodiment may increase the load capacity of the flat plate 32 when the upper surface of the loading portion 40 is blocked, unlike a configuration in which the flat plate 32 supports the covering 52 of the reading member 50 from below at the overlapping portion.

Also, in this way, the image forming apparatus 100 according to the present exemplary embodiment may inhibit the camera unit 20 from failing to copy the document G, unlike a configuration that includes the document reading device 210 according to the first comparative exemplary embodiment.

The image forming apparatus 100 according to the present exemplary embodiment includes the panel member 102 that displays the information about the image forming apparatus 100 in the +D direction. In this way, as for the image forming apparatus 100 according to the present exemplary embodiment that is configurated d so as to include the panel member 102 that displays the information in the +D direction, the flat plate 32 that has the upper surface 32a is readily moved while the content of display of the panel member 102 is checked, unlike a configuration in which the flat plate 32 moves in the +D direction.

The first exemplary embodiment is described in detail above, but the present disclosure is not limited to the exemplary embodiment described above, and various modifications, alterations, and improvements may be made within the range of the technical idea of the exemplary embodiment of the present disclosure.

For example, the formation device 110 according to the present exemplary embodiment is an electrophotographic formation device. However, the formation device 110 may be, for example, an ink-jet formation device or an offset print formation device.

The gap S according to the present exemplary embodiment has an L-shape when viewed in the depth direction of the apparatus. According to the exemplary embodiment of the present disclosure, however, the shape of the gap that is formed such that the first placing portion or the second placing portion is disposed on the imaginary straight line that connects the lower edge of the overlapping portion and the imaging unit to each other when viewed in the depth direction of the apparatus is not limited to an L-shape.

For example, the shape of the gap when viewed in the depth direction of the apparatus may be a linear shape, provided that the first placing portion or the second placing portion is disposed on the imaginary straight line that connects the lower edge of the overlapping portion and the imaging unit to each other as in the document reading device 410 according to the third comparative exemplary embodiment described above (see FIG. 1-10).

The shape of the gap when viewed in the depth direction of the apparatus may be the shape of a hat the top of which faces sideways as illustrated in FIG. 1-11. Specifically, the gap may be formed between a covering 552 that has an end portion in the +W direction projecting in the +W direction and a flat plate 532 that has an end portion in the −W direction having a recessed portion that fits to the end portion of the covering 552 in the +W direction when viewed in the depth direction of the apparatus.

As illustrated in FIG. 1-12, the shape of the gap when viewed in the depth direction of the apparatus may be a sideways V-shape. Specifically, the gap may be formed between a covering 652 that has an end portion in the +W direction projecting in the +W direction into a V-shape and a flat plate 632 that has an end portion in the −W direction having a V-shaped recessed portion that fits to the end portion of the covering 652 in the +W direction when viewed in the depth direction of the apparatus. The shape of the gap when viewed in the depth direction of the apparatus may be a U-shape instead of the V-shape.

The projecting portion 52c that forms the overlapping portion 70 according to the present exemplary embodiment is integrally formed with the covering 52. However, the overlapping portion according to the exemplary embodiment of the present disclosure may be formed separately from the first placing portion or the second placing portion. The first placing portion, the second placing portion, a part of the overlapping portion that is exposed at least from the gap according to the exemplary embodiment of the present disclosure may have the same surface roughness and the same surface color.

The placing surface 30a according to the present exemplary embodiment corresponds to the portion that is surrounded by the four marks M in the upper surface 52a of the covering 52 and the upper surface 32a of the flat plate 32 adjacent to the covering 52 such that the flat plate 32 and the covering 52 meet with the gap S interposed therebetween. However, the placing surface 30a is not particularly limited but may be formed by the entire upper surface 52a of the covering 52 and the entire upper surface 32a of the flat plate 32.

The document table 30 according to the present exemplary embodiment is configurated d by using the covering 52 of the reading member 50 and the flat plate 32. However, the document table 30 may be configurated d by using three or more members including the first surface of the first placing portion and the second surface of the second placing portion. The number of the gap S and the number of the boundary line K may be two or more.

The single boundary line K according to the present exemplary embodiment linearly extends when viewed in the vertical direction of the apparatus. However, the boundary line K may bend or may curve when viewed in the vertical direction of the apparatus.

The flat plate 32 according to the present exemplary embodiment moves by sliding in the width direction of the apparatus. However, the flat plate 32 may be configurated d so as to slide in the depth direction of the apparatus. The flat plate 32 may be configurated d so as to move by rotating to uncover the upper surface of the loading portion 40 or may be configurated d so as to be installable on and removable from the document table 30.

The length of the flat plate 32 according to the present exemplary embodiment in the width direction of the apparatus is greater than half of the length of the placing surface 30a in the width direction of the apparatus. However, the length of the flat plate 32 in the width direction of the apparatus is not limited to a length greater than half of the length of the placing surface 30a in the width direction of the apparatus but may be equal to half of the length of the placing surface 30a in the width direction of the apparatus or may be less than half of the length of the placing surface 30a in the width direction of the apparatus.

The document reading device 10 may be configurated d so as not to include the reading member 50. For example, the document reading device 10 that is thus configurated d reads the image of the document G by using only the camera unit 20. As for the document reading device 10 that is thus configurated d, the flat plate 32 may be configurated d so as to slide in the +W direction from the position illustrated in FIG. 1-3 and to consequently uncover the upper surface of the discharge portion 170. The document reading device 10 that is thus configurated d has the same action and effect as those of the document reading device 10 that includes the reading member 50 described above.

As for the document reading device 10 according to the present exemplary embodiment, the maximum size of the document G that has an image that the camera unit 20 is capable of capturing is the A3 size. However, the maximum size of the document that has an image that the camera unit 20 is capable of capturing is not limited to the A3 size but may be a size larger than the A3 size such as A2 or B3 or may be a size smaller than the A3 size such as A4 or B4.

As for the image forming apparatus 100 according to the present exemplary embodiment, the size of the largest number of sheet materials P that are containable in the container unit 120 is A4. However, the size of the largest number of sheet materials P that are containable in the container unit 120 is not limited to A4 but may be A3 or may be B5.

Second Exemplary Embodiment

An image forming apparatus 2100 according to a second exemplary embodiment will be described with reference to the drawings.

In the following description, a vertical direction of the apparatus (a vertical direction), a width direction of the apparatus (a horizontal direction), and a depth direction of the apparatus (a horizontal direction) are respectively described as a H direction, a W direction, and a D direction in a front view of the image forming apparatus 2100 from a position at which a user (not illustrated) stands. In the case where it is necessary to distinguish between one direction and the other direction of the vertical direction of the apparatus, the width direction of the apparatus, and the depth direction of the apparatus, an upward direction is described as a +H direction, a downward direction is described as a −H direction, a right-hand direction is described as a +W direction, a left-hand direction is described as a −W direction, a rear direction is described as a −D direction, and a front direction is described as a +D direction in a front view of the image forming apparatus 2100.

Image Forming Apparatus

As illustrated in FIG. 2-1, the image forming apparatus 2100 according to the present exemplary embodiment includes a document reading device 2010, a formation device 2110, a panel member 2102, and a controller (not illustrated). The document reading device 2010 reads images that are formed on a front surface and a back surface of a document 2000G and converts the read images into electronic data. The formation device 2110 is disposed below the document reading device 2010, forms a copy image of the document 2000G, based on the electronic data of the images that is converted by the document reading device 2010, and records the copy image on a sheet material 2000P as a medium. The panel member 2102 is disposed between an image capturing member 2020 and a document table 2030 described later and is a touch screen display that allows the user to perform a touch input operation and that displays information about the image forming apparatus 2100 in the +D direction. The panel member 2102 is an example of the display unit. The controller (not illustrated) controls the operation of components of the image forming apparatus 2100. The document reading device 2010 will be described in detail later.

Formation Device

As illustrated in FIG. 2-2, the formation device 2110 includes a container unit 2120, a transport unit 2160, a formation member 2130, and a discharge portion 2170.

The container unit 2120 contains sheet materials 2000P having different sizes and supplies the sheet materials 2000P to the formation member 2130. The container unit 2120 according to the present exemplary embodiment includes a first container unit 2122 and a second container unit 2124. The first container unit 2122 is capable of containing up to 500 sheet materials 2000P having the A3 size or smaller. The second container unit 2124 is capable of containing up to 1500 sheet materials 2000P having the A4 size or smaller. That is, the size of the largest number of sheet materials 2000P that are containable in the container unit 2120 is the A4 size. The sheet material 2000P is a kind of the sheet material 2000P. The sheet materials 2000P are selectively fed from the container unit 2120 by using the controller (not illustrated).

The transport unit 2160 is configured d so as to include multiple roller members 2162 and transports the sheet material 2000P that is selectively fed by using the controller (not illustrated) toward the formation member 2130.

The formation member 2130 has a function of forming an image on the sheet material 2000P by using an electrophotographic system. The formation member 2130 includes photoconductor member units 2132 that form toner images in multiple colors, a transfer member 2140 that transfers the toner images that are formed by the photoconductor member units 2132 to the sheet material 2000P, and a fixing portion 2150 that fixes the toner images that are transferred to the sheet material 2000P on the sheet material 2000P.

The photoconductor member units 2132 are provided so as to form the toner images in the respective colors. According to the present exemplary embodiment, the photoconductor member units 2132 for the four colors of yellow (Y), magenta (M), cyan (C), and black (K) are provided. FIG. 2-2 illustrates Y, M, C, and K that represent components associated with the colors described above. In the case where the colors (Y, M, C, and K) are not particularly distinguished, the end of an alphabet is omitted for description.

The photoconductor member units 2132Y, 2132M, 2132C, and 2132K basically have the same configuration except for toner that is used.

As illustrated in FIG. 2-2, the photoconductor member units 2132Y, 2132M, 2132C, and 2132K are arranged along an outer circumferential portion of a transfer belt 2141 (described in detail later) of the transfer member 2140.

As illustrated in FIG. 2-2, each of the photoconductor member units 2132 includes a photoconductor drum 2133 that rotates in the direction of an arrow 2000A in the figure and a charger 2134 that charges the photoconductor drum 2133. Each of the photoconductor member units 2132 also includes an exposure device 2135 that exposes the photoconductor drum 2133 that is charged by the charger 2134 to light and that forms an electrostatic latent image and a developing device 2136 that develops the electrostatic latent image by using toner and that forms the toner image.

The transfer member 2140 has a function of first-transferring the toner images in the respective colors on the photoconductor drums 2133 such that the toner images are superposed on an intermediate transfer body and second-transferring the superposed toner images to the sheet material 2000P. Specifically, as illustrated in FIG. 2-2, the transfer member 2140 includes the transfer belt 2141 that serves as the intermediate transfer body, a drive roller 2142, a first transfer roller 2143, a second transfer roller 2144, and a backup roller 2145.

The transfer belt 2141 extends in the width direction of the apparatus, has no ends, and is wound around the drive roller 2142 that is disposed at a folded portion in the +W direction and the second transfer roller 2144 that is disposed in the −W direction. The drive roller 2142 is connected to a drive unit such as a motor not illustrated and has a function of turning the transfer belt 2141 by being rotated by the drive unit.

The first transfer rollers 2143 are roll members that are disposed opposite the photoconductor drums 2133 for the respective colors with the transfer belt 2141 interposed therebetween. The first transfer rollers 2143 have a function of transferring the toner images that are formed on the photoconductor drums 2133 to the transfer belt 2141 at first transfer positions 2000T between the photoconductor drums 2133 and the first transfer roller 2143.

The second transfer roller 2144 is a roll member that is disposed inside a folded portion of the transfer belt 2141 opposite the drive roller 2142. The backup roller 2145 is a roll member that is disposed opposite the second transfer roller 2144 with the transfer belt 2141 interposed therebetween. The second transfer roller 2144 and the backup roller 2145 have a function of transferring the toner images that are transferred to the transfer belt 2141 to the sheet material 2000P at a second transfer position between the transfer belt 2141 and the backup roller 2145.

The fixing portion 2150 heats and compresses the sheet material 2000P that is transported from the formation member 2130 and consequently fixes the images that are transferred to the sheet material 2000P by using the formation member 2130 to the sheet material 2000P. The fixing portion 2150 transports the sheet material 2000P to which the images are fixed to the discharge portion 2170.

The discharge portion 2170 is configurated d so as to include a discharge table 2172 that is located below a discharge portion 2018 (described in detail later) of the document reading device 2010 and a pair of discharge rollers 2174 that is disposed between the discharge table 2172 and the fixing portion 2150. The discharge portion 2170 discharges the sheet material 2000P that is transported from the fixing portion 2150 to the discharge table 2172 by using the pair of discharge rollers 2174.

Document Reading Device

The configuration of the document reading device 2010 according to the present exemplary embodiment will now be described. The document reading device 2010 is disposed above the formation device 2110. The document reading device 2010 includes the image capturing member 2020, the document table 2030 that is disposed below the image capturing member 2020, and a detection reading member 2011a. The document reading device 2010 also includes a loading portion 2040 that is disposed below the document table 2030, a reading member 2050, and the discharge portion 2018.

The document reading device 2010 has a function of reading the image that is formed on an upper surface (the front surface) of the document 2000G by capturing the image of the document 2000G that is placed on the document table 2030 by using the image capturing member 2020. The document reading device 2010 has a function of reading the document 2000G that is placed on the loading portion 2040 by using the reading member 2050 while transporting the document 2000G and discharging the document 2000G to the discharge portion 2018.

FIG. 2-6 is a block diagram illustrating the hardware configuration of the document reading device 2010. As illustrated in FIG. 2-6, the document reading device 2010 includes a central processing unit (CPU) or a processor 2011, a read only memory (ROM) 2012, a random access memory (RAM) 2013, and a storage 2014.

Image Capturing Member

The image capturing member 2020 is a so-called document camera and has a function of capturing the image of the document 2000G that is placed on the document table 2030 described later. The size of the document 2000G that is placed on the document table 2030 may be any size such as a standard size (for example, a document having the A3 or A4 size) found in a market or a size that enables the document to be contained in the container unit 2120.

As illustrated in FIG. 2-5, the capturing range 2000AC of the image capturing member 2020 overlaps marks 2000M (described in detail later) that are formed on the document table 2030 in association with the document 2000G having the A3 size the longitudinal direction of which coincides with the width direction of the apparatus. According to the present exemplary embodiment, the document 2000G having the A3 size is a document having the maximum size that has an image that the image capturing member 2020 is capable of capturing. The document 2000G having the A3 size is an example of a document having the maximum size that has an image that the image capturing member 2020 is capable of capturing.

Document Table

As illustrated in FIG. 2-2, the document table 2030 is disposed below the image capturing member 2020 and is an example of a placement portion on which the document 2000G the image of which is captured by the image capturing member 2020 is placed. The document table 2030 is configurated d by using a covering 2052 of the reading member 2050 that is disposed in the −W direction and that will be described later and a flat plate 2032 that is disposed next to the covering 2052 in the +W direction and that extends along a D-W plane. The covering 2052 and the flat plate 2032 are examples of a member that configurated s the document table 2030. That is, the document table 2030 is configurated d by using the covering 2052 and the flat plate 2032 that are two members. The covering 2052 and the flat plate 2032 have a rectangular shape when viewed in the vertical direction of the apparatus. The document table 2030 extends along the D-W plane and has a placement surface 2030a on which the document 2000G is placed. The placement surface 2030a is configurated d by using an upper surface 2052a of the covering 2052 and an upper surface 2032a of the flat plate 2032 that has an edge in the −W direction adjacent to an edge of the covering 2052 in the +W direction such that these edges meet with a gap 2000S interposed therebetween.

As illustrated in FIG. 2-2, FIG. 2-3, and FIG. 2-5, the gap 2000S extends in the H direction from the placement surface 2030a to the back surfaces (surfaces opposite the placement surface 2030a) of the covering 2052 and the flat plate 2032 when viewed in the depth direction of the apparatus. The gap 2000S forms a boundary line 2000K on the placement surface 2030a. In other words, as illustrated in FIG. 2-5, the boundary line 2000K is formed by the gap 2000S between the upper surface 2052a of the covering 2052 and the upper surface 2032a of the flat plate 2032. The single boundary line 2000K linearly extends in the depth direction of the apparatus. In FIG. 2-2, FIG. 2-3, and FIG. 2-5, the gap 2000S is emphatically illustrated so as to be formed between the covering 2052 and the flat plate 2032.

The gap 2000S may be formed with a part of the covering 2052 and a part of the flat plate 2032 overlapping in a plan view. In this case, the part of the covering 2052 may be disposed above the part of the flat plate 2032, or the part of the flat plate 2032 may be disposed above the part of the covering 2052.

The document 2000G may be placed on the document table 2030 such that the position of the center of the document 2000G in the width direction of the apparatus overlaps that of the center of the capturing range (the angle of view) of the image capturing member 2020. In particular, the document 2000G having the A4 size may be placed on the document table 2030 such that the position of the center of the document 2000G in the width direction of the apparatus overlaps that of the center of the capturing range (the angle of view) of the image capturing member 2020. The document 2000G having the A4 size may be placed on the document table 2030 such that the center of the document 2000G overlaps the center of the document 2000G having the A3 size associated with the marks 2000M that are formed on the document table 2030. When the document 2000G having the A4 size is thus placed on the document table 2030, a part of the boundary line 2000K is covered by the document 2000G having the A4 size regardless of whether the document 2000G is vertically or laterally placed.

Accordingly, the boundary line 2000K is positioned between the "center of the capturing range (or the center of the position at which the document 2000G is placed)" and "an edge in the width direction of the apparatus of the document 2000G having the A3 size that is placed at the center of the capturing range (or the center of the position at which the document 2000G is placed)". According to the present exemplary embodiment, the boundary line 2000K is formed between the center of the capturing range and the marks 2000M.

The document table 2030 has the marks 2000M for adjusting the position of the document 2000G to be placed on the placement surface 2030a. The marks 2000M are associated with the document 2000G having the A3 size the longitudinal direction of which coincides with the width direction of the apparatus. The marks 2000M are formed by painting the placement surface 2030a.

Each mark 2000M has a L-shape when viewed in the vertical direction of the apparatus, and the four marks are formed on the placement surface 2030a at respective associated four corners of the document 2000G having the A3 size the longitudinal direction of which coincides with the width direction of the apparatus. Among the four marks 2000M, the marks 2000M in the −W direction are formed on the upper surface 2052a of the covering 2052 of the reading member 2050, and the marks 2000M in the +W direction are formed on the upper surface 2032a of the flat plate 2032. The position of the center of the document 2000G having the A3 size associated with the four marks 2000M in the width direction of the apparatus overlaps that of the center of the capturing range (the angle of view) of the image capturing member 2020.

The marks 2000M are formed on the upper surface 2052a of the covering 2052 or the upper surface 2032a of the flat plate 2032 at positions away from the boundary line 2000K. In other words, the boundary line 2000K is formed at a position away from the marks 2000M along the placement surface 2030a. According to the present exemplary embodiment, the boundary line 2000K is formed at a position at which the boundary line 2000K is covered by the document 2000G with the document 2000G having the A3 size placed on the document table 2030. The boundary line 2000K is not located at a position at which the boundary line 2000K is not covered by the document 2000G having the A3 size within the capturing range of the image capturing member 2020. In other words, the boundary line 2000K is formed only in the range in which the boundary line 2000K is covered by the document 2000G having the A3 size with the document 2000G having the A3 size placed on the placement surface 2030a within the capturing range of the image capturing member 2020. Outside the capturing range, the boundary line 2000K may be located also out of a range in which the boundary line 2000K is covered by the document 2000G having the A3 size.

Figures 1, 2, 3, 4:
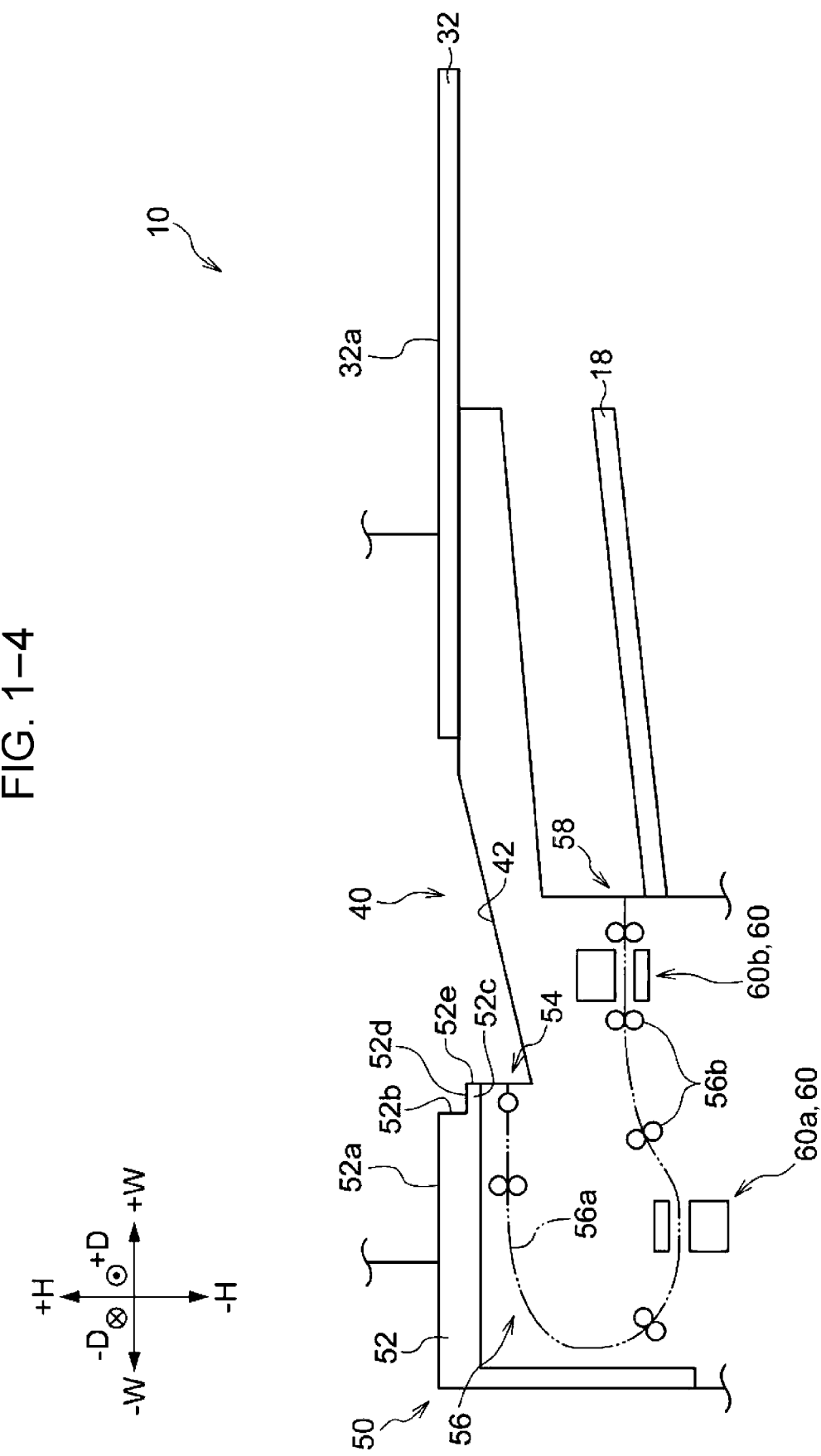

As illustrated in FIG. 2-3 and FIG. 2-4, the flat plate 2032 is a plate member that is disposed so as to be slidable in the width direction of the apparatus with respect to the covering 2052 of the reading member 2050 by using a guide mechanism, not illustrated. The flat plate 2032 has the upper surface 2032a that faces upward. The upper surface 2032a of the flat plate 2032 is an example of a surface that configurated s the placement surface 2030a. The flat plate 2032 has a function of uncovering an upper surface of the loading portion 2040 described later (see FIG. 2-4) by sliding in the +W direction from a state in which the flat plate 2032 is adjacent to the covering 2052 (see FIG. 2-3). The length of the flat plate 2032 in the width direction of the apparatus is greater than half of the length of the placement surface 2030a in the width direction of the apparatus. That is, the boundary line 2000K between the covering 2052 and the flat plate 2032 is away in the −W direction from a bisector that bisects the placement surface 2030a in the width direction of the apparatus.

It may be also said that the document table 2030 has the boundary line 2000K that is formed by the covering 2052 and the flat plate 2032 (examples of multiple components) on the placement surface 2030a (an example of a surface). The boundary line 2000K is located on a central portion when the placement surface 2030a is divided into three portions. Specifically, the boundary line 2000K is located in a central portion when the placement surface 2030a is divided into three portions in the width direction of the apparatus.

Detection Reading Member

As illustrated in FIG. 2-6, the CPU 2011 is a central processing unit, runs various programs, and controls components. That is, the CPU 2011 reads a program from the ROM 2012 or the storage 2014 and runs the program with a RAM 2013 used as a work area. The CPU 2011 controls the components described above and performs various kinds of arithmetic processing in accordance with the program that is recorded in the ROM 2012 or the storage 2014. According to the present exemplary embodiment, the ROM 2012 or the storage 2014 stores a document detection program for detecting an edge of the document 2000G by performing a process of detecting the color difference on the image that is captured by the image capturing member 2020. The ROM 2012 or the storage 2014 stores a captured image reading program for reading the image that is formed on the upper surface (the front surface) of the detected document 2000G the image of which is captured. The CPU 2011 functions as the detection reading member 2011a that uses the programs to measure the color difference between the document 2000G and the placement surface 2030a of the document table 2030 from the image that is captured by the image capturing member 2020, detects the edge of the document 2000G, and reads the image that is formed on the document 2000G. That is, the detection reading member 2011a has a function of detecting only the document 2000G from the image of the document 2000G, placed on the placement surface 2030a, which is captured by the image capturing member 2020, and reading the document 2000G.

The ROM 2012 stores various programs and various kinds of data. The RAM 2013 serves as a work area and temporarily stores a program or data. The storage 2014 is configurated d by using a hard disk drive (HDD) or a solid state drive (SSD) and stores various programs including an operating system and various kinds of data.

Loading Portion

As illustrated in FIG. 2-2, the loading portion 2040 is disposed below the document table 2030 and is a part of the housing of the document reading device 2010 that has a bottom surface 2042 that is dented from the placement surface 2030a and that has a rectangular shape. As for an end portion of the bottom surface 2042 in the −W direction, the position in the width direction of the apparatus overlaps that of the boundary line 2000K of the document table 2030. The bottom surface 2042 tilts with respect to the horizontal direction such that the end portion in the −W direction is lower than an end portion in the +W direction.

As illustrated in FIG. 2-4, the loading portion 2040 has a function of enabling multiple documents 2000G to be loaded on the bottom surface 2042 in a state in which an end portion of the flat plate 2032 in the −W direction slides to a location away from the loading portion 2040 in the +W direction and uncovers the upper surface of the loading portion 2040. In this state, the loading portion 2040 has a function of enabling the document 2000G that has a length in the width direction of the apparatus greater than that of A4 (a short side) to be placed thereon with the document 2000G extending across the upper surface 2032a of the flat plate 2032 slid and the bottom surface 2042.

Reading Member

The reading member 2050 is an auto document feeder (a so-called ADF) and has a function of reading the document 2000G that is placed on the loading portion 2040 while transporting the document 2000G. The reading member 2050 includes the covering 2052, an intake port 2054, a transport unit 2056, a reading unit 2060, and an outlet 2058.

The intake port 2054 is adjacent to the loading portion 2040 in the −W direction. The intake port 2054 is an example of the opening. As for the outlet 2058, the position in the vertical direction of the apparatus is lower than that of the intake port 2054 and is higher than that of the discharge portion 2170 of the formation device 2110. The outlet 2058 is adjacent to the discharge portion 2018 in the −W direction.

The transport unit 2056 includes a transport path 2056a that extends from the intake port 2054 to the outlet 2058 and that has a substantially U-shape and multiple roller members 2056b that are disposed along the transport path 2056a. The transport unit 2056 takes in the document 2000G that is placed on the loading portion 2040 via the intake port 2054 by using the roller members 2056b and transports the document 2000G toward the outlet 2058 along the transport path 2056a.

The reading unit 2060 is a stationary contact image sensor that is disposed along the transport path 2056a and has a function of reading the images that are formed on the front surface and the back surface of the document 2000G that is transported by the transport unit 2056. The reading unit 2060 includes a front surface reading member 2060a that reads the image that is formed on the front surface of the document 2000G and a back surface reading member 2060b that reads the image that is formed on the back surface of the document 2000G.

The covering 2052 is a panel member that has an L-shaped section when viewed in the depth direction of the apparatus and that covers an upper surface of the reading member 2050. The covering 2052 has the upper surface 2052a that faces upward. The upper surface 2052a of the covering 2052 is an example of the surface that configurated s the placement surface 2030a as described above. The upper surface 2052a of the covering 2052 is substantially flush with the upper surface 2032a of the flat plate 2032 when the flat plate 2032 is adjacent to the covering 2052 such that the edge of the flat plate 2032 in the −W direction and the edge of the covering 2052 in the +W direction meet with the gap 2000S interposed therebetween (see FIG. 2-2 and FIG. 2-3).

The covering 2052 is configured d so as to be capable of uncovering the upper surface of the reading member 2050 by using an opening-closing mechanism, not illustrated, and exposing the transport path 2056a. The reading member 2050 has a function of uncovering the upper surface of the reading member 2050 by using the opening-closing mechanism of the covering 2052 and enabling the document 2000G that is jammed on the transport path 2056a to be manually taken out when the document 2000G is jammed on the transport path 2056a due to a transport failure of the transport unit 2056.

As illustrated in FIG. 2-2, the discharge portion 2018 is a tray member that is disposed below the outlet 2058 and above the discharge portion 2170 of the formation device 2110. The discharge portion 2018 has a function of receiving the document 2000G that is transported by the transport unit 2056 and that is discharged via the outlet 2058.

Action and Effect

Action and effect according to the present exemplary embodiment will now be described. In the case where the same component as that of the image forming apparatus 2100 according to the present exemplary embodiment, for example, is used in the description when a comparative exemplary embodiment relative to the present exemplary embodiment is described, the reference character and name of the component, for example, are used as they are for the description.

As for the document reading device 2010 according to the present exemplary embodiment, the boundary line 2000K is formed at a position at which the boundary line 2000K is covered by the document 2000G with the document 2000G having the A3 size placed on the document table 2030. In this way, as for the document reading device 2010 that reads the document 2000G, the image of which is captured by the image capturing member 2020 that captures the image of the document 2000G, from above the document table 2030 on which the document 2000G is placed, precision with which the document 2000G is read may be improved, unlike the case where a portion within the capturing range of the image capturing member 2020 and outside the document 2000G that is placed has a gap line that corresponds to a line on a gap between members.

As for the document reading device 2010 according to the present exemplary embodiment, the boundary line 2000K is not located at the position at which the boundary line 2000K is not covered by the document 2000G having the A3 size within the capturing range of the image capturing member 2020. In this way, precision with which the document 2000G having the A3 size is read may be improved, unlike the case where the boundary line 2000K is located at the position at which the boundary line 2000K is not covered by the document 2000G having the A3 size within the capturing range of the image capturing member 2020.

The document reading device 2010 according to the present exemplary embodiment is configured d such that the boundary line 2000K is formed by the gap 2000S between the covering 2052 and the flat plate 2032 on the placement surface 2030a. In this way, as for the document reading device 2010 according to the present exemplary embodiment, the precision with which the document 2000G is read may be improved in the case where the document table 2030 is configured d by using multiple members, unlike the case where the boundary line 2000K is formed within the capturing range of the image capturing member 2020 and outside the document 2000G that is placed on the document table 2030.

The document reading device 2010 according to the present exemplary embodiment is configured d such that the boundary line 2000K is formed at the position away from the marks 2000M for adjusting the position of the document 2000G along the placement surface 2030a. In this way, as for the document reading device 2010 according to the present exemplary embodiment, the precision with which the document 2000G is read may be improved, unlike the case where the boundary line 2000K overlaps the marks 2000M.

The document reading device 2010 according to the present exemplary embodiment is configured d so as to have the single boundary line 2000K. Therefore, the document reading device 2010 according to the present exemplary embodiment looks good, unlike the case where there are multiple boundary lines 2000K.

The document reading device 2010 according to the present exemplary embodiment also includes the reading member 2050. Therefore, the document reading device 2010 according to the present exemplary embodiment is capable of reading the document 2000G by selecting one from the image capturing member 2020 and the reading member 2050.

As for the document reading device 2010 according to the present exemplary embodiment, a member of two members that configurated the document table 2030 is the covering 2052 that covers the upper surface of the reading member 2050. In this way, the document reading device 2010 according to the present exemplary embodiment may have a compact size, unlike the case where the member of the two members that configurated the document table 2030 is disposed between the flat plate 2032 and the covering 2052 of the reading member 2050.

The document reading device 2010 according to the present exemplary embodiment includes the reading member 2050 that transports the document 2000G from the intake port 2054 adjacent to the loading portion 2040 in the −W direction and the flat plate 2032 that is capable of moving in the +W direction with respect to the reading member 2050 and uncovering the upper surface of the loading portion 2040. In this way, the document reading device 2010 according to the present exemplary embodiment that is configurated d so as to include the reading member 2050 may load the document 2000G having an increased size across the loading portion 2040 and the flat plate 2032 that moves in the +W direction, unlike the case where the flat plate 2032 moves in the depth direction of the apparatus.

The document reading device 2010 according to the present exemplary embodiment is configured d such that the flat plate 2032 moves by sliding in the width direction of the apparatus. In this way, the document reading device 2010 according to the present exemplary embodiment may facilitate movement of the flat plate 2032 to uncover the upper surface of the loading portion 2040, unlike the case where the flat plate 2032 moves by rotating.

The document reading device 2010 according to the present exemplary embodiment is configured d such that the length of the covering 2052 in the width direction of the apparatus is less than half of the length of the placement surface 2030a in the width direction of the apparatus. That is, the document reading device 2010 according to the present exemplary embodiment is configurated d such that the length of the flat plate 2032 in the width direction of the apparatus is greater than half of the length of the placement surface 2030a in the width direction of the apparatus. In this way, the document reading device 2010 according to the present exemplary embodiment may load the document 2000G having an increased size across the loading portion 2040 and the flat plate 2032, unlike the case where the length of the covering 2052 in the width direction of the apparatus is greater than half of the length of the placement surface 2030a in the width direction of the apparatus.

The image forming apparatus 2100 according to the present exemplary embodiment that is configurated d such that the image of the document 2000G is captured by the image capturing member 2020 may be capable of inhibiting the image capturing member 2020 from failing to copy the document 2000G, unlike the case where the boundary line 2000K is formed within the capturing range of the image capturing member 2020 and outside the document 2000G.

In particular, the image forming apparatus 2100 according to the present exemplary embodiment is configured d such that a part of the boundary line 2000K is covered by the document 2000G when the document 2000G having the A4 size equal to the sizes of the largest number of the sheet materials 2000P having the A4 size that are containable in the container unit 2120 is placed on the placement surface 2030a. In this way, the image forming apparatus 2100 according to the present exemplary embodiment may be capable of inhibiting the image capturing member 2020 from failing to copy the document 2000G, unlike the case where the boundary line 2000K is formed within the capturing range of the image capturing member 2020 and outside the document 2000G having the A4 size.

The image forming apparatus 2100 according to the present exemplary embodiment includes the panel member 2102 that displays the information about the image forming apparatus 2100 in the +D direction. In this way, as for the image forming apparatus 2100 according to the present exemplary embodiment that is configurated d so as to include the panel member 2102 that displays the information in the +D direction, the flat plate 2032 that has the upper surface 2032a is readily moved while the content of display of the panel member 2102 is checked, unlike a configuration in which the flat plate 2032 moves in the +D direction.

The second exemplary embodiment is described in detail above, but the present disclosure is not limited to the exemplary embodiment described above, and various modifications, alterations, and improvements may be made within the range of the technical idea of the exemplary embodiment of the present disclosure.

It is not necessary for the placement surface 2030a according to the present exemplary embodiment to be completely flat. That is, the placement surface 2030a may have any shape, provided that the document 2000G is placed on the placement surface 2030a, and the image capturing member 2020 is capable of capturing the image. Accordingly, for example, the placement surface 2030a may have unevenness, provided that the document 2000G is placed on the placement surface 2030a, and the image capturing member 2020 is capable of capturing the image.

For example, the formation device 2110 according to the present exemplary embodiment is an electrophotographic formation device. However, the formation device 2110 may be, for example, an ink-jet formation device or an offset print formation device.

The document table 2030 according to the present exemplary embodiment is configurated d by using two members of the covering 2052 of the reading member 2050 and the flat plate 2032. However, the document table 2030 may be configurated d by using a single member an upper surface of which is divided into multiple surfaces by a single or multiple grooves. The single or multiple grooves is examples of a boundary line. The document table 2030 may be configurated d by using three or more members. That is, the number of the gap 2000S between members according to the exemplary embodiment of the present disclosure and the number of the boundary line 2000K that is formed by the gap 2000S may be two or more.

The single boundary line 2000K according to the present exemplary embodiment linearly extends. However, the boundary line 2000K may bend or may curve on the placement surface 2030a.

The flat plate 2032 according to the present exemplary embodiment moves by sliding in the width direction of the apparatus. However, the flat plate 2032 according to the present exemplary embodiment may be configurated d so as to slide in the depth direction of the apparatus. The flat plate 2032 according to the present exemplary embodiment may be configurated d so as to move by rotating to uncover the upper surface of the loading portion 2040 or may be configurated d so as to be installable on and removable from the document table 2030.

The length of the flat plate 2032 according to the present exemplary embodiment in the width direction of the apparatus is greater than half of the length of the placement surface 2030a in the width direction of the apparatus. However, the length of the flat plate 2032 according to the present exemplary embodiment in the width direction of the apparatus is not limited to a length greater than half of the length of the placement surface 2030a in the width direction of the apparatus but may be equal to half of the length of the placement surface 2030a in the width direction of the apparatus or may be less than half of the length of the placement surface 2030a in the width direction of the apparatus.

As for the document reading device 2010 according to the present exemplary embodiment, the maximum size of the document 2000G that has an image that the image capturing member 2020 is capable of capturing is the A3 size. However, the maximum size of the document that has an image that the image capturing member 2020 according to the present exemplary embodiment is capable of capturing is not limited to the A3 size but may be a size larger than the A3 size such as A2 or B3 or may be a size smaller than the A3 size such as A4 or B4.

As for the image forming apparatus 2100 according to the present exemplary embodiment, the size of the largest number of sheet materials 2000P that are containable in the container unit 2120 is A4. However, the size of the largest number of sheet materials 2000P that are containable in the container unit 2120 according to the present exemplary embodiment is not limited to A4 but may be A3 or may be B5.

Third Exemplary Embodiment

A third exemplary embodiment will now be described by way of example with reference to the drawings.

Image Reading Apparatus 3010

An image reading apparatus 3010 according to the third exemplary embodiment will be described. FIG. 3-1 schematically illustrates the image reading apparatus 3010 according to the present exemplary embodiment. An arrow H illustrated in figures represents a vertical direction of the apparatus. An arrow W represents a width direction of the apparatus (specifically, a horizontal direction). An arrow D represents a depth direction of the apparatus (specifically, a horizontal direction). The vertical direction of the apparatus, the width direction of the apparatus, and the depth direction of the apparatus intersect each other (specifically, at right angles).

The image reading apparatus 3010 illustrated in FIG. 3-1 reads an image. Specifically, as illustrated in FIG. 3-1, the image reading apparatus 3010 includes a transport unit 3014, an image forming member 3012, a reading member 3030, a transport mechanism 3040, a document table 3050, a discharge portion 3060, a document table 3070, and a camera 3080.

According to the present exemplary embodiment, the image reading apparatus 3010 has a function of forming an image and may be thought to be an image forming apparatus as described later.

Transport Unit 3014 and Image Forming Member 3012

The transport unit 3014 (see FIG. 3-1) transports a recording medium 3000P such as paper that is contained in a container unit 3016. Specifically, as illustrated in FIG. 3-1, the transport unit 3014 includes transport members 3014A such as multiple transport rollers and transports the recording medium 3000P by using the transport members 3014A.

The image forming member 3012 (see FIG. 3-1) forms an image on the recording medium 3000P that is transported by the transport unit 3014. The image forming member 3012 is capable of forming an image that is read by the reading member 3030 or the camera 3080 on the recording medium 3000P.

Specifically, the image forming member 3012 forms a toner image (an example of an image) on the recording medium 3000P by using an electrophotographic system. Specifically, as illustrated in FIG. 3-1, the image forming member 3012 includes toner image forming members 3020Y, 3020M, 3020C, and 3020K (referred to below as 3020Y to 3020K), a transfer body 3024, and fixing portions 3026.

As for the image forming member 3012, the toner image forming members 3020Y to 3020K perform charging, exposing, developing, and transferring processes and form toner images in respective colors of yellow (Y), magenta (M), cyan (C), and black (K) on the transfer body 3024. The image forming member 3012 transfers the toner images in the respective colors that are formed on the transfer body 3024 to the recording medium 3000P. The fixing portions 3026 fix the toner images to the recording medium 3000P. The image forming member 3012 thus uses an intermediate transfer system that transfers the images to the recording medium 3000P via the transfer body 3024.

Reading Member 3030 and Transport Mechanism 3040

The reading member 3030 illustrated in, for example, FIG. 3-1 is a component that reads the image of a document 3000G (see FIG. 3-3 and FIG. 3-5) that is transported. As illustrated in FIG. 3-1, the reading member 3030 is installed above the image forming member 3012. Specifically, the reading member 3030 includes reading sensors 3032 and 3034 and a covering 3033.

The reading sensor 3032 is a functional unit that has a function of reading an image on one of surfaces of the document 3000G that is transported. The reading sensor 3034 is a functional unit that has a function of reading an image on the other surface of the document 3000G that is transported. Examples of the reading sensors 3032 and 3034 include a contact image sensor abbreviated as a CIS.

The covering 3033 is a component that covers the reading sensor 3032. Specifically, as illustrated in FIG. 3-1, the covering 3033 includes a top plate 3035 and side plates 3037 and 3039.

The top plate 3035 is installed above the reading sensor 3032 and covers the reading sensor 3032 from above. As illustrated in FIG. 3-2 and FIG. 3-4, a part of the document 3000G the image of which is read by the camera 3080 is placed on the top plate 3035.

The side plate 3037 is installed at a position away from the reading sensor 3032 in one of the width directions of the apparatus (the left-hand direction in FIG. 3-1) and covers the reading sensor 3032 from the position away therefrom in the one of the width directions of the apparatus. The side plate 3039 is installed at a position away from the reading sensor 3032 in the other width direction of the apparatus (the right-hand direction in FIG. 3-1) and covers the reading sensor 3032 from the position away therefrom in the other width direction of the apparatus.

The one of the width directions of the apparatus corresponds to the left-hand direction of the image reading apparatus 3010, and accordingly, the one of the width directions of the apparatus is referred to below as the left-hand direction. The other width direction of the apparatus corresponds to the right-hand direction of the image reading apparatus 3010, and accordingly, the other width direction of the apparatus is referred to below as the right-hand direction. These directions are defined for convenience of description, and the configuration of the apparatus is not limited by the directions.

The side plate 3039 has an inlet 3039A via which the document 3000G that is placed on the document table 3050 enters a location inside the covering 3033. The inlet 3039A is configured d as an opening that extends in the depth direction of the apparatus.

An outlet 3039B via which the document 3000G is discharged from the location inside the covering 3033 onto the discharge portion 3060 is formed below the inlet 3039A of the side plate 3039. The outlet 3039B is configured d as an opening that extends in the depth direction of the apparatus.

The transport mechanism 3040 transports the document 3000G the image of which is read by the reading member 3030. The transport mechanism 3040 is disposed inside the covering 3033. In other words, the transport mechanism 3040 is covered by the covering 3033.

Specifically, the transport mechanism 3040 includes multiple transport members 3040A such as transport rollers. The transport mechanism 3040 transports the document 3000G that is placed on the document table 3050 from the inlet 3039A to the outlet 3039B (that is, the discharge portion 3060) along a C-shaped transport path by using the transport members 3040A.

As for the image reading apparatus 3010, the transport mechanism 3040 thus transports the document 3000G from the document table 3050 to the discharge portion 3060, and the reading member 3030 reads the image of the document 3000G that is transported by the transport mechanism 3040.

Document Table 3050

As illustrated in FIG. 3-3, FIG. 3-5, and FIG. 3-7, the document table 3050 is a table on which the document 3000G the image of which is read by the reading member 3030 (see FIG. 3-1) is placed. That is, the document table 3050 may be referred to as a component on which the document 3000G that is transported by the transport mechanism 3040 (see FIG. 3-1) is placed. The document table 3050 is an example of a second placement portion.

As for the document table 3050, the document 3000G is placed on an upper surface 3050A. Accordingly, the upper surface 3050A of the document table 3050 is referred to as a placement surface on which the document 3000G is placed. According to the present exemplary embodiment, the document 3000G is placed on the document table 3050 from above with the document table 3070 positioned at an open position as described later.

According to the present exemplary embodiment, the meaning of the "document table" represents a component on which the document 3000G is placed. Accordingly, the meaning of the "table" does not include a meaning that specifies a shape.

As illustrated in FIG. 3-1, the document table 3050 is installed adjacent to the reading member 3030 in the right-hand direction. The document table 3050 is installed below the document table 3070 and below a top surface 3035A of the top plate 3035. Accordingly, there is a step between the upper surface 3050A of the document table 3050 and the top surface 3035A of the top plate 3035.

The document table 3050 has a plate shape that extends from the side plate 3039 of the covering 3033 in the right-hand direction. The upper surface 3050A of the document table 3050 extends from the inlet 3039A in the right-hand direction. The upper surface 3050A is an inclined surface that gradually extends upward from the inlet 3039A while extending in the right-hand direction.

As illustrated in FIG. 3-3 and FIG. 3-7, the document table 3050 includes a restriction portion 3058 (a so-called a side guide). The restriction portion 3058 comes into contact with side edges of the document 3000G that is placed on the document table 3050 and restricts movement of the document 3000G in both of the depth directions of the apparatus.

One of the depth directions of the apparatus corresponds to the front direction of the image reading apparatus 3010, and accordingly, the one of the depth directions of the apparatus is referred to below as the front direction. The other depth direction of the apparatus corresponds to the rear direction of the image reading apparatus 3010, and accordingly, the other depth direction of the apparatus is referred to below as the rear direction. These directions are defined for convenience of description, and the configuration of the apparatus is not limited by the directions.

Discharge Portion 3060

Figures 1, 2, 3, 4, 5:
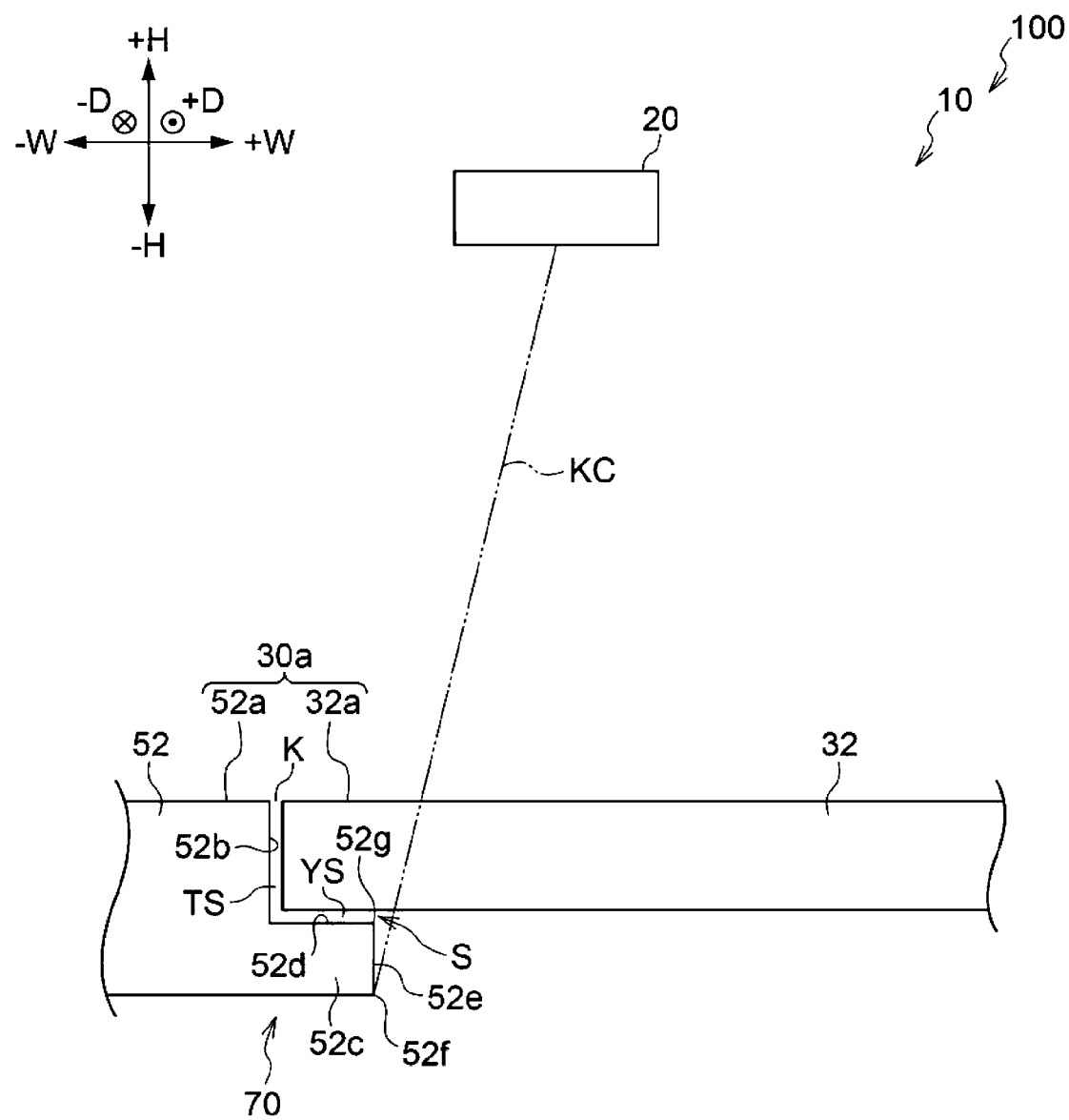

The discharge portion 3060 illustrated in, for example, FIG. 3-5 is a component onto which the document 3000G the image of which is read by the reading member 3030 is discharged. That is, the discharge portion 3060 may be referred to as a component on which the document 3000G that is transported by the transport mechanism 3040 is placed. As for the discharge portion 3060, the document 3000G is placed on an upper surface 3060A. Accordingly, the upper surface 3060A of the discharge portion 3060 is referred to as a placement surface on which the document 3000G is placed.

The discharge portion 3060 is installed below the top surface 3035A of the top plate 3035 and below the document table 3050. The discharge portion 3060 has a plate shape that extends from the side plate 3039 of the covering 3033 in the right-hand direction.

The upper surface 3060A of the discharge portion 3060 extends from the outlet 3039B in the right-hand direction. The upper surface 3060A is configured d as an inclined surface that gradually extends upward from the outlet 3039B while extending in the right-hand direction.

Document Table 3070

As illustrated in FIG. 3-2 and FIG. 3-4, the document table 3070 is a table on which the document 3000G the image of which is read by the camera 3080 is placed. The document table 3070 is an example of a placement portion and an example of a first placement portion.

As for the document table 3070, the document 3000G is placed on an upper surface 3070A. Accordingly, the upper surface 3070A of the document table 3070 is referred to as a placement surface on which the document 3000G is placed. As illustrated in FIG. 3-4, the upper surface 3070A of the document table 3070 is flush with the top surface 3035A of the top plate 3035. That is, the upper surface 3070A of the document table 3070 and the top surface 3035A of the top plate 3035 are on the same plane.

The document table 3070 is installed above the discharge portion 3060 and above the document table 3050.

Accordingly, the document table 3070 covers the upper surface 3050A of the document table 3050 from above. The document table 3070 is disposed at a height such that a user who operates the image reading apparatus 3010 is able to perform an operation of placing the document 3000G with the user standing. Specifically, the document table 3070 is disposed, for example, at a height of about 1000 mm away from a floor on which the image reading apparatus 3010 is installed.

Specifically, as illustrated in FIG. 3-3, the document table 3070 includes a top plate 3071 and side plates 3072, 3074, and 3075. The top plate 3071 has a plate shape the thickness direction of which coincides with the vertical direction as illustrated in FIG. 3-4 and has a substantially rectangular shape in a plan view as illustrated in FIG. 3-6. As for the document table 3070, as illustrated in FIG. 3-2, FIG. 3-4, and FIG. 3-6, the document 3000G is placed on the top plate 3071. Accordingly, the upper surface of the top plate 3071 configured s the upper surface 3070A of the document table 3070.

As illustrated in FIG. 3-4, the top plate 3071 is installed above the document table 3050. The dimensions of the top plate 3071 in the width direction of the apparatus and in the depth direction of the apparatus are larger than the dimensions of the document table 3050 in the width direction of the apparatus and in the depth direction of the apparatus.

The side plate 3075 extends downward from a right-hand edge portion of the top plate 3071. The side plate 3075 has a plate shape the thickness direction of which coincides with the width direction of the apparatus. The side plate 3075 is installed at a position away from the document table 3050 in the right-hand direction and covers the document table 3050 from the position away therefrom in the right-hand direction.

The side plates 3072 and 3074 extend downward from a front edge portion and a rear edge portion of the top plate 3071 (see FIG. 3-3). The side plates 3072 and 3074 have a plate shape the thickness direction of which coincides with the depth direction of the apparatus. The side plates 3072 and 3074 are installed at positions in front of and behind the document table 3050 and cover the document table 3050 from the positions in front of and behind the document table 3050.

The document table 3070 is movable to a covering position (a position illustrated in FIG. 3-1, FIG. 3-2, FIG. 3-4, and FIG. 3-6) at which the document table 3070 covers the document table 3050 from above and an open position (a position illustrated in FIG. 3-3, FIG. 3-5, and FIG. 3-7) at which the document table 3070 uncovers the upper surface of the document table 3050. According to the present exemplary embodiment, the document table 3070 is supported by an apparatus body 3011 that serves as a support body so as to be movable to the covering position and the open position.

As illustrated in FIG. 3-8 and FIG. 3-9, the side plates 3072 and 3074 include respective rails 3076 that have long holes that extend in a left-right direction. Two shaft portions 3057 that are disposed on the front surface and rear surface of the document table 3050 are inserted in the rails 3076. The two shaft portions 3057 guide the document table 3070 to the covering position (a position illustrated in FIG. 3-8) and the open position (a position illustrated in FIG. 3-9) along the rails 3076. The document table 3070 moves between the covering position (the position illustrated in FIG. 3-8) and the open position (the position illustrated in FIG. 3-9) in the width directions of the apparatus.

As illustrated in FIG. 3-3, FIG. 3-5, and FIG. 3-7, the document table 3070 is located opposite the document table 3050 with respect to the reading member 3030 (that is, away therefrom in the right-hand direction) when being positioned at the open position. A part of the document 3000G that is placed on the document table 3050 is placed on the document table 3070 that is positioned at the open position.

The image reading apparatus 3010 thus includes a movement mechanism that moves the document table 3070 by using the two shaft portions 3057 and the rails 3076. The movement mechanism is not limited by the configuration described above and may be configurated d by using various mechanical factors.

The document table 3070 has a function of a covering that covers the document table 3050 as described above. That is, the document table 3070 doubles as the covering that covers the document table 3050. The document table 3070 has the function of the covering and may be thought to be the covering (a covering member) of the document table 3050.

Camera 3080

The camera 3080 is a camera (a so-called a document camera) that is capable of reading the image of the document 3000G (an example of an object) that is placed on the document table 3070. The camera 3080 is installed above the document table 3070. The camera 3080 faces downward and is capable of reading the image of the document 3000G that is placed on the upper surface 3070A of the document table 3070. The camera 3080 is an example of an image capturing member that captures the image of the object.

An example of the camera 3080 is a digital camera that includes an optical system such as a lens and an imaging element that converts photosensitivity into an electrical signal. Examples of the imaging element include a charge coupled device (CCD) and a complementary metal oxide semiconductor (CMOS). The optical axis of the camera 3080 coincides with, for example, the vertical direction when viewed from the front.

The camera 3080 is supported by a support portion 3085 that is disposed on the apparatus body 3011. The support portion 3085 includes a support rod 3087 that extends upward from the apparatus body 3011 at the rear of the document table 3070 and a mounting portion 3089 that extends forward from an upper end portion of the support rod 3087. The camera 3080 is mounted on the mounting portion 3089.

As illustrated in FIG. 3-6, the reading range 3000MH of the camera 3080 is across the reading member 3030 and the document table 3070. The top surface 3035A of the top plate 3035 of the reading member 3030 and the upper surface 3070A of the document table 3070 are flat at least in the reading range 3000MH of the camera 3080. According to the present exemplary embodiment, the entire top surface 3035A of the top plate 3035 and the entire upper surface 3070A of the document table 3070 are flat. The reading range 3000MH is an example of a capturing range.

The meaning of "being flat" described herein represents that the surfaces are flat to such an extent that the document 3000G that is supported has a posture that is suitable for being read by the camera 3080, and unevenness is permitted provided that the document is supported in the posture that is suitable for being read by the camera 3080.

The posture of the document 3000G that is suitable for reading is a smooth posture that enables at least the degree of a warp to be smaller than that in the case where the document 3000G (specifically, plain paper) is placed across the top surface 3035A of the top plate 3035 and the upper surface 3050A of the document table 3050.

The top surface 3035A of the top plate 3035 of the reading member 3030 and the upper surface 3070A of the document table 3070 may be perpendicular to the optical axis of the camera 3080. As for the image reading apparatus 3010, at least an angle between the top surface 3035A and the optical axis of the camera 3080, that is, the vertical direction and an angle between the upper surface 3070A and the vertical direction are smaller than an angle between the upper surface 3050A of the document table 3050 and the vertical direction when viewed from the front.

As for the image reading apparatus 3010, the camera 3080 reads the image in a manner in which the document 3000G is placed on the document table 3070 that is positioned at the covering position and the top surface 3035A of the top plate 3035 of the reading member 3030, and the document 3000G is imaged by the camera 3080. The image is formed on the document 3000G and includes, for example, a character, a picture, and a photograph.

The top surface 3035A and the upper surface 3070A that function as the placement surfaces on which the document 3000G is placed may not be flat. That is, the top surface 3035A and the upper surface 3070A may not be flat, provided that the top surface 3035A and the upper surface 3070A enable the document 3000G that is placed on the top surface 3035A and the upper surface 3070A to be imaged by the camera 3080. Accordingly, for example, the top surface 3035A and the upper surface 3070A may have unevenness, provided that the document 3000G is placed on the top surface 3035A and the upper surface 3070A and imaged by the camera 3080.

Action According to Present Exemplary Embodiment

The image reading apparatus 3010 includes the reading member 3030 that reads the image of the document 3000G that is transported, the discharge portion 3060 onto which the document 3000G the image of which is read by the reading member 3030 is discharged, the document table 3070 that is installed above the discharge portion 3060, and the camera 3080 that is installed above the document table 3070 and that is capable of reading the image of the document 3000G (an example of the object) that is placed on the document table 3070. In this way, as for the image reading apparatus 3010 that includes the reading member 3030 that reads the image of the document 3000G transported, both of the reading member 3030 and the camera 3080 that reads the image of the document 3000G and that is installed above the document table 3070 that is installed above the discharge portion 3060 to which the document 3000G is discharged may be installable.

As for the image reading apparatus 3010, the upper surface 3070A of the document table 3070 is flat at least in the reading range 3000MH of the camera 3080. In this way, the document 3000G may be placed in a posture that is more suitable for being read by the camera 3080 than the case where the upper surface 3070A of the document table 3070 has unevenness in the reading range 3000MH of the camera 3080 such that the document is difficult to support in the posture that is suitable for being read.

As for the image reading apparatus 3010, the top surface 3035A of the top plate 3035 of the reading member 3030 and the upper surface 3070A of the document table 3070 are flat at least in the reading range 3000MH of the camera 3080. In this way, the document 3000G may be placed in a posture that is more suitable for being read by the camera 3080 than in the case where the upper surface 3070A of the document table 3070 and the top surface 3035A of the top plate 3035 have unevenness in the reading range 3000MH of the camera 3080 such that the document is difficult to support in the posture that is suitable for being read.

As for the image reading apparatus 3010, the document 3000G is placed on the upper surface 3070A of the document table 3070 and the top surface 3035A of the top plate 3035. In this way, a range in which the document 3000G is placed may be increased to a range wider than that in the case where the document 3000G is placed on only the upper surface 3070A of the document table 3070.

As for the image reading apparatus 3010, the document table 3070 is capable of moving to the open position at which the document table 3070 uncovers the upper surface of the document table 3050. In this way, the document 3000G may be placed on the document table 3050 from above the document table 3050.

As for the image reading apparatus 3010, a part of the document 3000G that is placed on the document table 3050 is placed on the document table 3070 that is positioned at the open position. In this way, a range in which the document 3000G is placed may be increased to a range wider than that in the case where the document 3000G is placed on only the document table 3050.

As for the image reading apparatus 3010, the document table 3070 is disposed at the height such that the user who operates the image reading apparatus 3010 is able to perform the operation of placing the document 3000G with the user standing. In this way, the user may perform the operation of placing the document 3000G on the document table 3070 while the user is not sitting.

The image reading apparatus 3010 includes the image forming member 3012 that is capable of forming the image that is read by the reading member 3030 or the camera 3080 on the recording medium 3000P. In this way, the image of the document 3000G that is transported or the image of the document 3000G that is placed on the document table 3070 may be formed on the recording medium 3000P.

Modification to Image Forming Member 3012

Examples of the image forming member are not limited to the image forming member 3012 described above. An example of the image forming member may be an image forming member that uses a direct transfer method in which the toner image forming members 3020Y to 3020K directly form the toner images on the recording medium 3000P without using the transfer body 3024. Another example of the image forming member may be an image forming member that forms an image by spraying ink to the recording medium 3000P, provided that the image forming member has a function of forming the image on the recording medium 3000P.

Modification to Reading Member 3030

The reading member 3030 uses a contact image sensor as a functional unit that has a function of reading an image but is not limited thereto. An example of the functional unit may be an image sensor such as a CCD, provided that the functional unit is capable of reading the image.

According to the present exemplary embodiment, the reading member 3030 includes the reading sensors 3032 and 3034 as functional units that have a function of reading an image but is not limited thereto. The reading member 3030 may be configurated d so as to include only one of the reading sensors 3032 and 3034. That is, the reading member 3030 is capable of reading at least the image on one of the surfaces of the document 3000G.

According to the present exemplary embodiment, the covering 3033 is thought to be a component that configurated s a part of the reading member 3030 that includes the reading sensors 3032 and 3034 but is not limited thereto. For example, the covering 3033 may be thought to be a component that configurated s a part of a transport unit that includes the transport mechanism 3040.

Modification to Camera 3080

An example of the image that is read by the camera 3080 is not limited to an image that includes, for example, a character, a picture, and a photograph. An example of the image that is read by the camera 3080 may be a still image or a video image, provided that the camera 3080 is capable of reading the image.

Examples of the object are not limited to the document 3000G. An example of the object may be a video device (such as a smart phone or a mobile terminal) that captures an image, a book, and a card, provided that the camera 3080 is capable of imaging the object.

The object may be any object, provided that the object is placed on the document table 3070 and the covering 3033. Accordingly, the camera 3080 may be configurated d so as to be capable of capturing not only the image but also the still image or video image of the object itself.

Modification to Document Table 3070

As illustrated in FIG. 3-4, the upper surface 3070A of the document table 3070 is flush with the top surface 3035A of the top plate 3035 but is not limited thereto. The upper surface 3070A of the document table 3070 and the top surface 3035A of the top plate 3035 may have a step. For example, the step is formed such that the document is supported in the posture that is suitable for being read by the camera 3080.

Other Modifications

As for the image reading apparatus 3010, the top surface 3035A of the top plate 3035 of the reading member 3030 and the upper surface 3070A of the document table 3070 may be flat at least in the reading range of the camera 3080 and may have unevenness outside the reading range of the camera 3080 such that the document is difficult to support in the posture that is suitable for being read.

The image reading apparatus 3010 is configurated d such that the document 3000G the image of which is read by the camera 3080 is placed on the document table 3070 that is positioned at the covering position and the top surface 3035A of the top plate 3035 of the reading member 3030 but may be configurated d such that the document 3000G is placed on only the document table 3070. In this case, the reading range 3000MH of the camera 3080 may be a range that covers only the document table 3070.

As for the image reading apparatus 3010, the document table 3070 is used as an example of the placement portion but is not limited thereto. As for the image reading apparatus 3010, for example, the document table 3050 may be used as an example of the placement portion. That is, an object such as the document 3000G the image of which is read by the camera 3080 may be placed on the document table 3050. In this case, for example, the document table 3070 may be configurated d so as to be secured at the open position or the document table 3070 may not be provided.

The image reading apparatus 3010 includes the image forming member 3012 but may not include the image forming member 3012.

The present disclosure is not limited to the exemplary embodiment described above but may be modified, altered, and improved in various ways without departing from the spirit thereof. For example, the modifications described above may be configurated d by appropriately combining some of these.

Fourth Exemplary Embodiment

An example of an image forming apparatus and a container apparatus according to a fourth exemplary embodiment of the present disclosure will be described with reference to FIG. 4-1 to FIG. 4-7. An arrow H illustrated in figures represents the vertical direction of the apparatus that is vertical. An arrow W represents the width direction of the apparatus that is horizontal. An arrow D represents the depth direction of the apparatus that is horizontal.

Entire Configuration of Image Forming Apparatus

As illustrated in FIG. 4-1, an image forming apparatus 4010 includes an image forming member 4012 that forms a toner image by using an electrophotographic system and a container apparatus 4110 that includes a transport unit 4014 that transports a recording medium P along a transport path 4016 and container units 4060, 4070, and 4080 that contain recording media P. The image forming apparatus 4010 also includes a controller 4028 that controls components and a principal power supply 4036 that supplies the power of a commercial principal power supply to components.

As for the image forming apparatus 4010 that has the above configuration, the recording media P are contained in the container units 4060, 4070, and 4080, and the recording medium P that is contained in any one of the container units 4060, 4070, and 4080 is transported along the transport path 4016 by using the transport unit 4014. The toner image that is formed by the image forming member 4012 is formed on the transported recording medium P, and the recording medium P on which the toner image is formed is discharged to a location outside an apparatus body 4010a.

Image Forming Member 4012

As illustrated in FIG. 4-1, the image forming member 4012 includes multiple toner image forming members 4030 that form toner images in respective colors and a transfer member 4032 that transfers the toner images that are formed by the toner image forming members 4030 to the recording medium P. The image forming member 4012 also includes a fixing device 4034 that fixes the toner images that are transferred to the recording medium P by using the transfer member 4032 to the recording medium P.

Toner Image Forming Member 4030

The toner image forming members 4030 are provided so as to form the toner images in the respective colors. According to the present fourth exemplary embodiment, the toner image forming members 4030 for the four colors of yellow (Y), magenta (M), cyan (C), and black (K) are provided. In the following description, Y, M, C, and K in reference characters are omitted when it is not necessary to distinguish among yellow (Y), magenta (M), cyan (C), and black (K).

The toner image forming members 4030 for the respective colors are basically configurated d in the same manner except for toner that is used. As illustrated in FIG. 4-2, each toner image forming member 4030 includes an image carrier 4040 that is rotatable and that is cylindrical and a charger 4042 that charges the image carrier 4040. Each toner image forming member 4030 also includes an exposure device

4044 that radiates exposure light to the image carrier 4040 that is charged and that forms an electrostatic latent image and a developing device 4046 that develops the electrostatic latent image into the toner image by using a developer G that contains the toner. Consequently, the toner image forming members 4030 for the respective colors form images in the respective colors by using the toner in the respective colors.

As illustrated in FIG. 4-1, the image carriers 4040 for the respective colors are in contact with a transfer belt 4050 (described in detail later) that turns. The toner image forming members 4030 for yellow (Y), magenta (M), cyan (C), and black (K) are disposed in this order from an upstream position in the direction in which the transfer belt 4050 turns (see an arrow in the figure).

Transfer Member 4032

As illustrated in FIG. 4-1, the transfer member 4032 includes the transfer belt 4050 and first transfer rollers 4052 that are disposed opposite the image carriers 4040 for the respective colors with the transfer belt 4050 interposed therebetween and that transfer the toner images that are formed by the image carriers 4040 for the respective colors to the transfer belt 4050.

The transfer member 4032 also includes a winding roller 4056 around which the transfer belt 4050 is wound and a drive roller 4058 around which the transfer belt 4050 is wound for transmitting rotational force to the transfer belt 4050. Consequently, the transfer belt 4050 turns in the direction of the arrow in the figure.

The transfer member 4032 also includes a second transfer roller 4054 that is disposed opposite the winding roller 4056 with the transfer belt 4050 interposed therebetween and that transfers the toner images that are transferred to the transfer belt 4050 to the recording medium P. A transfer nip NT at which the toner images are transferred to the recording medium P is formed between the second transfer roller 4054 and the transfer belt 4050.

With this configuration, the toner images are first-transferred to the transfer belt 4050 in the order of yellow (Y), magenta (M), cyan (C), and black (K) by using the first transfer rollers 4052. The second transfer roller 4054 transfers the toner images from the transfer belt 4050 to the recording medium P that is transported between the transfer belt 4050 and the second transfer roller 4054. The recording medium P to which the toner images are transferred is transported toward the fixing device 4034.

Fixing Device 4034

As illustrated in FIG. 4-1, the fixing device 4034 is disposed downstream of the transfer nip NT in the direction in which the recording medium P is transported. The fixing device 4034 heats and compresses the toner images that are transferred to the recording medium P and fixes the toner images to the recording medium P.

Container Apparatus 4110

As illustrated in FIG. 4-1, the container apparatus 4110 is located in a lower portion of the image forming apparatus 4010 and includes the three container units 4060, 4070, and 4080 that contain the recording media P, and the transport unit 4014 that transports the recording media P. The container unit 4060 that is located at the highest position tilts with respect to the horizontal direction. The container apparatus 4110 will be described in detail later.

Controller 4028 and Principal Power Supply 4036

The controller 4028 and the principal power supply 4036 are disposed in a triangular region that is formed between the container unit 4060 that tilts and the image forming member 4012.

Configuration of Principal Component

The container apparatus 4110 will now be described.

As illustrated in FIG. 4-1, the container apparatus 4110 is located in the lower portion of the image forming apparatus 4010. As illustrated in FIG. 4-3, the container apparatus 4110 includes an apparatus body 4110a, the container unit 4060 that contains the recording medium P, the container unit 4070 that contains the recording medium P, and the container unit 4080 that contains the recording medium P. The container apparatus 4110 also includes sliding rails 4064 that enable the container unit 4060 to move in the depth direction of the apparatus, sliding rails 4074 that enable the container unit 4070 to move in the depth direction of the apparatus, and sliding rails 4084 that enable the container unit 4080 to move in the depth direction of the apparatus. The container apparatus 4110 also includes the transport unit 4014 that transports the recording media P and a covering 4130 (see FIG. 4-5A and FIG. 4-5B) that covers the apparatus body 4110a in the width direction of the apparatus.

The container unit 4060 is an example of a first container unit, the container unit 4070 is an example of a second container unit, and the container unit 4080 is an example of a third container unit. The depth direction of the apparatus is an example of a first direction. The width direction of the apparatus is an example of "sideways". The apparatus body 4110a of the container apparatus 4110 corresponds to a lower portion of the apparatus body 4010a of the image forming apparatus 4010.

The container unit 4060, the container unit 4070, and the container unit 4080 are arranged in this order downward from above. The maximum size of the recording medium P that is containable in the container unit 4070 is smaller than the maximum size of the recording medium P that is containable in the container unit 4060. The maximum size of the recording medium P that is containable in the container unit 4080 is smaller than the maximum size of the recording medium P that is containable in the container unit 4060 and is larger than the maximum size of the recording medium P that is containable in the container unit 4070.

The maximum size of the recording medium P that is containable in the container unit 4060 is an example of a first size. The maximum size of the recording medium P that is containable in the container unit 4070 is an example of a second size. The maximum size of the recording medium P that is containable in the container unit 4080 is an example of a third size.

According to the present fourth exemplary embodiment, the container unit 4060 principally contains the recording medium P having the A3 size, and the A3 size is the maximum size of the recording medium P that is containable in the container unit 4060. The container unit 4070 principally contains the recording medium P that has a postcard size, and the postcard size is the maximum size of the recording medium P that is containable in the container unit 4070. The container unit 4080 principally contains the recording medium P having the A4 size, and the A4 size is the maximum size of the recording medium P that is containable in the container unit 4080.

As for the length of each contained recording medium P in a front-rear direction, the recording medium P that is contained in the container unit 4060 is longest, and the recording medium P that is contained in the container unit 4080 is longer than the recording medium P that is contained in the container unit 4070. The length of each recording medium P in the front-rear direction described herein corresponds to the length of the recording medium P in the direction in which the recording medium P is fed to the transport path 4016.

The number of the recording media P that are containable in the container unit 4080 is larger than the number of the recording media P that are containable in the container unit 4060 and the number of the recording media that are containable in the container unit 4070.

According to the present fourth exemplary embodiment, the container unit 4060 is capable of containing 200 recording media P, the container unit 4070 is capable of containing 100 recording media P, and the container unit 4080 is capable of containing 1000 recording media P.

As for the total thickness of the containable recording media P in the thickness direction, the total thickness of the recording media P that are containable in the container unit 4080 is the greatest thickness, and the total thickness of the recording media P that are containable in the container unit 4060 is greater than the total thickness of the recording media P that are containable in the container unit 4070. That is, the total thickness of the recording media P that are containable in the container unit 4070 is the least thickness.

As for the image forming apparatus 4010, the consumption of the recording media P having the A4 size is highest. That is, the number of the recording media P that are containable in the container unit 4080 and that have the highest consumption is larger than the number of the recording media P that are containable in the container unit 4060 and the number of the recording media P that are containable in the container unit 4070.

Transport Unit 4014

As illustrated in FIG. 4-1, the transport unit 4014 includes a feed roller 4020a that feeds the recording medium P that is contained in the container unit 4060 to the transport path 4016 and prevention rollers 4022a that prevent multiple recording media P that are fed by the feed roller 4020a from being transported.

The transport unit 4014 also includes a feed roller 4020b that feeds the recording medium P that is contained in the container unit 4070 to the transport path 4016 and prevention rollers 4022b that prevent multiple recording media P that are fed by the feed roller 4020b from being transported.

The transport unit 4014 also includes a feed roller 4020c that feeds the recording medium P that is contained in the container unit 4080 to the transport path 4016 and prevention rollers 4022c that prevent multiple recording media P that are fed by the feed roller 4020c from being transported.

The transport unit 4014 also includes adjustment rollers 4024 that are disposed downstream of the prevention rollers 4022a, 4022b, and 4022c in the direction in which the recording medium P is transported and that adjust a timing with which the recording medium P is transported to the transfer nip NT. The transport unit 4014 also includes discharge rollers 4026 that discharge the recording medium P to which the toner images are fixed by the fixing device 4034 to the location outside the apparatus body 4010a.

Container Unit 4060 and Sliding Rail 4064

As illustrated in FIG. 4-3, the container unit 4060 has a box shape that opens upward. The two sliding rails 4064 are mounted to the respective edges of the container unit 4060 in the width direction of the apparatus.

Each sliding rail 4064 includes an outer member, an intermediate member, and an inner member. The outer member is mounted on the apparatus body 4110a. The inner member is mounted on the container unit 4060. These enable the container unit 4060 to move in the depth direction of the apparatus with respect to the apparatus body 4110a.

Figures 1, 4:
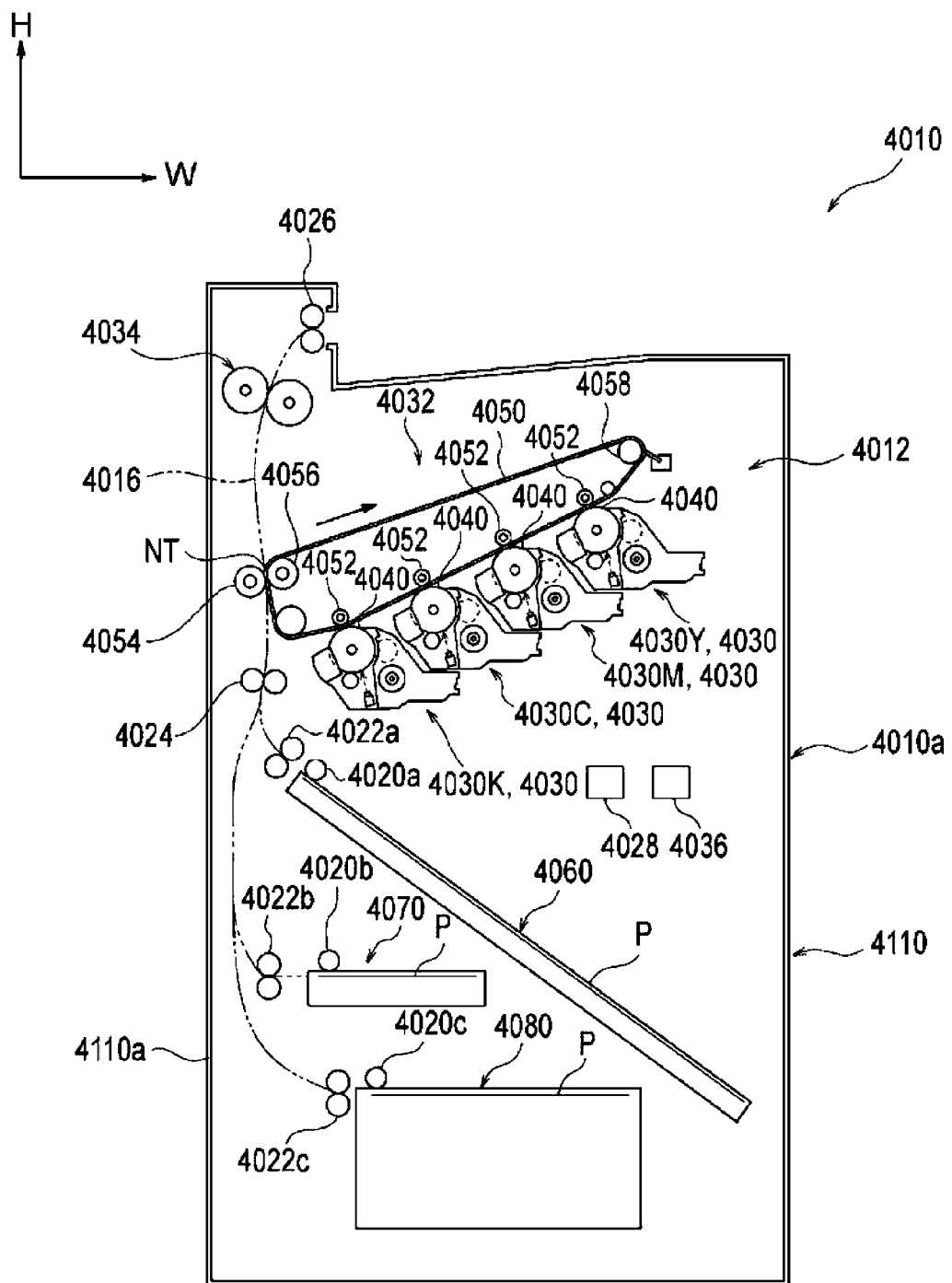
Figures 2, 4:
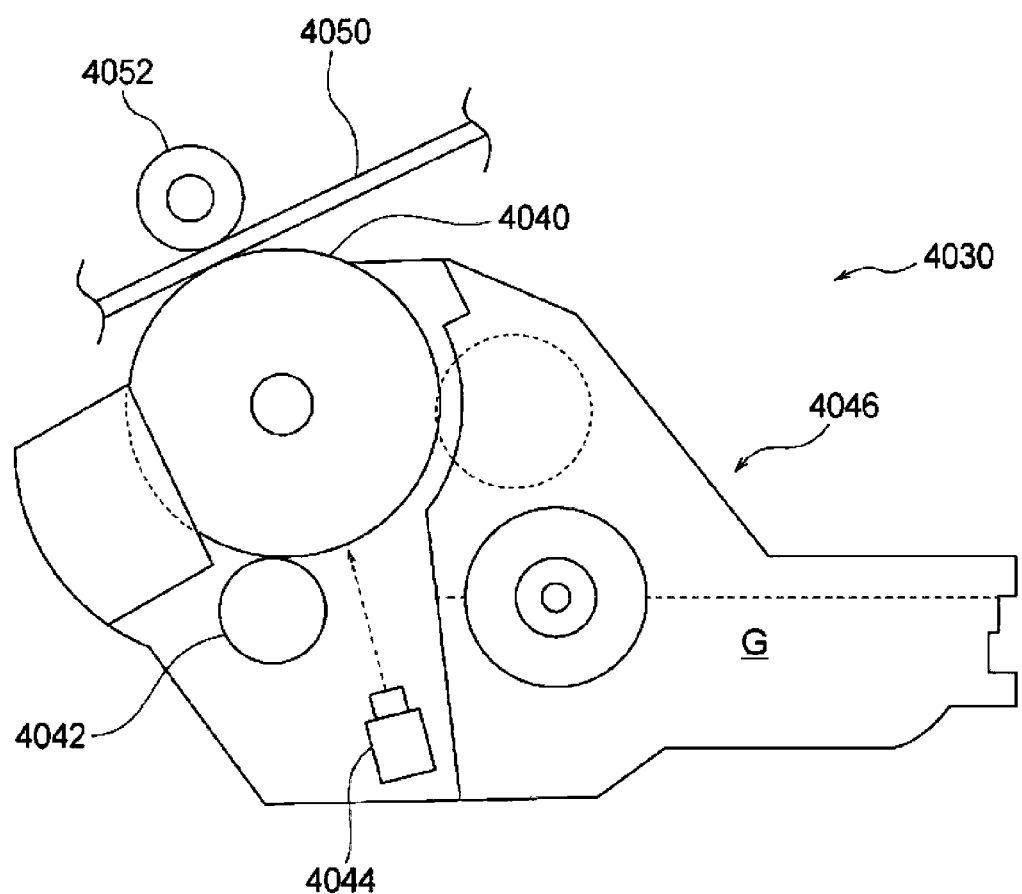
Figures 3, 4:
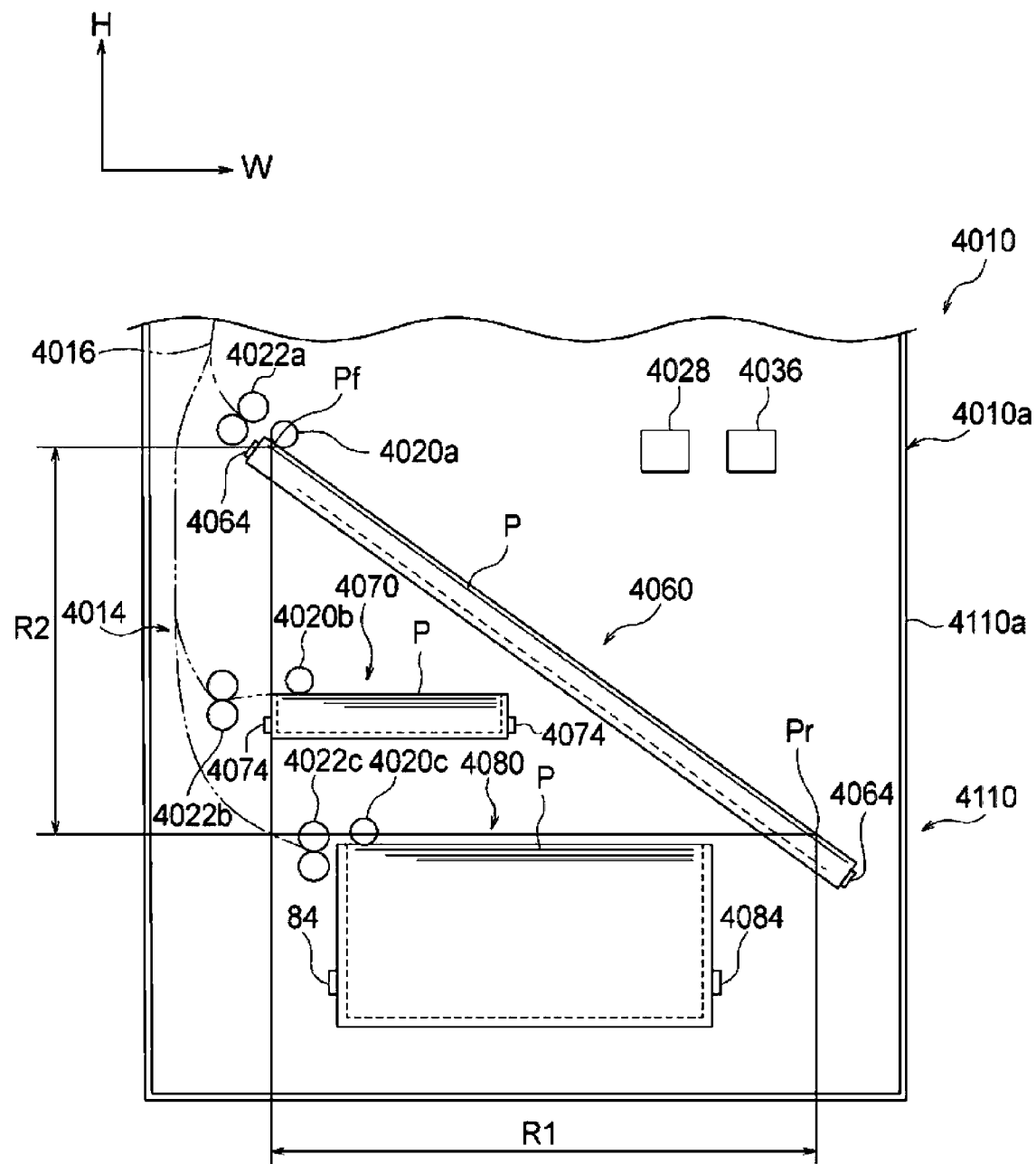
Figures 4, 4A:
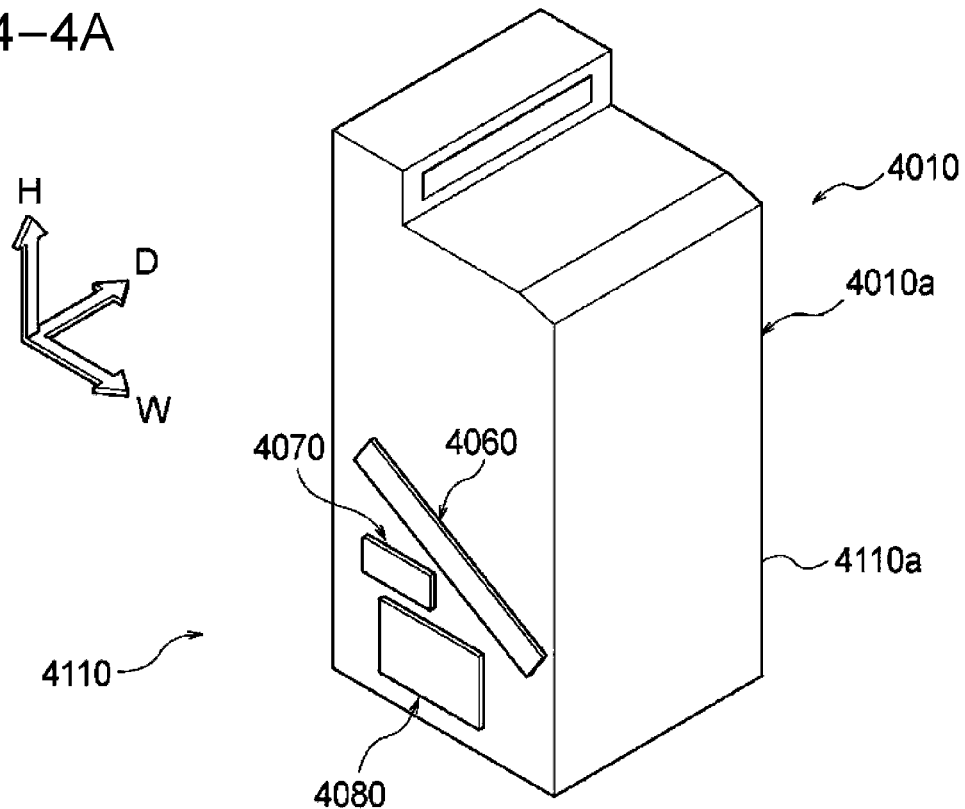

As illustrated in FIG. 4-3 and FIG. 4-4A, the container unit 4060 tilts with respect to the horizontal direction with the container unit 4060 installed in the apparatus body 4110a such that a first end (a left-hand end portion in the figures) and a second end in the width direction of the apparatus are located at different heights when viewed in the depth direction of the apparatus. Specifically, the container unit 4060 tilts with respect to the horizontal direction such that the first end in the width direction of the apparatus is higher than the second end when viewed in the depth direction of the apparatus. The first end and the second end described herein correspond to portions of the container unit 4060 that are farthest from each other in the width direction of the apparatus. In other words, the first end of the container unit 4060 is a downstream end portion of the container unit 4060, and the second end of the container unit 4060 is an upstream end portion of the container unit 4060. The upstream end portion or the downstream end portion of the container unit 4060 means an intersection point between a plane on which the recording medium P that is contained in the container unit 4060 is placed and the container unit 4060.

The posture of the recording medium P that is contained in the container unit 4060 is that a surface of the recording medium P is along a bottom plate of the container unit 4060.

According to the present fourth exemplary embodiment, the container unit 4060 tilts with respect to the horizontal direction such that a leading edge Pf of the recording medium P that is contained in the container unit 4060 is higher than a trailing edge Pr. The leading edge Pf of the recording medium P described herein is an edge in the direction in which the recording medium P is fed to the transport path 4016 (see FIG. 4-1), and the trailing edge Pr of the recording medium P is an edge opposite the leading edge Pf.

The recording medium P that is contained in the container unit 4060 is transportable by using the transport unit 4014 with the container unit 4060 installed in the apparatus body 4110a. In other words, the container unit 4060 that is installed in the apparatus body 4110a is positioned at a first transport position at which the contained recording medium P is transportable.

Figures 4, 4B:
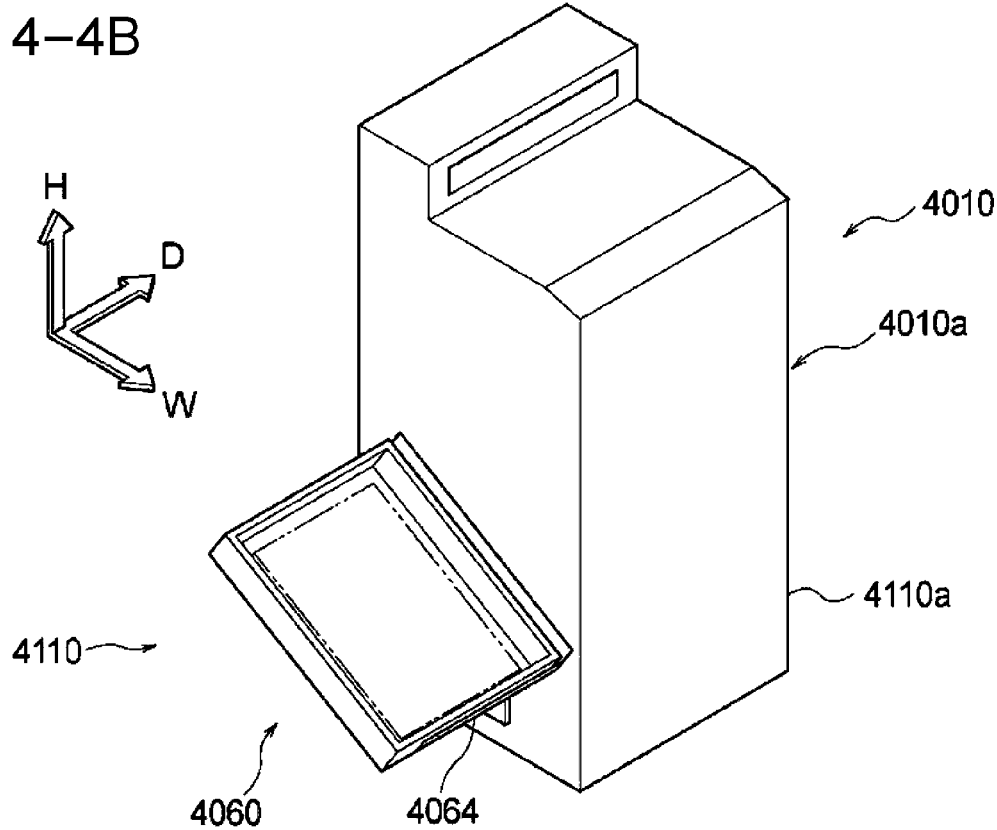

The user pulls the container unit 4060 that is installed in the apparatus body 4110a forward in the depth direction of the apparatus, and consequently, the container unit 4060 is guided by the sliding rails 4064, comes into contact with a stopper not illustrated, stops, and is separated from the apparatus body 4110a as illustrated in FIG. 4-4B. The user pushes the container unit 4060 that is separated from the apparatus body 4110a backward in the depth direction of the apparatus, and consequently, the container unit 4060 is guided by the sliding rails 4064 and is installed in the apparatus body 4110a. In a state of separation, the recording medium P is containable in the container unit 4060. According to the present fourth exemplary embodiment, the container unit 4060 is not removed from the apparatus body 4110a but is supported by the apparatus body 4110a, and the recording medium P is containable in the container unit 4060 with the container unit 4060 separated from the apparatus body 4110a.

The container unit 4060 tilts with respect to the horizontal direction such that the first end and the second end in the width direction of the apparatus are located at different heights with the container unit 4060 separated from the apparatus body 4110a when viewed in the depth direction of the apparatus. Specifically, the container unit 4060 that is separated from the apparatus body 4110a overlaps the container unit 4060 that is installed in the apparatus body 4110*a* when viewed in the depth direction of the apparatus. In other words, the container unit 4060 that is separated from the apparatus body is located within the width of the apparatus body 4110*a* when viewed in the depth direction of the apparatus.

The container unit 4060 opens upward and enables the recording medium P to be supplied to the container unit 4060 with the container unit 4060 separated from the apparatus body 4110*a*. In other words, the container unit 4060 that is separated from the apparatus body 4110*a* is positioned at a first supply position at which the container unit 4060 enables the recording medium P to be supplied to the container unit 4060. The first supply position is an example of a second position.

Container Unit 4070 and Sliding Rail 4074

As illustrated in FIG. 4-3, the container unit 4070 has a box shape that opens upward. The two sliding rails 4074 are mounted to the respective edges of the container unit 4070 in the width direction of the apparatus.

Each sliding rail 4074 includes an outer member, an intermediate member, and an inner member. The outer member is mounted on the apparatus body 4110*a*. The inner member is mounted on the container unit 4070.

The user pulls the container unit 4070 that is installed in the apparatus body 4110*a* forward in the depth direction of the apparatus, and consequently, the container unit 4070 is guided by the sliding rails 4074 and is separated from the apparatus body 4110*a*. The user pushes the container unit 4070 that is separated from the apparatus body 4110*a* backward in the depth direction of the apparatus, and consequently, the container unit 4070 is guided by the sliding rails 4074 and is installed in the apparatus body 4110*a*.

As illustrated in FIG. 4-3, the container unit 4070 is horizontally disposed with the container unit 4070 installed in the apparatus body 4110*a*, and the container unit 4070 is horizontally disposed with the container unit 4070 separated from the apparatus body 4110*a* when viewed in the depth direction of the apparatus. According to the present fourth exemplary embodiment, an example of the state in which the container unit 4070 is horizontally disposed includes the state in which the recording medium P that is contained in the container unit 4070 does not move due to the tilt although the container unit 4070 is permitted to slightly tilt, provided that the container unit 4070 extends in the horizontal direction.

The container unit 4070 that is installed in the apparatus body 4110*a* is positioned at a second transport position at which the contained recording medium P is transportable. The container unit 4070 that is separated from the apparatus body 4110*a* is positioned at a second supply position at which the container unit 4070 enables the recording medium P to be supplied to the container unit 4070.

The container unit 4070 that is installed in the apparatus body 4110*a* is pulled forward from the apparatus body 4110*a* in the depth direction of the apparatus regardless of the position of the container unit 4060.

The recording medium P having the maximum size that is contained in the container unit 4070 is located within the range (R1 in the figure) in which the recording medium P having the maximum size is contained in the container unit 4060 in the width direction of the apparatus when viewed in the depth direction of the apparatus. The recording medium P having the maximum size that is contained in the container unit 4070 is located within the range (R2 in the figure) in which the recording medium P having the maximum size is contained in the container unit 4060 in the vertical direction of the apparatus when viewed in the depth direction of the apparatus.

Container Unit 4080 and Sliding Rail 4084

As illustrated in FIG. 4-3, the container unit 4080 has a box shape that opens upward. The two sliding rails 4084 are mounted to the respective edges of the container unit 4080 in the width direction of the apparatus.

Each sliding rail 4084 includes an outer member, an intermediate member, and an inner member. The outer member is mounted on the apparatus body 4110*a*. The inner member is mounted on the container unit 4080.

The user pulls the container unit 4080 that is installed in the apparatus body 4110*a* forward in the depth direction of the apparatus, and consequently, the container unit 4080 is guided by the sliding rails 4084 and is separated from the apparatus body 4110*a*. The user pushes the container unit 4080 that is separated from the apparatus body 4110*a* backward in the depth direction of the apparatus, and consequently, the container unit 4080 is guided by the sliding rails 4084 and is installed in the apparatus body 4110*a*.

As illustrated in FIG. 4-3, the container unit 4080 is horizontally disposed with the container unit 4080 installed in the apparatus body 4110*a*, and the container unit 4080 is horizontally disposed with the container unit 4080 separated from the apparatus body 4110*a* when viewed in the depth direction of the apparatus. According to the present fourth exemplary embodiment, an example of the state in which the container unit 4080 is horizontally disposed includes the state in which the recording medium P that is contained in the container unit 4080 does not move due to the tilt although the container unit 4080 is permitted to slightly tilt, provided that the container unit 4080 extends in the horizontal direction.

The container unit 4080 that is installed in the apparatus body 4110*a* is positioned at a third transport position at which the contained recording medium P is transportable. The container unit 4080 that is separated from the apparatus body 4110*a* is positioned at a third supply position at which the container unit 4080 enables the recording medium P to be supplied to the container unit 4080.

The container unit 4080 that is installed in the apparatus body 4110*a* is pulled forward from the apparatus body 4110*a* in the depth direction of the apparatus regardless of the position of the container unit 4060.

The recording medium P having the maximum size that is contained in the container unit 4080 is located within the range R1 in which the recording medium P having the maximum size is contained in the container unit 4060 in the width direction of the apparatus when viewed in the depth direction of the apparatus.

Covering 4130

As illustrated in FIG. 4-5A and FIG. 4-5B, the covering 4130 is mounted on the apparatus body 4110*a* and moves to a covering position at which the covering 4130 covers a first side surface of the apparatus body 4110*a* in the width direction of the apparatus and an open position at which the covering 4130 uncovers the first side surface of the apparatus body 4110*a* in the width direction of the apparatus.

The covering 4130 that is positioned at the covering position covers at least a part of the transport path 4016, along which the recording medium P is transported by the transport unit 4014, in the width direction of the apparatus. For this reason, the covering 4130 that is positioned at the open position uncovers at least a part of the transport path 4016 (see FIG. 4-1), along which the recording medium P is transported by the transport unit 4014, in the width direction of the apparatus.

According to the present fourth exemplary embodiment, the covering 4130 has a function of covering the first side surface of the apparatus body 4010a of the image forming apparatus 4010. That is, the covering 4130 moves to the covering position at which the covering 4130 covers the fixing device 4034 that is installed in the apparatus body 4010a in the width direction of the apparatus and the open position at which the covering 4130 uncovers the fixing device 4034 in the width direction of the apparatus.

Figures 4, 5, 5A:
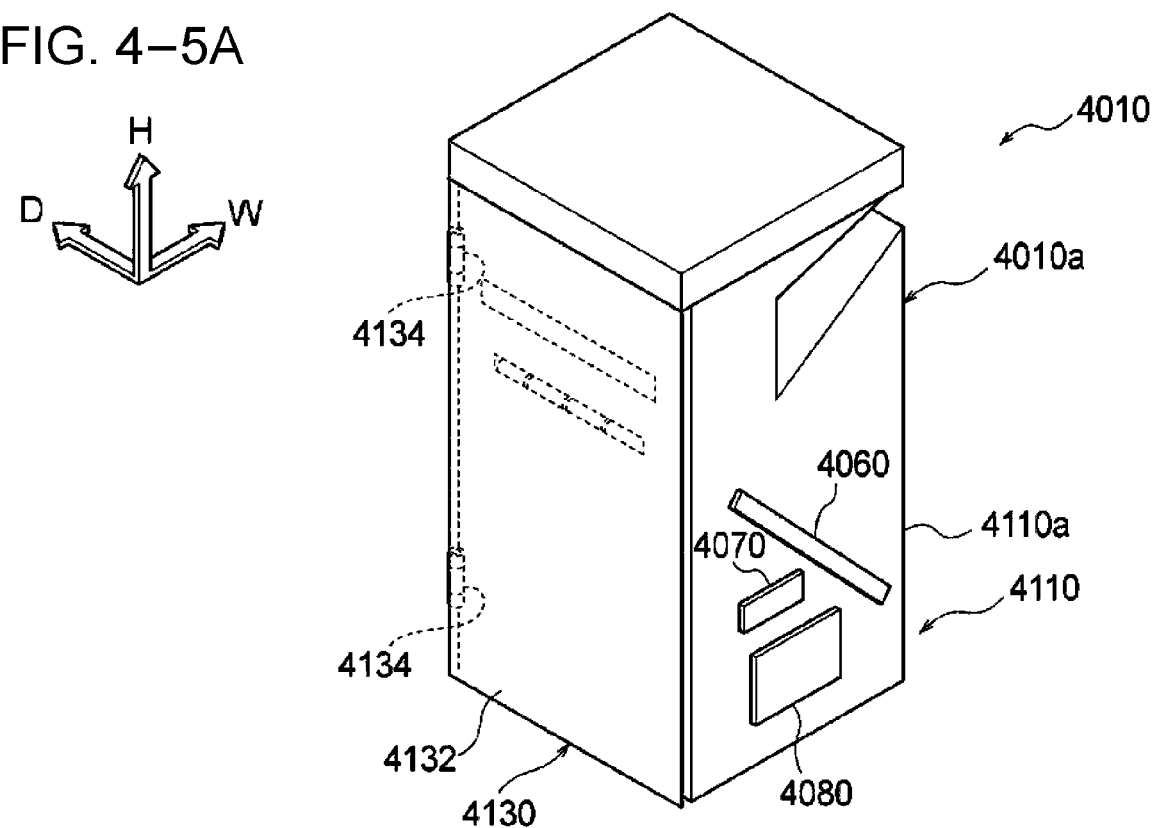
Figures 4, 5, 5B:
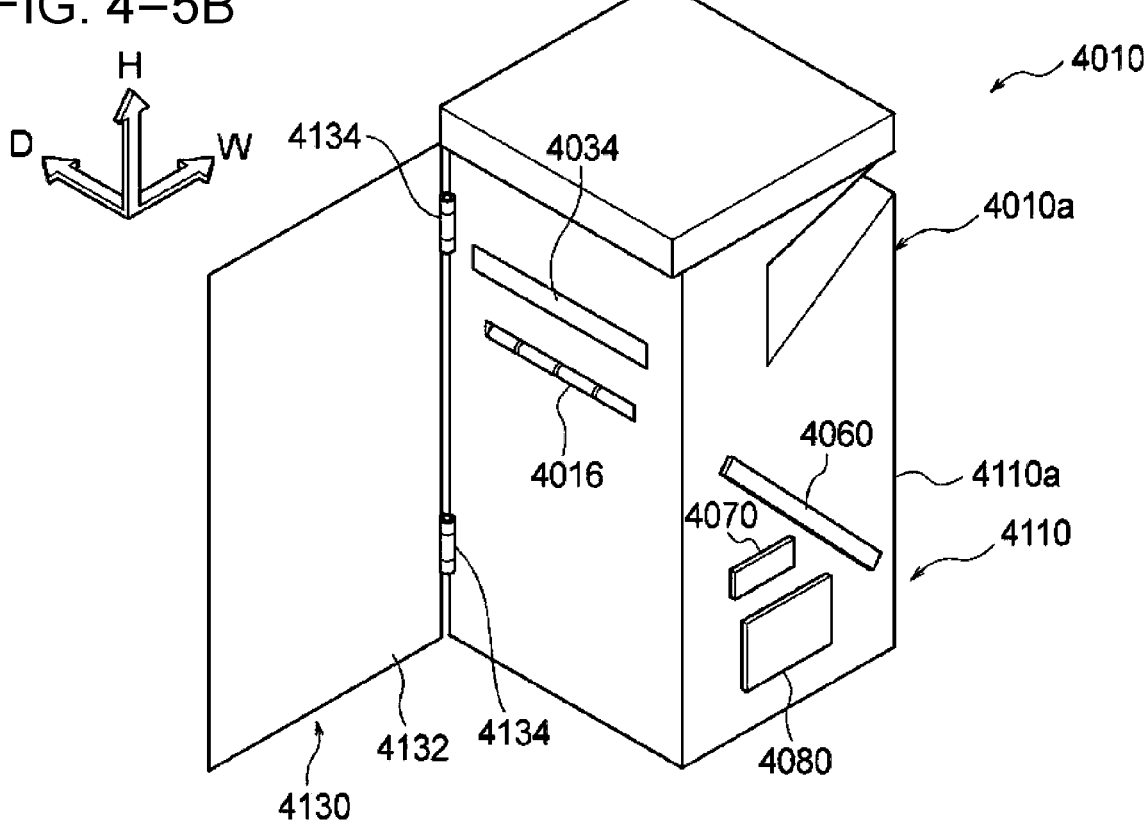

As illustrated in FIG. 4-5A, the covering 4130 that is positioned at the covering position includes a body 4132 that has a rectangular shape and that extends in the vertical direction of the apparatus when viewed in the width direction of the apparatus and support portions 4134 that rotatably support the body 4132.

As illustrated in FIG. 4-5A and FIG. 4-5B, the two support portions 4134 are mounted on a rear portion of the apparatus body 4110a in the depth direction of the apparatus and are separated from each other in the vertical direction of the apparatus.

With this structure, the covering 4130 moves to the covering position (see FIG. 4-5A) at which the covering 4130 covers the apparatus body 4110a of the container apparatus 4110 in the width direction of the apparatus and the open position (see FIG. 4-5B) at which the covering 4130 uncovers the apparatus body 4110a in the width direction of the apparatus. Specifically, the covering 4130 comes into contact with a stopper not illustrated and stops at the covering position. The covering 4130 that is positioned at the covering position swings, consequently comes into contact with a stopper not illustrated, and stops at the open position.

Conclusion

The action of the container apparatus 4110 is compared with those of a container apparatus 4310 of an image forming apparatus 4210 according to a first comparative exemplary embodiment and a container apparatus 4510 of an image forming apparatus 4410 according to a second comparative exemplary embodiment, and this will now be described. Differences between the configuration of the container apparatus 4310 and the configuration of the container apparatus 4110 and between the configuration of the container apparatus 4510 and the configuration of the container apparatus 4110 will be principally described.

Configuration of Container Apparatus 4310

As illustrated in FIG. 4-6A and FIG. 4-6B, the container apparatus 4310 includes three container units 4260, 4070, and 4080 that contain the recording media P.

As illustrated in FIG. 4-6A, the container unit 4260 tilts with respect to the horizontal direction with the container unit 4260 installed in an apparatus body 4310a as in the container unit 4060.

As illustrated in FIG. 4-6B, the container unit 4260 is guided by a sliding and link mechanism not illustrated with the container unit 4260 separated from the apparatus body 4310a and is horizontally disposed. The container unit 4260 projects from the apparatus body 4310a in the width direction of the apparatus when viewed in the depth direction of the apparatus.

Configuration of Container Apparatus 4510

As illustrated in FIG. 4-7, the container apparatus 4510 includes a container unit 4560, a container unit 4570, and a container unit 4580. The container unit 4560, the container unit 4570, and the container unit 4580 are arranged in this order downward from above in the vertical direction of the apparatus.

The maximum size of the recording medium P that is containable in the container unit 4570 is smaller than the maximum size of the recording medium P that is containable in the container unit 4560. The maximum size of the recording medium P that is containable in the container unit 4580 is smaller than the maximum size of the recording medium that is containable in the container unit 4570.

The number of the recording media P that are containable in the container unit 4560, the number of the recording media P that are containable in the container unit 4570, and the number of the recording media P that are containable in the container unit 4580 are equal to each other. Consequently, the total thickness of the containable recording media P in the thickness direction is equal among the container unit 4560, the container unit 4570, and the container unit 4580.

The container unit 4560 tilts with respect to the horizontal direction such that a first end in the width direction of the apparatus is higher than a second end when viewed in the depth direction of the apparatus. The container unit 4570 tilts at the same angle as the container unit 4560. The container unit 4580 tilts at the same angle as the container unit 4560.

The recording medium P having the maximum size that is contained in the container unit 4570 and the recording medium P having the maximum size that is contained in the container unit 4580 project from the range (R4 in the figure) in which the recording medium P having the maximum size is contained in the container unit 4560 in the width direction of the apparatus. In other words, the recording media P stick out from the range R4. As for the container apparatus 4510 according to the second comparative exemplary embodiment, a part of the recording medium P having the maximum size that is contained in the container unit 4570 and a part of the recording medium P having the maximum size that is contained in the container unit 4580 stick out from the range R4 in the width direction of the apparatus, but the recording media P may entirely stick out from the range R4.

The recording medium P having the maximum size that is contained in the container unit 4570 projects from the range (R5 in the figure) in which the recording medium P having the maximum size is contained in the container unit 4560 in the vertical direction of the apparatus. In other words, the recording medium P sticks out from the range R5. As for the container apparatus 4510 according to the second comparative exemplary embodiment, a part of the recording medium P having the maximum size that is contained in the container unit 4570 sticks out from the range R5 in the vertical direction of the apparatus, but the recording medium P may entirely stick out from the range R5.

Action of Container Apparatus 4110

As for the container apparatus 4110, the container unit 4060 that is separated from the apparatus body 4110a tilts with respect to the horizontal direction such that the first end and the second end in the width direction of the apparatus are located at different heights when viewed in the depth direction of the apparatus as described above. For this reason, when the recording medium P is supplied, the range in which the container unit 4060 is disposed in the width direction of the apparatus is smaller than that of the container apparatus 4310 according to the first comparative exemplary embodiment.

As for the container apparatus 4110, the container unit 4060 that is separated from the apparatus body 4110a is located within the range of the apparatus body 4110*a* in the width direction of the apparatus when viewed in the depth direction of the apparatus. For this reason, when the recording medium P is supplied, the range in which the container unit 4060 is disposed in the width direction of the apparatus is smaller than that of the container apparatus 4310 according to the first comparative exemplary embodiment.

As for the container apparatus 4110, the recording medium P having the maximum size that is contained in the container unit 4070 that is installed in the apparatus body 4110*a* is located within the range R1 in which the recording medium P having the maximum size is contained in the container unit 4060 that is installed in the apparatus body 4110*a* in the width direction of the apparatus when viewed in the depth direction of the apparatus. In this way, the range in which the recording medium P is contained in the width direction of the apparatus may be decreased to a range narrower than that of the container apparatus 4510 according to the second comparative exemplary embodiment when it is assumed that the container unit 4060 and the container unit 4560 that tilt have the same shape.

As for the container apparatus 4110, the covering 4130 that is positioned at the open position uncovers at least a part of the transport path 4016 for the recording medium P. In this way, it may make easy to remove the recording medium P that is transported from the container unit 4060, the container unit 4070, or the container unit 4080 and that is jammed on the transport path 4016, unlike the case where the covering 4130 is not included.

As for the container apparatus 4110, the recording medium P having the maximum size that is contained in the container unit 4070 is located within the ranges in which the recording medium P having the maximum size is contained in the container unit 4060 in the vertical direction of the apparatus and in the width direction of the apparatus. In this way, the ranges in which the recording medium P is contained in the width direction of the apparatus and in the vertical direction of the apparatus may be decreased to ranges narrower than those of the container apparatus 4510 according to the second comparative exemplary embodiment when it is assumed that the container unit 4060 and the container unit 4560 that tilt have the same shape.

As for the container apparatus 4110, the recording medium P having the maximum size that is contained in the container unit 4080 is located within the range in which the recording medium P having the maximum size is contained in the container unit 4060 in the width direction of the apparatus. In this way, the range in which the recording medium P is contained in the width direction of the apparatus may be decreased to a range narrower than that of the container apparatus 4510 according to the second comparative exemplary embodiment when it is assumed that the container unit 4060 and the container unit 4560 that tilt have the same shape.

As for the container apparatus 4110, the degree of tilt of the container unit 4070 and the degree of tilt of the container unit 4080 are lower than the degree of tilt of the container unit 4060. In this way, the recording media P that are contained in the container unit 4070 and in the container unit 4080 may be inhibited from moving in a tilt direction, unlike the case where the degree of tilt of the container unit 4070 and the degree of tilt of the container unit 4080 are equal to the degree of tilt of the container unit 4060.

As for the container apparatus 4110, the container unit 4070 and the container unit 4080 are horizontally disposed. In this way, the recording media P that are contained in the container unit 4070 and in the container unit 4080 may be inhibited from moving in a tilt direction, unlike the case where the container unit 4070 and the container unit 4080 tilt with respect to the horizontal direction.

As for the container apparatus 4110, the number of the recording media P that are containable in the container unit 4080 is larger than the number of the recording media P that are containable in the container unit 4060 and the number of the recording media P that are containable in the container unit 4070. Consequently, the position of the center of gravity of the container apparatus 4110 with the recording media P contained is a lower position than that in the case where the number of the recording media P that are containable in the container unit 4080 is smaller than the number of the recording media P that are containable in the container unit 4060 and the number of the recording media P that are containable in the container unit 4070.

As for the container apparatus 4110, the container unit 4070 and the container unit 4080 that are installed in the apparatus body 4110*a* are capable of being pulled from the apparatus body 4110*a* in the depth direction of the apparatus regardless of the position of the container unit 4060. In this way, it may make easy to supply the recording medium P to the container unit 4070 or the container unit 4080 with the container unit 4060 separated from the apparatus body 4110*a*, unlike a configuration in which neither the container unit 4070 nor the container unit 4080 is capable of being pulled.

As for the image forming apparatus 4010, a range that is needed when the recording medium P is supplied to the image forming apparatus 4010 is smaller than that in the case where the container apparatus 4110 is not provided.

The specific fourth exemplary embodiment of the present disclosure is described in detail. The present disclosure is not limited to the fourth exemplary embodiment. It is clear for a person skilled in the art that the present disclosure includes different fourth exemplary embodiments within the scope of the present disclosure. For example, according to the fourth exemplary embodiment described above, the container apparatus 4110 is used for the electrophotographic image forming apparatus 4010. However, the container apparatus 4110 may be used for, for example, an ink-jet image forming apparatus.

According to the fourth exemplary embodiment described above, the container apparatus 4110 includes the container unit 4060, the container unit 4070, and the container unit 4080 but may include neither the container unit 4070 nor the container unit 4080. However, this does not take the action that is carried out by including the container unit 4070 and the container unit 4080.

According to the fourth exemplary embodiment described above, the recording medium P having the maximum size that is contained in the container unit 4070 is located within the range R1 in the width direction of the apparatus when viewed in the depth direction of the apparatus but may project to a location outside the range R1. However, this does not take the action that is carried out by locating the recording medium P within the range R1.

According to the fourth exemplary embodiment described above, the container unit 4070 and the container unit 4080 are horizontally disposed but may not be horizontally disposed, provided that the angles at which the container unit 4070 and the container unit 4080 tilt are smaller than the angle at which the container unit 4060 tilts. In this way, the recording media P that are contained in the container unit 4070 and in the container unit 4080 may be inhibited from moving in a tilt direction, unlike the case where the angles at which the container unit 4070 and the container unit 4080 tilt are equal to the angle at which the container unit 4060 tilts or the case where the angles at which the container unit 4070 and the container unit 4080 tilt are larger than the angle at which the container unit 4060 tilts.

According to the fourth exemplary embodiment described above, the container unit 4070 and the container unit 4080 that are installed in the apparatus body 4110*a* are capable of being pulled from the apparatus body 4110*a* in the depth direction of the apparatus regardless of the position of the container unit 4060. However, at least the container unit 4070 or the container unit 4080 may be capable of being pulled. In this way, it may make easy to supply the recording medium P, unlike the case where neither the container unit 4070 nor the container unit 4080 is capable of being pulled.

According to the fourth exemplary embodiment described above, the number of the recording media P that are containable in the container unit 4080 is larger than the number of the recording media P that are containable in the container unit 4060 and the number of the recording media P that are containable in the container unit 4070. However, the relationship in the number of the recording media P that are contained in each container unit may differ. In this case, the action that is carried out by increasing the number of the recording media P that are containable in the container unit 4080 to the largest number is not taken.

According to the fourth exemplary embodiment described above, the container unit 4060 that is installed in the apparatus body 4110*a* is movable to the supply position regardless of the position of the container unit 4070 and the position of the container unit 4080, although this is not particularly described. In this way, it may make easy to supply the recording medium P to the container unit 4060, unlike the case where movement of the container unit 4060 is restricted by the position of the container unit 4070 and the position of the container unit 4080.

According to the fourth exemplary embodiment described above, as illustrated in FIG. 4-8, a guide member 4200 such as a rib that guides the recording medium P that is transported from the container unit 4070 may be formed at an upper edge portion of the container unit 4060, and a part of the transport path 4016 that extends from the container unit 4070 to the guide member 4200 may be located within the range in which the container unit 4060 is disposed in the width direction of the apparatus, although this is not particularly described. In this way, the width of the apparatus body 4110*a* may be inhibited from increasing due to the part of the transport path 4016 that extends from the container unit 4070 to the guide member 4200, unlike the case where the part of the transport path 4016 that extends from the container unit 4070 to the guide member 4200 is located out of the range in which the container unit 4060 is disposed in the width direction of the apparatus.

According to the fourth exemplary embodiment described above, the image forming member 4012 may be located within the range in which the container unit 4060 is disposed in the width direction of the apparatus, although this is not particularly described. In this way, at least the width of the apparatus body 4010*a* that includes the image forming member 4012 may be inhibited from increasing, unlike the case where the image forming member 4012 is located out of the range in which the container unit 4060 is disposed.

According to the fourth exemplary embodiment described above, a reverse path along which the recording medium P is reversed upside down may be located within the range in which the container unit 4060 is disposed in the width direction of the apparatus, although this is not particularly described. In this way, the width of the apparatus body 4010*a* may be inhibited from increasing, unlike the case where the reverse path is located out of the range in which the container unit 4060 is disposed in the width direction of the apparatus.

According to the fourth exemplary embodiment described above, the transfer nip NT at which the image forming member 4012 transfers the image to the recording medium P may be disposed opposite a portion of the container unit 4060 from which the recording medium P is fed in the width direction of the apparatus, although this is not particularly described. The reverse path along which the recording medium P is reversed upside down may be located in the range in which the container unit 4060 is disposed in the width direction of the apparatus. In this way, the width of the apparatus body 4010*a* may be inhibited from increasing, unlike the case where the reverse path is located out of the range in which the container unit 4060 is disposed in the width direction of the apparatus.

According to the fourth exemplary embodiment described above, the container apparatus 4110 does not include the transport unit 4014 in some cases, although this is not particularly described.

According to the fourth exemplary embodiment described above, the container unit 4070 may tilt with respect to the horizontal direction, although this is not particularly described, provided that the recording medium P having the maximum size that is contained in the container unit 4070 is located within the range R1 when viewed in the depth direction of the apparatus.

According to the fourth exemplary embodiment described above, the container unit 4080 may tilt with respect to the horizontal direction, although this is not particularly described, provided that the recording medium P having the maximum size that is contained in the container unit 4080 is located within the range R1 when viewed in the depth direction of the apparatus.

In the description according to the fourth exemplary embodiment described above, the container unit tilts with respect to the horizontal direction. As for the container unit, however, the position of the first end and the position of the second end may differ from each other. In this way, a range in which the container unit is disposed in the width direction may be smaller than that in the case where the container unit horizontally extends, for example, even when the container unit is disposed in the vertical direction.

Fifth Exemplary Embodiment

An example of an image forming apparatus and a sheet containing apparatus according to a fifth exemplary embodiment of the present disclosure will be described with reference to FIG. 5-1 to FIG. 5-9. An arrow H illustrated in figures represents the height direction of the apparatus that is vertical. An arrow W represents the width direction of the apparatus that is horizontal. An arrow D represents the depth direction of the apparatus that is horizontal.

Entire Configuration of Image Forming Apparatus

As illustrated in FIG. 5-1, an image forming apparatus 5010 includes an image forming member 5012 that forms a toner image by using an electrophotographic system, a sheet containing apparatus 5110 that includes container units 5018 and 5060 that contain sheets P and a transport unit 5014 that transports the sheets P along a transport path 5016, and a controller 5028 that controls components.

As for the image forming apparatus 5010 that has the configuration described above, each of the sheets P that are contained in the container units 5018 and 5020 is transported along the transport path 5016 by using the transport unit 5014. The toner image that is formed by the image forming member 5012 is formed on the transported sheet P, and the sheet P on which the toner image is formed is discharged to a location outside an apparatus body 5010*a*.

Image Forming Member 5012

As illustrated in FIG. 5-1, the image forming member 5012 includes multiple toner image forming members 5030 that form toner images in respective colors and a transfer member 5032 that transfers the toner images that are formed by the toner image forming members 5030 to the sheet P. The image forming member 5012 also includes a fixing device 5034 that fixes the toner images that are transferred to the sheet P by using the transfer member 5032 to the sheet P. The toner image forming members are examples of an image formation unit, and the fixing device 5034 is an example of a fixing portion.

Toner Image Forming Member 5030

The toner image forming members 5030 are provided so as to form the toner images in the respective colors. According to the present fifth exemplary embodiment, the toner image forming members 5030 for the four colors of yellow (Y), magenta (M), cyan (C), and black (K) are provided. In the following description, Y, M, C, and K in reference characters are omitted when it is not necessary to distinguish among yellow (Y), magenta (M), cyan (C), and black (K).

The toner image forming members 5030 for the respective colors are basically configurated d in the same manner except for toner that is used. As illustrated in FIG. 5-2, each toner image forming member 5030 includes an image carrier 5040 that is rotatable and that is cylindrical and a charger 5042 that charges the image carrier 5040. Each toner image forming member 5030 also includes an exposure device 5044 that radiates exposure light to the image carrier 5040 that is charged and that forms an electrostatic latent image and a developing device 5046 that develops the electrostatic latent image into the toner image by using a developer G that contains the toner. Consequently, the toner image forming members 5030 for the respective colors form images in the respective colors by using the toner in the respective colors.

As illustrated in FIG. 5-1, the image carriers 5040 for the respective colors are in contact with a transfer belt 5050 (described in detail later) that turns. The toner image forming members 5030 for yellow (Y), magenta (M), cyan (C), and black (K) are disposed in this order from an upstream position in the direction in which the transfer belt 5050 turns (see an arrow in the figure).

Transfer Member 5032

As illustrated in FIG. 5-1, the transfer member 5032 includes the transfer belt 5050 and first transfer rollers 5052 that are disposed opposite the image carriers 5040 for the respective colors with the transfer belt 5050 interposed therebetween and that transfer the toner images that are formed by the image carriers 5040 for the respective colors to the transfer belt 5050.

The transfer member 5032 also includes a winding roller 5056 around which the transfer belt 5050 is wound and a drive roller 5058 around which the transfer belt 5050 is wound for transmitting rotational force to the transfer belt 5050. Consequently, the transfer belt 5050 turns in the direction of the arrow in the figure.

The transfer member 5032 also includes a second transfer roller 5054 that is disposed opposite the winding roller 5056 with the transfer belt 5050 interposed therebetween and that transfers the toner images that are transferred to the transfer belt 5050 to the sheet P. A transfer nip NT at which the toner images are transferred to the sheet P is formed between the second transfer roller 5054 and the transfer belt 5050.

With this configuration, the toner images are first-transferred to the transfer belt 5050 in the order of yellow (Y), magenta (M), cyan (C), and black (K) by using the first transfer rollers 5052. The second transfer roller 5054 transfers the toner images from the transfer belt 5050 to the sheet P that is transported between the transfer belt 5050 and the second transfer roller 5054. The sheet P to which the toner images are transferred is transported toward the fixing device 5034.

Fixing Device 5034

As illustrated in FIG. 5-1, the fixing device 5034 is disposed downstream of the transfer nip NT in the direction in which the sheet P is transported. The fixing device 5034 heats and compresses the toner images that are transferred to the sheet P and fixes the toner images to the sheet P.

Sheet Containing Apparatus 5110

The sheet containing apparatus 5110 is located in a lower portion of the image forming apparatus 5010. The sheet containing apparatus 5110 will be described in detail later.

Configuration of Principal Component

The sheet containing apparatus 5110 will now be described.

As illustrated in FIG. 5-1, the sheet containing apparatus 5110 is located in the lower portion of the image forming apparatus 5010. The sheet containing apparatus 5110 includes an apparatus body 5110*a*, the container unit 5018 that contains the sheet P, and the container unit 5060 that contains the sheet P. The sheet containing apparatus 5110 also includes the transport unit 5014 that transports the sheets that are contained in the container unit 5018 and the container unit 5060. As illustrated in FIG. 5-8A and FIG. 5-8B, the sheet containing apparatus 5110 also includes a covering portion 5120 that covers the apparatus body 5110*a* in the depth direction of the apparatus and a covering portion 5130 that covers the apparatus body 5110*a* in the width direction of the apparatus. As illustrated in FIG. 5-5, the sheet containing apparatus 5110 also includes rail members 5084 that are capable of moving the container unit 5018 in the depth direction of the apparatus.

The container unit 5018 is an example of the first container unit, and the container unit 5060 is an example of the second container unit. The depth direction of the apparatus is an example of the first direction, and the width direction of the apparatus is an example of "sideways".

The apparatus body 5110*a* of the sheet containing apparatus 5110 corresponds to a lower portion of the apparatus body 5010*a* of the image forming apparatus 5010.

Container Unit 5018

As illustrated in FIG. 5-1, the container unit 5018 contains a sheet P having the A3 size and is disposed below the toner image forming members 5030. The A3 size is an example of the first size.

The container unit 5018 tilts with respect to the horizontal direction such that a first end and a second end in the width direction of the apparatus are located at different heights when viewed in the depth direction of the apparatus. Specifically, the container unit 5018 tilts such that an end portion of the container unit 5018 in one direction (the left-hand direction in the figure) of the width direction of the apparatus is higher than an end portion of the container unit 5018 in the other direction. The first end and the second end described herein correspond to portions of the container unit 5018 that are farthest from each other in the width direction of the apparatus.

The apparatus body 5110*a* has a side wall 5112*a* that faces an upper edge of the container unit 5018 in one direction of the width direction of the apparatus and a side wall 5112*b* that faces a lower edge of the container unit 5018 in the other direction of the width direction of the apparatus. The lower edge of the container unit 5018 is nearer than the side wall 5112*a* that faces the upper edge of the container unit 5018 to the side wall 5112*b* that faces the lower edge of the container unit 5018.

As illustrated in FIG. 5-6A and FIG. 5-6B, the container unit 5018 is installable in and removable from the apparatus body 5110*a* in the depth direction of the apparatus with the covering portion 5120 that is described later positioned at an open position.

As illustrated in FIG. 5-5, the container unit 5018 includes a container body 5070 and a trailing edge restriction portion 5074 that comes into contact with the trailing edge Pr of the contained sheet P and that restricts the position of the trailing edge Pr of the sheet P. The container unit 5018 also includes two side edge restriction portions 5082 that come into contact with respective side edges Ps of the sheet P and that restrict the positions of the side edges Ps of the sheet P and a support portion 5094 that supports the contained sheet P from below.

The container unit 5018 tilts such that the leading edge Pf of the sheet P that is contained in the container unit 5018 is higher than the trailing edge Pr. The sheet P is fed to the transport path 5016 with the leading edge Pf of the sheet P facing forward.

Container Body 5070

As illustrated in FIG. 5-5, the container body 5070 has a box shape that opens upward. The container body 5070 includes a bottom plate 5070*a* that faces a back surface of the contained sheet P in the thickness direction of the sheet P (referred to below as a "medium thickness direction") and a rear wall 5070*b* that faces the trailing edge Pr of the sheet P in the front-rear direction of the sheet P (referred to below as a "medium front-rear direction"). The container unit 5018 also includes a front wall 5070*c* that faces the leading edge Pf of the contained sheet P in the medium front-rear direction and two side walls 5072 (a and b) that face the respective side edges Ps of the sheet P in the width direction of the sheet P (referred to below as a "medium width direction").

The two side walls 5072 are a side wall 5072*a* at the rear in the depth direction of the apparatus and a side wall 5072*b* at the front in the depth direction of the apparatus. The side wall 5072*a* has a rectangular shape that extends from the rear wall 5070*b* to the front wall 5070*c* when viewed in the depth direction of the apparatus. The side wall 5072*b* includes a foundation portion 5073*a* that has a rectangular shape that extends from the rear wall 5070*b* to the front wall 5070*c* and an extension portion 5073*b* that extends from the foundation portion 5073*a* in one direction of the width direction of the apparatus when viewed in the depth direction of the apparatus.

Figures 1, 5:
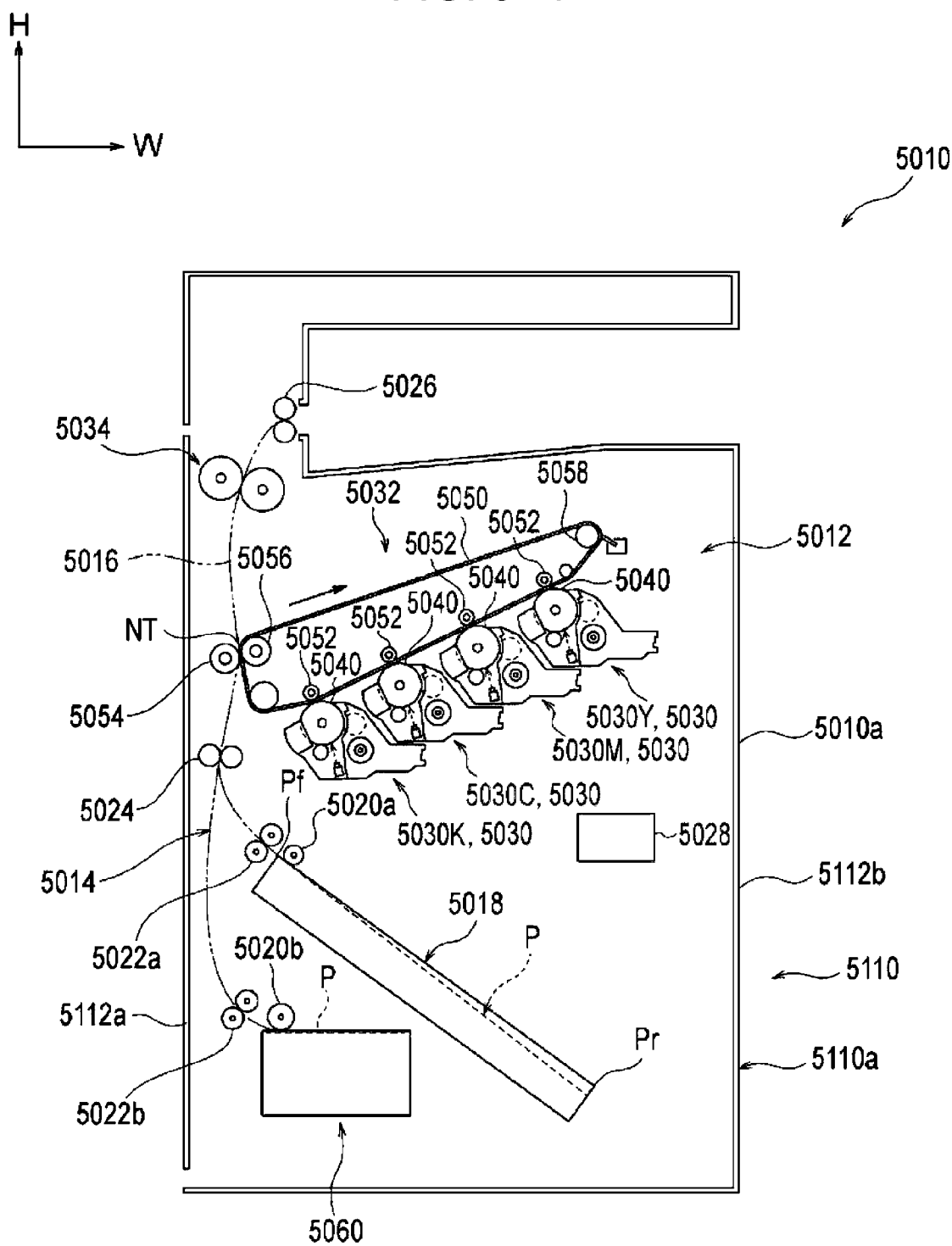
Figures 2, 5:
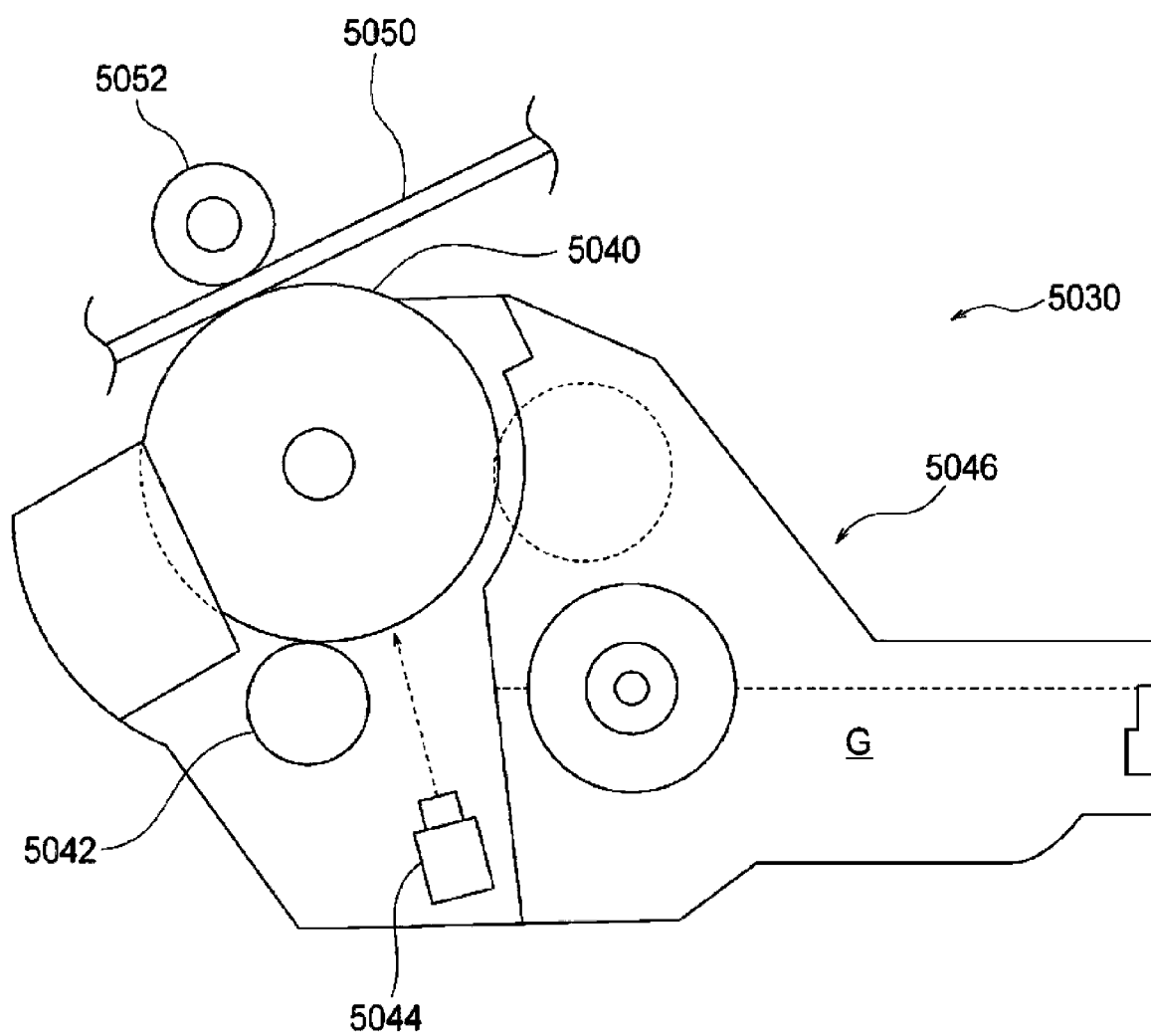
Figures 3A, 5:
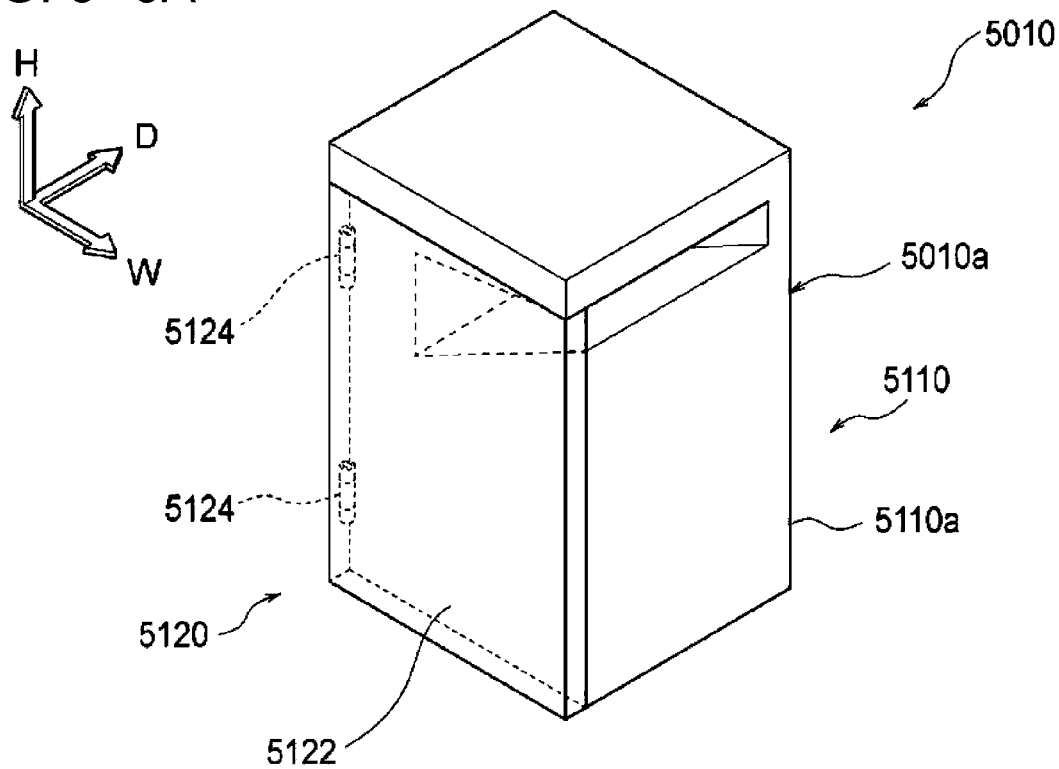
Figures 3B, 5:
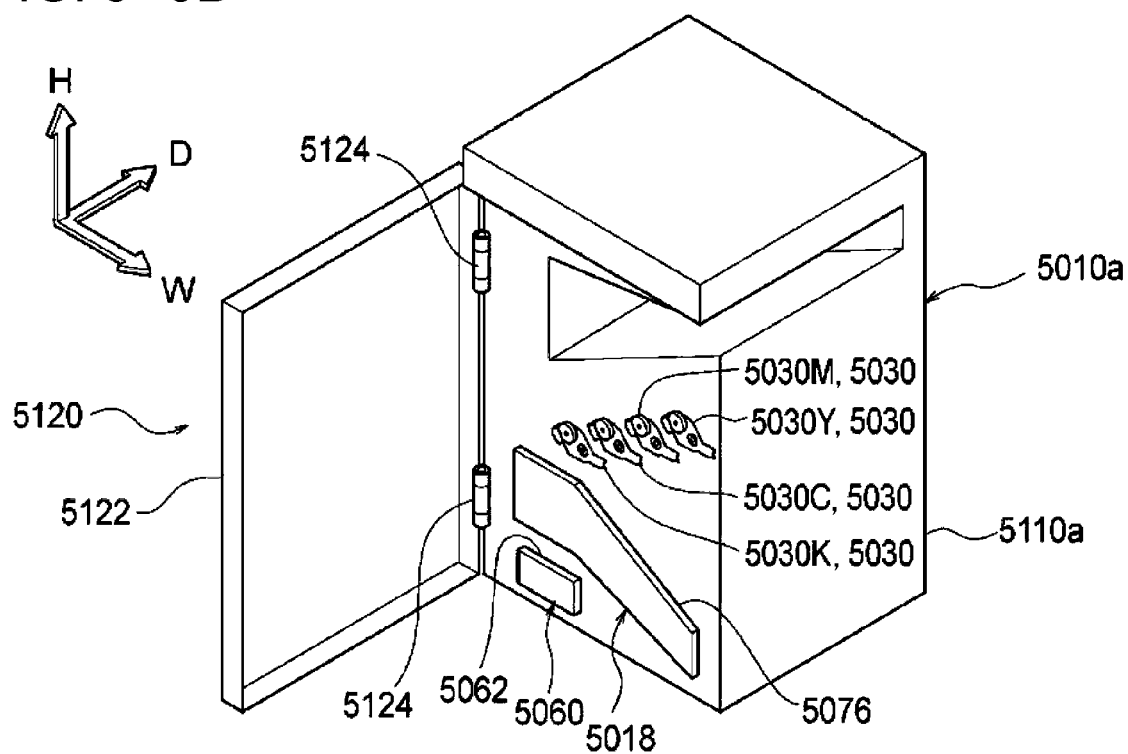
Figures 4A, 5:
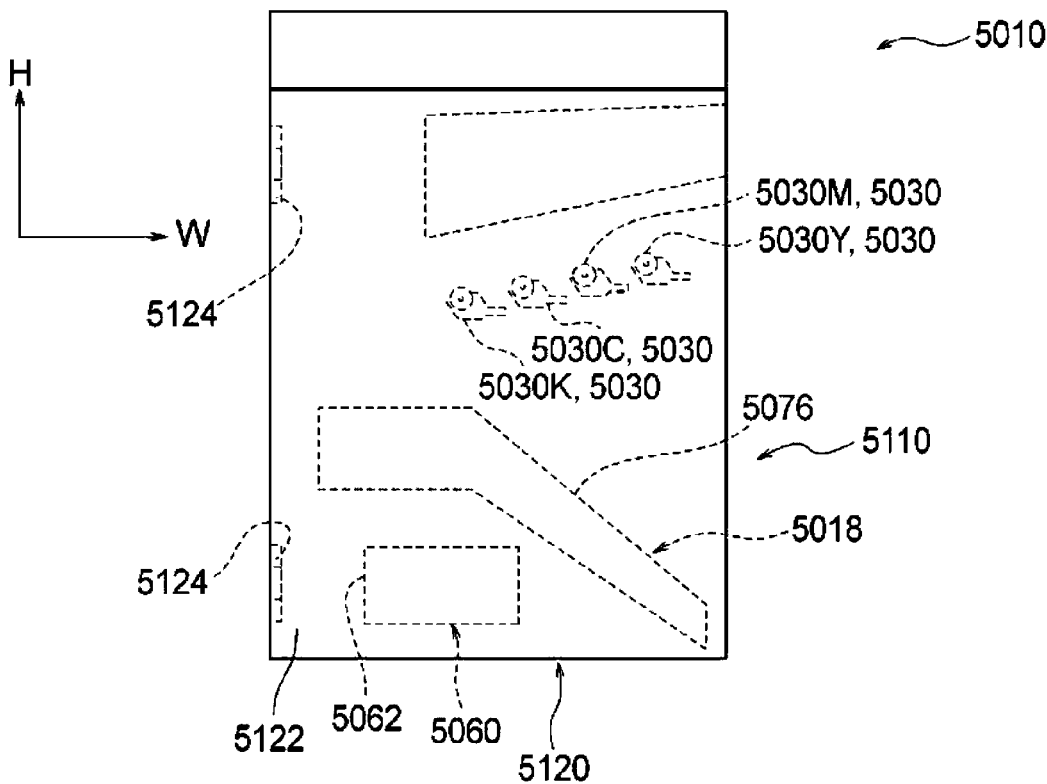
Figures 4B, 5:
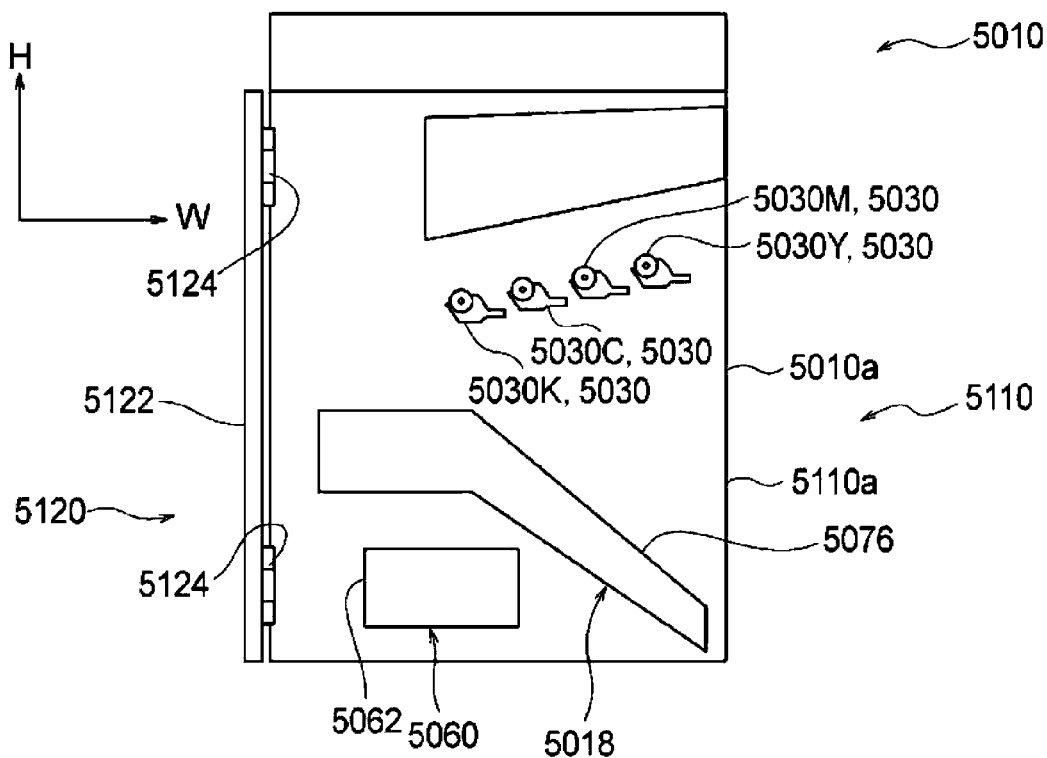
Figure 5:
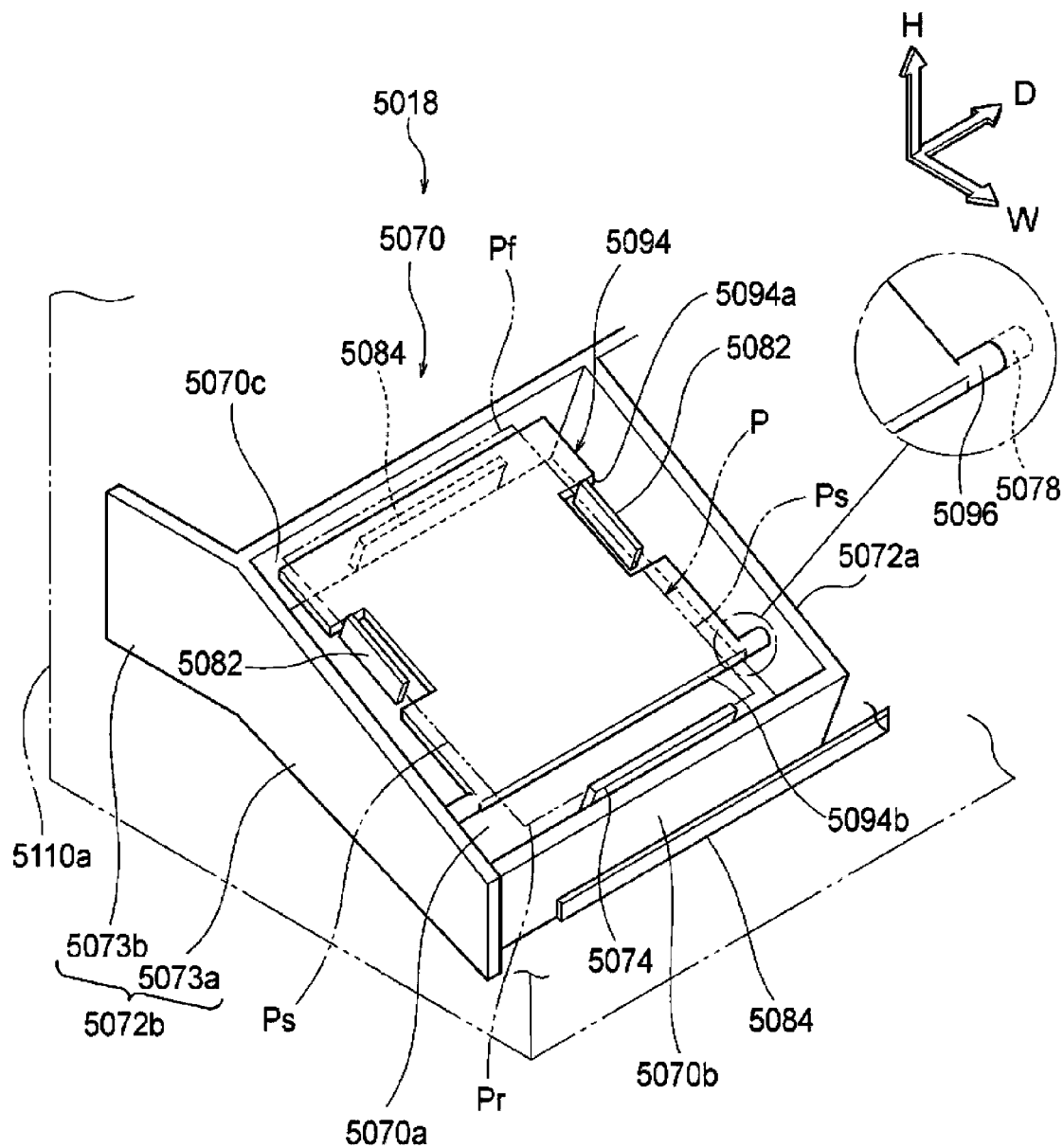
Figures 5, 6, 6A:
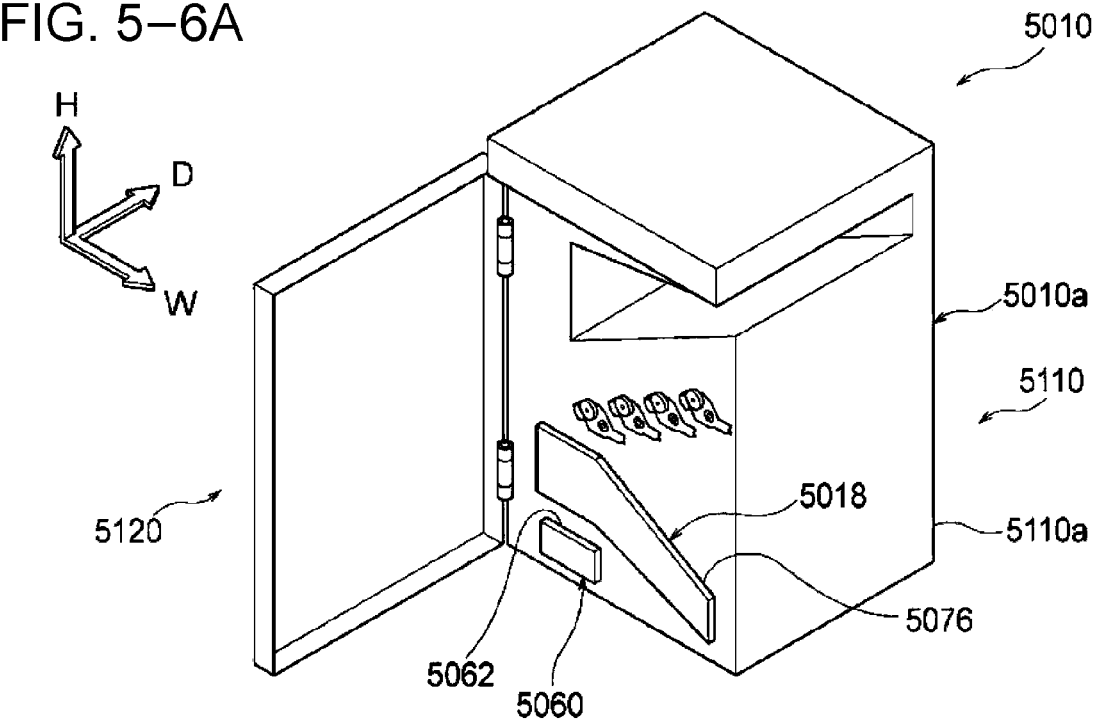
Figures 5, 6, 6B:
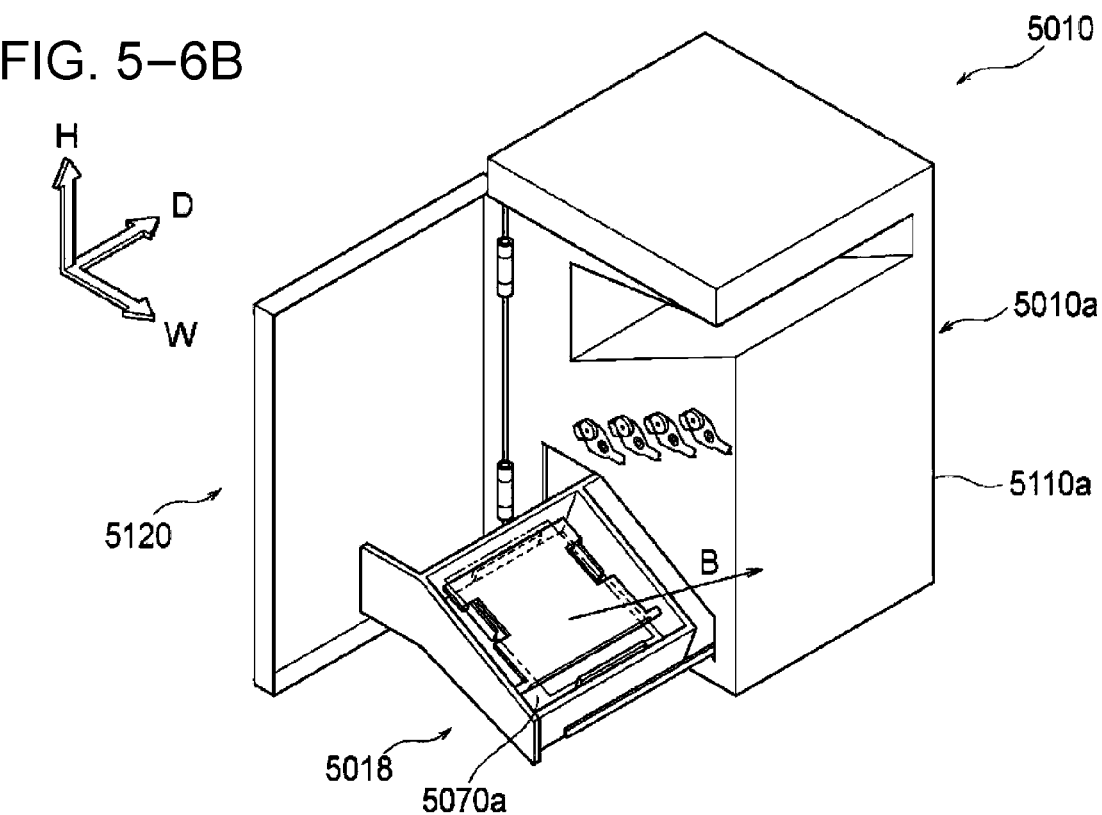
Figures 5, 6, 7, 7A:
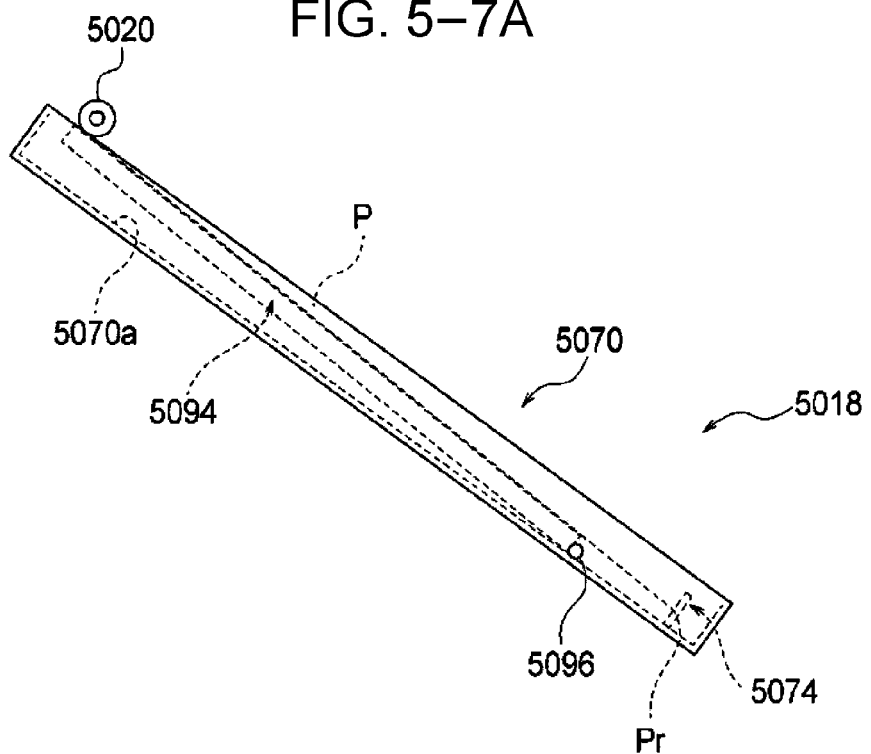
Figures 5, 6, 7, 7B:
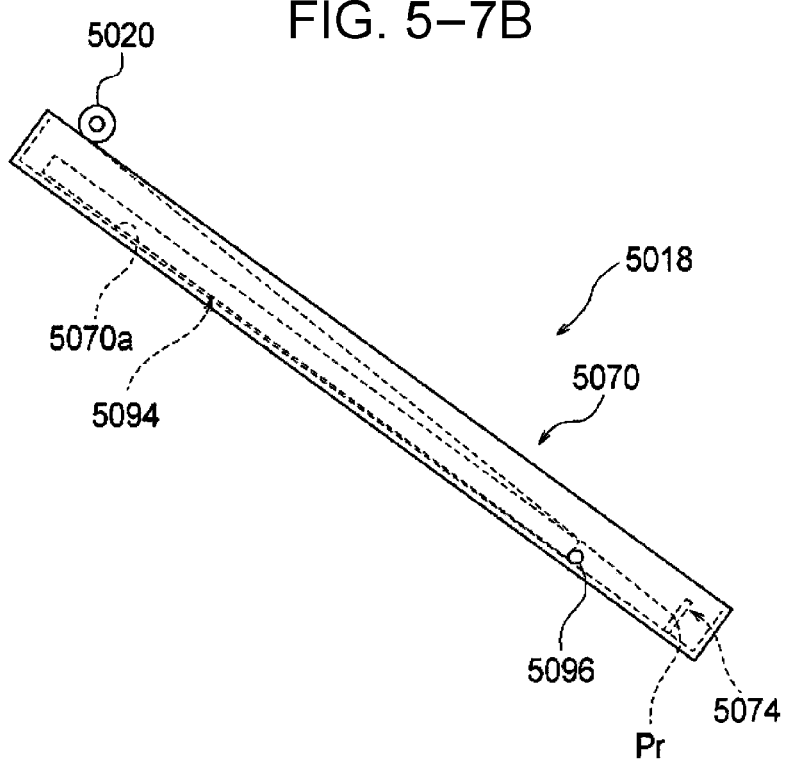
Figures 5, 6, 7, 8, 8A:
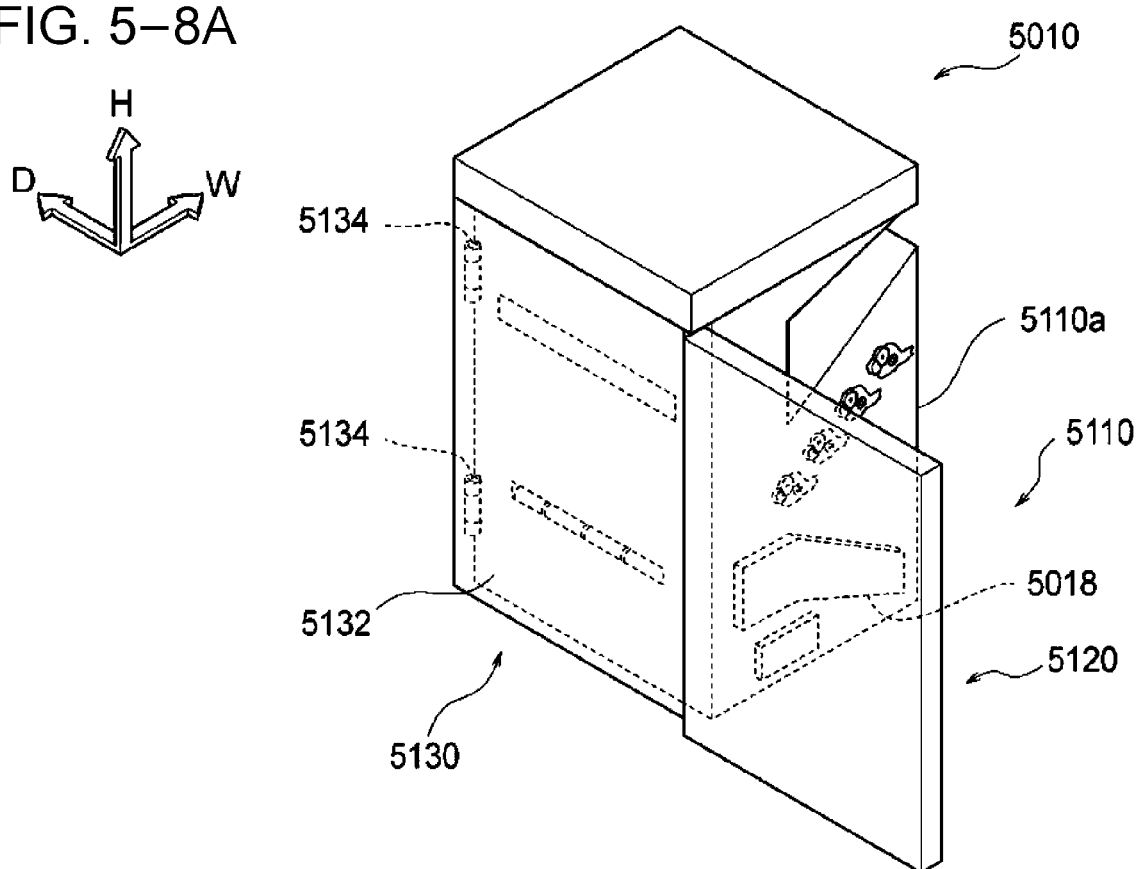
Figures 5, 6, 7, 8, 8B:
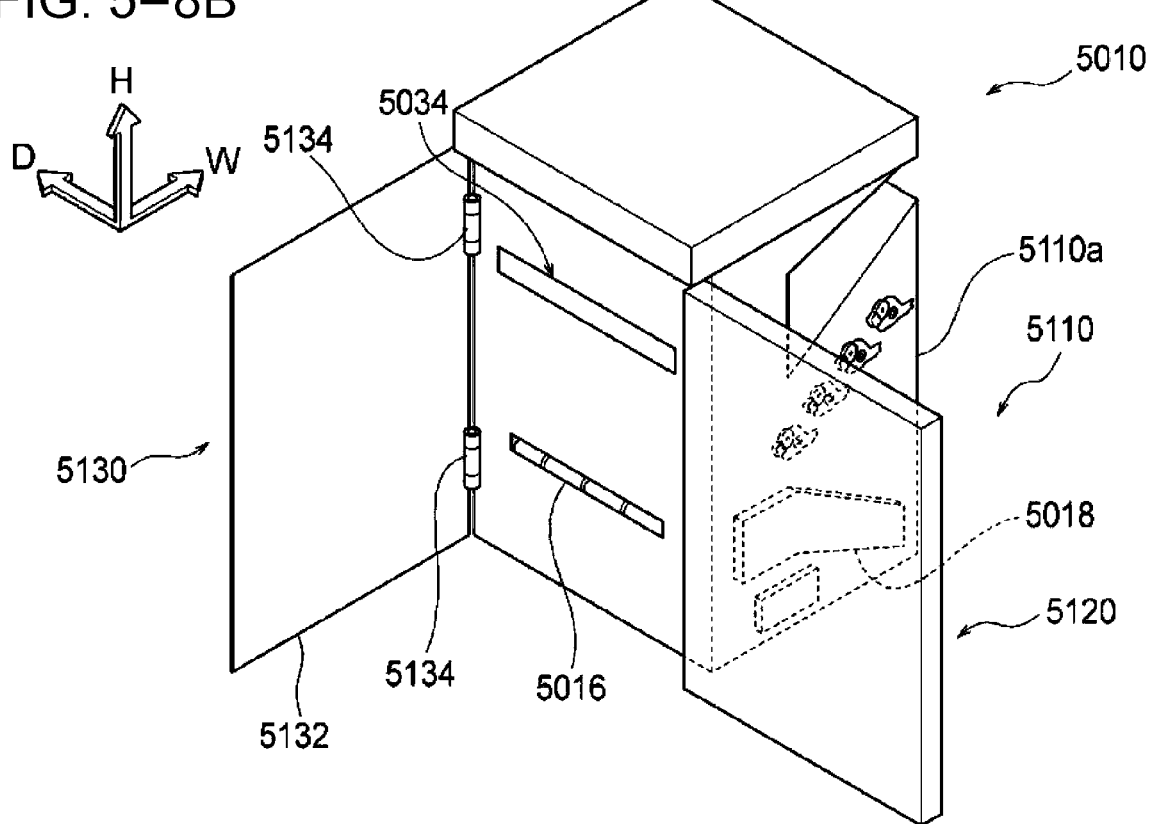
Figures 5, 6, 7, 8, 9:
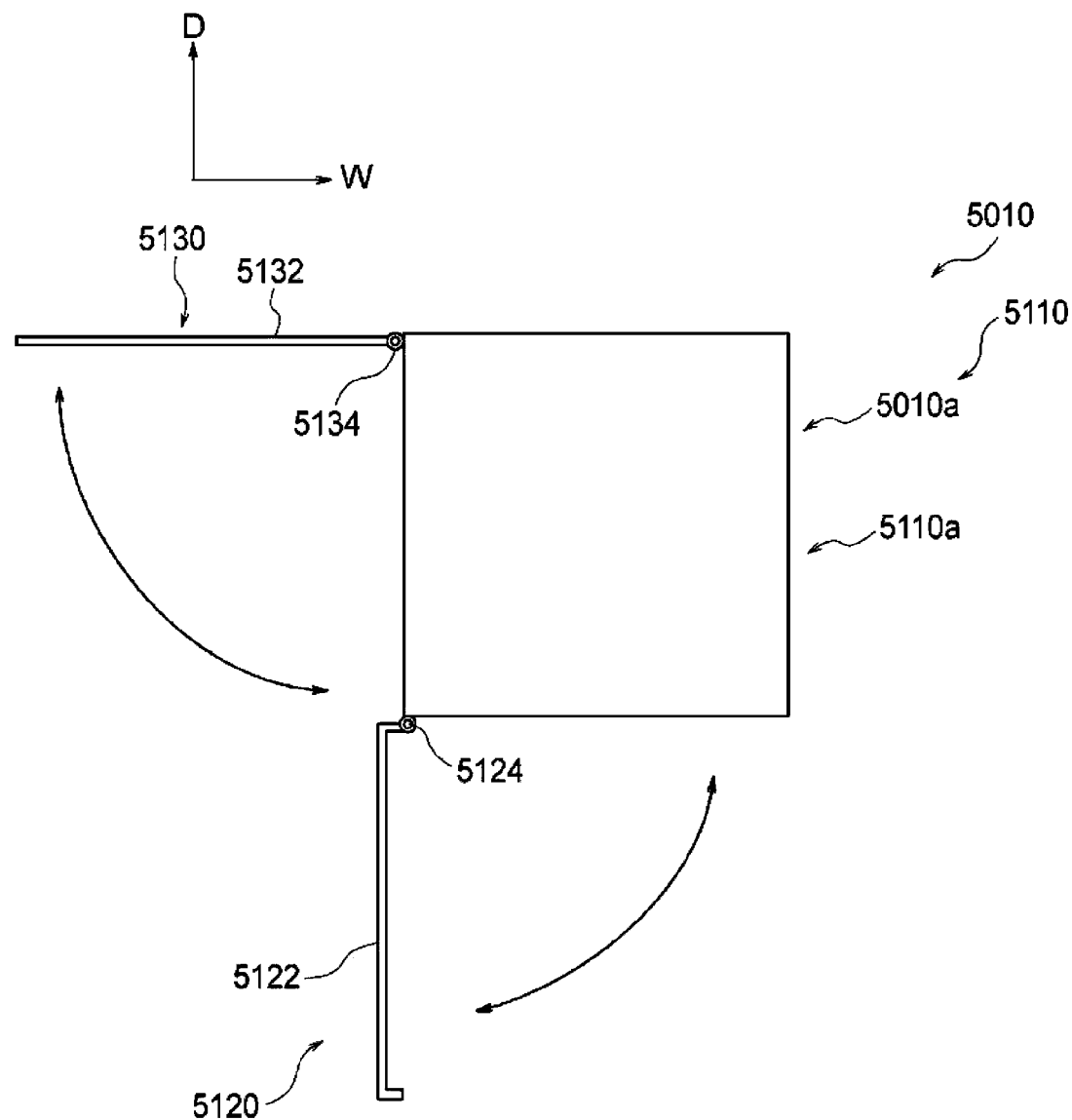

As illustrated in FIG. 5-3B and FIG. 5-4B, a division line 5076 that divides the container unit 5018 and the apparatus body 5110*a* and that tilts is present between the side wall 5072*b* and the apparatus body 5110*a* with the container unit 5018 installed in the apparatus body 5110*a*. With the container unit 5018 installed in the apparatus body 5110*a*, the container unit 5018 is nearer than the covering portion 5120 that covers the apparatus body 5110*a* from the front in the depth direction of the apparatus to the apparatus body 5110*a*.

Trailing Edge Restriction Portion 5074

As illustrated in FIG. 5-5, the trailing edge restriction portion 5074 is disposed in the container body 5070 and is mounted on the bottom plate 5070*a* of the container body 5070. The trailing edge restriction portion 5074 is guided by a pair of slits (not illustrated) that is formed in the bottom plate 5070*a* and that extends in the medium front-rear direction and moves in a predetermined range in the medium front-rear direction. Movement of the trailing edge restriction portion 5074 that moves is restricted by a lock mechanism not illustrated.

With this configuration, the trailing edge restriction portion 5074 comes into contact with the trailing edge Pr of the sheet P that is contained in the container unit 5018 in the medium front-rear direction and consequently restricts the position of the trailing edge Pr of the sheet P.

Side Edge Restriction Portion 5082

As illustrated in FIG. 5-5, the side edge restriction portions 5082 are disposed in the container body 5070 and are mounted on the bottom plate 5070*a* of the container body 5070. The side edge restriction portions 5082 are disposed on both sides of the sheet P in the medium width direction. The two side edge restriction portions 5082 are symmetrical in the medium width direction.

The side edge restriction portions 5082 are guided by a pair of slits (not illustrated) that is formed in the bottom plate 5070*a* and that extends in the medium width direction and moves in a predetermined range in the medium width direction. The side edge restriction portions 5082 that move stop there due to frictional force that acts between the side edge restriction portions 5082 and the bottom plate 5070*a*.

The container unit 5018 uses a center registration method. The container unit 5018 include a mechanism not illustrated, and when one of the side edge restriction portions 5082 is moved in the medium width direction, the mechanism moves the other side edge restriction portion 5082 the same distance in the medium width direction.

With this configuration, the two side edge restriction portions 5082 come into contact with the side edges Ps of the sheet P that is contained in the container unit 5018 in the medium width direction and consequently restrict the positions of the side edges Ps of the sheet P.

Support Portion 5094

As illustrated in FIG. 5-5, the support portion 5094 is disposed in the container body 5070.

The support portion 5094 is formed by using a metal plate, is symmetrical in the medium width direction when viewed in the medium thickness direction and has a shape obtained by notching a rectangle at two portions.

Specifically, notches 5094*a* that have a U-shape and that are used to avoid interference with the side edge restriction portions 5082 that move are formed in the support portion 5094. The position of a rear edge 5094*b* of the support portion 5094 is determined so as to avoid interference with the trailing edge restriction portion 5074 that moves.

Shaft portions 5096 that project in the medium width direction are formed on respective end portions of the rear edge 5094*b* of the support portion 5094. The shaft portions 5096 are inserted in through-holes 5078 that are formed in the respective side walls 5072 of the container unit 5018. Consequently, the support portion 5094 is rotatable about the shaft portions 5096 such that a front edge portion of the support portion 5094 moves up and down.

As illustrated in FIG. 5-7A, the front edge portion of the support portion 5094 is urged upward by an urging member that is disposed on the apparatus body 5110*a* and that is not illustrated with the container unit 5018 installed in the apparatus body 5110*a* (see FIG. 5-1), and the support portion 5094 turns about the shaft portions 5096. The portion of the leading edge of the sheet P that is supported by the support portion 5094 comes into contact with the feed roller 5020.

As illustrated in FIG. 5-7B, the urging force of the urging member is released, and the front edge portion of the support portion 5094 comes into contact with the bottom plate 5070*a* of the container body 5070 with the container unit 5018 separated from the apparatus body 5110*a* (see FIG. 5-1). As in the case where the container unit 5018 is installed in the apparatus body 5110*a*, the container unit 5018 tilts with respect to the horizontal direction even with the container unit 5018 separated from the apparatus body 5110*a*. A state of being separated is a state in which the container unit is pulled from the apparatus body, and the sheet P is to be supplied to the container unit. Specifically, the container unit 5018 is not removed from the apparatus body 5110*a* but is supported by the apparatus body 5110*a*, and the sheet P is containable in the container unit 5018 with the container unit 5018 separated from the apparatus body 5110*a*.

Container Unit 5060

The container unit 5060 contains the sheet P having the A4 size and is disposed below an upper portion of the container unit 5018 as illustrated in FIG. 5-1. The container unit 5060 includes a container body, a trailing edge restriction portion, two side edge restriction portions, and a support portion that supports the sheet P from below as in the container unit 5018 although a detailed description is omitted. The A4 size is an example of the second size. According to the present fifth exemplary embodiment, the first size and the second size differs from each other but may be the same size.

The container unit 5060 is disposed in the horizontal direction when viewed in the depth direction of the apparatus. In other words, the container unit 5060 is disposed such that movement force does not act on the sheet P that is contained in the container unit 5060.

As illustrated in FIG. 5-3B and FIG. 5-4B, a division line 5062 that divides the apparatus body 5110*a* and the container unit 5060 is present between the container unit 5060 and the apparatus body 5110*a* with the container unit 5060 installed in the apparatus body 5110*a*. The division line according to the present fifth exemplary embodiment is not limited to a division line between a container unit and the apparatus body 5110*a*, but a division line between a container unit and another member such as another container unit, for example, is acceptable.

The container unit 5060 is installable in and removable from the apparatus body 5110*a* in the depth direction of the apparatus with the covering portion 5120 that is described later positioned at the open position.

Rail Member 5084

As illustrated in FIG. 5-5, the two rail members 5084 are mounted on a lower edge portion of the rear wall 5070*b* of the container body 5070 and a lower edge portion of the front wall 5070*c* of the container body 5070.

Each rail member 5084 is a so-called slide rail, includes an outer member, an intermediate member, and an inner member, the outer member is mounted on the apparatus body 5110*a*, and the inner member is mounted on the container body 5070.

With this configuration, the rail members 5084 guide the container unit 5018 in the depth direction of the apparatus. Specifically, the rail members 5084 guide the container unit 5018 to an installation position (see FIG. 5-6A) at which the container unit 5018 is installed in the apparatus body 5110*a* and a separation position (see FIG. 5-6B) at which the container unit 5018 is separated from the apparatus body 5110*a*.

Also, the container unit 5060 includes rail members for installing the container unit 5060 in and removing the container unit 5060 from the apparatus body 5110*a* although a detailed description is omitted.

Transport Unit 5014

As illustrated in FIG. 5-1, the transport unit 5014 includes a feed roller 5020*a* that feeds the sheet P that is contained in the container unit 5018 to the transport path 5016 and prevention rollers 5022*a* that prevent multiple sheets P that are fed by the feed roller 5020*a* from being transported. The transport unit 5014 also includes a feed roller 5020*b* that feeds the sheet P that is contained in the container unit 5060 to the transport path 5016 and prevention rollers 5022*b* that prevent multiple sheets P that are fed by the feed roller 5020*b* from being transported.

The transport unit 5014 also includes adjustment rollers 5024 that adjust a timing with which the sheet P is transported to the transfer nip NT and discharge rollers 5026 that discharge the sheet P to which the toner images are fixed by the fixing device 5034 to the location outside the apparatus body 5010*a*.

Covering Portion 5120

The covering portion 5120 is a so-called front covering, is mounted on the apparatus body 5110*a* as illustrated in FIG. 5-3A and FIG. 5-3B, moves to the covering position at which the covering portion 5120 covers the container unit 5018 that is installed in the apparatus body 5110*a* in the depth direction of the apparatus and the open position at which the covering portion 5120 uncovers the container unit 5018 in the depth direction of the apparatus.

According to the present fifth exemplary embodiment, the covering portion 5120 has a function of covering the apparatus body 5010*a* of the image forming apparatus 5010 in the depth direction of the apparatus. Consequently, the covering portion 5120 moves to the covering position at which the covering portion 5120 covers the toner image forming members 5030 in the respective colors that are installed in the apparatus body 5010*a* in the depth direction of the apparatus and the open position at which the covering portion 5120 uncovers the toner image forming members 5030 in the depth direction of the apparatus.

As illustrated in FIG. 5-3A, the covering portion 5120 that is positioned at the covering position includes a body 5122 that has a rectangular shape extending in the height direction of the apparatus and that includes a flange on an outer circumferential edge when viewed in the depth direction of the apparatus and support portions 5124 that rotatably support the body 5122.

As illustrated in FIG. 5-3A and FIG. 5-3B, the two support portions 5124 are mounted on a portion of the apparatus body 5110*a* in one direction of the width direction of the apparatus and are separated from each other in the height direction of the apparatus.

With this structure, the covering portion 5120 moves to the covering position (see FIG. 5-3A and FIG. 5-4A) at which the covering portion 5120 covers the container unit 5018 in the depth direction of the apparatus and the open position (see FIG. 5-3B and FIG. 5-4B) at which the covering portion 5120 uncovers the container unit 5018 in the depth direction of the apparatus. Specifically, the covering portion 5120 comes into contact with a stopper not illustrated and stops at the covering position. The covering portion 5120 that is positioned at the covering position swings, consequently comes into contact with a stopper not illustrated, and stops at the open position.

As illustrated in FIG. 5-4A, the covering portion 5120 covers the entire container unit 5018 and the entire container unit 5060 that are installed in the apparatus body 5110a when viewed in the depth direction of the apparatus with the covering portion 5120 positioned at the covering position. In other words, the covering portion 5120 covers the entire division line 5076 of the container unit 5018 and the entire division line 5062 of the container unit 5060 when viewed in the depth direction of the apparatus.

As illustrated in FIG. 5-4B, the covering portion 5120 is nearer than the lower edge of the container unit 5018 to the upper edge with the covering portion 5120 positioned at the open position when viewed in the depth direction of the apparatus. The entire container unit 5018 and the entire container unit 5060 are uncovered in the depth direction of the apparatus with the covering portion 5120 positioned at the open position when viewed in the depth direction of the apparatus. In other words, the entire division line 5076 of the container unit 5018 and the entire division line 5062 of the container unit 5060 are directly visible with the covering portion 5120 positioned at the open position when viewed in the depth direction of the apparatus.

The covering portion 5120 that is positioned at the covering position limits work on separation of the container unit 5018 and the container unit 5060 that are installed in the apparatus body 5110a, but the covering portion 5120 that is positioned at the open position does not limit work on separation of the container unit 5018 and the container unit 5060 that are installed in the apparatus body 5110a as above. In other words, work on separation of the container unit 5018 that is installed in the apparatus body 5110a is permitted.

Figures 1, 2, 3, 4, 5, 6, 7:
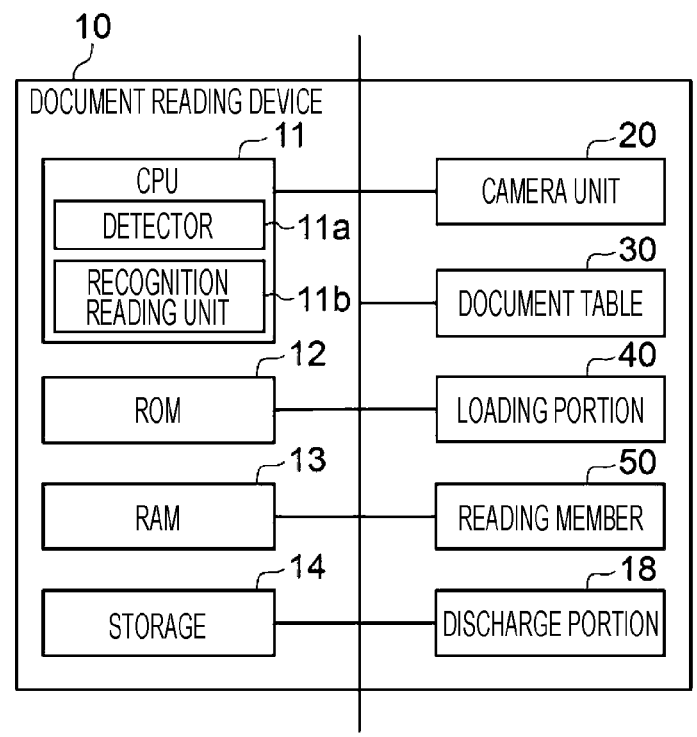

When the container unit 5018 that is installed in the apparatus body 5110a is pulled in the depth direction of the apparatus and is separated from the apparatus body 5110a with the covering portion 5120 positioned at the open position, the bottom plate 5070a of the separated container unit 5018 is uncovered in the thickness direction of the bottom plate 5070a. Specifically, as illustrated in FIG. 5-6B, the covering portion 5120 is not present in the thickness direction (an arrow B illustrated in FIG. 5-6B) of the bottom plate 5070a, and the bottom plate 5070a of the separated container unit 5018 is uncovered.

Covering Portion 5130

The covering portion 5130 is a so-called side covering, is mounted on the apparatus body 5110a as illustrated in FIG. 5-8A and FIG. 5-8B, moves to the covering position at which the covering portion 5130 covers the apparatus body 5110a in the width direction of the apparatus and the open position at which the covering portion 5130 uncovers the apparatus body 5110a in the width direction of the apparatus. The covering portion 5130 is another example of the covering portion. According to the present fifth exemplary embodiment, the covering portion 5130 is configurated d by using the single covering portion.

The covering portion 5130 that is positioned at the covering position covers the apparatus body 5110a in a direction in which the sheet P is transported by the transport unit 5014. For this reason, the covering portion 5130 that is positioned at the open position uncovers at least a part of the transport path 5016 (see FIG. 5-1), along which the sheet P is transported by the transport unit 5014, in the width direction of the apparatus.

According to the present fifth exemplary embodiment, the covering portion 5130 also has a function of covering the apparatus body 5010a of the image forming apparatus 5010 in the width direction of the apparatus. Consequently, the covering portion 5130 moves to the covering position at which the covering portion 5130 covers the fixing device 5034 that is installed in the apparatus body 5010a in the width direction of the apparatus and the open position at which the covering portion 5130 uncovers the fixing device 5034 in the width direction of the apparatus.

As illustrated in FIG. 5-8A, the covering portion 5130 that is positioned at the covering position includes a body 5132 that has a rectangular shape and that extends in the height direction of the apparatus when viewed in the width direction of the apparatus and support portions 5134 that rotatably support the body 5132.

As illustrated in FIG. 5-8A and FIG. 5-8B, the two support portions 5134 are mounted on a rear portion of the apparatus body 5110a in the depth direction of the apparatus and are separated from each other in the height direction of the apparatus.

With this structure, the covering portion 5130 moves to the covering position (see FIG. 5-8A) at which the covering portion 5130 covers at least a part of the transport path 5016 in the width direction of the apparatus and the open position (see FIG. 5-8B) at which the covering portion 5130 uncovers at least a part of the transport path 5016 in the width direction of the apparatus. Specifically, the covering portion 5130 comes into contact with a stopper not illustrated and stops at the covering position. The covering portion 5130 that is positioned at the covering position swings, consequently comes into contact with a stopper not illustrated, and stops at the open position.

Conclusion

As for the sheet containing apparatus 5110, as illustrated in FIG. 5-4A, the covering portion 5120 covers the entire container unit 5018 that is installed in the apparatus body 5110a when viewed in the depth direction of the apparatus with the covering portion 5120 positioned at the covering position as described above.

As for the sheet containing apparatus 5110, as illustrated in FIG. 5-4A, the covering portion 5120 covers the entire container unit 5060 that is installed in the apparatus body 5110a when viewed in the depth direction of the apparatus with the covering portion 5120 positioned at the covering position.

As for the sheet containing apparatus 5110, as illustrated in FIG. 5-4B, the covering portion 5120 is nearer than the lower edge of the container unit 5018 to the upper edge with the covering portion 5120 positioned at the open position when viewed in the depth direction of the apparatus. In this way, workability when the sheet P is contained in the container unit 5018 may be increased to a level higher than that in the case where the covering portion 5120 that is positioned at the open position is nearer than the upper edge of the container unit 5018 to the lower edge when viewed in the depth direction of the apparatus.

As for the sheet containing apparatus 5110, when the container unit 5018 is separated from the apparatus body 5110a with the covering portion 5120 positioned at the open position, the bottom plate 5070a of the separated container unit 5018 is uncovered in the thickness direction of the bottom plate 5070a. In this way, the workability when the sheet P is contained in the container unit 5018 may be increased to a level higher than that in the case where the bottom plate 5070a of the container unit 5018 that is separated from the apparatus body 5110a is uncovered in the thickness direction of the bottom plate 5070a.

As for the sheet containing apparatus 5110, the covering portion 5120 that is positioned at the covering position limits work on separation of the container unit 5018 that is installed in the apparatus body 5110a, but the covering portion 5120 that is positioned at the open position does not limit work on separation of the container unit 5018 that is installed in the apparatus body 5110a. In other words, work on separation of the container unit 5018 that is installed in the apparatus body 5110a is permitted. Consequently, separation of the container unit 5018 from the apparatus body 5110a is limited with the covering portion 5120 positioned at the covering position.

As for the sheet containing apparatus 5110, the lower edge of the container unit 5018 is nearer than the side wall 5112a that faces the upper edge of the container unit 5018 to the side wall 5112b that faces the lower edge when viewed in the depth direction of the apparatus. In this way, the workability when the sheet P is contained in the container unit 5018 may be increased to a level higher than that in the case where the lower edge of the container unit is nearer than the side wall that faces the lower edge of the container unit to the side wall that faces the upper edge.

As for the sheet containing apparatus 5110, the trajectory of the covering portion 5120 is separated from the trajectory of the covering portion 5130. Consequently, the covering portion 5130 moves regardless of the position to which the covering portion 5120 moves. The two trajectories do not three-dimensionally overlap with the trajectory of the covering portion 5120 separated from the trajectory of the covering portion 5130.

As for the sheet containing apparatus 5110, a part of the transport path 5016 for the sheet P is uncovered with the covering portion 5130 positioned at the open position, and the sheet P that is jammed on the transport path 5016 is removable.

As for the image forming apparatus 5010, the toner image forming members 5030 are maintainable with the covering portion 5120 positioned at the open position.

As for the image forming apparatus 5010, the fixing device 5034 is maintainable with the covering portion 5130 positioned at the open position.

The specific fifth exemplary embodiment of the present disclosure is described in detail. The present disclosure is not limited to the fifth exemplary embodiment. It is clear for a person skilled in the art that the present disclosure includes different fifth exemplary embodiments within the scope of the present disclosure. For example, according to the fifth exemplary embodiment described above, the sheet containing apparatus 5110 is used for the electrophotographic image forming apparatus 5010. However, the sheet containing apparatus 5110 may be used for, for example, an ink-jet image forming apparatus.

According to the fifth exemplary embodiment described above, the apparatus body 5110a is opened and closed by swinging the covering portion 5120 and the covering portion 5130, but the apparatus body 5110a may be opened and closed by sliding.

According to the fifth exemplary embodiment described above, the covering portion 5120 at the covering position covers the entire container unit 5018 that is installed in the apparatus body 5110a when viewed in the depth direction of the apparatus but may cover only a part of the container unit 5018. Consequently, the number of the division line 5076 that tilts and that is exposed in the depth direction of the apparatus decreases. The meaning of being exposed corresponds to the meaning of not being covered by another member and exposed from the surface. The meaning that the number decreases is that the length of an exposed portion along a straight portion of the division line decreases.

According to the fifth exemplary embodiment described above, the covering portion 5120 at the covering position covers the entire container unit 5060 that is installed in the apparatus body 5110a when viewed in the depth direction of the apparatus but may cover only a part of the container unit 5060. Consequently, the number of the division line 5062 that is exposed in the depth direction of the apparatus decreases.

According to the fifth exemplary embodiment described above, the covering portion 5120 that is positioned at the open position is nearer than the lower edge of the container unit 5018 to the upper edge when viewed in the depth direction of the apparatus. However, the covering portion may be nearer than the upper edge of the container unit 5018 to the lower edge. In this way, the maintenance of a paper feeding unit such as the feed roller of the container unit 5018 may be facilitated more than the case where the covering portion 5120 that is positioned at the open position is nearer than the lower edge of the container unit 5018 to the upper edge.

According to the fifth exemplary embodiment described above, the lower edge of the container unit 5018 is nearer than the side wall 5112a that faces the upper edge of the container unit 5018 to the side wall 5112b that faces the lower edge when viewed in the depth direction of the apparatus. However, the lower edge of the container unit 5018 may be nearer than the side wall 5112b that faces the lower edge of the container unit 5018 to the side wall 5112a that faces the upper edge. In this case, the action that is carried out with the lower edge of the container unit 5018 being nearer than the side wall 5112a that faces the upper edge of the container unit 5018 to the side wall 5112b that faces the lower edge is not taken.

According to the fifth exemplary embodiment described above, the mass of the covering portion 5120 is smaller than the mass of the container unit 5018, and the covering portion 5120 that is positioned at the open position may be prevented from moving to the covering position with the container unit 5018 separated from the apparatus body 5110a although this is not particularly described. Consequently, when the covering portion 5120 at the open position moves to the covering position with the container unit 5018 separated from the apparatus body 5110a, the covering portion 5120 comes into contact with the container unit 5018 and stops moving. In this way, the covering portion 5120 may be inhibited from being damaged, unlike a configuration in which the covering portion 5120 at the open position is forcefully movable to the covering position with the container unit 5018 separated from the apparatus body 5110a.

According to the fifth exemplary embodiment described above, the body 5122 of the covering portion 5120 opens and closes about the support portions 5124 that are disposed in the −W direction of the container unit 5018 and moves to the open position, and the container unit 5018 is uncovered in the front direction of the depth direction of the apparatus although this is not particular described. In this way, containing the sheet P in the container unit 5018 by the user may be facilitated because the body 5122 is not disposed in the +W direction of the container unit 5018 with the body 5122 of the covering portion 5120 moved to the open position.

According to the fifth exemplary embodiment described above, the support portions 5124 are disposed in the −W direction of the container unit 5018. However, the support portions 5124 may be disposed in the +W direction of the container unit 5018, and the body 5122 may open and close about the support portions. In this case, the body 5122 is not disposed in the −W direction of the container unit 5018 with the body 5122 moved to the open position. In this way, a measure against a jam that happens, for example, at a pickup portion near the feed roller 5020*a* may be facilitated.

According to the fifth exemplary embodiment described above, the container unit 5018 and the container unit 5060 are covered in the depth direction of the apparatus with the covering portion 5120 that is configured d by using the single covering portion moved to the covering position although this is not particular described. Consequently, the number of the division line due to the covering portion is smaller than that in the case of two covering portions.

Sixth Exemplary Embodiment

Figures 1B, 6:
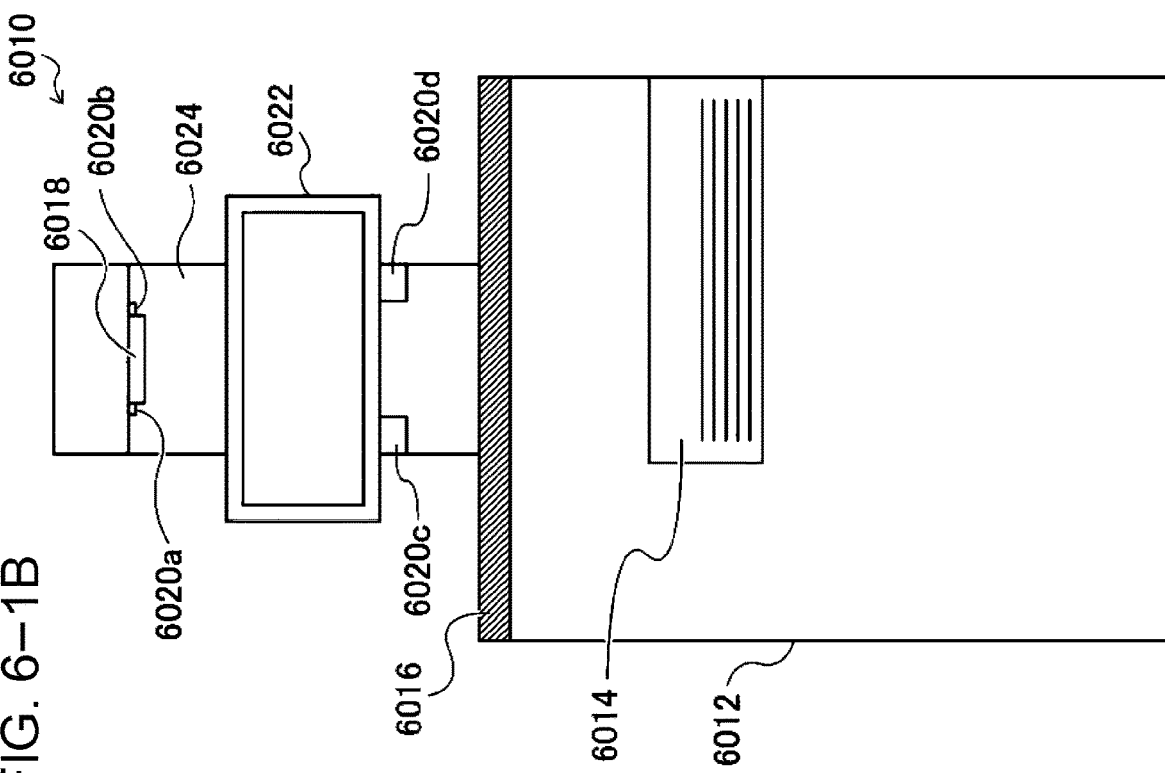
Figures 1A, 6:
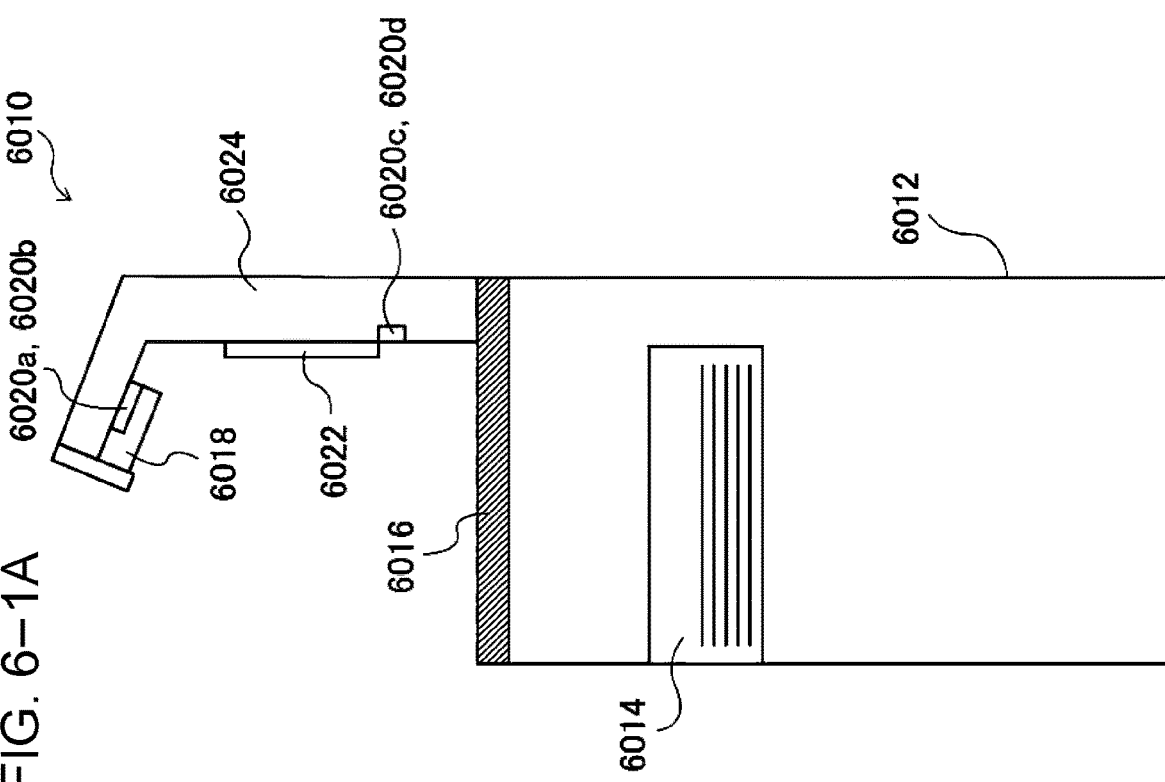
Figures 3, 6:
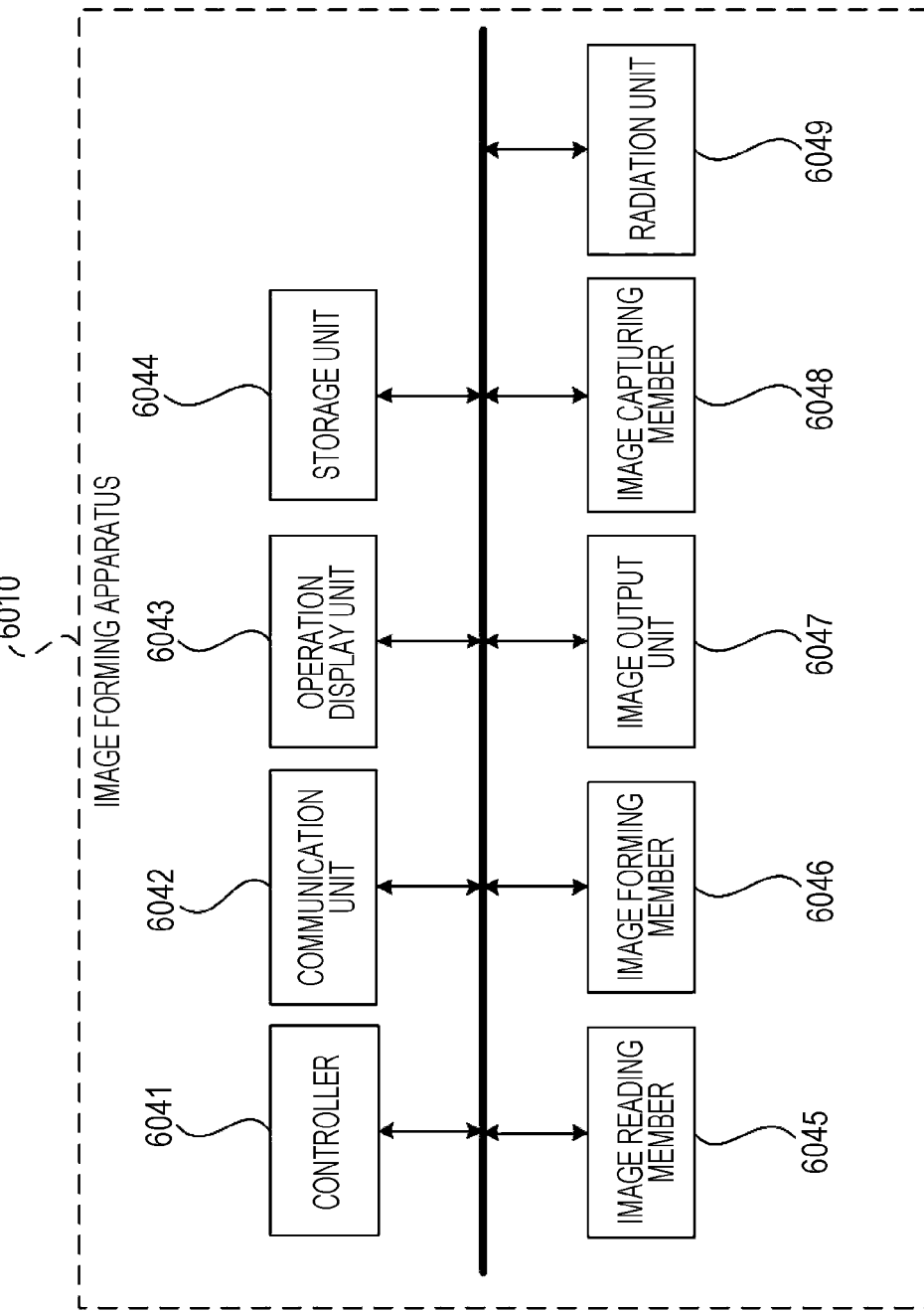
Figures 4, 6:
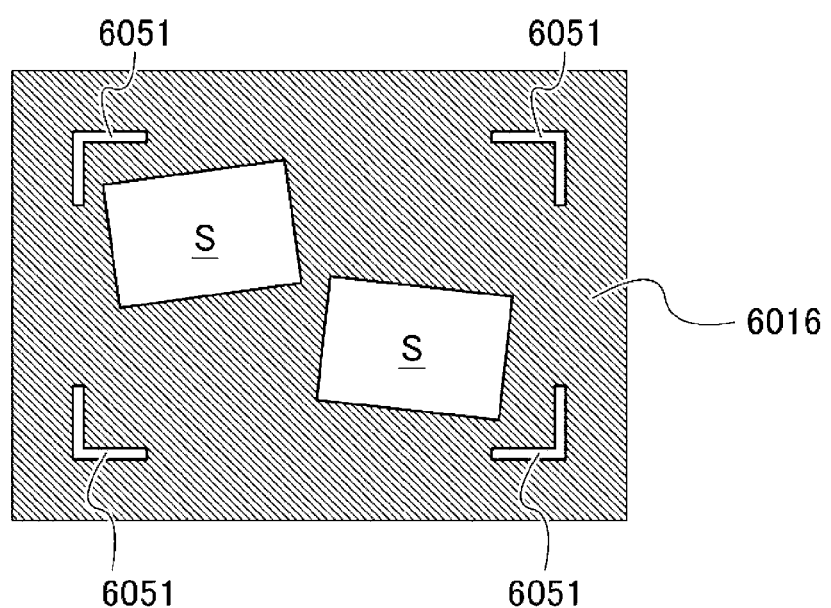
Figures 5, 6:
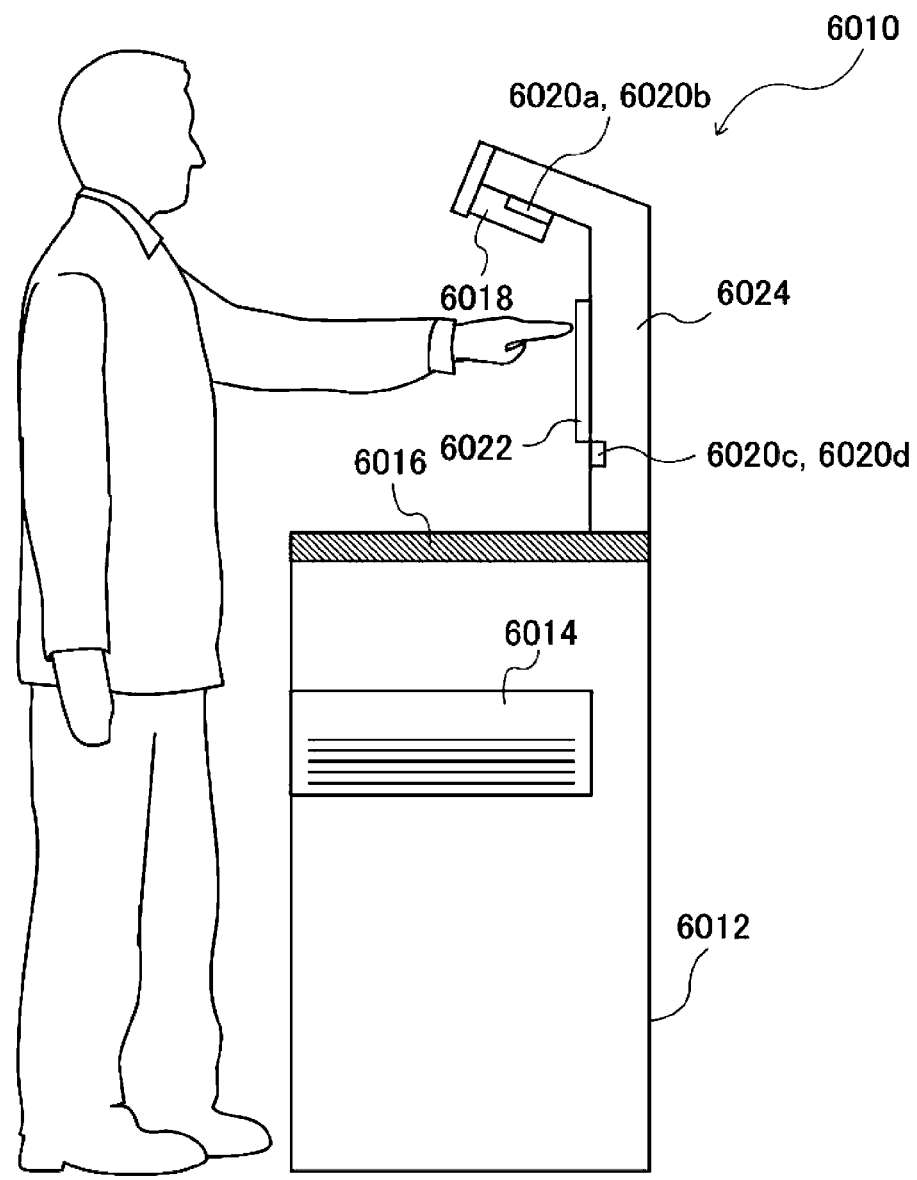
Figures 6, 6B:
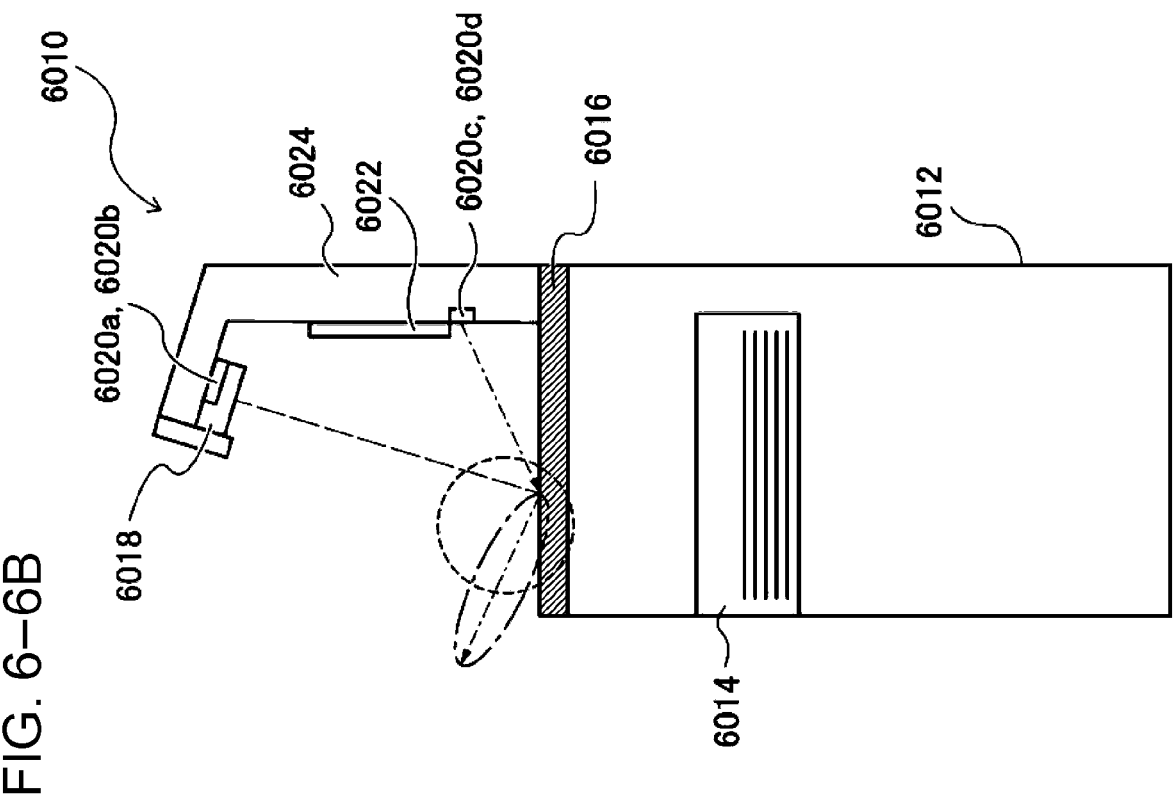
Figures 6, 6A:
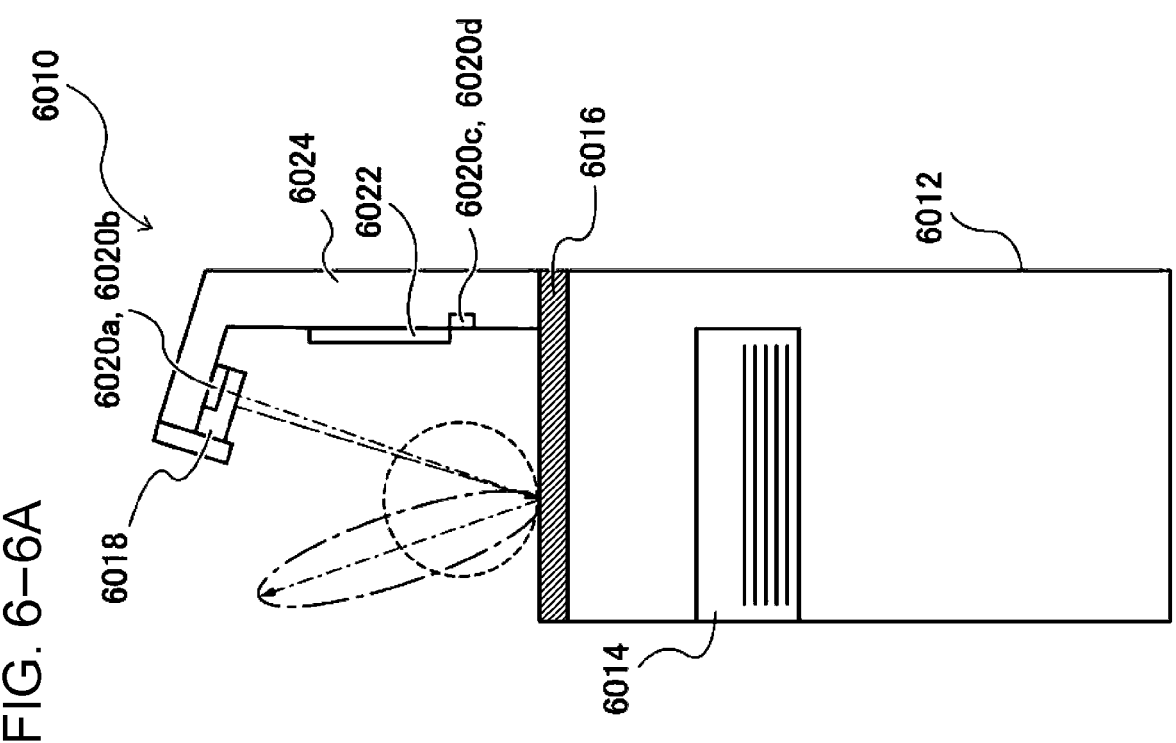
Figures 6, 7:
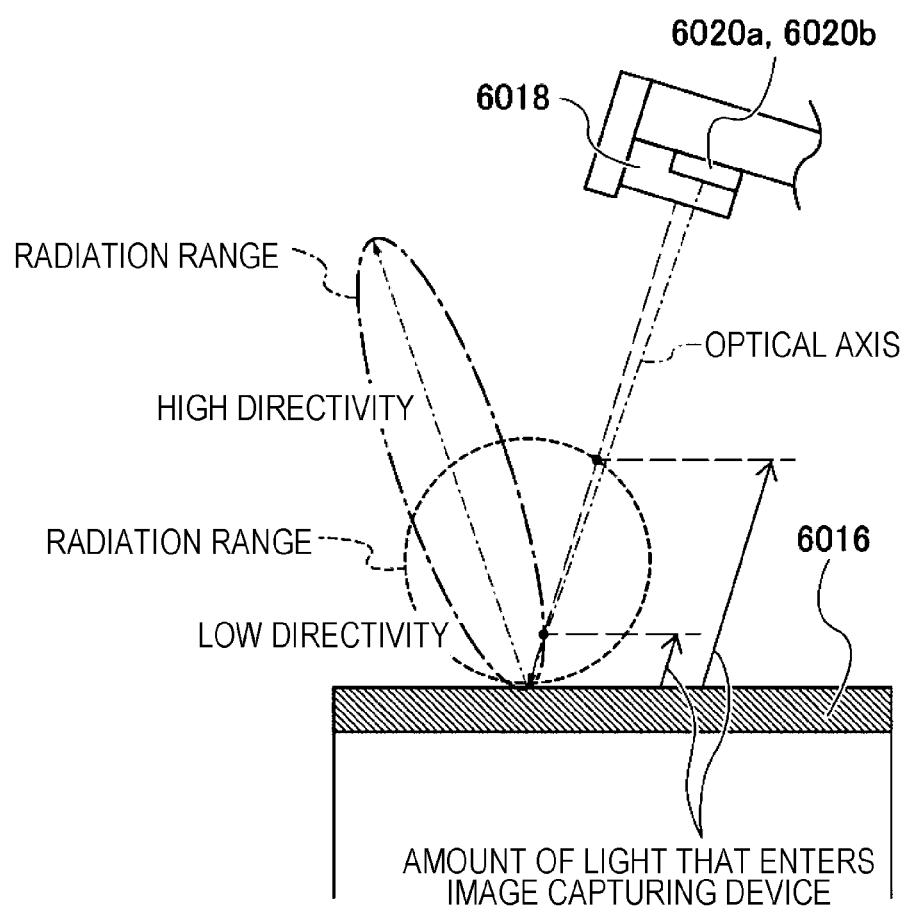
Figures 6, 7, 8, 8B:
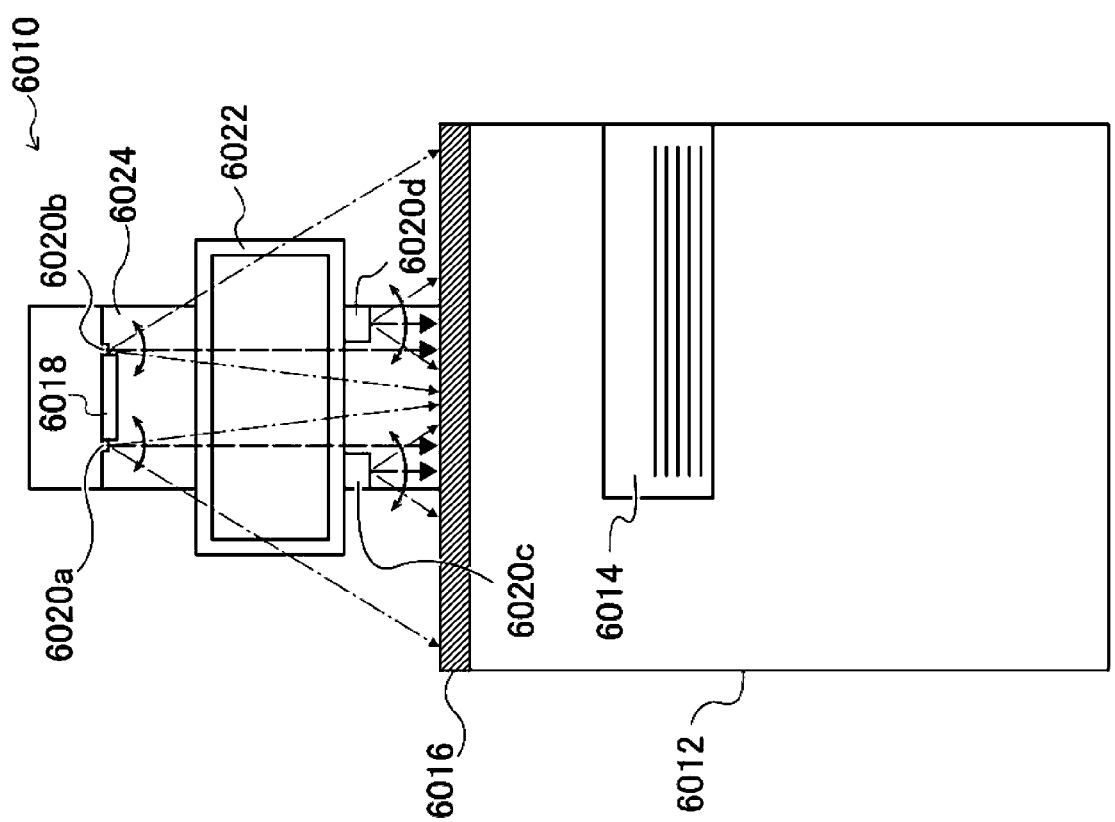
Figures 6, 7, 8, 8A:
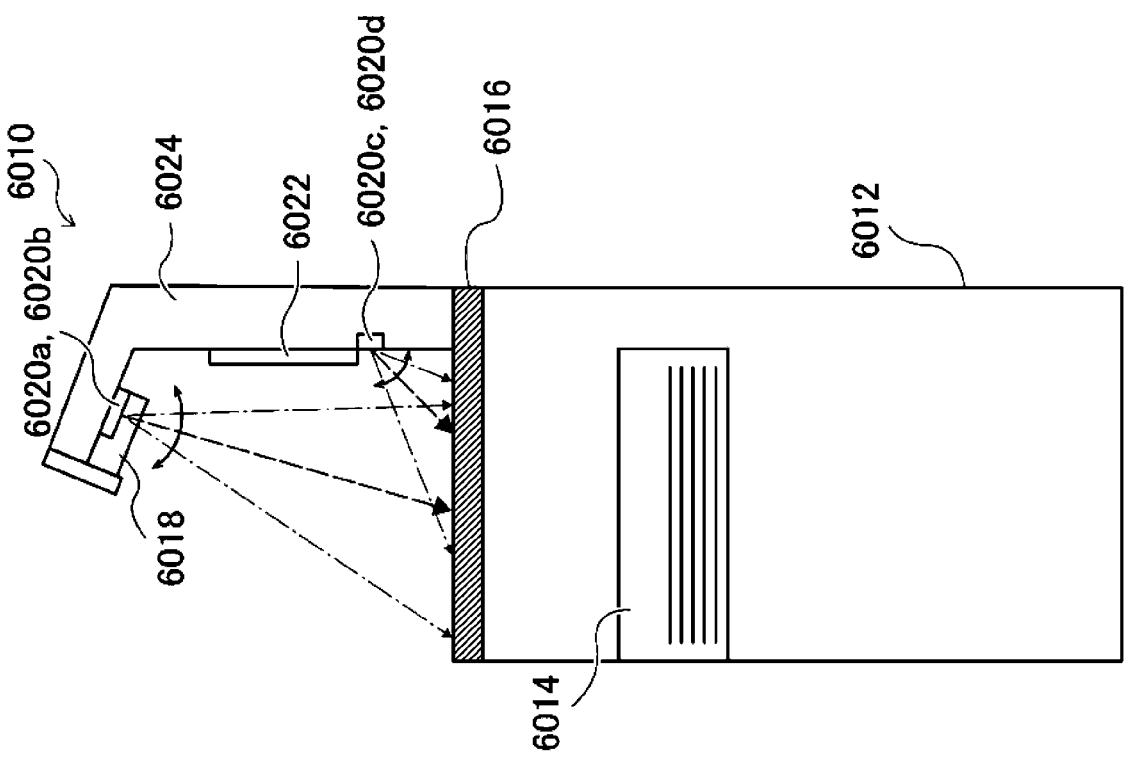
Figures 6, 7, 8, 9:
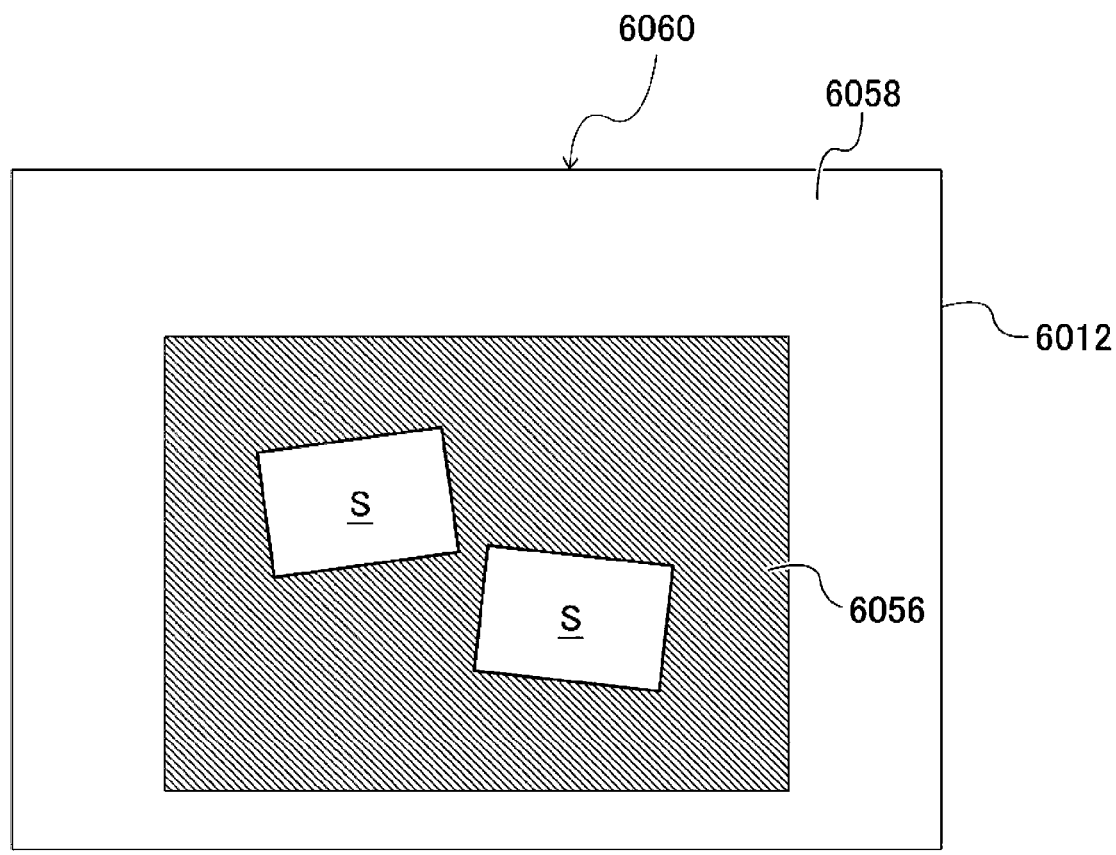
Figures 6, 7, 8, 9, 10:
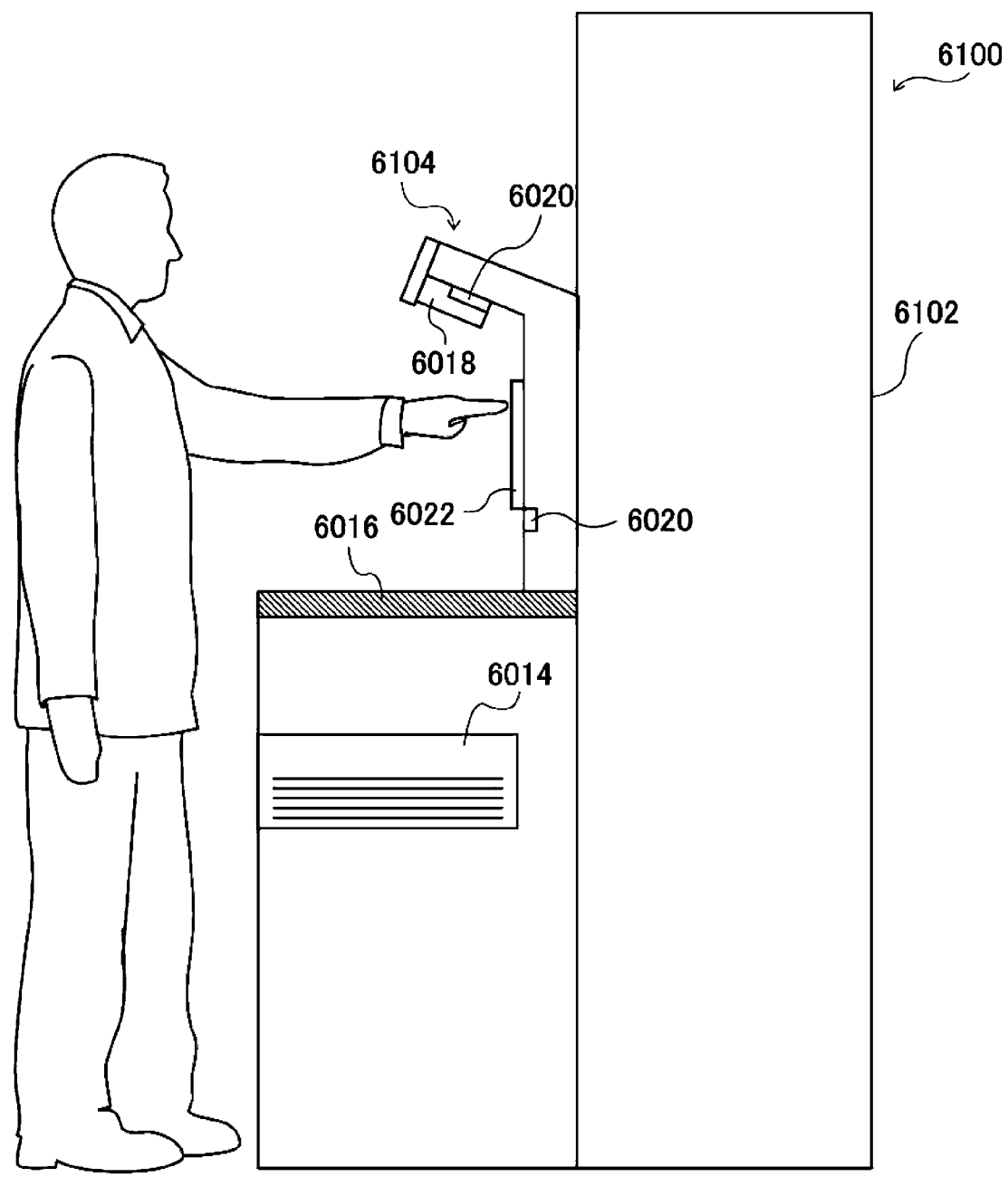
Figures 1, 7:
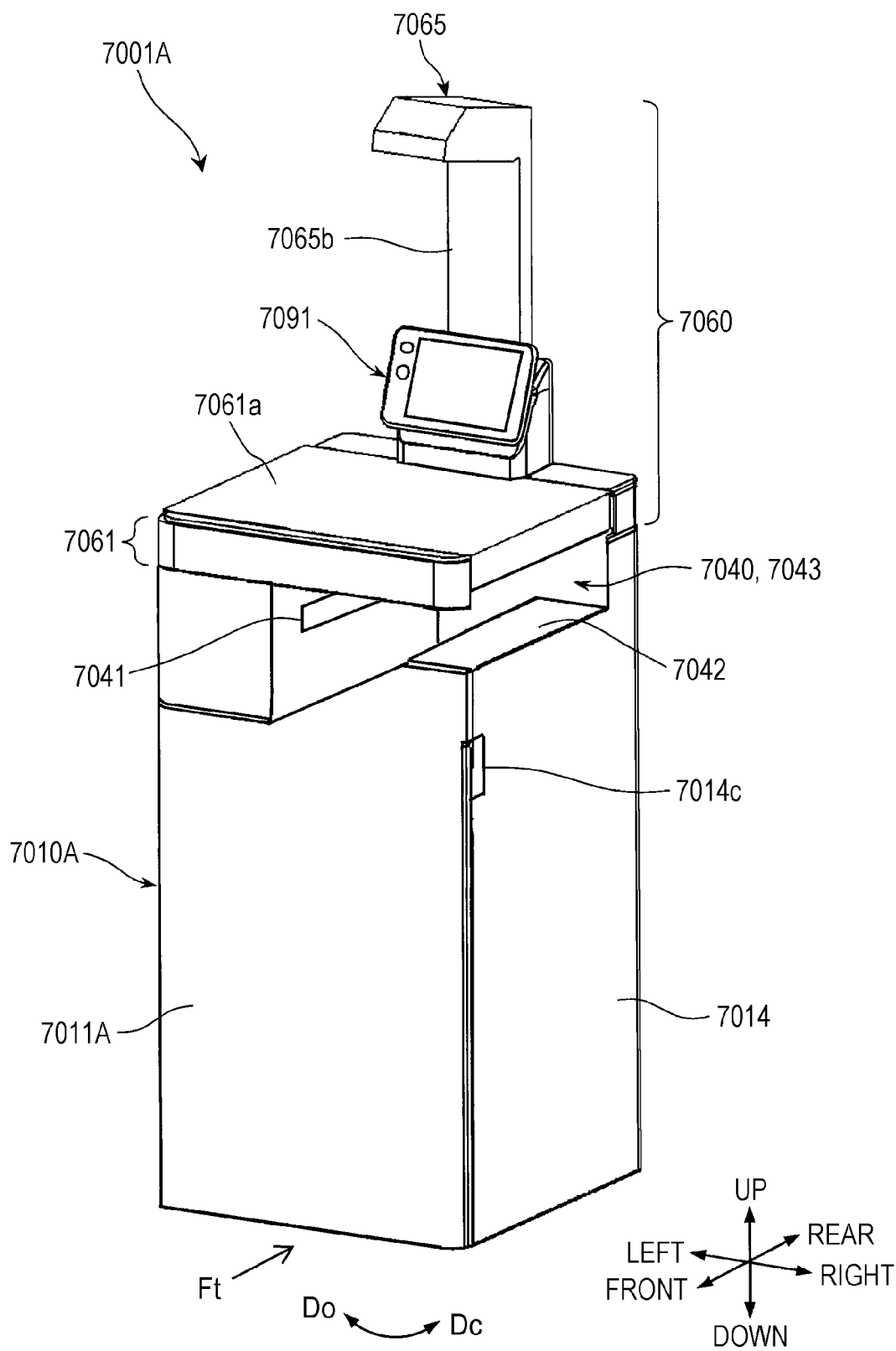
Figures 2, 7:
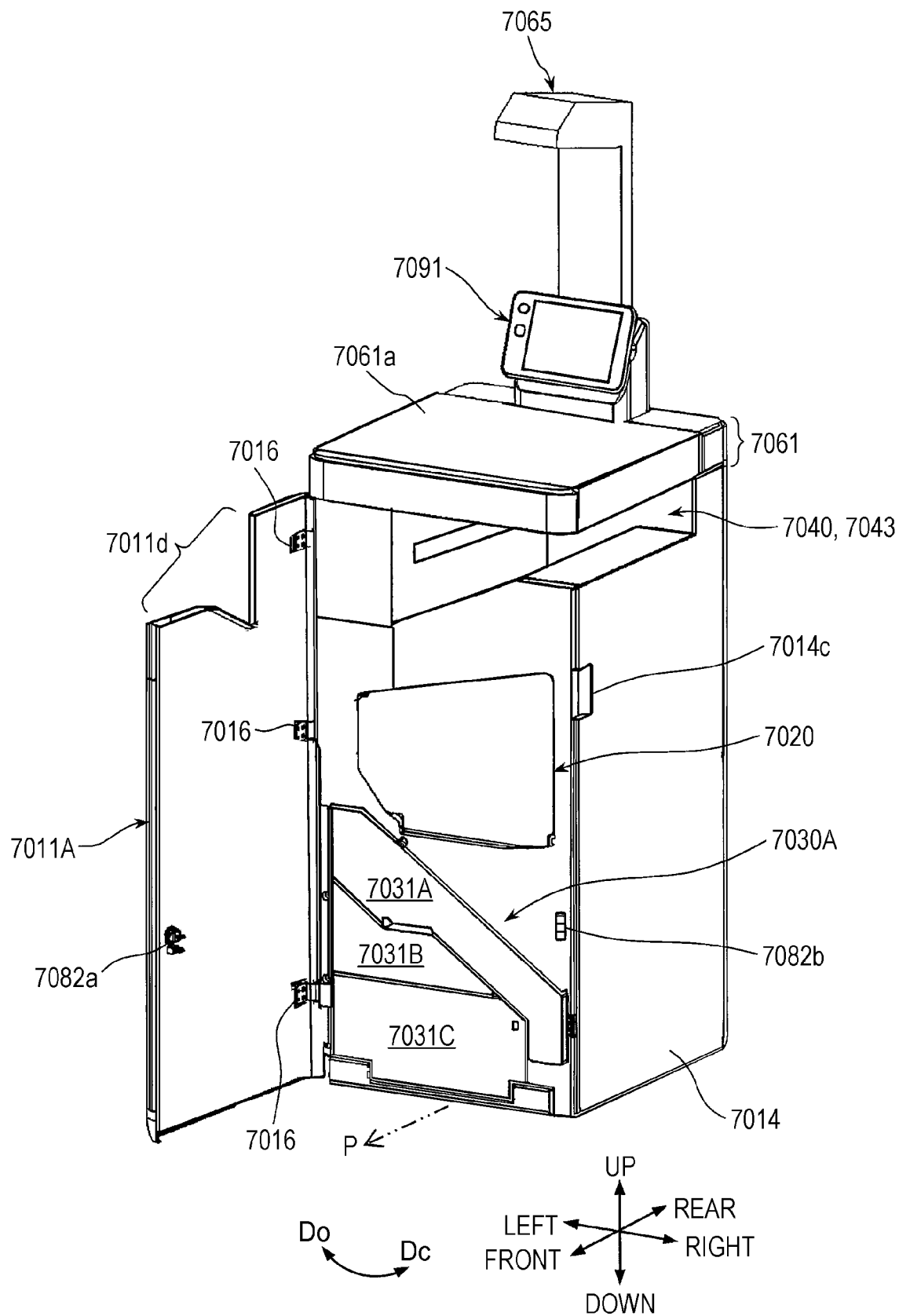
Figures 3, 7:
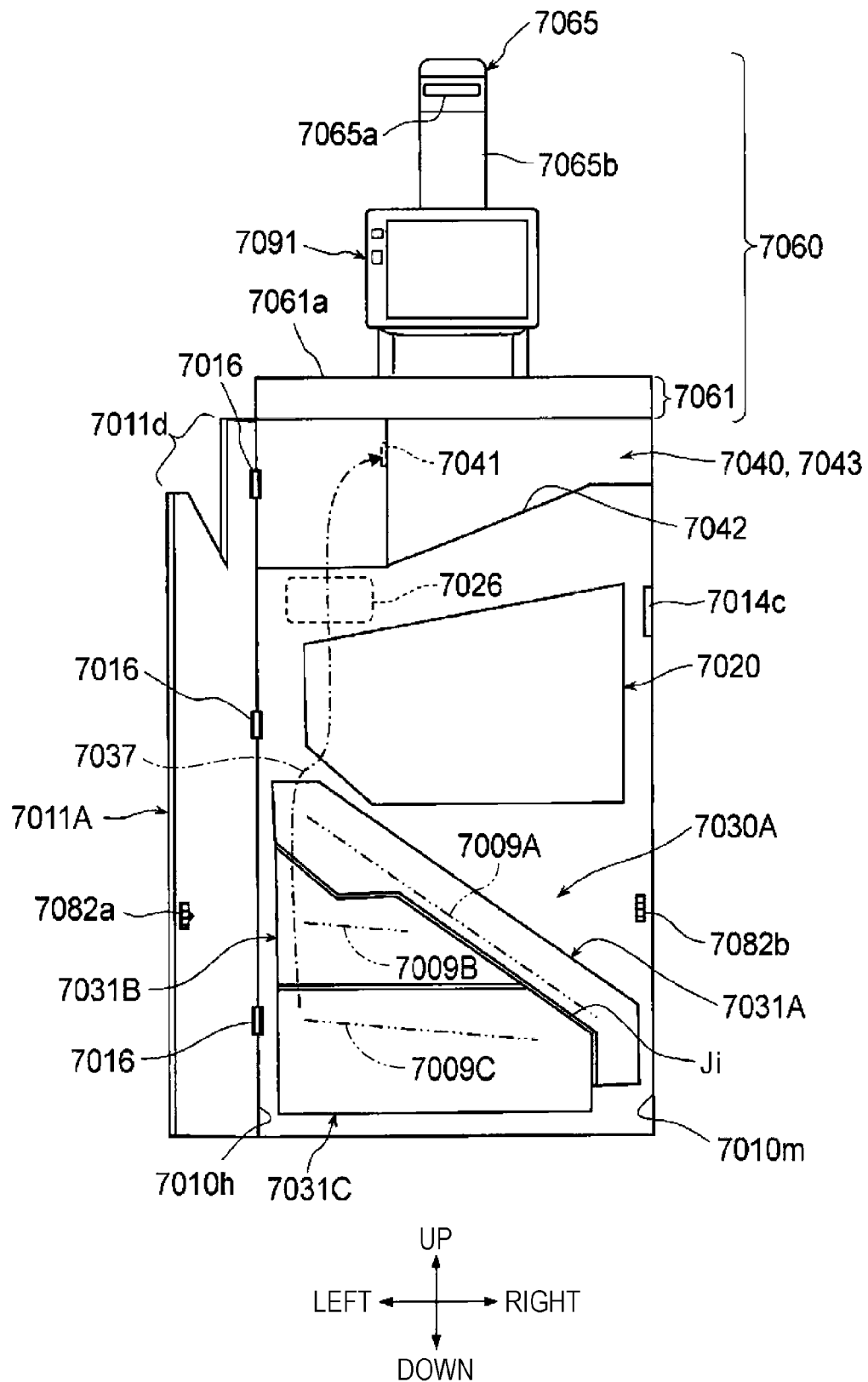
Figures 4, 7:
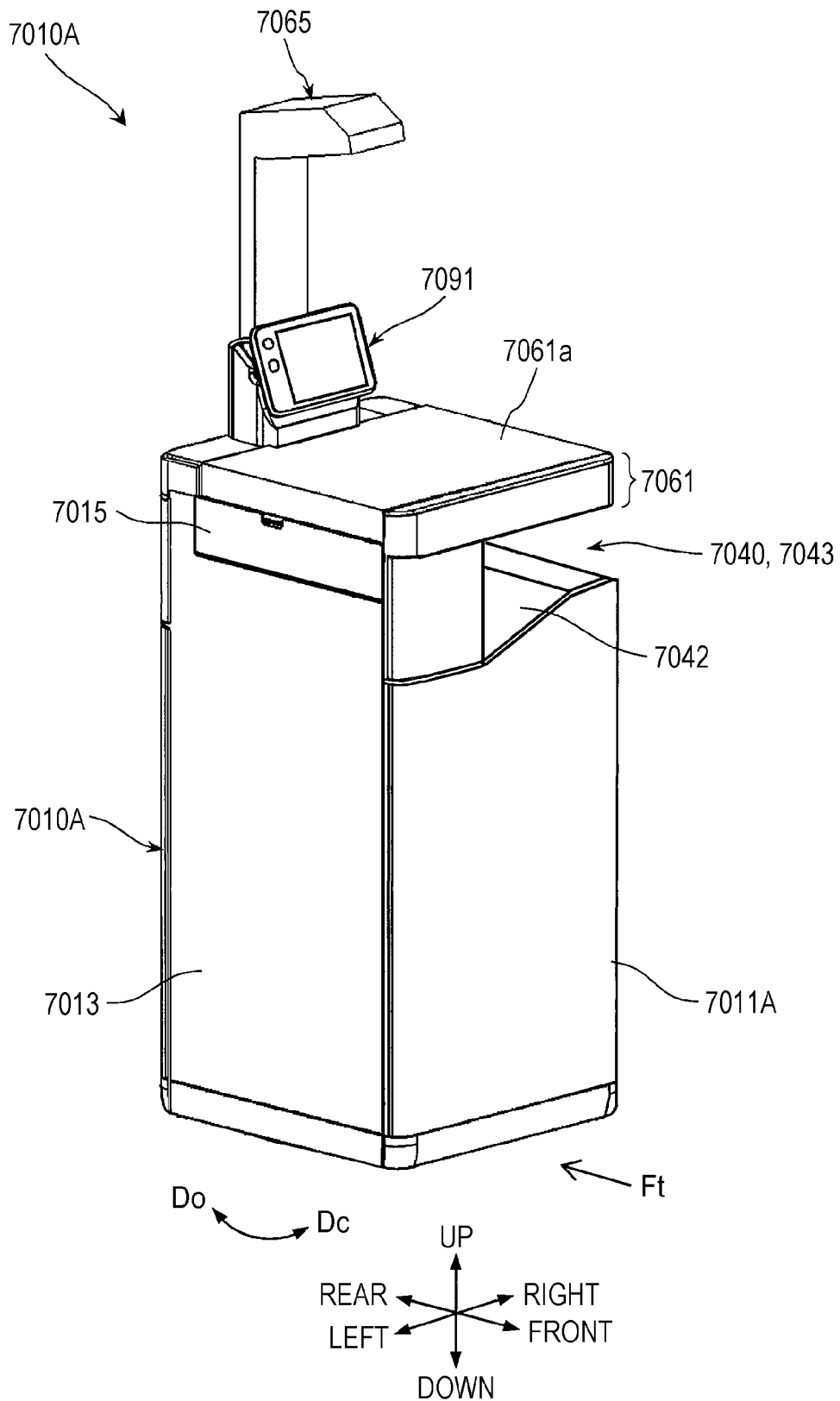
Figures 5, 7:
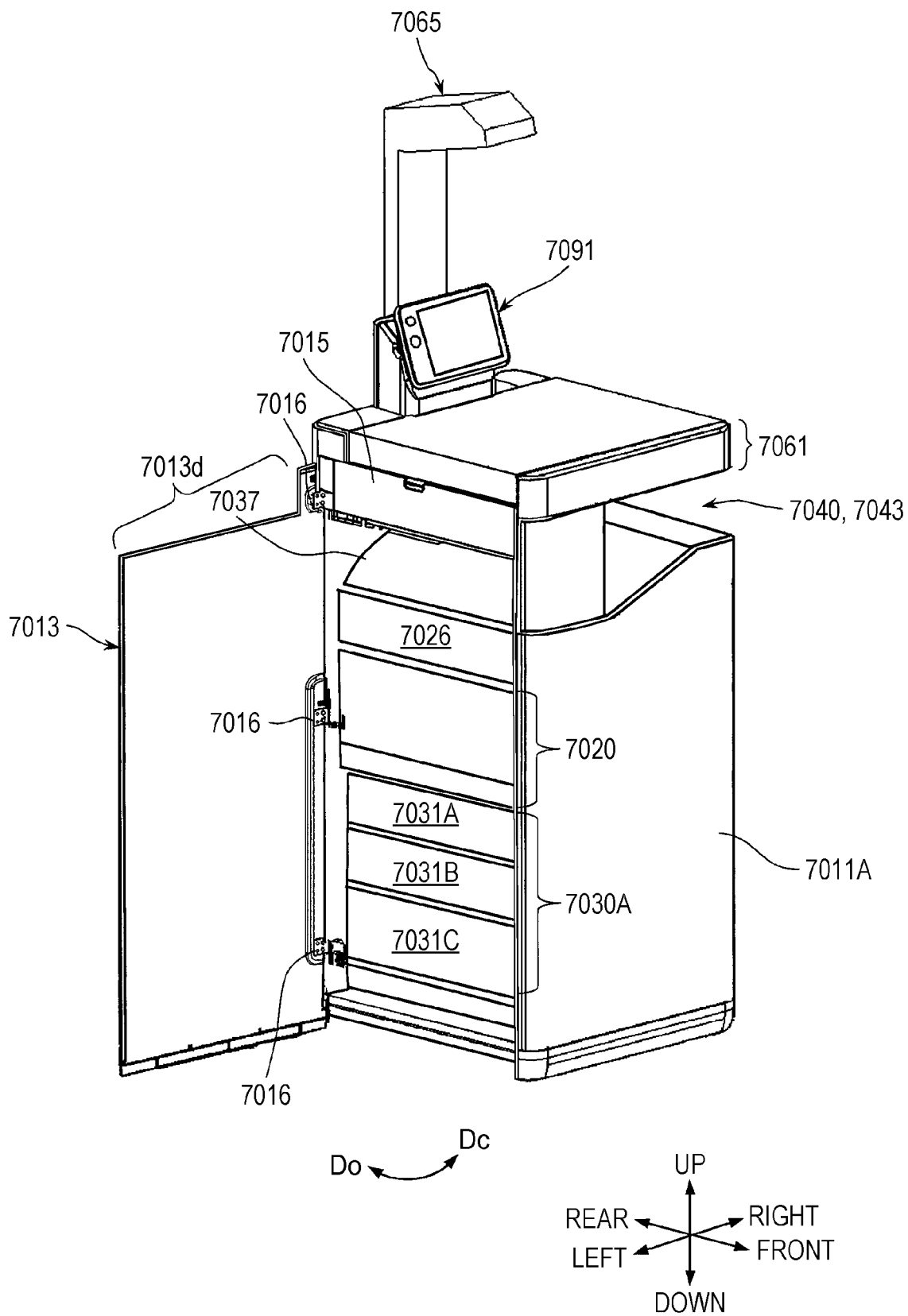
Figures 6, 7:
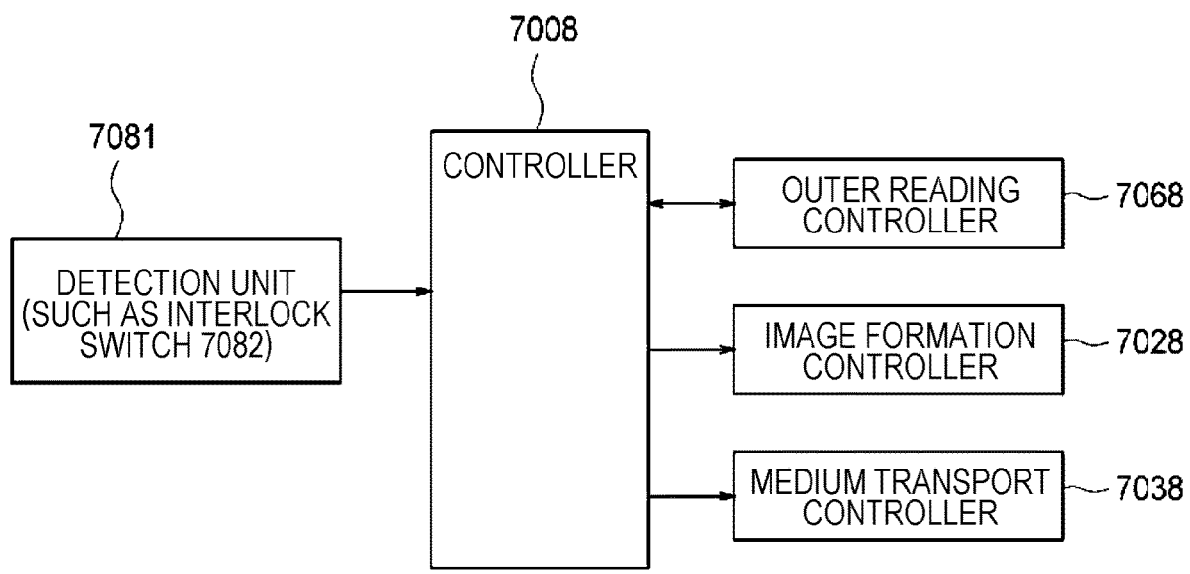
Figure 7:
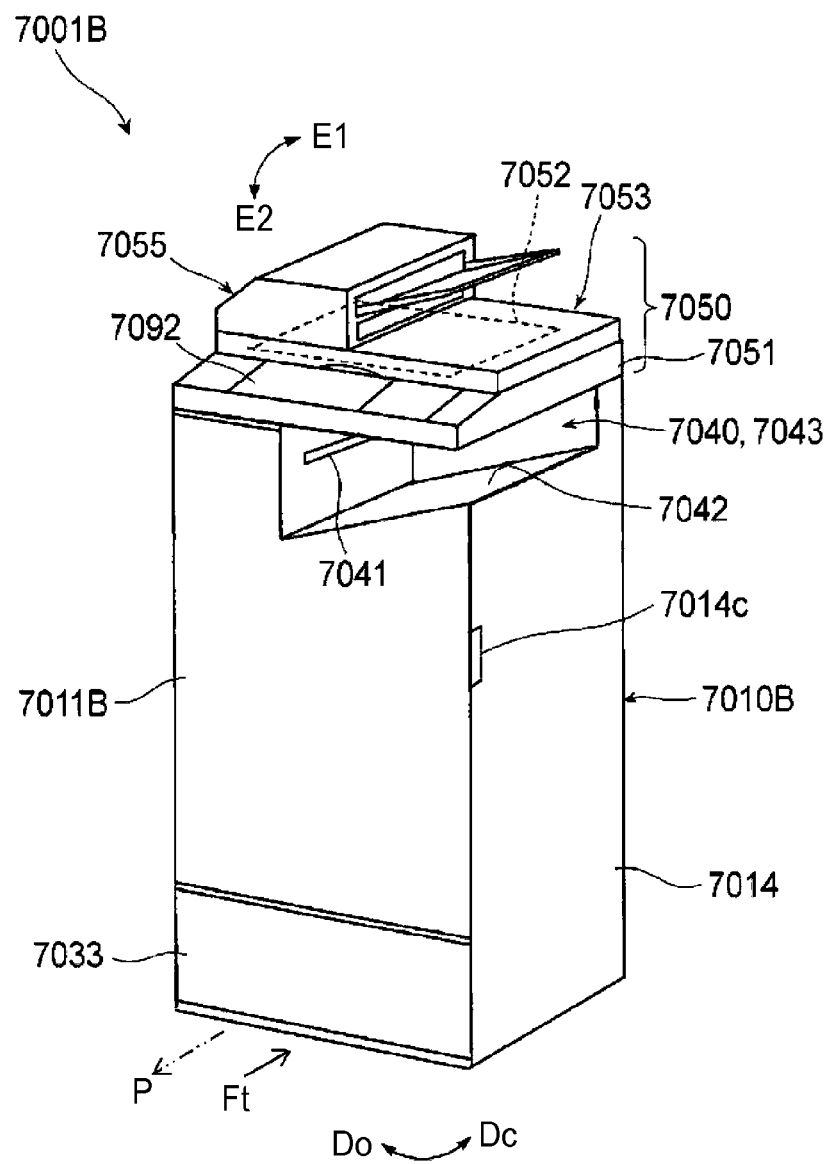
Figures 7, 8:
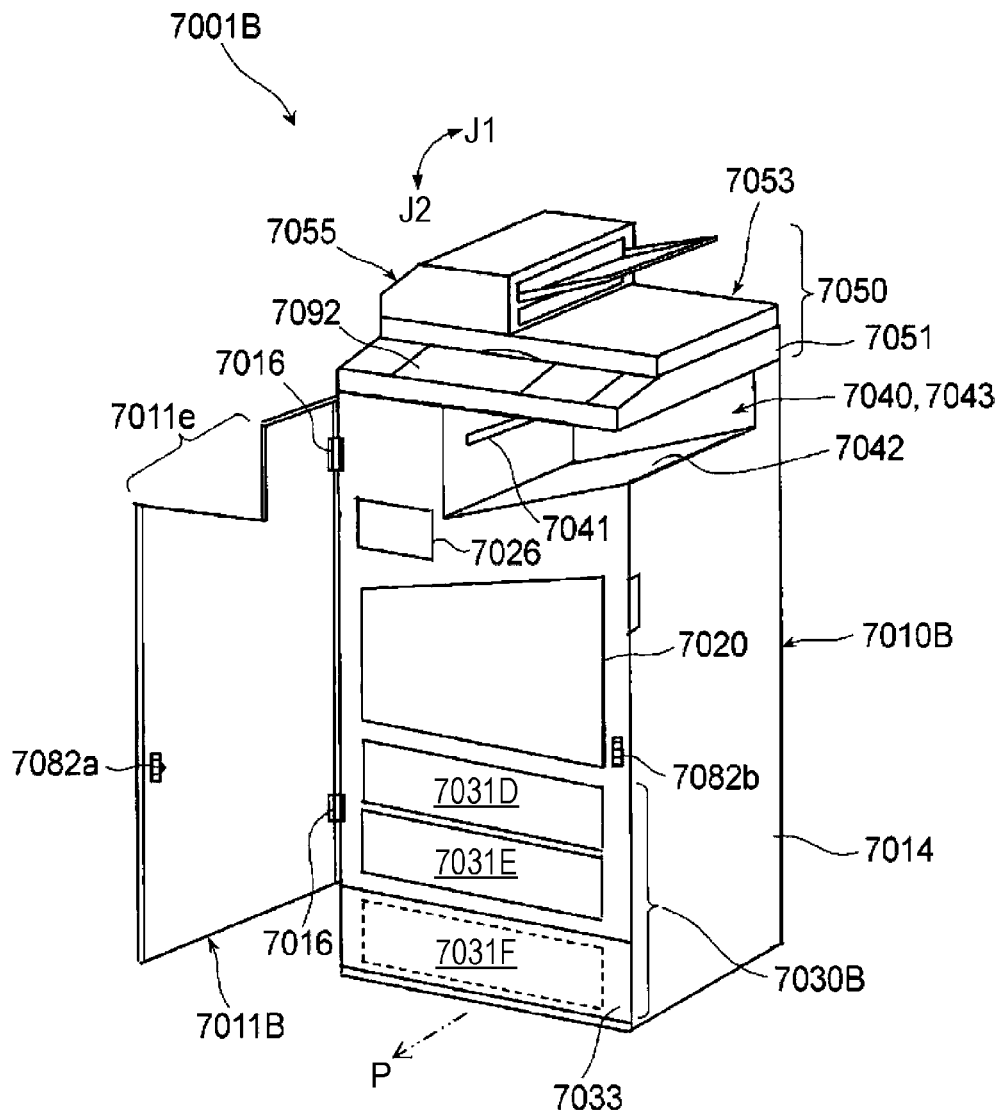
Figures 7, 8, 9:
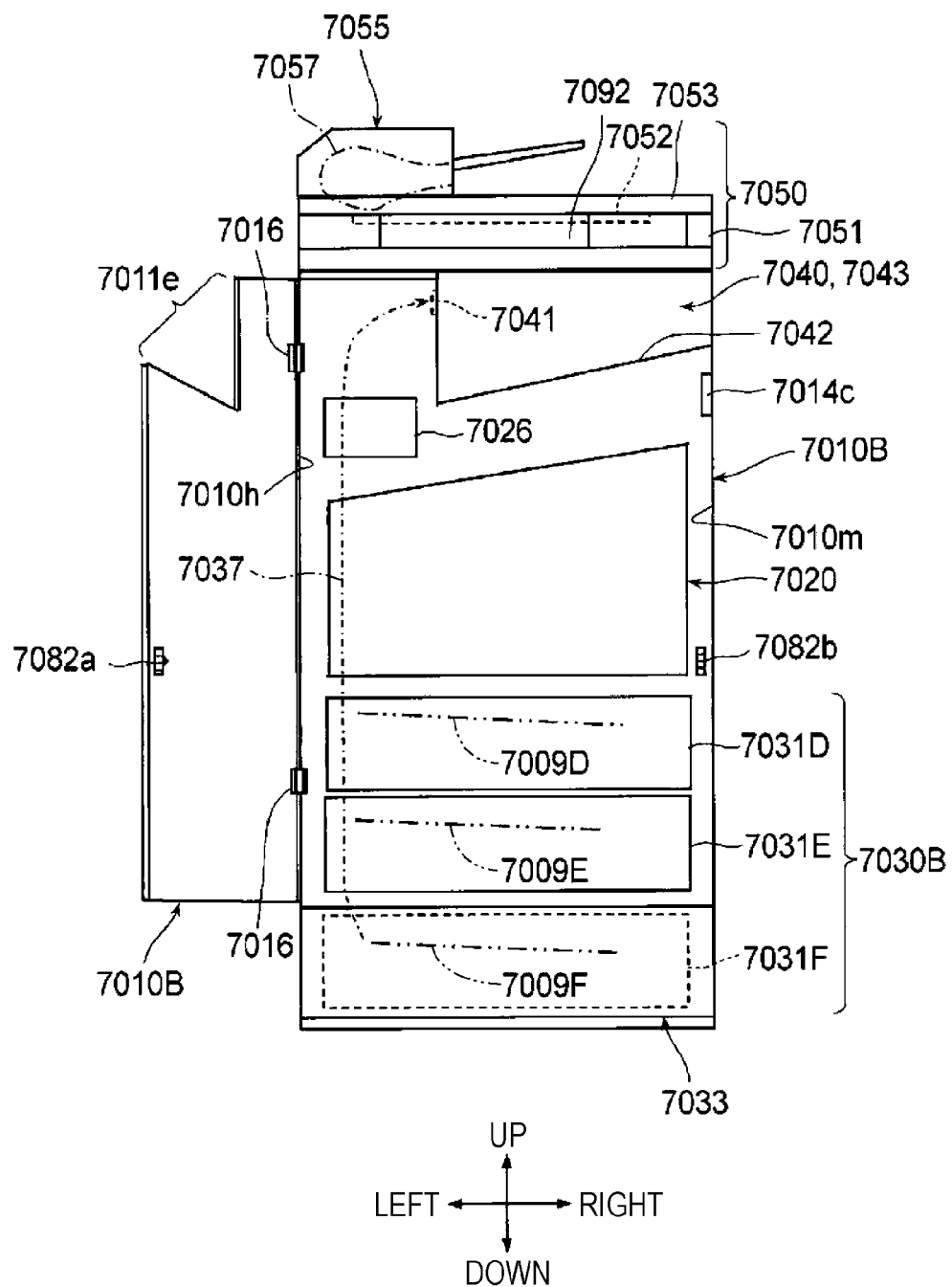
Figures 7, 8, 9, 10:
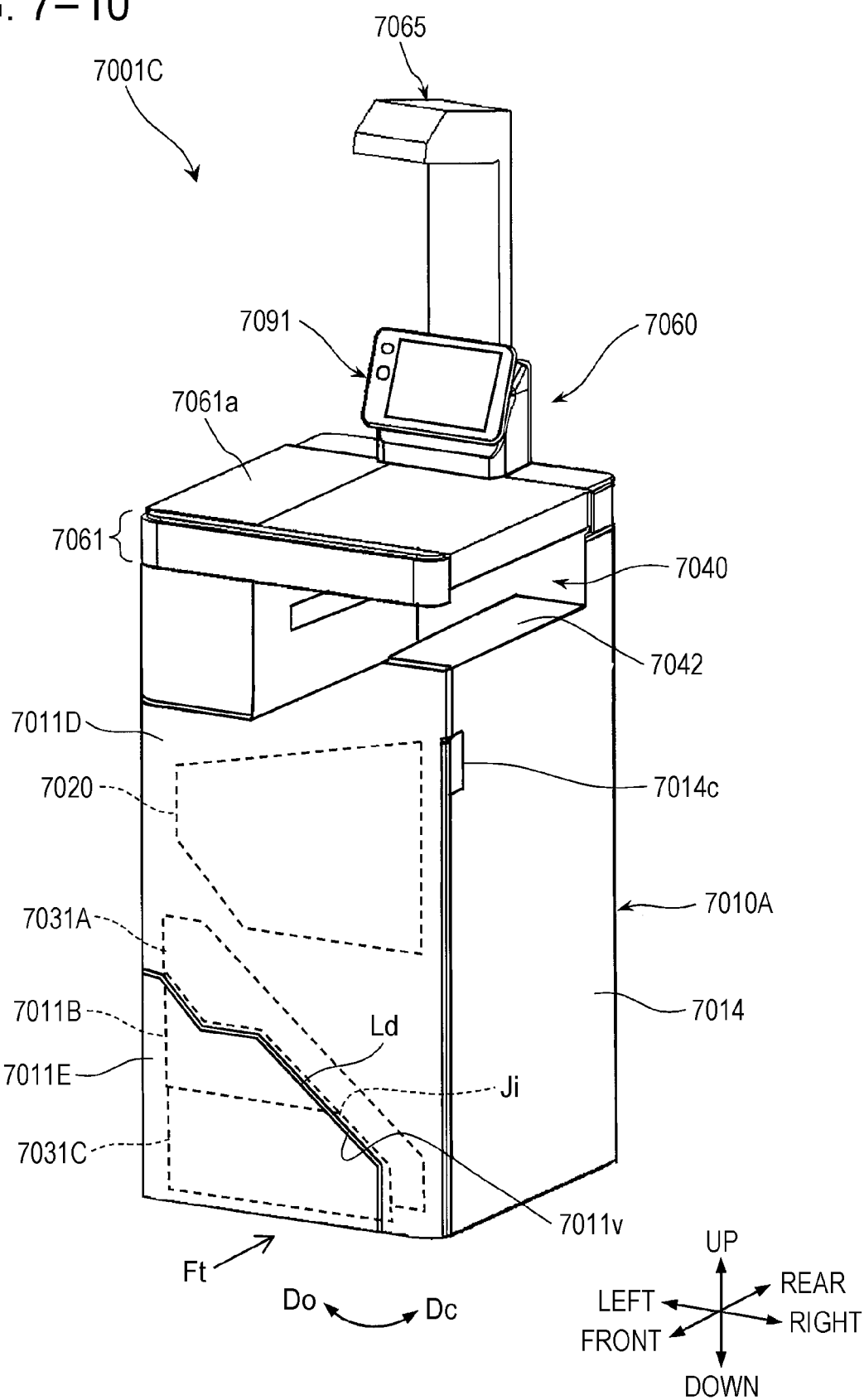
Figures 7, 8, 9, 10, 11:
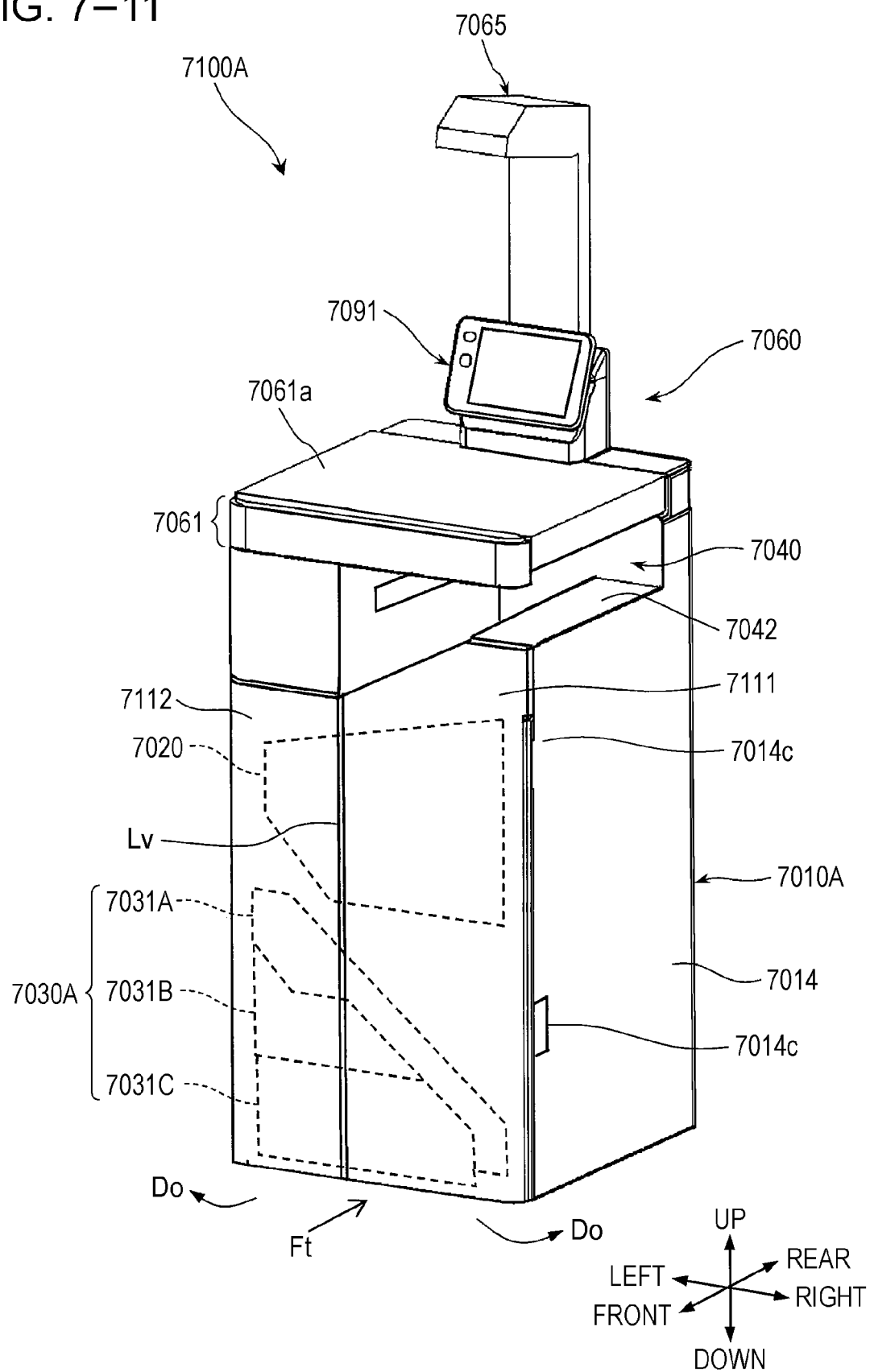
Figures 7, 8, 9, 10, 11, 12:
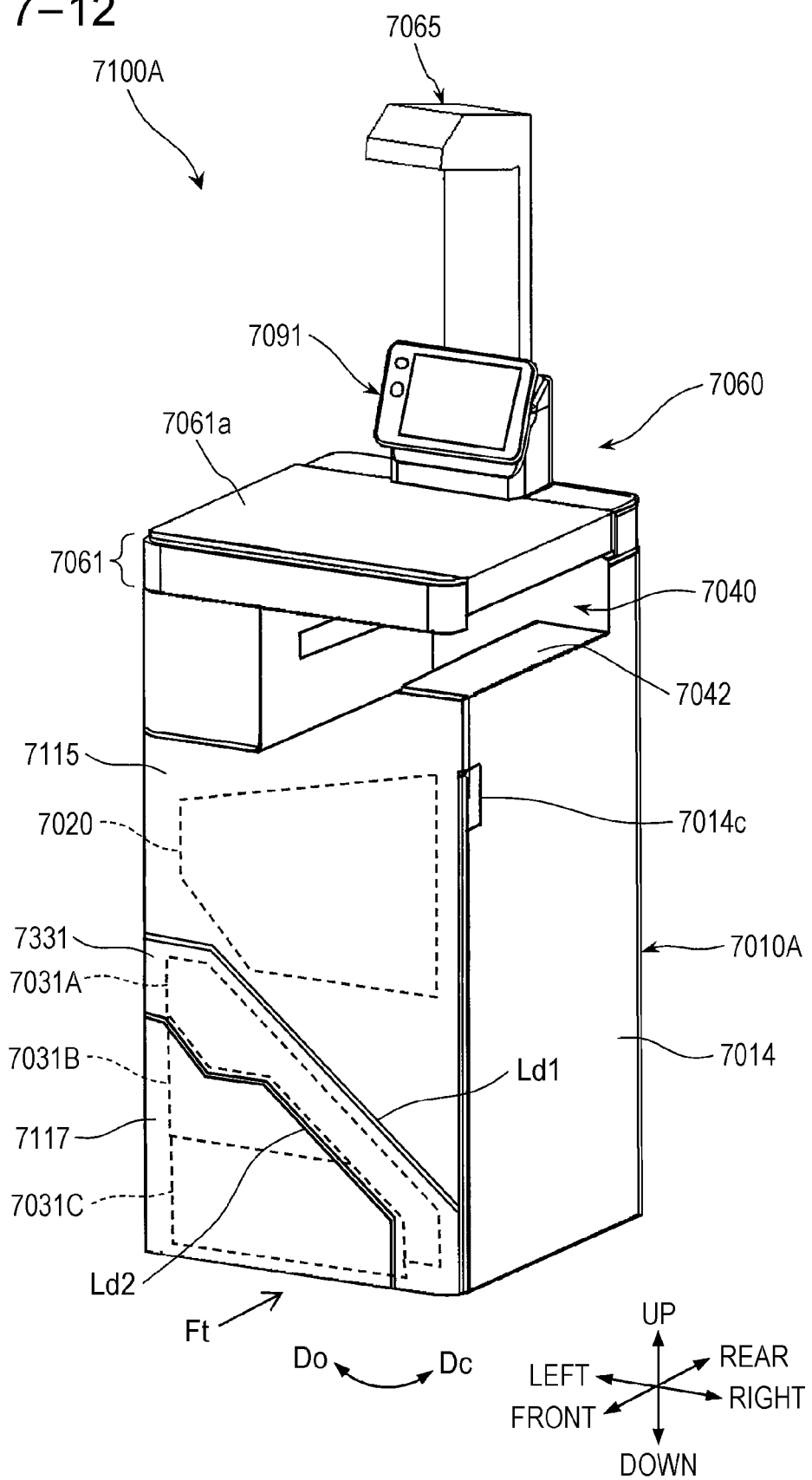
Figures 1, 8:
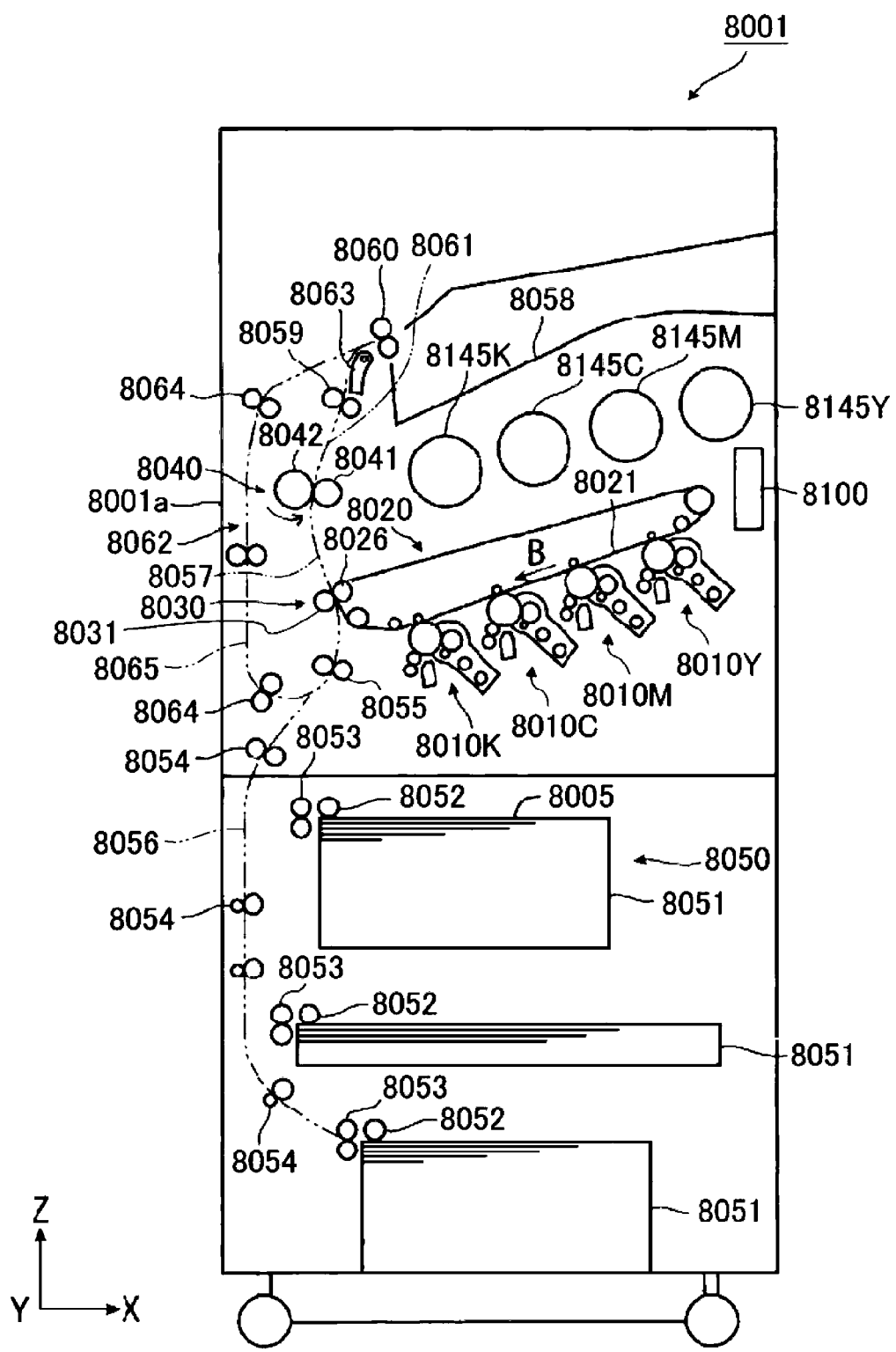
Figures 2, 8:
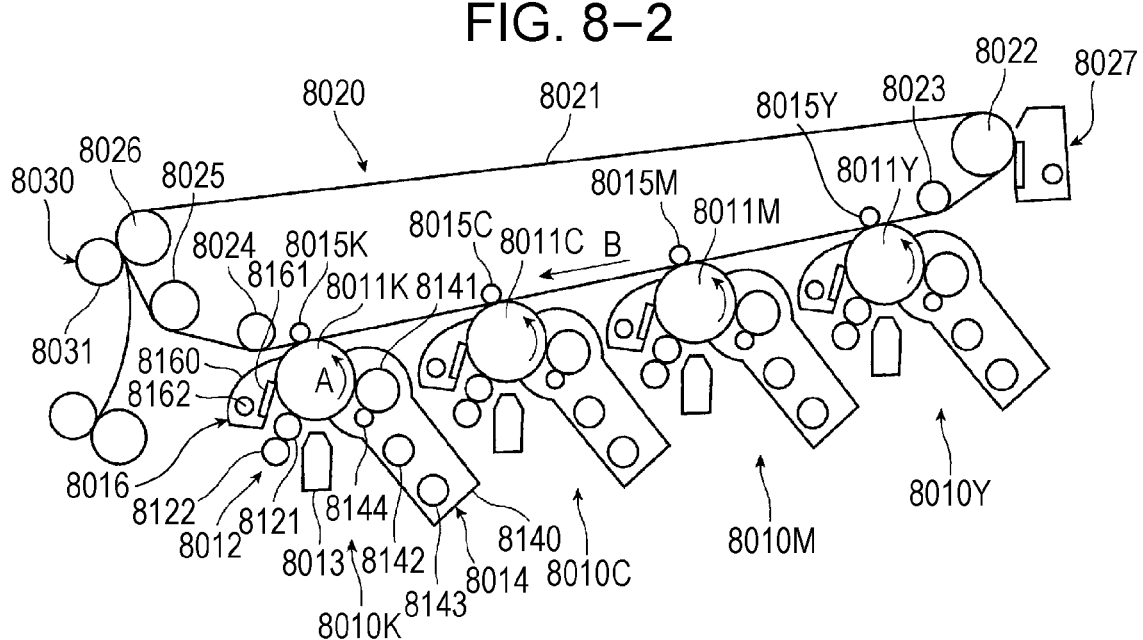
Figures 3, 8:
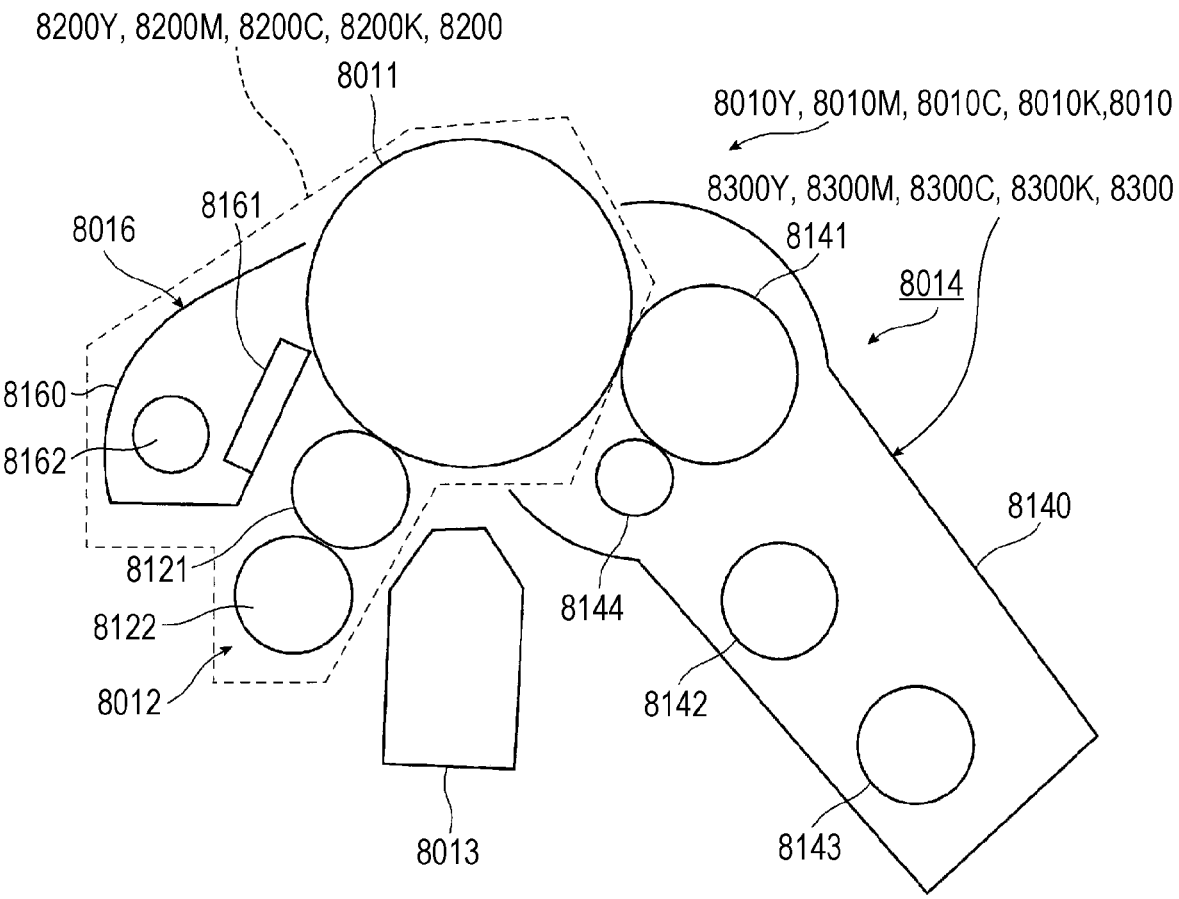
Figures 4, 8:
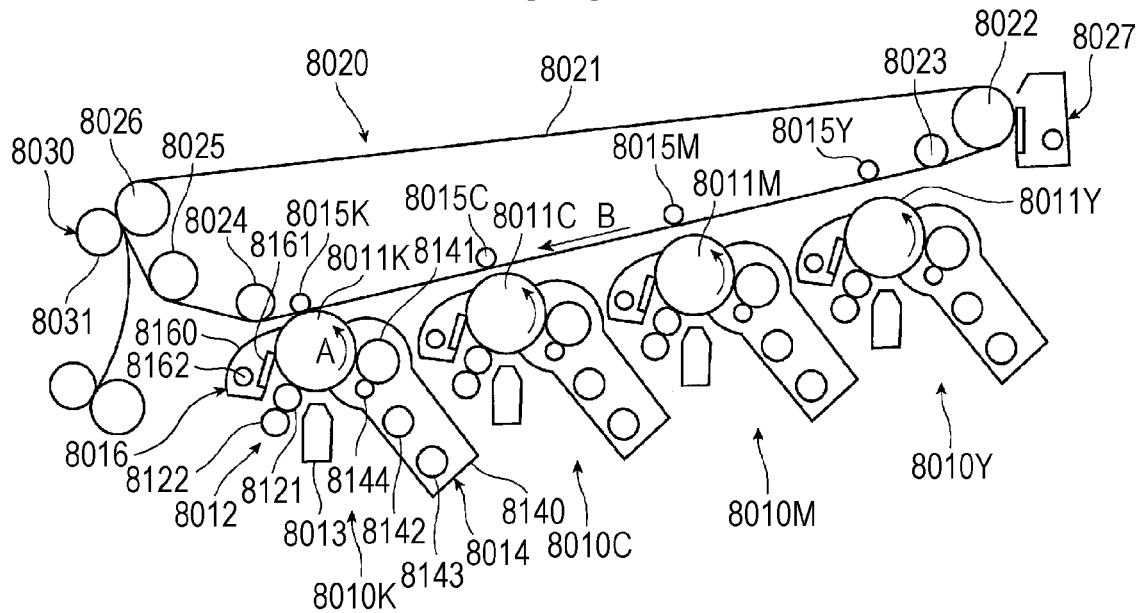
Figures 5, 8:
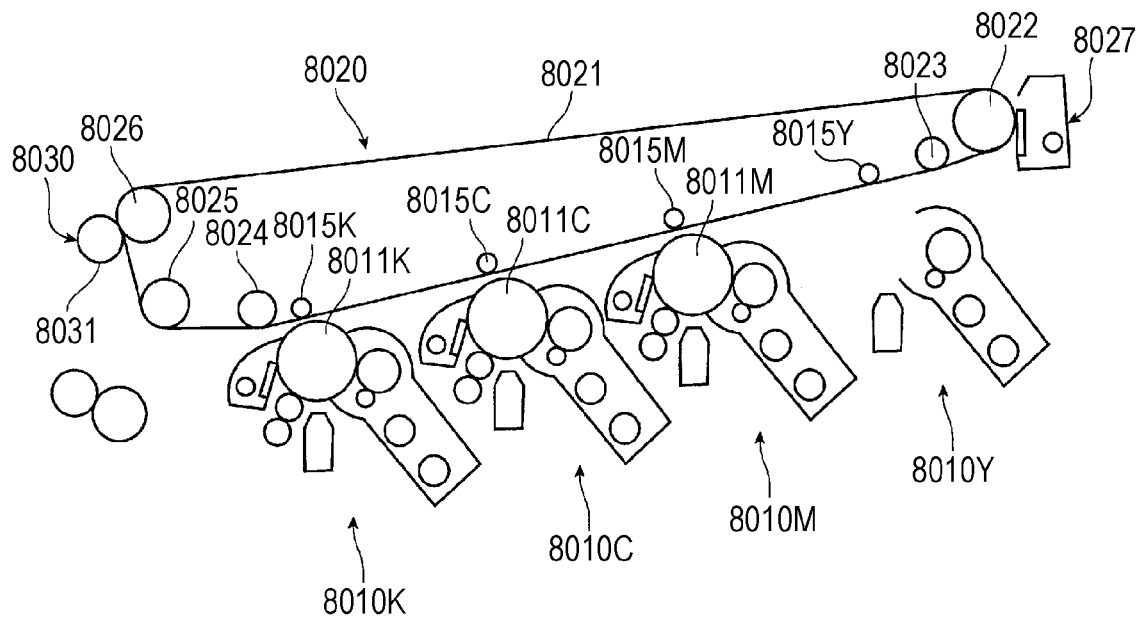
Figures 6, 8:
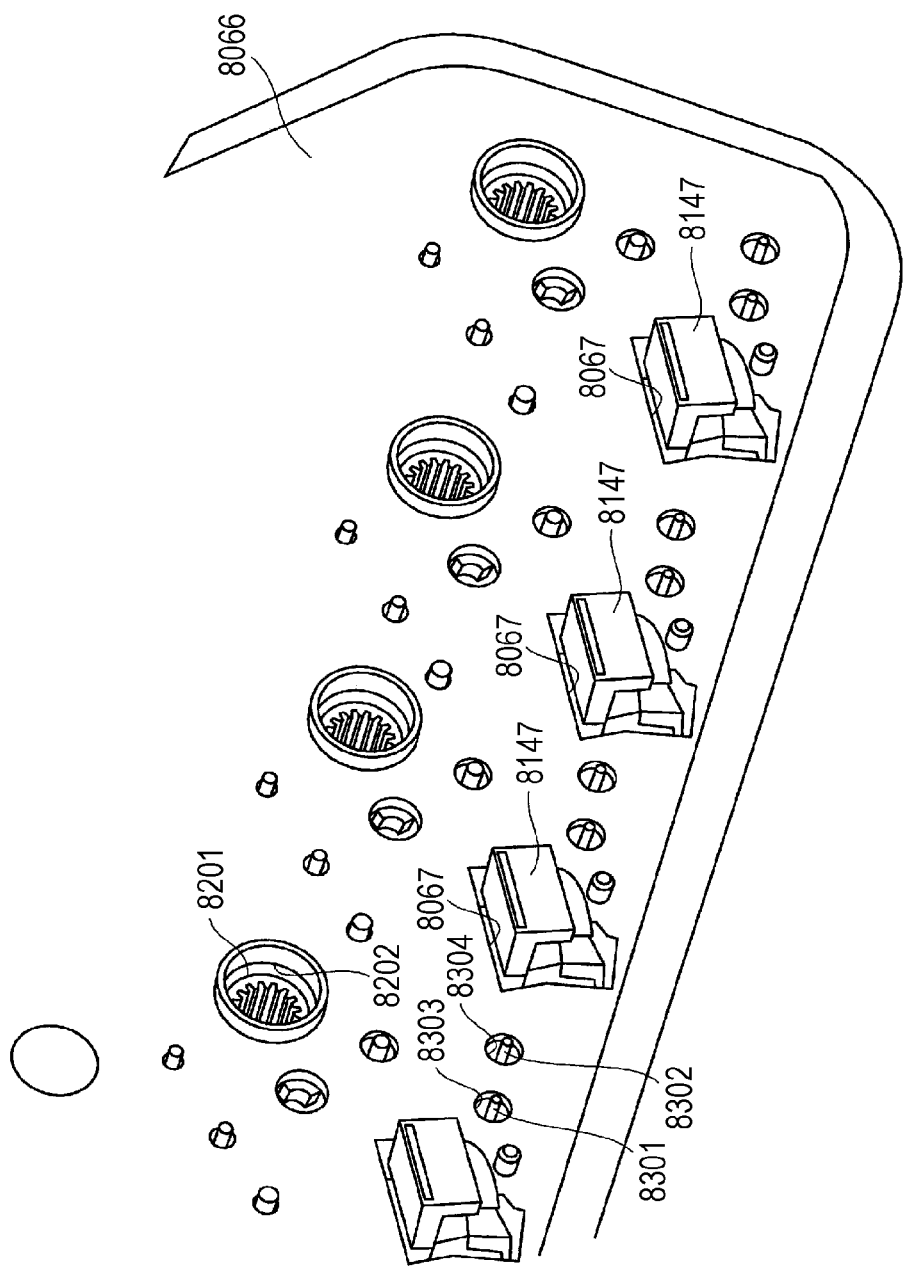
Figures 7, 8:
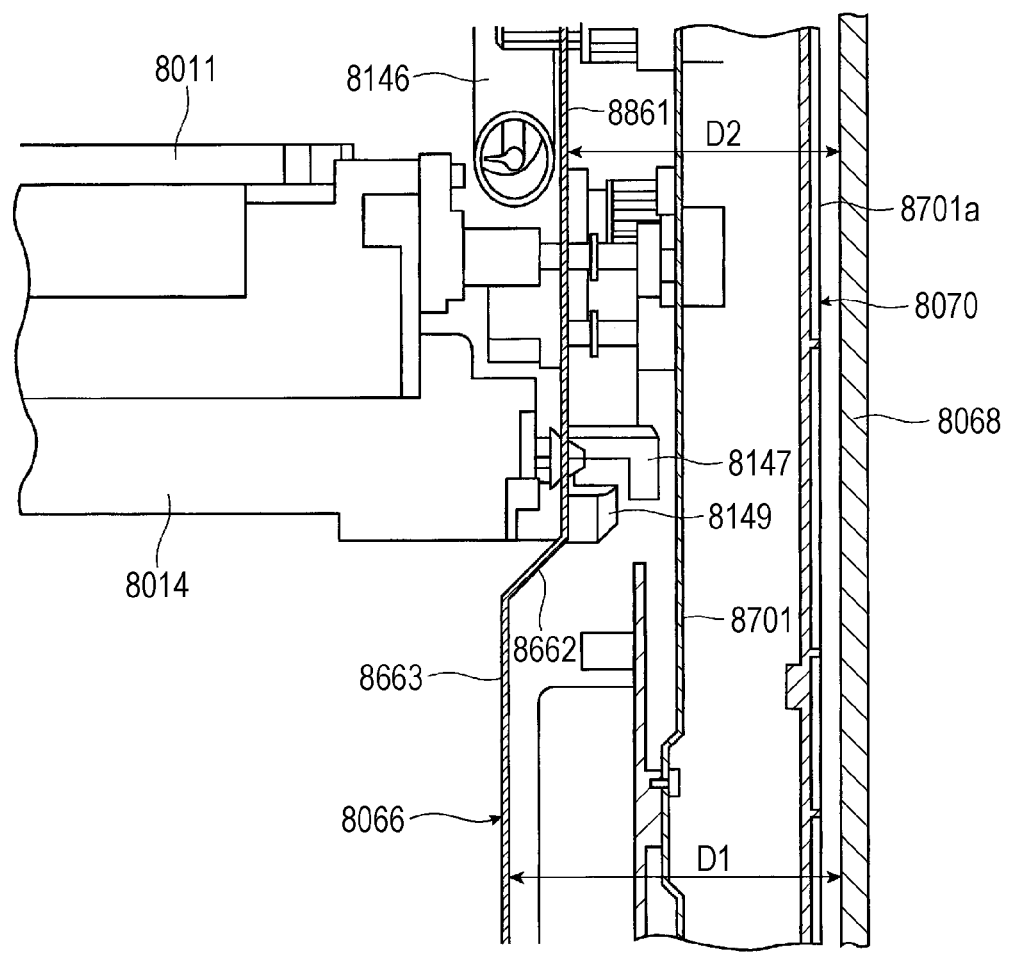
Figure 8:
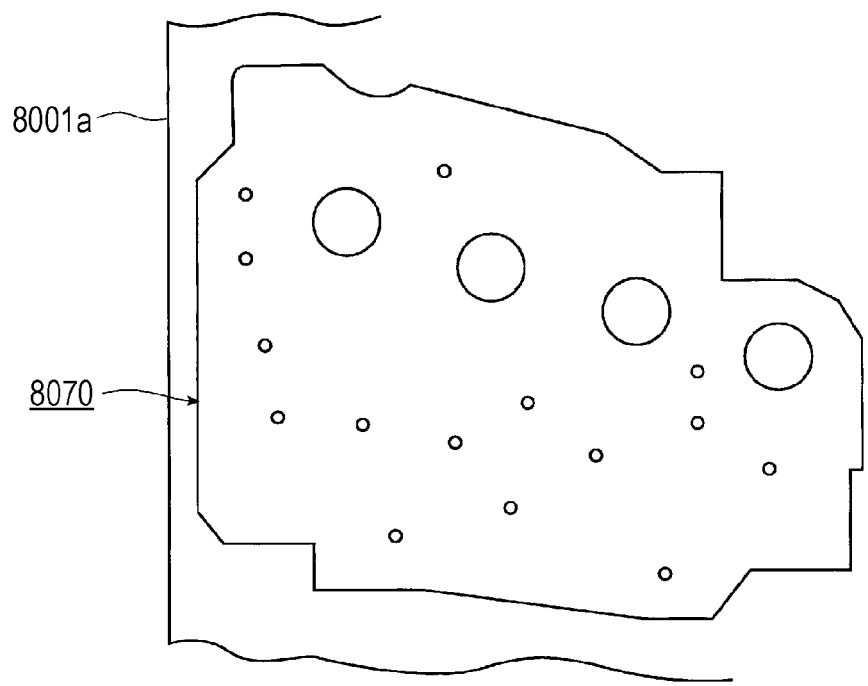
Figures 8, 9:
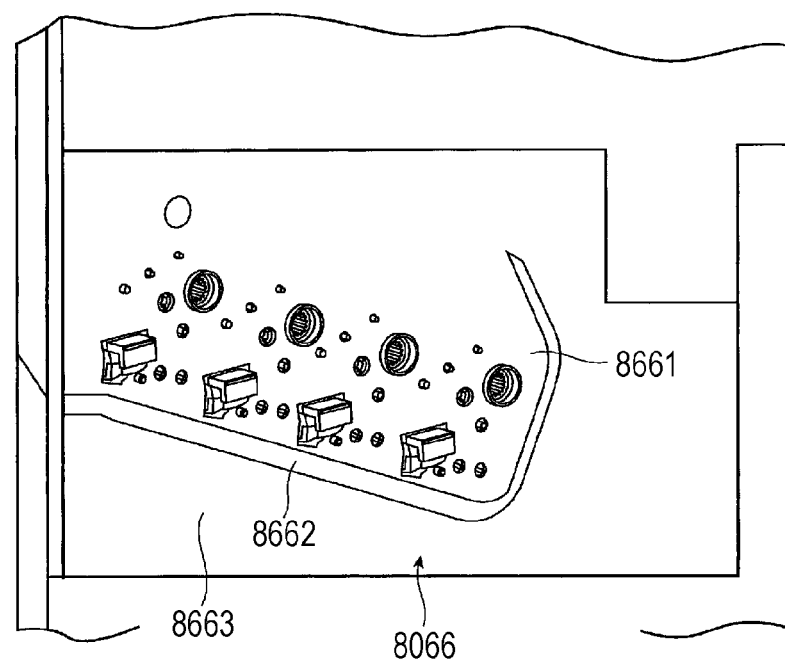
Figures 8, 9, 10:
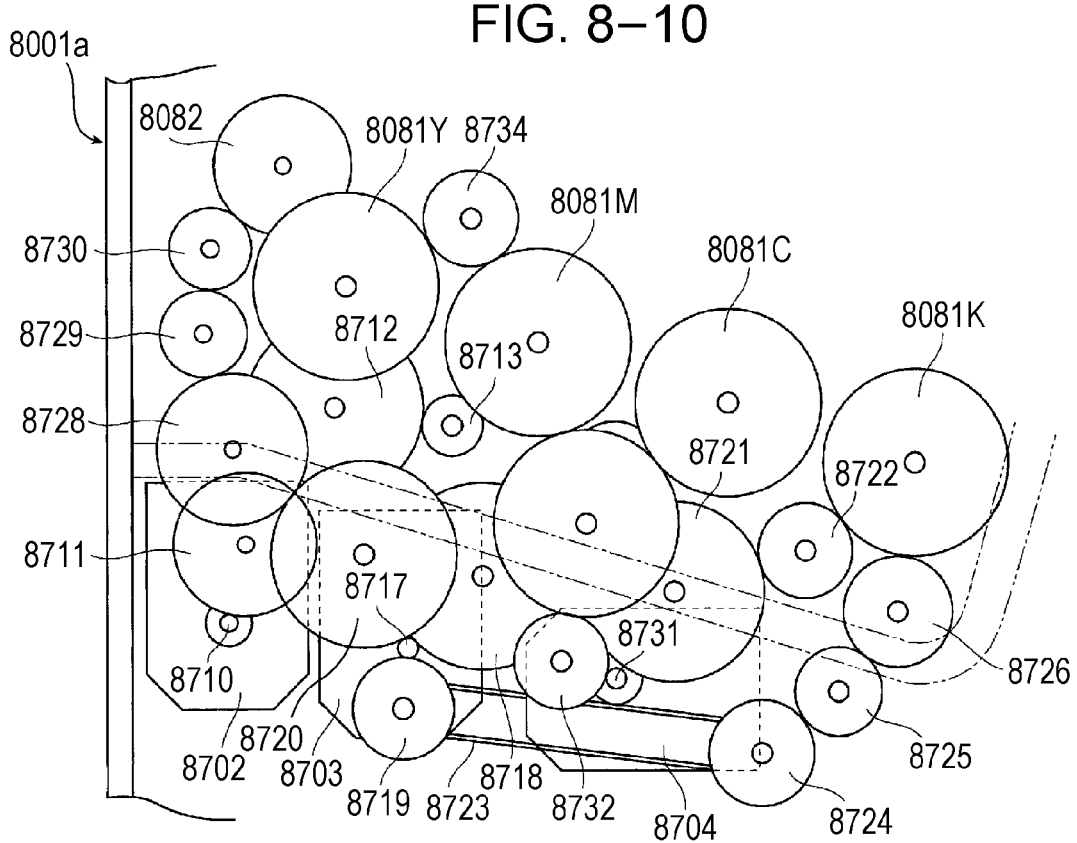
Figures 8, 9, 10, 11:
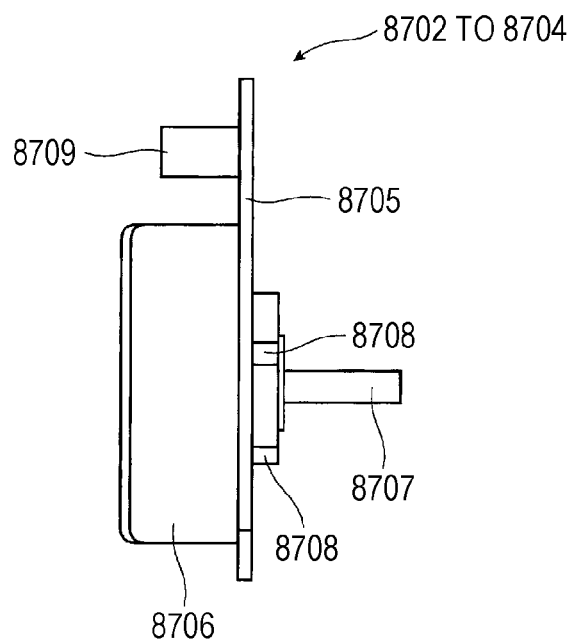
Figures 8, 9, 10, 11, 12:
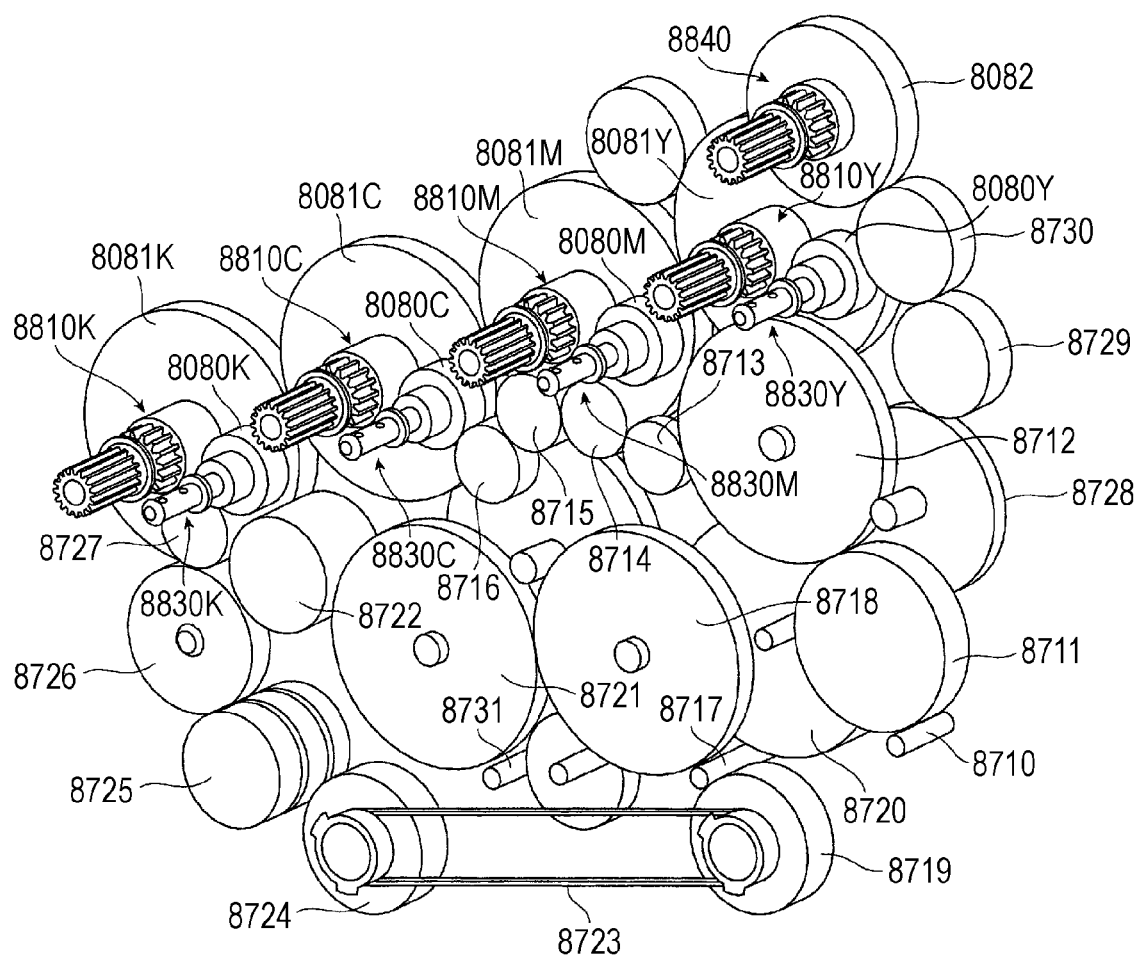
Figures 8, 9, 10, 11, 12, 13:
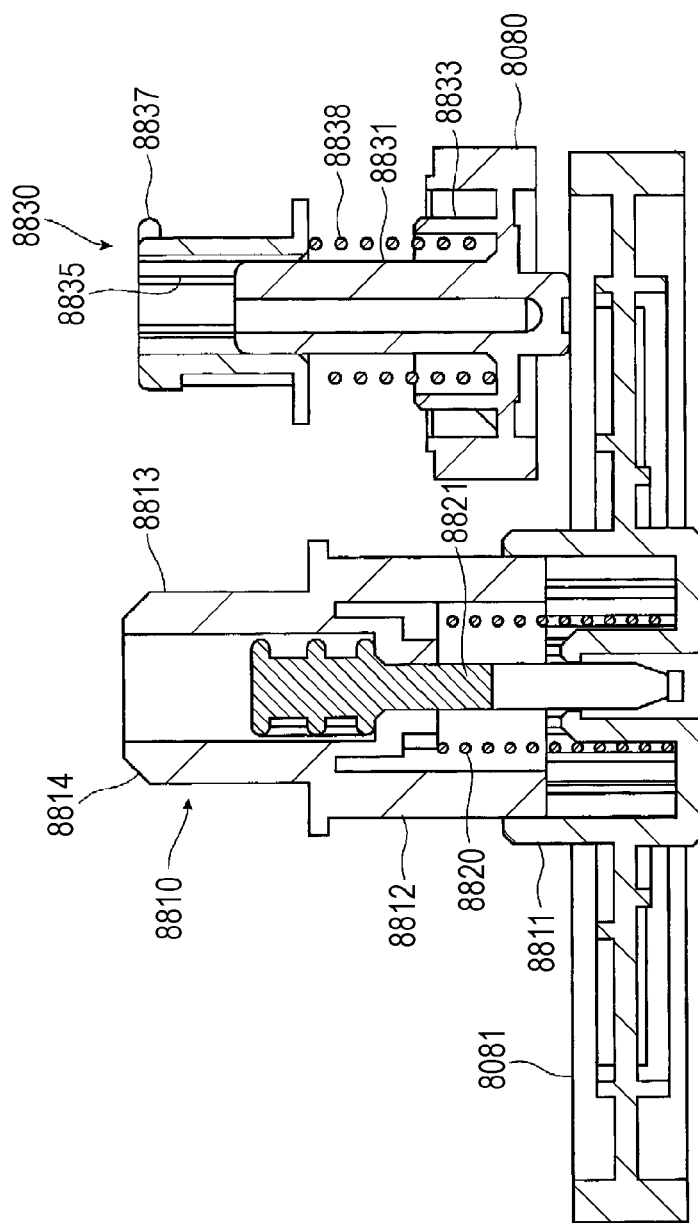
Figures 8, 9, 10, 11, 12, 13, 14, 15:
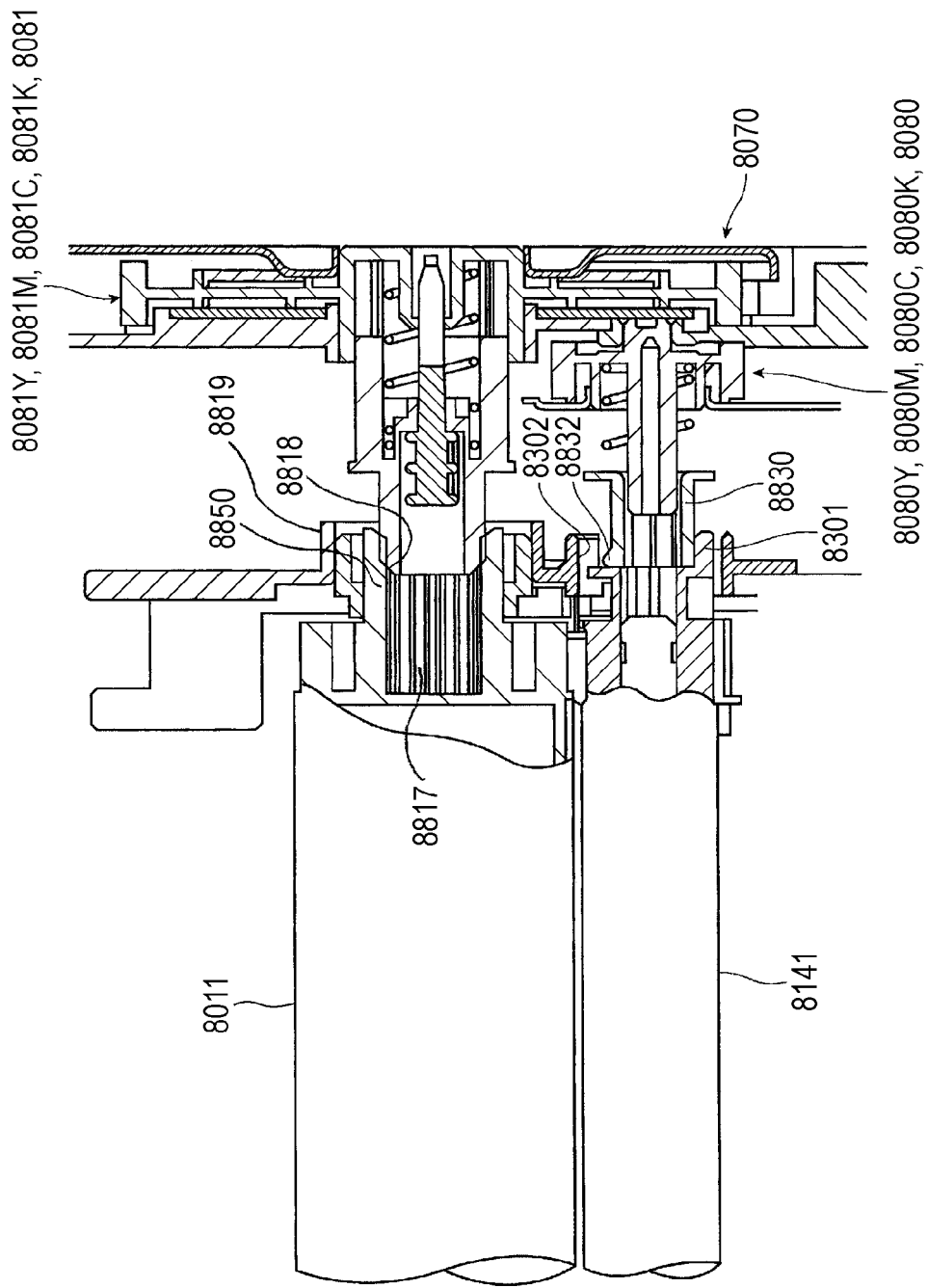
Figures 8, 9, 10, 11, 12, 13, 14, 15, 16:
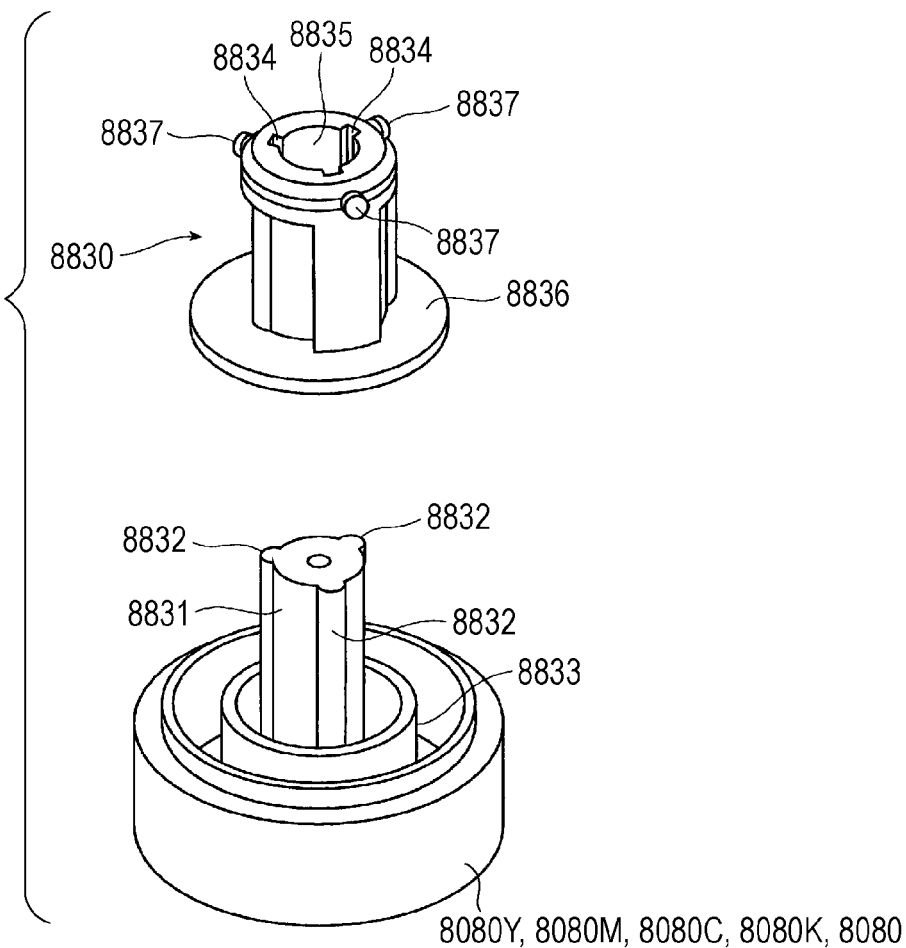
Figures 8, 9, 10, 11, 12, 13, 14, 15, 16, 17:
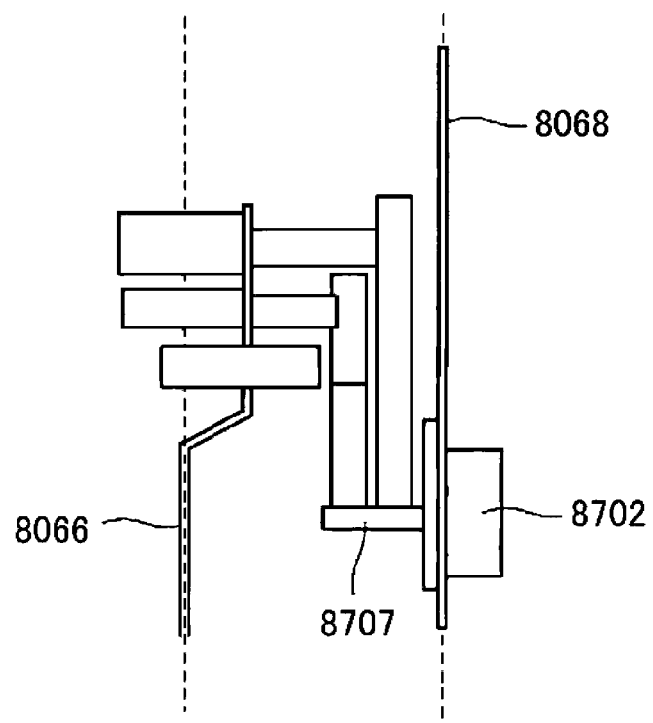

FIG. 6-1A and FIG. 6-1B illustrate an image forming apparatus 6010 that is an example of an image processing apparatus according to a sixth exemplary embodiment. The image forming apparatus 6010 is an apparatus that is installed in an office such as a multifunction peripheral.

In FIG. 6-1A and FIG. 6-1B, the image forming apparatus 6010 is configured d by using, for example, an apparatus body 6012, a discharge tray 6014 that serves as a medium discharge portion, a placement portion 6016, an image capturing device 6018 that serves as an image capturing member, a radiation device 6020, and an operation panel 6022.

Paper that is an example of a medium is discharged onto the discharge tray 6014. The discharge tray 6014 is disposed at a position at which a user takes out the medium with the user standing.

The placement portion 6016 corresponds to a top surface of the apparatus body 6012 and is disposed on an upper portion of the apparatus body 6012 although this will be described in detail later. The placement portion 6016 is installed above the discharge tray 6014 in the vertical direction.

The placement portion 6016 is configured d such that an object is placed thereon. According to the sixth exemplary embodiment, examples of the object include a document such as paper, flat objects such as a card and a receipt, and a three-dimensional object such as a book.

The image capturing device 6018 is installed above the placement portion 6016 and is configured d such that the image of the object that is placed on the placement portion 6016 is captured from above. The image capturing device 6018 faces downward so as to face the placement portion 6016. In the case where the upper surface of the placement portion 6016 is referred to as a reference surface, the phrase "above the placement portion 6016" described herein is not limited to a position upward from the reference surface in the vertical direction but means a position that is an upper position in the vertical direction and that is higher than that of the reference surface. The image capturing device 6018 is configured d such that the object is set on the placement portion 6016 with an image captured surface facing upward for capturing the image.

A support 6024 is disposed on the top surface of the apparatus body 6012 at the rear of the upper surface of the placement portion 6016. The support 6024 extends upward from the upper surface of the placement portion 6016 in the substantially vertical direction, and an end portion thereof bends toward a location above the placement portion 6016. The image capturing device 6018 is installed on the end portion of the support 6024.

An image forming member that forms the image of the object that is placed on the placement portion 6016 is disposed between the discharge tray 6014 and the placement portion 6016. That is, the image forming member that forms the image on the paper that is discharged onto the discharge tray 6014 is disposed above the discharge tray 6014.

The radiation device 6020 is configured d by using one or more light sources and is configured d by using, for example, light sources 6020*a*, 6020*b*, 6020*c*, and 6020*d*. The light sources 6020*a*, 6020*b*, 6020*c*, and 6020*d* are disposed on the support 6024. That is, the light sources 6020*a*, 6020*b*, 6020*c*, and 6020*d* are disposed above the placement portion 6016.

Specifically, the light sources 6020*a* and 6020*b* are disposed on the support 6024 and on both sides of the image capturing device 6018 near the image capturing device 6018 so as to face downward. The light sources 6020*c* and 6020*d* are disposed on a lower edge of the operation panel 6022 and on both sides of the support 6024 near the operation panel 6022 so as to face in an obliquely downward direction.

That is, the light sources 6020*a* and 6020*b* and the light sources 6020*c* and 6020*d* are disposed at different height positions from the placement portion 6016. That is, the light sources 6020*a*, 6020*b*, 6020*c*, and 6020*d* are disposed at the positions such that the object is irradiated with light at different angles and are configured d so as to radiate the light to the object in different directions. In this way, the ability of identification between the object and the placement portion 6016 may be improved.

The operation panel 6022 includes a display screen and is configured d so as to be capable of setting the image forming apparatus 6010. The operation panel 6022 is disposed above the placement portion 6016. The operation panel 6022 is disposed at the rear of the apparatus body 6012. The operation panel 6022 is installed on the support 6024 between the placement portion 6016 and the image capturing device 6018.

A document feeder that has a function of reading both surfaces simultaneously is disposed in the apparatus body 6012 below the top plate of the placement portion 6016. That is, the document feeder is configured d so as to be usable by sliding the top plate of the placement portion 6016 in a plane direction.

The hardware configuration of the image forming apparatus 6010 according to the sixth exemplary embodiment will now be described with reference to FIG. 6-2.

As illustrated in FIG. 6-2, the image forming apparatus 6010 includes a CPU 6031, a memory 6032, a storage device 6033 such as a hard disk drive, a communication interface (abbreviated as IF) 6034 for data transmission to and data reception from, for example, an external device via a network, a user interface (abbreviated as UI) device 6035 that includes a touch screen or a liquid-crystal display and a keyboard, a scanner 6036, a print engine 6037, the image capturing device 6018, and the radiation device 6020. These components are connected to each other with a control bus 6040 interposed therebetween.

The print engine 6037 prints an image on paper through processes such as charging, exposure, development, transfer, and fixing.

The CPU 6031 is a processor that performs a predetermined process, based on the control program that is stored in the memory 6032 or the storage device 6033 and controls the operation of the image forming apparatus 6010. In the description according to the sixth exemplary embodiment, the CPU 6031 reads and runs the control program that is stored in the memory 6032 or the storage device 6033, but the program may be stored in a storage medium such as a CD-ROM and provided to the CPU 6031.

FIG. 6-3 is a block diagram illustrating the functional configuration of the image forming apparatus 6010 that is acquired by running the control program described above.

As illustrated in FIG. 6-3, the image forming apparatus 6010 according to the sixth exemplary embodiment includes a controller 6041, a communication unit 6042, an operation display unit 6043, a storage unit 6044, an image reading member 6045, an image forming member 6046, an image output unit 6047, an image capturing member 6048, and a radiation unit 6049.

The communication unit 6042 receives a print job (an example of a print instruction) that is transmitted from a terminal device.

The controller 6041 implements control to generate image data that is used as print data, based on the print job that is received by the communication unit 6042 and to output the generated image data from the image output unit 6047.

The storage unit 6044 stores various kinds of data such as the image data that is generated by the controller 6041.

The image output unit 6047 outputs the image on the paper, based on control of the controller 6041.

The operation display unit 6043 is controlled by the controller 6041 and displays various kinds of information on the operation panel 6022 or a display screen such as the terminal device. The operation display unit 6043 inputs various kinds of information about operations that are performed by the user.

The image reading member 6045 performs a scanning operation for reading the image of the object such as a document, based on the control of the controller 6041.

The image forming member 6046 forms the image of the object that is placed on the placement portion 6016, based on the control of the controller 6041.

The image capturing member 6048 is controlled by the controller 6041 and captures the image of the object. The controller 6041 functions as an image acquiring member that acquires the image data of the object the image of which is captured by the image capturing member 6048.

The radiation unit 6049 is controlled by the controller 6041 and radiates light to the object that is placed on the placement portion 6016.

The controller 6041 controls the radiation unit 6049 such that the multiple light sources 6020a, 6020b, 6020c, and 6020d are switched on or switched off, and the brightness or optical axis of the light to be radiated is adjusted.

The controller 6041 implements control such that the operation panel 6022 is switched off when the image capturing member 6048 captures the image of the object.

FIG. 6-4 illustrates the placement portion 6016 viewed from above and illustrates a state in which an object S is placed on the placement portion 6016.

The placement portion 6016 according to the sixth exemplary embodiment is configurated d such that the luminance difference between a painted portion or material portion of the whole or a part of an upper portion of the placement portion 6016 and the object S that is placed is a predetermined luminance difference or more, and the color difference between the paint color or material color of the whole or a part of the upper portion of the placement portion 6016 and the color of the object S that is placed is a predetermined color difference or more and such that the object S and the placement portion 6016 are distinguishable from each other. However, the present exemplary embodiment is not a limitation, provided that the object S and the placement portion 6016 are distinguishable. For example, even when the paint color or material color of the whole or a part of the upper portion of the placement portion 6016 and the color of the object S that is placed have the predetermined color difference or less, a luminance difference equal to or more than the predetermined luminance difference suffices provided that the object S and the placement portion 6016 are distinguishable. Specifically, for example, in the case of an 8-bits environment, the luminance difference may be 50 LSB or more, and at least a luminance difference of 20 LSB or more suffices. In contrast, even when the luminance difference between the painted portion or material portion of the whole or a part of the upper portion of the placement portion 6016 and the object S that is placed is the predetermined luminance difference or less, a color difference equal to or more than the predetermined color difference suffices provided that the object S and the placement portion 6016 are distinguishable.

The object S that has color that is represented by a Y-value closer than a value that represents the black color to a value that represents the white color is placed on the placement portion 6016, for example, where the color is represented by using a Y-value that represents luminance in a YCbCr method. For example, in the case of the 8-bits environment, the object S the Y-value of which is represented by a value closer than 0 to 255 is placed. The color of the upper portion of the placement portion 6016 is represented by the Y-value closer than the value that represents the white color to the value that represents the black color where the color is represented by using the Y-value that represents the luminance in the YCbCr method such that the object S and the placement portion 6016 are distinguishable in the image that is captured by the image capturing member 6048. For example, in the case of the 8-bits environment, the color is color the Y-value of which is represented by a value closer than 255 to 0. The color of the whole or a part of the upper portion of the placement portion 6016 is represented by the Y-value closer than the value that represents the white color to the value that represents the black color where the color is represented by using the Y-value that represents the luminance in the YCbCr method.

As for the placement portion 6016 according to the sixth exemplary embodiment, the paint color or material color of the whole or a part of the upper portion is the black color or color having a predetermined optical concentration or more. The light reflectance of the paint color or material color of the whole or a part of the upper surface of the placement portion 6016 is 10% or less. According to the sixth exemplary embodiment, the black color means color chromaticity of which differs from that at an achromatic color point (x=0.333, y-=0.333, Y=0) by a color difference ΔE of 3 or less, color an optical concentration OD of which is 1.0 or more, or color the Y-value representing the luminance in the YCbCr method of which is 50 or less. However, the definition of the black color described above is used for the placement portion 6016 according to the sixth exemplary embodiment and may be changed depending on the actual environment of the vicinity of the apparatus or the performance of the image capturing member.

In addition, the color of the upper portion of the placement portion 6016 is not limited to the paint color or material color of the placement portion 6016 itself but may be color that is reflected on the placement portion 6016 by using the radiation unit 6049 or color that is acquired by superposing the color that is reflected on the placement portion 6016 and shadow.

The object S may be readily identified in a manner in which the color difference or the luminance difference between the color of the placement portion 6016 and the color of the object S that is placed is thus made clear. In this way, the precision of extraction or rotation correction of the image data of the object may be increased.

Marks 6051 are provided at four corners of the upper surface of the placement portion 6016.

The marks 6051 represent a range in which the image capturing device 6018 is capable of capturing the image of the object S on the placement portion 6016, and the object the image data of which is acquirable by the controller 6041 is placed on the placement portion 6016, that is, a position at which the object is placed. As illustrated in FIG. 6-4, the marks 6051 have, for example, a bracket shape. The color of the marks 6051 is represented by the Y-value closer than the value that represents the black color to the value that represents the white color where the color is represented by using the Y-value that represents the luminance in the YCbCr method, and an example thereof is the white color. In other words, the light reflectance of the color of the marks 6051 is a predetermined value or more and is, for example, 80% or more. The object that is placed on the placement portion 6016 may be readily identified in a manner in which the luminance difference between the marks 6051 and the placement portion 6016 is thus made clear. In this way, the precision of extraction or rotation correction of the image data of the object may be increased.

The marks 6051 are not limited by the bracket shape but may be, for example, guidelines. According to the sixth exemplary embodiment, the marks 6051 are used to distinguish between a region in which the object S is placed and a region in which the object S is not placed. Specifically, the marks 6051 may be marks that represent the range in which the object is placed by using, for example, a bracket as described above, the color of the placement portion 6016 that is in the range in which the object is placed and that differs from that of a range out of the range, the material of the placement portion 6016 that is in the range in which the object is placed and that differs from the material of a range out of the range, or marks that are represented by irradiating the position at which the object is placed by using the radiation device 6020.

FIG. 6-5 illustrates a state in which the user operates the image forming apparatus 6010.

The image forming apparatus 6010 is configured d such that the placement portion 6016, the operation panel 6022, and the discharge tray 6014, for example, are disposed at positions so as to be operable by a person with the person standing and are readily operated with the user standing.

As illustrated in FIG. 6-1A, FIG. 6-1B, and FIG. 6-5, the paint color or material color of the placement portion 6016 is configured d also on a portion of a surface that is accessed by the user and is configured d on the surface that is accessed by the user between the top surface of the apparatus body 6012 and the discharge tray 6014.

The paint color or material color of the placement portion 6016 and another color are configured d between the top surface of the apparatus body 6012 and the discharge tray 6014. Specifically, the paint color or material color of the placement portion 6016 is configured d on an upper portion, and the other color is configured d on a lower portion between the top surface of the apparatus body 6012 and the discharge tray 6014.

In this way, the user is more likely to recognize the position of the placement portion 6016 than in the case where the surface that is accessed by the user has the white color.

A relationship between reflected light distribution due to the light sources 6020a, 6020b, 6020c, and 6020d and the amount of the light that enters the image capturing device 6018 will now be described with reference to FIG. 6-6A, FIG. 6-6B, and FIG. 6-7.

Figures 4, 5, 6, 6A:
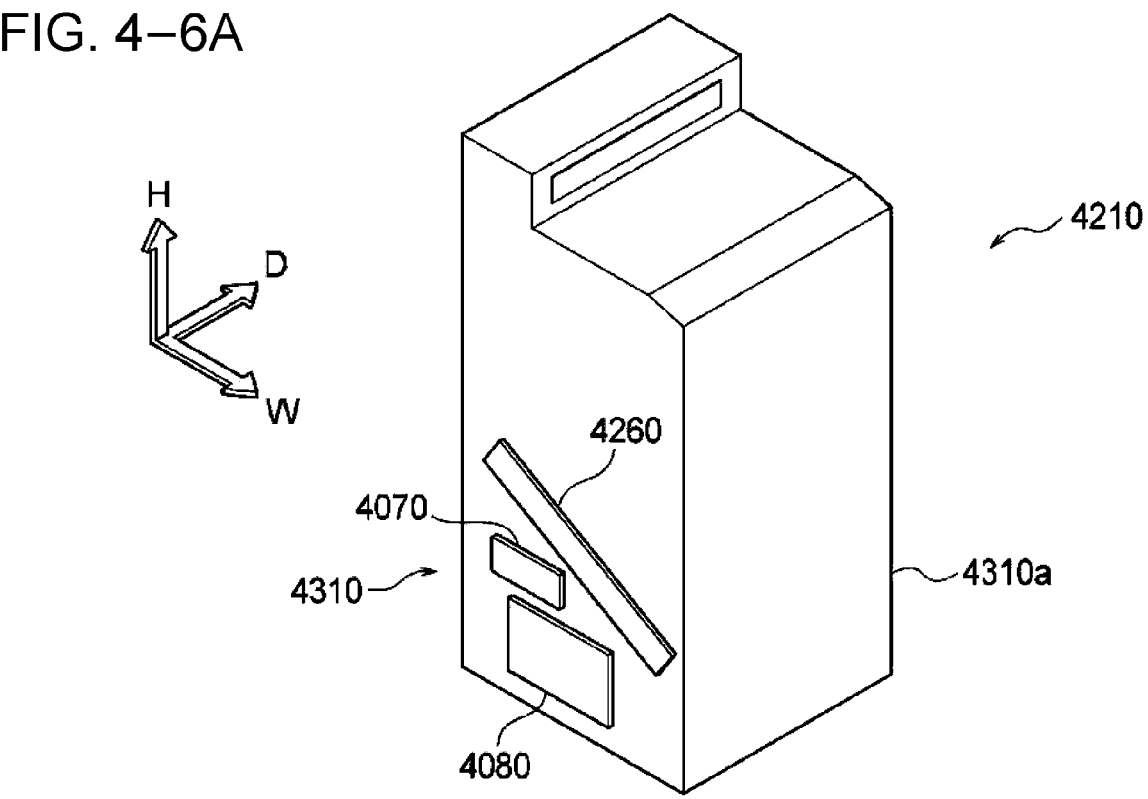
Figures 4, 5, 6, 6B:
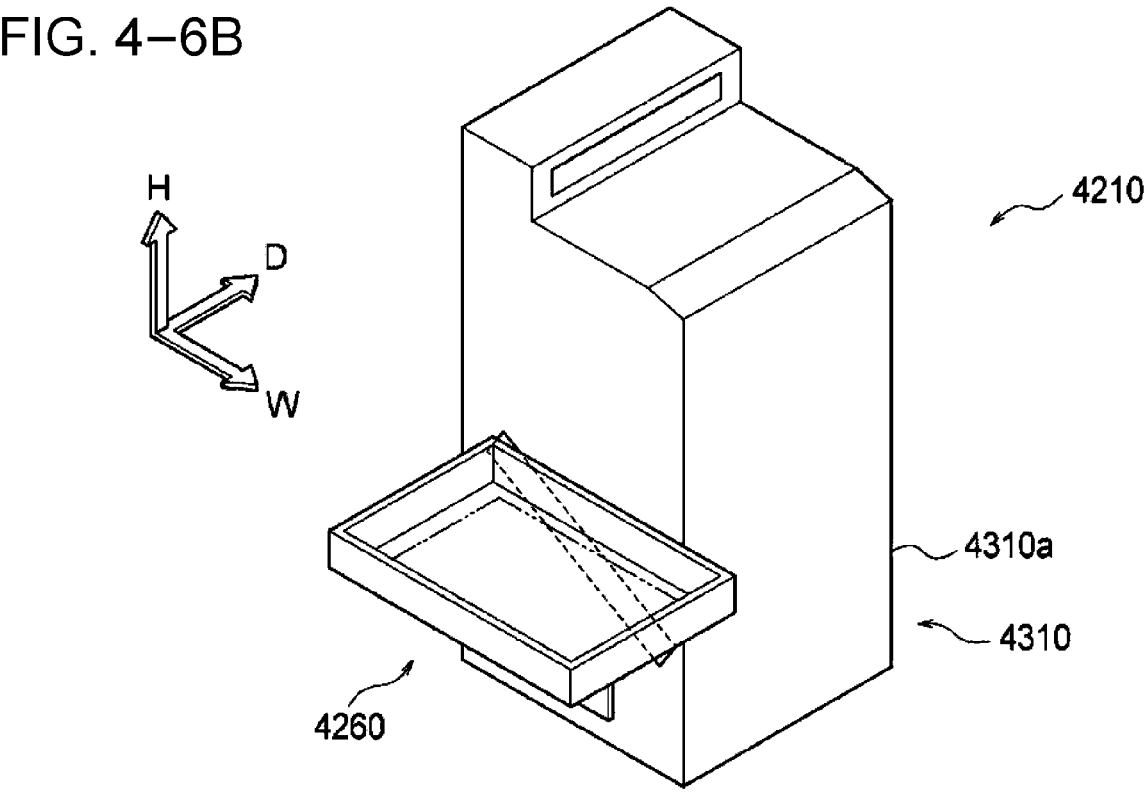
Figures 4, 5, 6, 7:
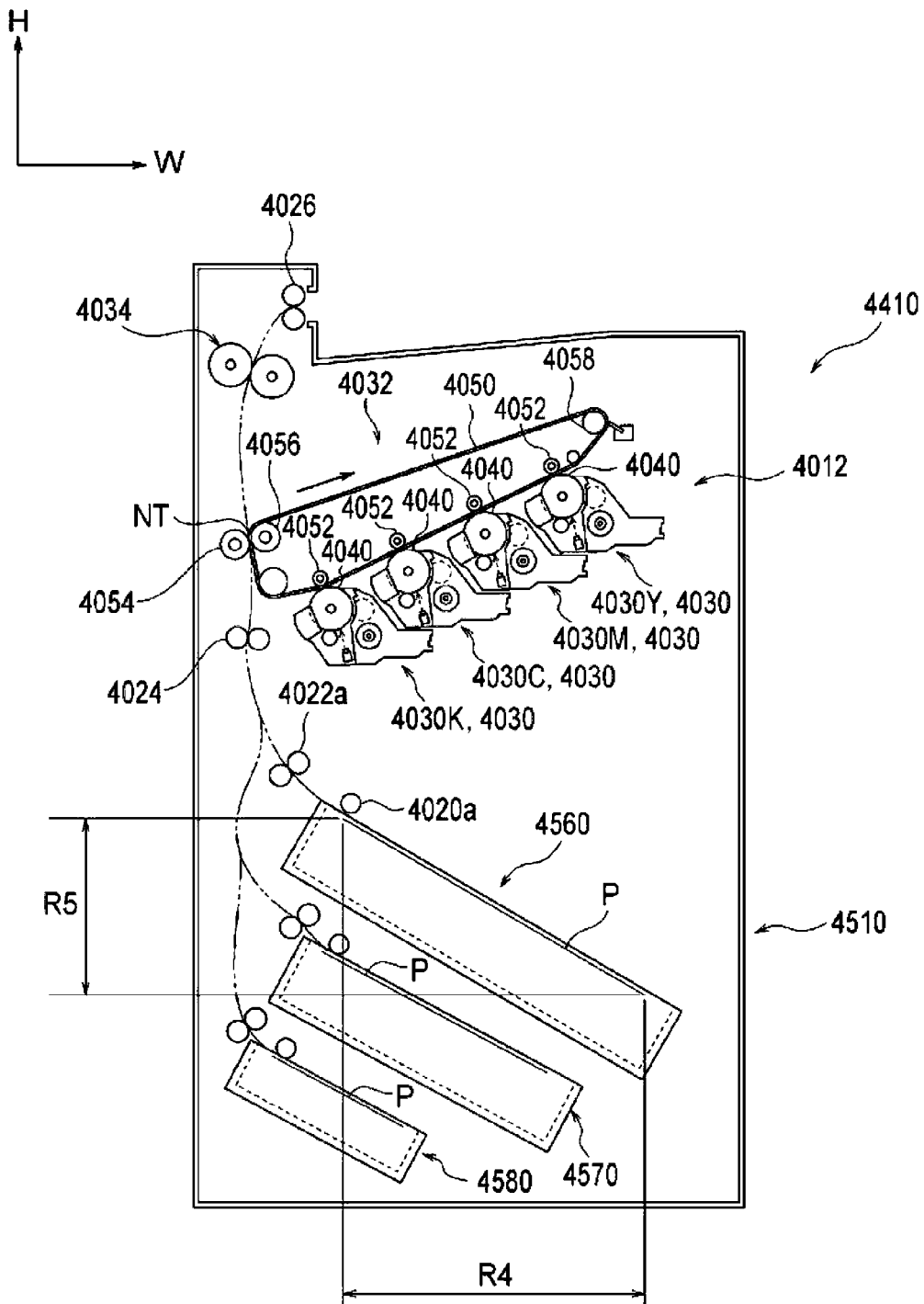
Figures 4, 5, 6, 7, 8:
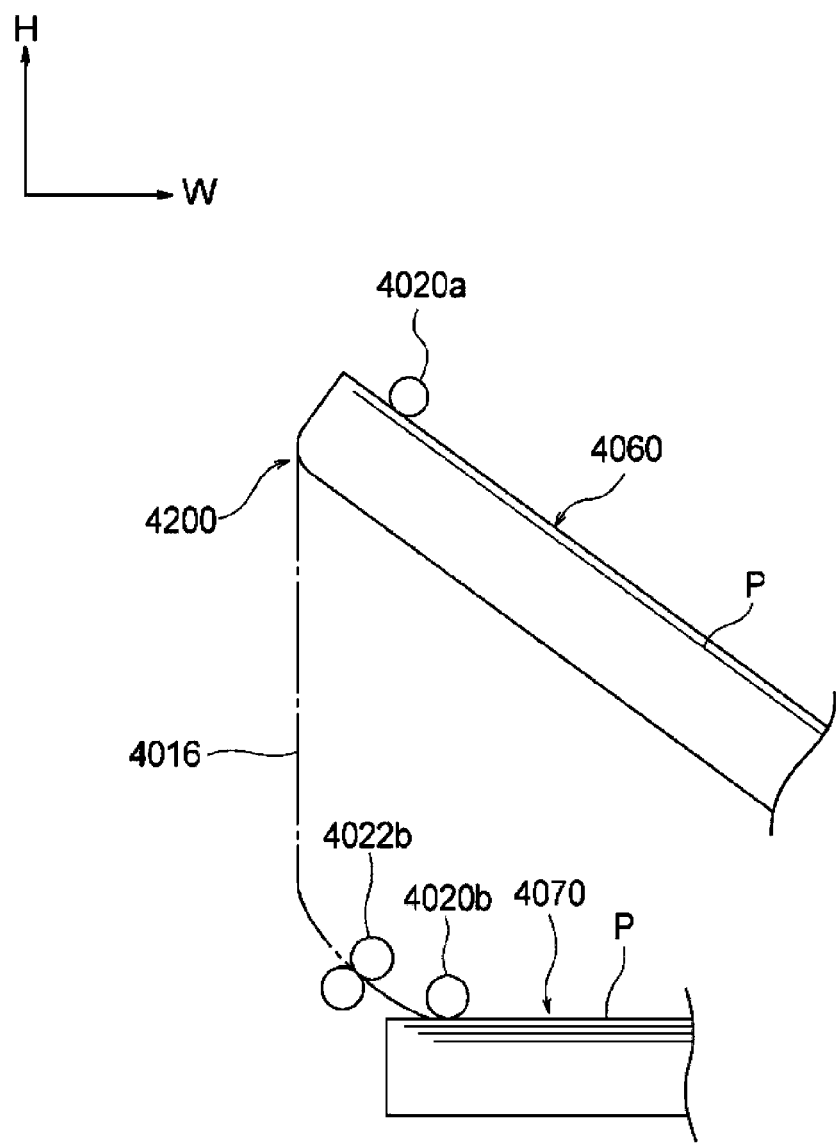

FIG. 6-6A illustrates the reflected light distribution in the case where the directivity of the light sources is high and the case where the directivity of the light sources is low when the object is irradiated downward from above by using the light sources 6020a and 6020b near the image capturing device 6018 for capturing the image. FIG. 6-6B illustrates the reflected light distribution in the case where the directivity of the light sources is high and the case where the directivity of the light sources is low when the object is irradiated obliquely downward from above by using the light sources 6020c and 6020d near the operation panel 6022 for capturing the image.

When the directivity of the light sources is high, the light that enters the object is reflected with the light having the directivity, the light does not diffuse, and the reflected light distribution does not expand. That is, when the directivity of the light sources is high, the amount of the light that enters the image capturing device 6018 decreases, and it becomes dark. When the directivity of the light sources is low, the light that enters the object is reflected with the light having no directivity, the light diffuses, and the reflected light distribution expands, unlike the case where the directivity is high.

That is, the amount of the light that enters the image capturing device 6018 may be increased by setting the directivity of the light sources to a predetermined value or less. For example, in the case where the light is radiated to the object at 45 degrees by using a light source, the directivity may be such that the ratio of the amount of the reflected light to the amount of the radiated light is 50% or less.

In other words, the light sources 6020a, 6020b, 6020c, and 6020d may be such that the directivity of the light to be radiated is higher than a predetermined range.

The color temperature of the light that is radiated from the light sources 6020a, 6020b, 6020c, and 6020d has a predetermined value or more and has, for example, 5000 K (kelvin) or more. Examples of the light sources 6020a, 6020b, 6020c, and 6020d include a LED that is a light source for the white color.

The light sources 6020a, 6020b, 6020c, and 6020d include respective dimming units that adjust the brightness of the light to be radiated and are configured d so as to be capable of dimming the light in consideration of the object and natural light.

The light sources 6020a, 6020b, 6020c, and 6020d include respective motors that are examples of a changing unit that changes the optical axis of the light to be radiated.

The change operation of the light sources 6020a, 6020b, 6020c, and 6020d will now be described with reference to FIG. 6-8A and FIG. 6-8B.

The controller 6041 causes the motors to change the optical axes of the light sources 6020a, 6020b, 6020c, and 6020d such that radiation angles for the object change.

The controller 6041 implements control such that the light sources 6020a, 6020b, 6020c, and 6020d are switched on or switched off.

The controller 6041 adjusts the amount of the light of the light sources 6020a, 6020b, 6020c, and 6020d, that is, the brightness of the light. That is, the light sources 6020a, 6020b, 6020c, and 6020d have a dimming function and are capable of adjusting the brightness of the light that is radiated to the object under the control of the controller 6041.

In this way, the reflected light from the object may be adjusted so as to be constant regardless of the influence of the object and the natural light.

The ratio of the light sources 6020*a*, 6020*b*, 6020*c*, and 6020*d* that are switched on is changeable. In this way, the ability of identification may be improved, and the optimal image data of the object may be acquired.

Specifically, the brightness of the light that is radiated to the object may be adjusted, for example, in a manner in which the light sources 6020*a* and 6020*b* are switched on in a high intensity of 100%, and the light sources 6020*c* and 6020*d* are switched off, in a manner in which the light sources 6020*a*, 6020*b*, 6020*c*, and 6020*d* are switched on in a middle intensity of 60%, or in a manner in which the light sources 6020*a* and 6020*b* are switched on in a high intensity of 100%, and the light sources 6020*c* and 6020*d* are switched on in a low intensity of 30%.

A modification to the placement portion 6016 will now be described. FIG. 6-9 illustrates a placement portion 6060 in an image forming apparatus according to another sixth exemplary embodiment viewed from above.

As for the placement portion 6060 according to the present modification, a range 6056 in which the object is placed has the black color or color having a predetermined optical concentration or more, and there is a guideline 6058 around the range 6056.

The center of the capturing range of the image capturing device 6018 is nearer than the center of the top surface of the apparatus body 6012 to the surface that is accessed by the user. In other words, the center of the capturing range of the image capturing device 6018 is nearer than the center of the top surface of the apparatus body 6012 to the front of the apparatus body 6012.

The center of the range 6056 that corresponds to the center in the guideline 6058 is nearer than the center of the top surface of the apparatus body 6012 to the surface that is accessed by the user and to the front of the apparatus body 6012.

An image forming apparatus 6100 according to the other sixth exemplary embodiment will now be described with reference to FIG. 6-10.

As for the image forming apparatus 6100, as illustrated in FIG. 6-10, the placement portion 6016 and the image capturing device 6018 are not disposed on the upper portion of the image forming apparatus 6100 but on an intermediate portion of the image forming apparatus 6100. The image forming apparatus 6100 is configured d by using an apparatus body 6102 that includes, for example, an image forming member and an image processing unit 6104 that includes, for example, the placement portion 6016 and the discharge tray 6014 described above.

The placement portion 6016 and the discharge tray 6014 are disposed at positions so as to be operable and be capable of being taken out by the user with the user standing. The placement portion 6016 is configured d so as to face the user.

The image capturing device 6018 is installed above the placement portion 6016 and is configured d such that the image of the object that is placed on the placement portion 6016 is captured from above. The image capturing device 6018 faces downward so as to face the placement portion 6016.

The center of the placement portion 6016 is nearer than the center of the top surface of the apparatus body 6102 to the surface that is accessed by the user. In other words, the center of the placement portion 6016 is nearer than the center of the top surface of the apparatus body 6102 to the front of the apparatus body.

The center of the capturing range of the image capturing device 6018 is nearer than the center of the top surface of the apparatus body 6102 to the surface that is accessed by the user. In other words, the center of the capturing range of the image capturing device 6018 is nearer than the center of the top surface of the apparatus body 6102 to the front of the apparatus body 6102.

According to the sixth exemplary embodiment described above, the use of the present disclosure for the image capturing device 6018 and the placement portion 6016 that are included in the image forming apparatus 6010 is described. The present disclosure, however, is not limited thereto. The present disclosure may be used also for an image processing apparatus that includes the image capturing device 6018 and the placement portion 6016 and that is used with the image processing apparatus connected to an image forming apparatus that includes the image forming member 6046 and the image output unit 6047. The present disclosure may be used also for an apparatus that includes a post-processing device.

According to the sixth exemplary embodiment described above, the use of the present disclosure for the image capturing device 6018 and the placement portion 6016 that are included in the image forming apparatus 6010 is described. The present disclosure, however, is not limited thereto. The present disclosure may be used also for various image processing apparatuses such as an apparatus in which the image capturing device 6018 and the placement portion 6016 are separated devices.

In the description according to the sixth exemplary embodiment described above, the paint color or material color of the whole or a part of the upper portion of the placement portion 6016 is the black color or color having a predetermined optical concentration or more, but this is not a limitation. The paint color or material color near a part of the upper portion of the placement portion 6016 that is included in a portion at which the object is not placed and that is in contact with at least an edge of the object may be the black color or color having a predetermined optical concentration or more.

According to the sixth exemplary embodiment described above, the color of the marks 6051 is the white color but is not limited thereto and may include another color or may be the black color. That is, color that is distinguishable from the color of the placement portion 6016 suffices.

First Aspect of Seventh Exemplary Embodiment

A first aspect of a seventh exemplary embodiment will now be described with reference to the drawings.

FIG. 7-1 is a perspective view of an image forming apparatus 7001A according to the first aspect of the seventh exemplary embodiment of the present disclosure viewed in an oblique direction in front of the image forming apparatus 7001A. FIG. 7-2 is a perspective view of the image forming apparatus 7001A with a front opening-closing covering opened. FIG. 7-3 is a schematic front view of the image forming apparatus 7001A with the front opening-closing covering opened. Upward, downward, left-hand, right-hand, front, and rear directions illustrated by arrows in the figures such as FIG. 7-1 are directions based on the front Ft of the image forming apparatus 7001A that is supposed to face a user when the image forming apparatus 7001A is used.

As illustrated in FIG. 7-1 to FIG. 7-3, the image forming apparatus 7001A according to the first aspect of the seventh exemplary embodiment includes an image forming member 7020, a medium container unit 7030A, a housing 7010A that includes a medium discharge portion 7040 and an outer reading member 7060, and a front opening-closing covering 7011A that opens or closes such that the front opening-closing covering 7011A covers the front of the housing 7010A.

The housing 7010A is an example of an apparatus body of the image forming apparatus 7001A. The housing 7010A includes an inner frame portion and an outer exterior member (an exterior portion) and has a structural body that has a required shape and structure that includes components such as multiple frames and an exterior covering. As illustrated in FIG. 7-1, the housing 7010A according to the first aspect of the seventh exemplary embodiment has the structural body that has a rectangular cuboid shape that extends in the vertical direction.

For example, the exterior member of the housing 7010A includes exterior coverings such as the front opening-closing covering 7011A, a back covering, a left-hand side opening-closing covering 7013, and a right-hand side covering 7014. The exterior coverings such as the back covering and the right-hand side covering 7014 are non-opening-closing coverings that neither opens nor closes and that are secured. The exterior coverings are configurated d as untransparent coverings (coverings that are not see-through from the outside) except for the case where there is no particular description. The front opening-closing covering 7011A and the left-hand side opening-closing covering 7013 will be described in detail later.

The image forming member 7020 includes a device for forming an image on a recording medium 7009 (A, B, or C). The image forming member 7020 according to the first aspect of the seventh exemplary embodiment is configurated d by using an electrophotographic imaging device that finally forms an image that is formed by a developer on the recording medium 7009.

The image forming member 7020 that includes the electrophotographic imaging device includes an image carrier such as a photoconductor member, devices that are disposed around the image carrier such as a charging device, an exposure device, a developing device, and a transfer device, and a fixing device that is disposed at a position away from the image carrier, although these are not illustrated. The image forming member 7020 also includes devices such as a developer supplying device, an image processing apparatus, and a control device, not illustrated. Among these, the transfer device is a direct transfer device that directly transfers the image that is formed by the developer on the image carrier to the recording medium 7009 or an intermediate transfer device that transfers the image from the image carrier to the recording medium 7009 via an intermediate transfer body. A reference character 7026 that designates a dashed line in FIG. 7-3 represents a fixing portion at which the fixing device that configurated s a part of the image forming member 7020 is disposed.

As illustrated by an arrow P in FIG. 7-2, the image forming member 7020 is mounted so as to be able to be pulled from a location inside the housing 7010A to a location outside the housing 7010A (toward the front of the housing 7010A) with the front opening-closing covering 7011A opened (see FIG. 7-2 and FIG. 7-3), for example, when being inspected or repaired.

The image forming member 7020 has a function of forming an image that corresponds to image information that is inputted from an external device such as an information terminal that is connected to the image forming apparatus 7001A and a function of forming an image that corresponds to image information that is reading information about an object that is read by the outer reading member 7060.

For this reason, the image forming member 7020 performs a charging operation by chiefly using the image carrier of the imaging device described above, an exposure operation in accordance with the image information, a developing operation, and a transfer operation in this order. Consequently, the image forming member 7020 creates the image that is formed by the developer on the image carrier, and the image is subsequently transferred from the image carrier to the recording medium 7009. The image forming member 7020 performs a fixing operation on the recording medium 7009 to which the image is transferred, and the image is consequently fixed to the recording medium 7009. The recording medium 7009 to which the formed image is fixed is finally discharged onto the medium discharge portion 7040.

The medium container unit 7030A includes a device that contains the recording media 7009 that are supplied to the image forming member 7020. The medium container unit 7030A is disposed below the image forming member 7020. The medium container unit 7030A includes three container units 7031A, 7031B, and 7031C. Examples of the recording media 7009 (7009A, 7009B, and 7009C) include media such as plain paper sheets, coated paper sheets, and thick paper sheets that have predetermined sizes.

The container unit 7031A is configurated d as an oblique container unit that is obliquely disposed such that a left-hand portion is higher than a right-hand portion when viewed from the front of the housing 7010A and that is disposed at the highest stage. The oblique container unit 7031A at the highest stage is capable of containing and supplying the recording medium 7009A that is sized such that a length in a transport direction is longer than the width of the housing 7010A. The oblique container unit 7031A at the highest stage is located nearest to the image forming member 7020 among the container units.

The container unit 7031C is configurated d as a typical container unit that is substantially horizontally disposed in a left-right direction when viewed from the front of the housing 7010A and that is disposed at the lowest stage. The container unit 7031C at the lowest stage is capable of containing and supplying the recording medium 7009C that is sized such that a length in the transport direction is slightly smaller than the width of the housing 7010A. The container unit 7031B is configurated d as a small container unit that is disposed in a space between the oblique container unit 7031A at the highest stage and the container unit 7031C at the lowest stage and that is disposed at a middle stage.

Each of the container units 7031A, 7031B, and 7031C is configurated d by using, for example, a container body such as a tray that contains the recording medium 7009 and a feed device that feeds the recording medium 7009 from the container body although these are not illustrated. The container bodies of the container units 7031A, 7031B, and 7031C include respective inner coverings that have contours following the front shapes of the container units 7031A, 7031B, and 7031C at the front. The container body of the oblique container unit 7031A is obliquely disposed such that a left-hand portion is higher than a right-hand portion. The container bodies of the other container units 7031B and 7031C are substantially horizontally disposed.

As illustrated by the arrow P in FIG. 7-2, the container bodies of the container units 7031A, 7031B, and 7031C are mounted so as to be able to be pulled from locations inside the housing 7010A to locations outside the housing 7010A (outside the front of the housing 7010A) with the front opening-closing covering 7011A opened (see FIG. 7-2 and FIG. 7-3), for example, when the recording media 7009 are put therein.

In the medium container unit 7030A, the recording medium 7009 that is required is fed from the container unit 7031A, 7031B, or 7031C that contains the recording medium 7009 toward the image forming member 7020 in conjunction with the transfer operation of the image forming member 7020. A reference character 7037 that designates a one-dot chain line in FIG. 7-3 represents a principal medium transport path on which the recording media 7009 are transported from the medium container unit 7030A (the container units 7031A, 7031B, and 7031C) to an outlet 7041 in the medium discharge portion 7040 via a part of the image forming member 7020. The part of the image forming member 7020 corresponds to a portion that transfers the image to the recording medium 7009. The medium transport path 7037 is configurated d by using, for example, pairs of transfer drive rollers and a transfer guide member, not illustrated.

The outer reading member 7060 reads the object to be read outside (above) the housing 7010A. As illustrated in, for example, FIG. 7-1, the outer reading member 7060 is configurated d by using, for example, a table 7061 on which the object to be read is placed and a reading device unit 7065 that reads the object that is placed on the table 7061.

The table 7061 is configurated d by using a plate member that includes an upper surface portion 7061a that is flat, and the object to be read may be placed thereon at rest. The table 7061 is mounted on the upper end of the housing 7010A such that the upper surface portion 7061a serves as the uppermost surface of the housing 7010A. The object to be read may be an object that is placed on the table 7061 and read by the reading device unit 7065 from a location above the table 7061, and examples thereof include three-dimensional objects such as a sheet document on which image information is recorded, a book, a magazine, a food, and a plant.

The reading device unit 7065 is configurated d by using components such as a reading device 7065a (see FIG. 7-3) that is capable of optically reading the object that is placed on the table 7061 and a support portion 7065b that supports and mounts the reading device 7065a. The reading device unit 7065 according to the first aspect of the seventh exemplary embodiment is mounted such that the reading device 7065a is supported by the support portion 7065b with the support portion 7065b extending upward a required length from the rear edge of the table 7061 and is capable of reading a portion on the table 7061. Examples of the reading device 7065a include an imaging element such as a charge coupled device (CCD) and a camera that is configurated d by using a combination of optical elements such as a lens. The camera that serves as the reading device 7065a is also referred to as a document camera. The reading device unit 7065 may include an illumination device that illuminates the object that is placed on the table 7061 when the object is read.

As illustrated in, for example, FIG. 7-1, the reading device unit 7065 includes an operation panel 7091 for operation of the image forming apparatus 7001A at a position near the bottom of the support portion that supports the reading device 7065a and away forward therefrom. From the perspective of, for example, improvement in operability, the operation panel 7091 may be disposed away upward from the table 7061. The operation panel 7091 includes a display unit such as a liquid crystal touch screen that is capable of displaying and operating an operation screen but may include a mechanical operation member such as a button.

The medium discharge portion 7040 is a portion onto which the recording media 7009 on which the images are formed by the image forming member 7020 are discharged. The medium discharge portion 7040 is disposed above the image forming member 7020. The medium discharge portion 7040 has a container space 7043 that is located at the upper right of the front Ft of the housing 7010A. The container space 7043 opens into the outside via a front opening in the housing 7010A and a right-hand opening continuous thereto. The medium discharge portion 7040 has the outlet 7041 for the recording media 7009 in a left-hand inner wall surface adjacent to the container space 7043 and a placement surface 7042 on which the recording media 7009 that are discharged via the outlet 7041 are to be placed and contained along the bottom of the container space 7043. For example, the placement surface 7042 is a surface that obliquely extends such that the height thereof increases as a position from the outlet 7041 in the right-hand direction increases, or a slope rising to the right.

As illustrated in, for example, FIG. 7-1 to FIG. 7-3, the front opening-closing covering 7011A of the image forming apparatus 7001A is configurated d as an opening-closing covering that is capable of entirely covering the image forming member 7020 and the medium container unit 7030A that correspond to a portion at the front of the housing 7010A except for the medium discharge portion 7040 and the table 7061 of the outer reading member 7060. The front opening-closing covering 7011A opens or closes so as to cover the front of the housing 7010A from an edge (a left-hand edge 7010h) to an edge (a right-hand edge 7010m) in the left-right direction. The meaning of to be covered from the edge to the edge includes not only the meaning of to be completely covered from a boundary portion between the front of the apparatus body and a surface in the left-hand direction to a boundary portion between the front of the apparatus body and a surface in the right-hand direction but also the meaning that the medium container unit is covered at least in the left-right direction.

As illustrated in, for example, FIG. 7-2, the overall shape of the front opening-closing covering 7011A is a shape obtained by removing an upper right half as a notch 7011d that has a shape that corresponds to the shape of the front opening of the medium discharge portion 7040 from a rectangle that extends in the vertical direction and that corresponds to a lower portion of the front of the housing 7010A except for the table 7061.

As illustrated in, for example, FIG. 7-2, the front opening-closing covering 7011A is mounted so as to open and close in directions illustrated by arrows Do and Dc on opening-closing support members 7016 such as multiple hinges (three hinges in this example) on the left-hand edge 7010h at the front of the housing 7010A. Consequently, the whole of the front opening-closing covering 7011A swings sideways in the left-hand direction (the direction illustrated by the arrow Do).

As for the image forming apparatus 7001A, as illustrated in FIG. 7-1 and FIG. 7-2, the right-hand side covering 7014 has a handle guide depression 7014c on a front edge portion. The handle guide depression 7014c has a depressed shape for guiding a finger of the user to a handle of the front opening-closing covering 7011A such that the finger is easily caught on the handle when the front opening-closing covering 7011A is opened.

As illustrated in FIG. 7-4 or FIG. 7-5, the left-hand side opening-closing covering 7013 of the image forming apparatus 7001A is configured d as an opening-closing covering that is capable of entirely covering the image forming member 7020 and the medium container unit 7030A that correspond to a portion at the left-hand side of the housing 7010A except for the table 7061 of the outer reading member 7060 and a part of an upper edge portion (an upper covering portion 7015). The left-hand side opening-closing covering 7013 is heavier than the front opening-closing covering 7011A, for example, because there are a part of the medium transport path 7037 and a member such as a thermal insulation member inside the left-hand side opening-closing covering 7013.

As illustrated in, for example, FIG. 7-5, the overall shape of the left-hand side opening-closing covering 7013 is a shape obtained by removing a part as a notch 7013d from a rectangle that extends in the vertical direction and that corresponds to a lower portion of the left-hand side of the housing 7010A except for the table 7061 and the upper covering portion 7015. The notch 7013d has a shape that corresponds to a rectangular shape of the upper covering portion 7015 that extends in a front-rear direction and is formed in an upper front portion of the rectangle described above. As illustrated in FIG. 7-5, the left-hand side opening-closing covering 7013 opens or closes so as to cover a fixing portion 7026 and a part of the medium transport path 7037 that corresponds to a part of the image forming member 7020.

As illustrated in, for example, FIG. 7-5, the left-hand side opening-closing covering 7013 is mounted so as to open and close in directions illustrated by the arrows Do and Dc on the opening-closing support members 7016 such as multiple hinges (three hinges in this example) on the rear edge of the left-hand side of the housing 7010A. The opening-closing support members 7016 are disposed on the rear edge of both edges in the left-right direction of the left-hand side opening-closing covering 7013 (the front-rear direction of the housing 7010A). Consequently, the whole of the left-hand side opening-closing covering 7013 swings sideways in the rear direction (the direction illustrated by the arrow Do).

As illustrated in FIG. 7-6, the image forming apparatus 7001A includes a control device 7008 that controls the operation of the entire apparatus such as the image forming member 7020, the outer reading member 7060, and the medium transport path 7037. In FIG. 7-6, the control device 7008 is illustrated as a controller.

The control device 7008 is configured d by using, for example, an arithmetic processing unit, a storage element, input and output portions, a storage device, and a control device. The control device 7008 transmits a control instruction that is needed for an object to be controlled depending on, for example, a control program, reference data, or detection data that is stored in the storage element or the storage device. For this reason, the control device 7008 is connected to, for example, an image formation controller 7028 that exclusively controls the operation of the image forming member 7020, an outer reading controller 7068 that exclusively controls the operation of the outer reading member 7060, and a medium transport controller 7038 that exclusively controls the operation of the medium transport path 7037. The control device 7008 is connected to a detection unit 7081 that includes various sensors that detect information that is needed for control.

As for the image forming apparatus 7001A, an interlock switch 7082 that is one of safety mechanisms regarding the operation of the image forming apparatus 7001A is used as an example of the detection unit 7081. The interlock switch 7082 is configured d by using, for example, a movable connection member 7082a that is disposed on the front opening-closing covering 7011A and a switch member 7082b that is disposed in the housing 7010A.

When the interlock switch 7082 is in a connection state, the control device 7008 implements control such that the operation of the image forming member 7020, the outer reading member 7060, and the medium transport path 7037, for example, is performable. The connection state is a state in which the movable connection member 7082a is connected to the switch member 7082b. When the interlock switch 7082 is in a non-connection state, the control device 7008 implements control such that the operation of the image forming member 7020, the outer reading member 7060, and the medium transport path 7037, for example, is not performable. The non-connection state is a state in which the movable connection member 7082a is separated from the switch member 7082b and is not connected thereto. As for the control in the non-connection state, the operation is not started (no operation instruction is accepted) when the operation is inactive, and the operation is forcefully stopped when the operation is active.

As for the image forming apparatus 7001A that has the above configuration, as illustrated in FIG. 7-1, the image forming member 7020 (including the fixing portion 7026) and the medium container unit 7030A are entirely covered by the single front opening-closing covering 7011A at the front exterior of the housing 7010A with the front opening-closing covering 7011A closed.

Accordingly, as for the image forming apparatus 7001A, a vertical division line Lv that extends in the vertical direction across the image forming member 7020 and the medium container unit 7030A as illustrated in FIG. 7-11 by way of example is not present on the front exterior (the front opening-closing covering 7011A) of the housing 7010A between the image forming member 7020 and the medium container unit 7030A, unlike the case where the housing 7010A is covered from the left-hand edge to the right-hand edge by using multiple opening-closing coverings, and in this way, the quality of appearance may be improved.

Regarding this point, an image forming apparatus 7100A in a first comparative example illustrated in FIG. 7-11 is configured d such that two opening-closing coverings 7111 and 7112 open or close so as to entirely cover the image forming member 7020 and the medium container unit 7030A. As for the image forming apparatus 7100A in the first comparative example, the vertical division line Lv that corresponds to the boundary line between the opening-closing covering 7111 and the opening-closing covering 7112 is present on the front exterior of the housing 7010A. For this reason, in the case of the image forming apparatus 7100A in the first comparative example, the quality of the appearance of the front of the housing 7010A is degraded due to the vertical division line Lv on the front exterior of the housing 7010A.

The image forming apparatus 7001A is configured d such that the front opening-closing covering 7011A covers the three (all) container units 7031A, 7031B, and 7031C of the medium container unit 7030A.

For this reason, as for the image forming apparatus 7001A, no division line is present on the front exterior (the front opening-closing covering 7011A) of the housing 7010A among the multiple container units 7031A, 7031B, and 7031C of the medium container unit 7030A, and in this way, the quality of appearance may be improved. In addition, as for the image forming apparatus 7001A, the front opening-closing covering 7011A may entirely cover and conceal the medium container unit 7030A at once. For this reason, a container unit that has a unique form such as the oblique container unit 7031A may be used as the medium container unit 7030A. In the case where the oblique container unit 7031A is included in the medium container unit 7030A as in the image forming apparatus 7001A, the oblique container unit 7031A may be concealed, and in this way, the quality of appearance may be improved.

An image forming apparatus 7001C that includes a front opening-closing covering 7011D illustrated in FIG. 7-10 instead of the front opening-closing covering 7011A of the image forming apparatus 7001A may be provided. The front opening-closing covering 7011D opens or closes so as to cover the entire image forming member 7020 and the oblique container unit 7031A that corresponds to a part of the medium container unit 7030A at the front of the housing 7010A. A lower edge 7011v thereof serves as an opening-closing covering that has a shape substantially following an oblique contour line Ji of the lower side of the oblique container unit 7031A. Also, the front opening-closing covering 7011D covers the housing 7010A from the edge to the edge in the left-right direction.

However, as illustrated in FIG. 7-10, the image forming apparatus 7001C in a reference example that includes the front opening-closing covering 7011D needs a second front opening-closing covering 7011E that covers the other container units 7031B and 7031C of the medium container unit 7030A. In the case of the image forming apparatus 7001C, a division line Ld that obliquely extends is present between the front opening-closing covering 7011D and the second front opening-closing covering 7011E, and it is difficult to improve the quality of appearance due to the division line Ld accordingly.

The image forming apparatus 7001C that includes the front opening-closing covering 7011D is compared with the image forming apparatus 7100A in a second comparative example illustrated in FIG. 7-12 as follows.

Firstly, the image forming apparatus 7100A in the second comparative example includes a front opening-closing covering 7115 that entirely covers the image forming member 7020 but does not cover the medium container unit 7030A at all. Secondly, the image forming apparatus 7100A in the second comparative example includes an exterior covering 7331 that covers the oblique container unit 7031A of the medium container unit 7030A and a second front opening-closing covering 7117 that covers the two container units 7031B and 7031C of the medium container unit 7030A.

That is, in comparison between the image forming apparatus 7001C and the image forming apparatus 7100A in the second comparative example, as for the image forming apparatus 7100A in the second comparative example, the oblique container unit 7031A is not covered by the front opening-closing covering 7115, and two oblique division lines Ld1 and Ld2 are present. Regarding this point for the image forming apparatus 7001C that includes the front opening-closing covering 7011D, the single oblique division line Ld is present, the number of the division line Ld is decreased, and in this way, the quality of appearance at the front exterior of the housing 7010A may be improved.

As for the image forming apparatus 7001A according to the first aspect of the seventh exemplary embodiment, the lower edge 7011v of the front opening-closing covering 7011A is not along the oblique contour line Ji of the oblique container unit 7031A but substantially horizontally extends in the left-right direction. For this reason, the image forming apparatus 7001A may be capable of covering and concealing the oblique container unit 7031A such that the existence thereof is not recognized, and in this way, the quality of appearance may be maintained. The image forming apparatus 7001A even includes the container units 7031B and 7031C in addition to the oblique container unit 7031A as in the medium container unit 7030A but may not include the second front opening-closing covering 7117 for covering the container units 7031B and 7031C, unlike the image forming apparatus 7100A in the second comparative example.

The image forming apparatus 7001A is configured d such that the left-hand side opening-closing covering 7013 that is heavier than the front opening-closing covering 7011A opens and closes by using the opening-closing support members 7016 on the rear edge in the left-right direction. For this reason, as for the image forming apparatus 7001A, a vibration is unlikely to be produced when the left-hand side opening-closing covering 7013 opens and closes, a vibration is inhibited from being transmitted to the reading device 7065a in the outer reading member 7060 when the left-hand side opening-closing covering 7013 opens and closes, and the reading device 7065a is inhibited from being vibrated, unlike the case where the left-hand side opening-closing covering 7013 opens and closes on the opening-closing support members 7016 that are disposed on an edge thereof in the vertical direction. This is particularly effective when it is necessary to open or close the left-hand side opening-closing covering 7013 during the reading operation of the outer reading member 7060.

In addition, the image forming apparatus 7001A includes the left-hand side opening-closing covering 7013 that opens or closes such that the left-hand side opening-closing covering 7013 covers a portion at the left-hand side of the housing 7010A across the image forming member 7020 and the medium container unit 7030A. For this reason, as for the image forming apparatus 7001A, the vertical division line that extends across the image forming member 7020 and the medium container unit 7030A is not present on the left-hand side exterior of the housing 7010A, and in this way, the quality of appearance at the left-hand exterior thereof may be improved.

As for the image forming apparatus 7001A, when the front opening-closing covering 7011A is opened, the movable connection member 7082a of the interlock switch 7082 on the front opening-closing covering 7011A is separated from the switch member 7082b of the interlock switch 7082 in the housing 7010A and the state thereof changes into the non-connection state. In the case where the front opening-closing covering 7011A is opened while the image forming apparatus 7001A forms the image, the control device 7008 implements control such that the operation of the image formation controller 7028, the outer reading controller 7068, and the medium transport controller 7038 is forcefully stopped in accordance with detection information that represents the state of the interlock switch 7082 changes into the non-contact state.

For this reason, as for the image forming apparatus 7001A, when the front opening-closing covering 7011A is opened, the operation (image formation) of the image forming member 7020 and the medium transport path 7037 that are exposed at the front of the housing 7010A is stopped, and safety is ensured. In the case where there is the recording medium 7009 on the medium transport path 7037 for forming the image, the control device 7008 may implement control such that the recording medium 7009 that is being transported is transported to the medium discharge portion 7040 and discharged when the front opening-closing covering 7011A is opened and such that the operation of the medium transport path 7037 is subsequently stopped.

Second Aspect of Seventh Exemplary Embodiment

Figures 1, 2, 3, 4, 5, 6, 7, 8:
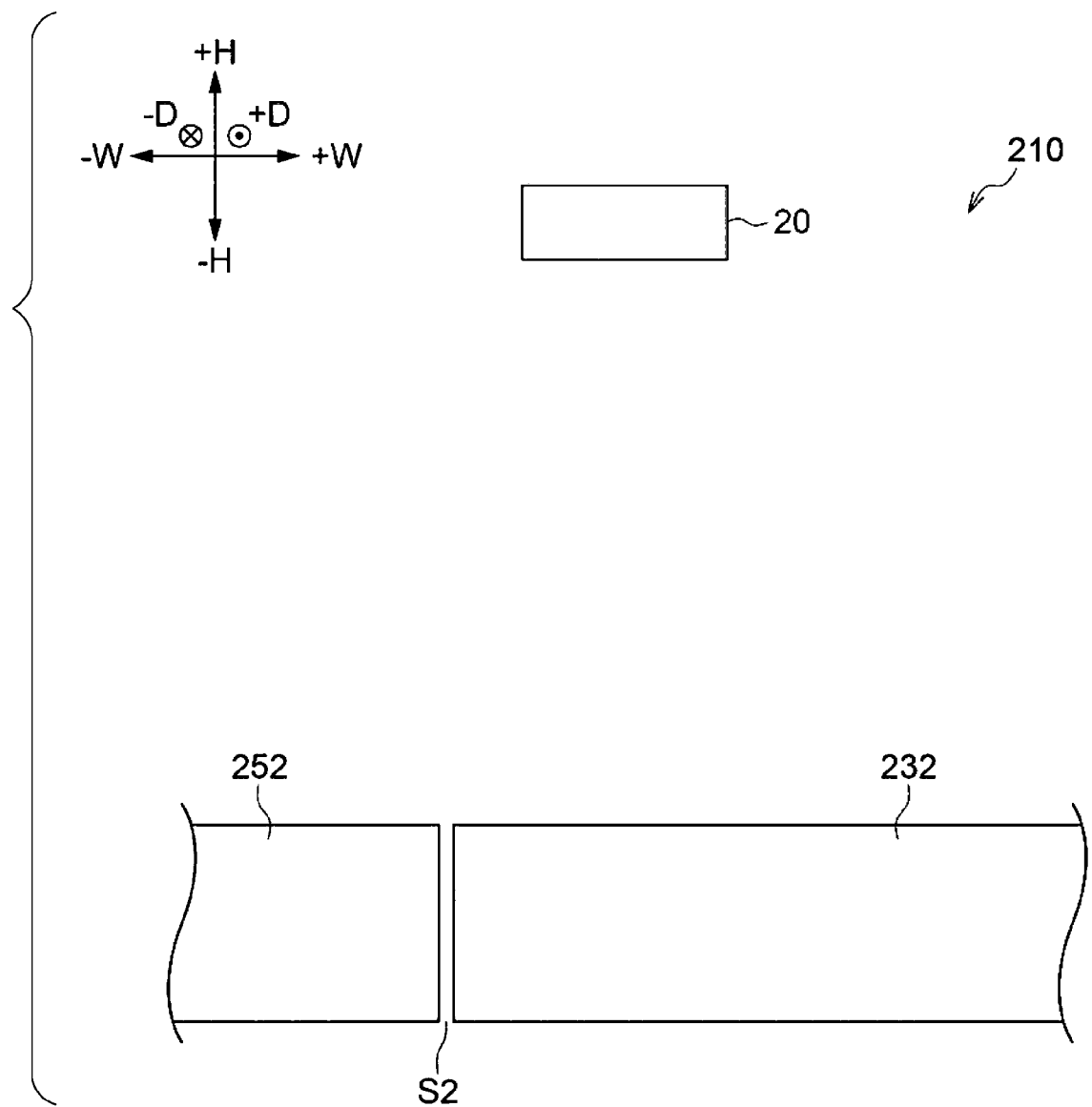
Figures 1, 2, 3, 4, 5, 6, 7, 8, 9:
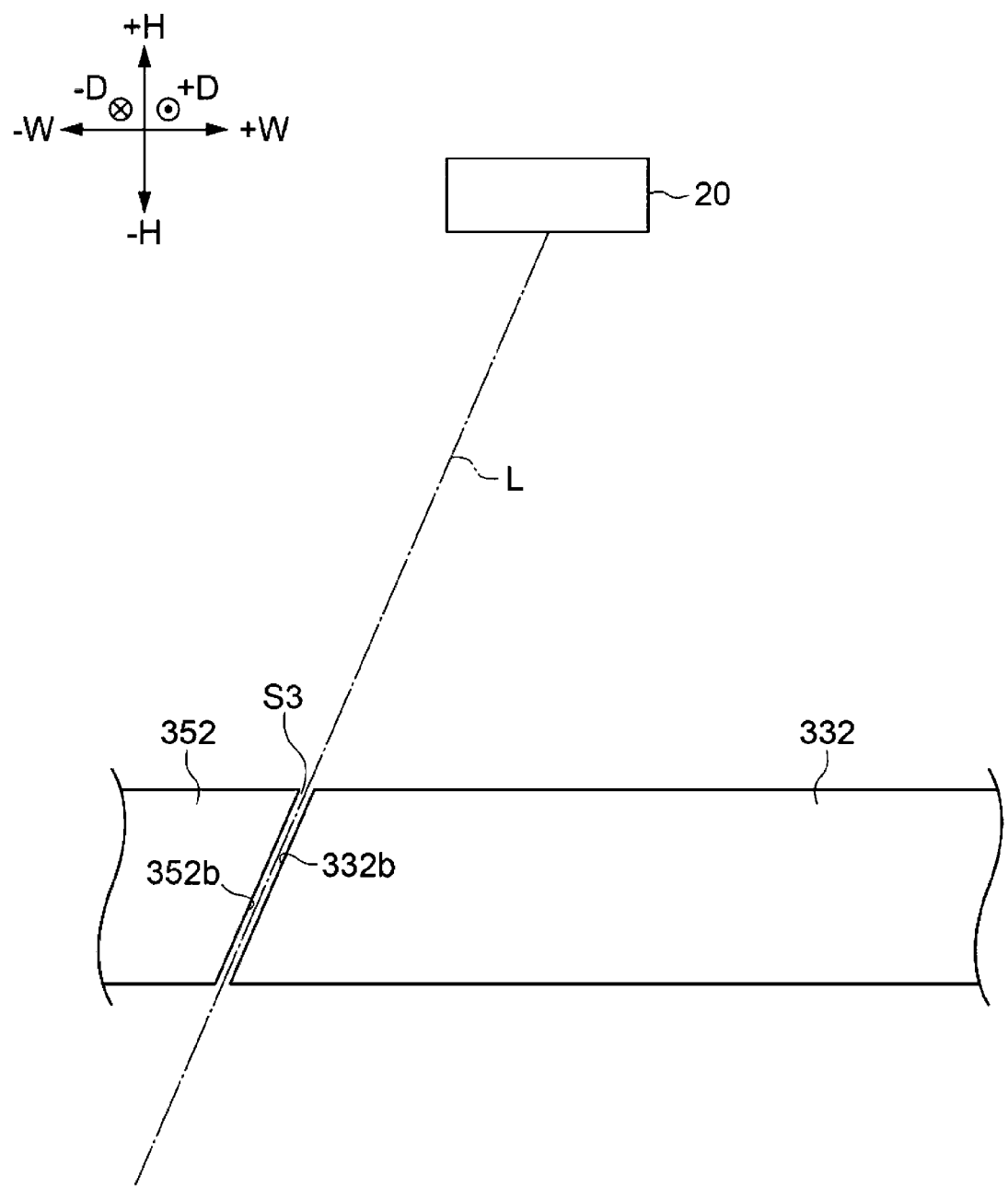

FIG. 7-7 is a perspective view of an image forming apparatus 7001B according to a second aspect of the seventh exemplary embodiment of the present disclosure viewed in an oblique direction in front of the image forming apparatus 7001B. FIG. 7-8 is a perspective view of the image forming apparatus 7001B with a front opening-closing covering opened. FIG. 7-9 is a schematic front view of the image forming apparatus 7001B with the front opening-closing covering opened.

The image forming apparatus 7001B according to the second aspect of the seventh exemplary embodiment has the same configuration as that of the image forming apparatus 7001A according to the first aspect of the seventh exemplary embodiment except that the following points are modified. As illustrated in FIG. 7-7 to FIG. 7-9, one of the changed points is that a document reading member 7050 is used instead of the outer reading member 7060, another is that a medium container unit 7030B is used instead of the medium container unit 7030A, and the other is that a front opening-closing covering 7011B is used instead of the front opening-closing covering 7011A. A housing 7010B that is an example of the apparatus body differs from the housing 7010A according to the first aspect of the seventh exemplary embodiment in including the medium container unit 7030B. For this reason, in the following description, common components are designated by reference characters like to those according to the first aspect of the seventh exemplary embodiment, and the description thereof is omitted unless the description is needed.

The document reading member 7050 includes a device that reads a sheet document. As illustrated in FIG. 7-7 to FIG. 7-9, the document reading member 7050 is configurated d by using devices or members such as an image reading member 7051, a platen covering portion 7053, and an auto document feeder 7055.

The image reading member 7051 includes, for example, a platen glass 7052 that is an example of a document table on which the document is placed and a reading device that reads the document that is placed on the platen glass 7052. The platen covering portion 7053 opens or closes so as to cover the platen glass 7052. The auto document feeder 7055 is disposed on the platen covering portion 7053 and enables multiple documents to be automatically transported and continuously read.

The auto document feeder 7055 uses a method of reading a document by using a reading device such as an image sensor that is disposed on a document transport path or a method of reading a document that is placed on the platen glass 7052 by using a reading device in the image reading member 7051. A reference character 7057 that designates a one-dot chain line in FIG. 7-9 represents a principal document transport path on which the document is transported in the auto document feeder 7055. The platen covering portion 7053 is coupled with the image reading member 7051 behind the platen glass 7052 by using opening-closing support members such as hinges, not illustrated. Consequently, the platen covering portion 7053 is mounted so as to be swingable in open and close directions illustrated by arrows E1 and E2 on the hinges that are disposed on a rear edge portion thereof and that are not illustrated.

The document reading member 7050 reads the document on the platen glass 7052 or continuously reads the documents that are being transported by the auto document feeder 7055 and transmits image information about each read document from the image reading member 7051 to, for example, the image forming member 7020. Consequently, the image forming apparatus 7001B is configurated d such that the image forming member 7020 forms the image of each document that is read by the document reading member 7050 on a recording medium 7009 (D, E, or F) for output. As for the document reading member 7050, an operation panel 7092 for the operation of the image forming apparatus 7001B is disposed on a front edge portion of the image reading member 7051. The operation panel 7092 includes mechanical operation members such as a button and a switch, a screen display unit, and a display unit such as a liquid crystal touch screen that is capable of displaying and operating an operation screen.

As illustrated in FIG. 7-8 and FIG. 7-9, the medium container unit 7030B includes three container units 7031D, 7031E, and 7031F that are arranged in the vertical direction.

Each of the three container units 7031D, 7031E, and 7031F is configurated d by using, for example, a container body such as a tray that contains the recording medium 7009 and a feed device that feeds the recording medium 7009 from the container body although these are not illustrated. Each of the three container units 7031D, 7031E, and 7031F is configurated d as a typical container unit in which the container body is substantially horizontally disposed in the left-right direction. The recording media 7009D, 7009E, and 7009F that are contained in the respective container units 7031D, 7031E, and 7031F may have the same size or different sizes, or at least one of the sizes may differ from the others. The container unit 7031D at the highest stage is located nearest to the image forming member 7020 among the container units.

As illustrated in, for example, FIG. 7-7 to FIG. 7-9, the front opening-closing covering 7011B is configurated d as an opening-closing covering that is capable of entirely covering the image forming member 7020 and that is capable of covering a part (the container units 7031D and 7031E) of the medium container unit 7030B in the housing 7010B. The front opening-closing covering 7011B opens or closes so as to cover the front of the housing 7010B from an edge (the left-hand edge 7010h) to an edge (the right-hand edge 7010m) in the left-right direction.

The overall shape of the front opening-closing covering 7011B is a shape obtained by removing an upper right half as a notch 7011e from a rectangle that extends in the vertical direction and that corresponds to a lower portion of the front of the housing 7010B except for the image reading member 7051, and the shape covers a portion of the medium container unit 7030B except for a lower portion including the container unit 7031F at the lowest stage. The notch 7011e has a shape following the shape of the front opening of the medium discharge portion 7040. As illustrated in, for example, FIG. 7-8, the front opening-closing covering 7011B is mounted so as to open and close in directions illustrated by the arrows Do and Dc on the opening-closing support members 7016 such as multiple hinges (two hinges in this example) on the left-hand edge at the front of the housing 7010B. Consequently, the whole of the front opening-closing covering 7011B swings sideways in the left-hand direction (the direction illustrated by the arrow Do).

As for the image forming apparatus 7001B, the front opening-closing covering 7011B does not cover the container unit 7031F at the lowest stage in the medium container unit 7030B. For this reason, the container unit 7031F at the lowest stage is mounted such that a front outer covering 7033 is secured at the front of the container body instead of the front opening-closing covering 7011B. The container bodies of the container units 7031D and 7031E that are covered by the front opening-closing covering 7011B include respective inner coverings that have contours following the front shapes (rectangles that extend sideways) of the container units 7031D and 7031E at the front.

As illustrated by an arrow P in FIG. 7-8, the container bodies of the container units 7031D and 7031E are mounted so as to be able to be pulled from locations inside the housing 7010B to locations outside the housing 7010B (toward the front of the housing 7010B) with the front opening-closing covering 7011B opened (see FIG. 7-8 and FIG. 7-9), for example, when the recording media 7009 are put therein. The container unit 7031F at the lowest stage is mounted so as to be able to be pulled from a location inside the housing 7010B to a location outside the housing 7010B anytime, for example, when the recording medium 7009 is put therein regardless of whether the front opening-closing covering 7011B opens or closes.

As for the image forming apparatus 7001B that has the above configuration, as illustrated in FIG. 7-7, the entire image forming member 7020 (including the fixing portion 7026) and the container units 7031D and 7031E that correspond to a part of the medium container unit 7030B are covered by the single front opening-closing covering 7011B at the front exterior of the housing 7010B with the front opening-closing covering 7011B closed. Accordingly, as for the image forming apparatus 7001B, the division line Ld (see FIG. 7-10) is not present on the front exterior (the front opening-closing covering 7011B) of the housing 7010B between the image forming member 7020 and the medium container unit 7030B, unlike the case where the image forming member 7020 and the medium container unit 7030B are covered by respective opening-closing coverings, and in this way, the quality of appearance may be improved.

As for the image forming apparatus 7001B, the front opening-closing covering 7011B is configurated d so as to cover the two container units 7031D and 7031E of the medium container unit 7030B. For this reason, as for the image forming apparatus 7001B, no division line (Ld) is present on the front exterior (the front opening-closing covering 7011B) of the housing 7010B between the container units 7031D and 7031E of the medium container unit 7030B, and in this way, the quality of appearance may be improved.

As for the image forming apparatus 7001B, the single container unit 7031F of the medium container unit 7030B that is not covered by the front opening-closing covering 7011B is pulled from a location inside the housing 7010B to a location outside the housing 7010B anytime, for example, when the recording medium 7009 is put therein regardless of whether the front opening-closing covering 7011B opens or closes. For this reason, an example of the container unit 7031F that is not covered by the front opening-closing covering 7011B may be a container unit that frequently needs supply of the recording medium 7009 because of high consumption of the recording medium 7009. When the container unit 7031F thus is not covered by the front opening-closing covering 7011B, it is not necessary for the front opening-closing covering 7011B to open and close when the recording medium 7009 is supplied to the container unit 7031F that is frequently used, and in this way, workability may be improved.

As for the image forming apparatus 7001B, when the front opening-closing covering 7011B is opened, the state of the interlock switch 7082 changes into the non-contact state. Specifically, as illustrated in, for example, FIG. 7-8, the movable connection member 7082a of the interlock switch 7082 on the front opening-closing covering 7011B is separated from the switch member 7082b of the interlock switch 7082 in the housing 7010B. In the case where the front opening-closing covering 7011B is opened while the image forming apparatus 7001B forms the image, it is detected that the state of the interlock switch 7082 changes into the non-connection state, and the control device (see FIG. 7-6) receives information about the detection and implements control such that the operation of the image formation controller 7028 and the medium transport controller 7038 is forcefully stopped.

For this reason, as for the image forming apparatus 7001B, when the front opening-closing covering 7011B is opened, the operation (image formation) of the image forming member 7020 and the medium transport path 7037 that are exposed at the front of the housing 7010B is stopped, and safety is ensured. As for the image forming apparatus 7001B, however, the medium transport path 7037 does not stop a transport operation toward the container unit 7031F at the lowest stage even when the front opening-closing covering 7011B is opened while the image is formed.

Modification

The present disclosure is not limited by the contents described according to the first aspect of the seventh exemplary embodiment and the second aspect of the seventh exemplary embodiment by way of example but includes, for example, a modification described below.

As for the image forming apparatus 7001A according to the first aspect of the seventh exemplary embodiment, the left-hand side opening-closing covering 7013 may be configurated d so as to open and close on the opening-closing support members 7016 that are disposed on the right-hand edge in the left-right direction of the left-hand side opening-closing covering 7013 (the front edge of the housing 7010A in the front-rear direction). As for the image forming apparatus 7001A, the right-hand side covering 7014 may be configurated d as an opening-closing covering that opens or closes so as to cover the image forming member 7020 and the medium container unit 7030A at the right-hand side of the housing 7010A instead of or in addition to the left-hand side opening-closing covering 7013. In this case, when the right-hand side covering 7014 is heavier than the front opening-closing covering 7011A, the right-hand side covering 7014 may open and close on the opening-closing support members 7016 that are disposed on one of both edges of the right-hand side covering 7014 in the left-right direction (the front-rear direction of the housing 7010A). The exterior coverings of the image forming apparatus 7001A may be a left-hand side covering and a right-hand side covering that neither open nor close.

As for the image forming apparatus 7001B according to the second aspect of the seventh exemplary embodiment, the front opening-closing covering 7011B may be configurated d so as to cover all of the three container units 7031D, 7031E, and 7031F of the medium container unit 7030B as in the front opening-closing covering 7011A according to the first aspect of the seventh exemplary embodiment. The front opening-closing covering 7011B, however, may cover the image forming member 7020 and the container unit 7031D of the medium container unit 7030B at the highest stage.

The housings 7010A and 7010B are not limited by the structural body that has a rectangular cuboid shape that extends in the vertical direction as described according to the first aspect of the seventh exemplary embodiment and the second aspect of the seventh exemplary embodiment by way of example but may have, for example, a curved side surface portion.

An image forming apparatus may have a configuration obtained by omitting the outer reading member 7060 from the configuration of the image forming apparatus 7001A according to the first aspect of the seventh exemplary embodiment (including the image forming apparatus 7001C). An image forming apparatus may have a configuration obtained by omitting the document reading member 7050 from the configuration of the image forming apparatus 7001B according to the second aspect of the seventh exemplary embodiment. In these cases, an upper end covering, for example, may be provided as an exterior covering on the upper end of the housing 7010A or 7010B on which the outer reading member 7060 or the document reading member 7050 is originally disposed. As for another image forming apparatus, the image forming member 7020 is not limited to an electrophotographic image forming member that uses a developer, but the image forming member 7020 may use another image formation method (for example, an ink-jet method).

Eighth Exemplary Embodiment

FIG. 8-1 illustrates an image forming apparatus that uses a drive device according to an eighth exemplary embodiment. In FIG. 8-1, an arrow X represents the horizontal direction (the width direction) of an image forming apparatus 8001, an arrow Y represents the depth direction of the image forming apparatus 8001, and an arrow Z represents the vertical direction of the image forming apparatus 8001 (the vertical direction).

Entire Configuration of Image Forming Apparatus

The image forming apparatus 8001 according to the eighth exemplary embodiment is configured d as, for example, a color printer. The image forming apparatus 8001 is an example of a container apparatus. As illustrated in FIG. 8-1, the image forming apparatus 8001 includes, for example, multiple imaging devices 8010 that form toner images that are developed by using toner that configurated s a developer, an intermediate transfer device 8020 that holds and finally transports the toner images that are formed by the imaging devices 8010 to a second transfer position at which the toner images are second-transferred to recording paper 8005 that is an example of a recording medium, a paper feeding device 8050 that contains and transports the recording paper 8005 that is required to be supplied to the second transfer position of the intermediate transfer device 8020, and a fixing device 8040 that fixes the toner images that are second-transferred by the intermediate transfer device 8020 to the recording paper 8005. In the figure, the apparatus body of the image forming apparatus 8001 is designated as 8001a. The apparatus body 8001a is configurated d by using, for example, a support structure member or an exterior covering. A two-dot chain line in the figure represents a principal transport path on which the recording paper 8005 is transported in the apparatus body 8001a.

The imaging devices 8010 are configured d by using four imaging devices 8010Y, 8010M, 8010C, and 8010K that exclusively form toner images in the four colors of yellow (Y), magenta (M), cyan (C), and black (K). The four imaging devices 8010 (Y, M, C, and K) are aligned in a column with the imaging device 8010Y for yellow (Y) tilting at a higher position in a Z-direction and with the imaging device 8010K for black (K) tilting at a lower position in the Z-direction in an interior space of the apparatus body 8001a.

The four imaging devices 8010 are configured d by using the imaging devices 8010 (Y, M, and C) for colors of yellow (Y), magenta (M), and cyan (C) and the imaging device 8010K for black (K). The imaging device 8010K for black is disposed at a most downstream position in a direction B in which an intermediate transfer belt 8021 of the intermediate transfer device 8020 moves. The image formation mode of the image forming apparatus 8001 includes a full color mode in which the imaging devices 8010 (Y, M, and C) for the colors and the imaging device 8010K for black (K) operate to form a full color image and a monochrome mode in which only the imaging device 8010K for black (K) operates to form a monochrome image.

As illustrated in FIG. 8-2, the imaging devices 8010 (Y, M, C, and K) include respective photoconductor drums 8011 that rotate and that are examples of an image forming unit (an image carrier). Around the photoconductor drums 8011, for example, there are charging devices 8012 that charge circumferential surfaces (image carrying surfaces) of the photoconductor drums 8011 on which images are formable at a required potential, exposure devices 8013 that radiate light based on information (signal) about the images to the charged circumferential surfaces of the photoconductor drums 8011 and that form electrostatic latent images (for the respective colors) that have a potential difference, developing devices 8014 (Y, M, C, and K) that are examples of an image forming unit (a developing unit) that develops the electrostatic latent images by using toner of the developer in the associated colors (Y, M, C, and K) into the toner images, first transfer devices 8015 (Y, M, C, and K) that transfer the respective toner images to the intermediate transfer device 8020, and drum cleaning devices 8016 (Y, M, C, and K) that remove and clean attached substances such as attached residual toner on the image carrying surfaces of the photoconductor drums 8011 after the first transfer.

In each photoconductor drum 8011, the image carrying surface that has a photoconductive layer (a photosensitive layer) composed of a photoconductive material is formed on the circumferential surface of a cylindrical or column base material that is grounded. Each photoconductor drum 8011 is supported so as to rotate in a direction illustrated by an arrow A when driving force is transmitted from the drive unit according to the eighth exemplary embodiment as described later.

Each charging device 8012 is configured d by using a charging roller 8121 that is disposed such that the charging roller 8121 is in contact with the photoconductor drum 8011. A cleaning roller 8122 that cleans the surface of the charging roller 8121 is disposed so as to be in contact with a back surface of the charging roller 8121. Charge voltage is applied to the charging device 8012. In the case where the developing device 8014 is used for reversal development, voltage, or current, having the same polarity as charge polarity of the toner that is supplied from the developing device 8014 is applied as the charge voltage. The charging roller 8121 and the cleaning roller 8122 are rotated when driving force is transmitted from the photoconductor drum 8011.

Each of the exposure devices 8013 includes a LED print head that radiates light depending on the image information to the photoconductor drum 8011 by using light emitting diodes (LEDs) that are multiple light emitting elements that are arranged in the axial direction of the photoconductor drum 8011 and forms the electrostatic latent image. The exposure device 8013 may be used for deflection scanning of laser light that is configured d depending on the image information in the axial direction of the photoconductor drum 8011.

Each of the developing devices 8014 (Y, M, C, and K) is configured d such that a development roller 8141 that carries the developer and that transports the developer to a development region that faces the photoconductor drum 8011, a mixing supply member 8142 such as a screw auger that mixes and supplies the developer such that the developer passes through the development roller 8141, a mixing transport member 8143 such as a screw auger that mixes and transports the developer to the mixing supply member 8142, and a layer thickness restriction member 8144 that restricts the amount (layer thickness) of the developer that is carried by the development roller 8141 are disposed in a housing 8140 that has an opening portion and a container chamber for the developer. Development voltage is applied from a power supply device, not illustrated, to the developing device 8014 between the development roller 8141 and the photoconductor drum 8011. The development roller 8141 rotates in a required direction when driving force is transmitted from the drive unit according to the eighth exemplary embodiment as described later. The mixing supply member 8142 and the mixing transport member 8143 are rotated when driving force is transmitted from the development roller 8141. Two-component developer that contains non-magnetic toner and a magnetic carrier is used as the developer for the four colors.

Each of the first transfer devices 8015 (Y, M, C, and K) is a contact transfer device that includes a first transfer roller that comes into contact with the intermediate transfer belt 8021 along the circumference of the photoconductor drum 8011 and rotates, and a first transfer voltage is applied thereto. As for the first transfer voltage, direct current voltage that has polarity opposite the charge polarity of the toner is applied from the power supply device, not illustrated.

Each of the drum cleaning devices 8016 is configured d by using, for example, a body 8160 that has a container shape that partly opens, a cleaning plate 8161 that comes into contact with the circumferential surface of the photoconductor drum 8011 at required pressure after the first transfer and that removes and cleans attached substances such as residual toner, and a feed member 8162 such as a screw auger that collects the attached substances such as the toner removed by the cleaning plate 8161 and that feeds and transports the attached substances to a collection system, not illustrated. A plate member (for example, a blade) composed of, for example, a rubber material is used as the cleaning plate 8161. The feed member 8162 of the drum cleaning device 8016 is rotated when driving force is transmitted from the photoconductor drum 8011.

As illustrated in FIG. 8-1, the intermediate transfer device 8020 is disposed so as to be located above the imaging devices 8010 (Y, M, C, and K) in the Z-direction. As illustrated in FIG. 8-2, the intermediate transfer device 8020 is configured d by using, for example, the intermediate transfer belt 8021 that turns in a direction illustrated by an arrow B while passing through the first transfer position between the photoconductor drums 8011 and the first transfer devices 8015 (the first transfer rollers), multiple belt support rollers 8022 to 8026 that hold and rotatably support the intermediate transfer belt 8021 from an inner surface thereof in a desired state, a second transfer device 8030 that is an example of a second transfer unit that is disposed on the outer circumferential surface (the image carrying surface) of the intermediate transfer belt 8021 supported by the belt support roller 8026 and that second-transfers the toner images on the intermediate transfer belt 8021 to the recording paper 8005, and a belt cleaning device 8027 that removes and cleans attached substances such as the toner and paper powder that remain and that are attached to the outer circumferential surface of the intermediate transfer belt 8021 after passing through the second transfer device 8030.

An example of the intermediate transfer belt 8021 is a belt that is composed of a material acquired by diffusing a resistance regulator such as carbon black in synthetic resin such as polyimide resin or polyamide resin and that has no ends. The belt support roller 8022 is configured d as a drive roller that doubles as a facing roller of the belt cleaning device 8027 and that is rotated by a drive device 8070 according to the eighth exemplary embodiment described later. Belt support rollers 8023 and 8024 are configured d as surfacing rollers that form an image formation surface of the intermediate transfer belt 8021. A belt support roller 8025 is configured d as a tension applying roller that applies tension to the intermediate transfer belt 8021. The belt support roller 8026 is configured d as a facing roller that faces the second transfer device 8030.

The intermediate transfer device 8020 is configured d such that the belt support rollers 8023 and 8024 are movable toward the inside and outside of the intermediate transfer belt 8021 together with the first transfer devices 8015 (Y, M, C, and K). In the full color mode, as illustrated in FIG. 8-2, the belt support rollers 8023 and 8024 are disposed at positions at which the first transfer devices 8015 (Y, M, C, and K) come into contact with the intermediate transfer belt 8021 on the surfaces of the photoconductor drums 8011 (Y, M, C, and K). In the monochrome mode, as illustrated in FIG. 8-4, only the first transfer device 8015K for black (K) comes into contact with the intermediate transfer belt 8021 on the surface of the photoconductor drum 8011K for black (K), and the belt support roller 8023 moves such that the first transfer devices 8015 (Y, M, and C) for the colors are away from the surface of the photoconductor drums 8011 (Y, M, and C) together with the intermediate transfer belt 8021.

During maintenance, as illustrated in FIG. 8-5, the belt support rollers 8023 and 8024 move such that the first transfer devices 8015 (Y, M, and C) for the colors and the first transfer device 8015K for black (K) are away from the surfaces of the photoconductor drums 8011 (Y, M, C, and K) together with the intermediate transfer belt 8021. FIG. 8-5 illustrates a state in which a photoconductor drum unit 8200Y for yellow (Y) is removed for convenience.

As illustrated in FIG. 8-1, the second transfer device 8030 is a contact transfer device including a second transfer roller 8031 that comes into contact with the circumferential surface of the intermediate transfer belt 8021 and that rotates, and second transfer voltage is applied thereto at the second transfer position that is a portion of the outer circumferential surface of the intermediate transfer belt 8021 that is supported by the belt support roller 8026 of the intermediate transfer device 8020. Direct current voltage that has polarity opposite the charge polarity of the toner or the same polarity as the charge polarity of the toner is applied as the second transfer voltage from the power supply device, not illustrated, to the second transfer roller 8031 or the belt support roller 8026 of the intermediate transfer device 8020.

The fixing device 8040 is configured d such that a heat rotating body 8041 in the form of a roller or a belt that rotates in a direction illustrated by an arrow and that is heated by a heating unit such that surface temperature is kept at a predetermined temperature, and a compression rotating body 8042 in the form of a belt or a roller that comes into contact therewith substantially in the axial direction of the heat rotating body 8041 at predetermined pressure and that is rotated are disposed in a housing that has an inlet and an outlet for the recording paper 8005 and that is not illustrated. The fixing device 8040 corresponds to a portion for a fixing process in which a contact portion at which the heat rotating body 8041 and the compression rotating body 8042 are in contact with each other performs the required fixing process (heating and compressing).

The paper feeding device 8050 is disposed below the imaging devices 8010 (Y, M, C, and K). The paper feeding device 8050 is configured d by using, for example, a paper container body 8051 (or paper container bodies 8051) that contains a desired kind of the recording paper 8005 having a desired size with the recording paper 8005 loaded thereon and feed devices 8052 and 8053 that feed the recording paper 8005 from the paper container body 8051 one by one. For example, the paper container body 8051 is mounted so as to be able to be pulled to a location in front of the apparatus body 8001a (a side surface that the user faces during operation).

Examples of the recording paper 8005 include plain paper for use in an electrophotographic copying machine or printer, thin paper such as tracing paper, and OHP paper. The surface of the recording paper 8005 may be smooth to improve smoothness of the surface of the fixed image. For example, so-called thick paper having a relatively great basis weight such as coated paper acquired by coating the surface of the plain paper with, for example, resin or print art paper may be used.

A single or multiple pairs of paper transport rollers 8054 and single or multiple pairs of paper transport rollers 8055 that transport the recording paper 8005 that is fed from the paper feeding device 8050 to the second transfer position, and a paper feed transport path 8056 that is configured d by using a transport guide, not illustrated, are provided between the paper feeding device 8050 and the second transfer device 8030. The pair of paper transport rollers 8055 that is disposed just upstream of the second transfer position on the paper feed transport path 8056 is configured d, for example, as rollers (resist rollers) that adjust a timing with which the recording paper 8005 is transported. A sheet transport path 8057 on which the recording paper 8005 that is fed from the second transfer device 8030 after the second transfer is transported to the fixing device 8040 is provided between the second transfer device 8030 and the fixing device 8040. A discharge transport path 8061 is provided near the outlet that is formed in the apparatus body 8001a of the image forming apparatus 8001 for the paper, and a pair of paper discharge rollers 8059 and a pair of paper discharge rollers 8060 for discharging the recording paper 8005 that is fed from the fixing device 8040 after fixing to a paper discharge portion 8058 that is an upper portion of apparatus body 8001a are disposed on the discharge transport path 8061.

The image forming apparatus 8001 also includes a double-sided unit 8062 for forming images on both surfaces of the recording paper 8005. The double-sided unit 8062 introduces the recording paper 8005 via a switch gate 8063 by rotating the pair of paper discharge rollers 8060 in an opposite direction while the pair of paper discharge rollers 8060 holds the trailing edge of the recording paper 8005 when the recording paper 8005 after the image is formed on one surface is transported to the paper discharge portion 8058 by using the pairs of paper discharge rollers 8059 and 8060. The double-sided unit 8062 has a double-sided transport path 8065 that is configured d by using multiple transport rollers 8064 that transport the introduced recording paper 8005 with the recording paper 8005 turned upside down and a transport guide, not illustrated.

In FIG. 8-1, reference characters 8145 (Y, M, C, and K) designate respective toner cartridges that are examples of a developer container that contains the developer containing at least the toner that is supplied to the respective developing devices 8014. According to the eighth exemplary embodiment, only the toner is contained in the toner cartridges 8145 (Y, M, C, and K).

In FIG. 8-1, reference characters 8100 designate a control device that collectively controls the operation of the image forming apparatus 8001. The control device 8100 includes a central processing unit (CPU), a read only memory (ROM), a random access memory (RAM), a bus that connects, for example, the CPU and the ROM, and a communication interface, not illustrated.

Operation of Image Forming Apparatus

A basic image formation operation of the image forming apparatus 8001 will now be described.

Operation in the full color mode in which the full-color image that is configured d by using a combination of the toner images in the four colors (Y, M, C, and K) with the four imaging devices 8010 (Y, M, C, and K) described above is formed will now be described.

When the image forming apparatus 8001 receives image information and instruction information about a request for full color image formation operation (print) from, for example, a personal computer or an image reading apparatus, not illustrated, the control device 8100 starts up, for example, the four imaging devices 8010 (Y, M, C, and K), the intermediate transfer device 8020, the second transfer device 8030, and the fixing device 8040.

In the imaging devices 8010 (Y, M, C, and K), as illustrated in FIG. 8-1 and FIG. 8-2, the photoconductor drums 8011 rotate in a direction illustrated by the arrow A, and the charging devices 8012 charge the surfaces of the photoconductor drums 8011 such that the surfaces have a required polarity (minus polarity according to the eighth exemplary embodiment) and potential. Subsequently, the exposure devices 8013 radiate light to the charged surfaces of the photoconductor drums 8011, based on an image signal acquired by conversion into color components (Y, M, C, and K), and electrostatic latent images having the respective color components that are configured d by using a required potential difference are formed on the surfaces.

Subsequently, the imaging devices 8010 (Y, M, C, and K) supply the toner in the respective colors (Y, M, C, and K) that is charged and that has the required polarity (the minus polarity) to the electrostatic latent images having the respective color components that are formed on the photoconductor drums 8011 from the development rollers 8141 and electrostatically stick the toner for development. As a result of the development, the toner images in the four colors (Y, M, C, and K) that are developed by using the toner in the respective colors are acquired from the electrostatic latent images having the respective color components that are formed on the respective photoconductor drums 8011.

Subsequently, the toner images in the respective colors that are formed on the photoconductor drums 8011 of the imaging devices 8010 (Y, M, C, and K) are transported to the first-transfer position, and the first-transfer devices 8015 (Y, M, C, and K) then first-transfer the toner images such that the toner images in the respective colors are superposed in order on the intermediate transfer belt 8021 of the intermediate transfer device 8020 that turns in the direction illustrated by the arrow B.

As for the imaging devices 8010 (Y, M, C, and K) after the first transfer ends, the drum cleaning devices 8016 scrape and remove the attached substances and clean the surfaces of the photoconductor drums 8011. Consequently, the imaging devices 8010 (Y, M, C, and K) become capable of performing imaging operation described below.

Subsequently, the intermediate transfer device 8020 carries the toner images that are first-transferred by the intermediate transfer belt 8021 that turns and transports the toner images to the second transfer position. The paper feeding device 8050 feeds the recording paper 8005 that is required to the paper feed transport path 8056 in conjunction with the imaging operation. As for the paper feed transport path 8056, the pair of paper transport rollers 8055 that serves as the resist rollers feeds and supplies the recording paper 8005 to the second transfer position in conjunction with the timing of the transfer.

At the second transfer position, the second transfer device 8030 collectively second-transfers the toner images on the intermediate transfer belt 8021 to the recording paper 8005. As for the intermediate transfer device 8020 after the second transfer ends, the belt cleaning device 8027 removes and cleans the attached substances such as the residual toner on the surface of the intermediate transfer belt 8021 after the second transfer.

Subsequently, the recording paper 8005 on which the toner images are second-transferred is separated from the intermediate transfer belt 8021 and is subsequently transported to the fixing device 8040 via the sheet transport path 8057. The fixing device 8040 introduces the recording paper 8005 after the second transfer ends such that the recording paper 8005 passes through the contact portion between the heat rotating body 8041 that rotates and the compression rotating body 8042 for the needed fixing process (heating and compressing) and fixes the unfixed toner images to the recording paper 8005. The recording paper 8005 after fixing is finally discharged onto, for example, the paper discharge portion 8058 that is installed on the upper portion of the apparatus body 8001a by using the pair of paper discharge rollers 8060.

As a result of the operation described above, the recording paper 8005 on which the full-color image that is configurated d by using the combination of the toner images in the four colors is formed is outputted.

When the image forming apparatus 8001 receives the image information and the instruction information about a request for monochrome image formation operation (print) from, for example, a personal computer or an image reading apparatus, not illustrated, and the control device 8100 starts up, for example, the imaging device 8010K for black (K) among the four imaging devices 8010 (Y, M, C, and K), the intermediate transfer device 8020, the second transfer device 8030, and the fixing device 8040.

In the monochrome mode, as illustrated in FIG. 8-4, only the first-transfer device 8015K for black (K) comes into contact with the intermediate transfer belt 8021 on the surface of the photoconductor drum 8011K for black (K), the belt support roller 8023 moves such that the first-transfer devices 8015 (Y, M, and C) for the colors are away from the surfaces of the photoconductor drums 8011 (Y, M, and C) together with the intermediate transfer belt 8021.

The toner image in black (K) is formed by the imaging device 8010K for black (K), and the monochrome image is formed on the recording paper 8005.

Image Formation Unit

As for the image forming apparatus 8001, the photoconductor layers of the photoconductor drums 8011, for example, wear due to the image formation operation, and it is necessary for the photoconductor drums 8011 to be replaced with new ones, for example, in the case where the photoconductor drums 8011 reach the lifetime thereof. As for the image forming apparatus 8001, the developing devices 8014 are replaced with new ones in the case where the developer in the developing devices 8014 deteriorates, and the developing devices 8014 reach the lifetime thereof.

For this reason, as for the image forming apparatus 8001, the imaging devices 8010 (Y, M, C, and K) for yellow (Y), magenta (M), cyan (C), and black (K) are manufactured as units. As illustrated in FIG. 8-3, each of the imaging devices 8010 (Y, M, C, and K) includes a photoconductor drum unit 8200 that is an example of a customer replacement unit (CRU) that includes the photoconductor drum 8011, the charging device 8012, and the drum cleaning device 8016 that are integrally formed, and a development unit 8300 that is configurated d by using only the developing device 8014. The exposure devices 8013 are installed in the apparatus body 8001a of the image forming apparatus 8001.

The photoconductor drum units 8200 (Y, M, C, and K) and the development units 8300 (Y, M, C, and K) for yellow (Y), magenta (M), cyan (C), and black (K) are configurated d so as to be separately installable in and removable from the apparatus body 8001a.

The photoconductor drum units 8200 (Y, M, C, and K) and the development units 8300 (Y, M, C, and K) are positioned and secured at predetermined operation positions by being pushed in a Y-direction from the front (a front surface) of the apparatus body 8001a toward the rear (a back surface) by using guide rails that are examples of a guide unit that is disposed in the apparatus body 8001a and that is not illustrated. As illustrated in FIG. 8-6, positioning members 8201 and multiple positioning pins 8301 and 8302 are disposed at positions that face back surfaces of the development units 8300 and the photoconductor drum units 8200 so as to project toward the back surfaces. An inner frame 8066 that faces the photoconductor drum units 8200 and the development units 8300 has positioning holes 8202, 8303, and 8304 into which the positioning members 8201 and the positioning pins 8301 and 8302 of the photoconductor drum units 8200 and the development units 8300 are inserted. The photoconductor drum units 8200 and the development units 8300 are secured at the operation positions by using a securing unit, not illustrated, after being positioned at the operation positions.

As illustrated in FIG. 8-1, the toner in the respective colors is supplied to the developing devices 8014 (Y, M, C, and K) of the development units 8300 (Y, M, C, and K) from the toner cartridges 8145 (Y, M, C, and K) that are disposed on the upper portion of the intermediate transfer device 8020 with a required timing. The toner in the respective colors that is contained in the toner cartridges 8145 (Y, M, C, and K) is transported in the Y-direction toward the back surface of the apparatus body 8001a. As illustrated in FIG. 8-7, supply pipes 8146 that extend downward in the Z-direction are connected to end portions of the toner cartridges 8145 (Y, M, C, and K) along the back surface. As illustrated in FIG. 8-6 and FIG. 8-7, coupling portions 8147 that are examples of projecting portions that are coupled with the developing devices 8014 (Y, M, C, and K) and that supply the toner are disposed on lower end portions of the supply pipes 8146. First shutter members, not illustrated, are mounted on the coupling portions 8147 and normally keep blocking supply holes that are formed in the lower end portions of the supply pipes 8146 and that are not illustrated. As illustrated in FIG. 8-7, the coupling portions 8147 are disposed so as to project from opening portions 8067 (see FIG. 8-6) that are formed in the inner frame 8066 of the apparatus body 8001*a* toward the back surface of the apparatus body 8001*a*.

As for each of the developing devices 8014 (Y, M, C, and K), a supply member 8149 that is an example of a projecting portion that is connected to the coupling portion 8147 and that supplies the toner to a location inside the housing 8140 is disposed at an end portion of the mixing transport member 8143 that faces the back surface with the supply member 8149 extending (projecting) toward the back surface of the apparatus body 8001*a*. The supply member 8149 of each of the developing devices 8014 (Y, M, C, and K) has a supply port, not illustrated, on an upper end portion thereof. A second shutter member that is normally urged in a close direction and that is not illustrated is installed in the supply port of the supply member 8149 so as to be openable and closeable.

When each of the developing devices 8014 (Y, M, C, and K) is installed in the apparatus body 8001*a*, the end portion of the housing 8140 that faces the back surface pushes the first shutter member and opens the supply hole, and an end portion of the coupling portion 8147 that faces an inner surface of the apparatus body 8001*a* pushes the second shutter member and opens the supply port. In this way, the toner may be supplied from the supply pipe 8146 into the developing device 8014.

Configuration of Drive Device

FIG. 8-8 illustrates the configuration of the drive device of the image forming apparatus according to the eighth exemplary embodiment. FIG. 8-8 is a rear view with an exterior covering 8068 that is an example of an outer wall that is located on a back surface of the image forming apparatus 8001 removed. The exterior covering is nearer than the inner frame and the drive motor to a location outside the apparatus body 8001*a* and covers at least the inner frame and the drive motor.

As illustrated in FIG. 8-8, the drive device 8070 that drives the imaging devices 8010 (Y, M, C, and K) and the intermediate transfer device 8020 for yellow (Y), magenta (M), cyan (C), and black (K) is installed on the back surface of the apparatus body 8001*a* so as to face back surfaces of the imaging devices 8010 (Y, M, C, and K) and the intermediate transfer device 8020.

As illustrated in FIG. 8-9, the apparatus body 8001*a* includes the inner frame 8066 inside the back surface. The inner frame 8066 includes a first portion 8661 that has a flat plate shape and that is close to and parallel with the exterior covering 8068 (see FIG. 8-7) that is an example of the outer wall of the apparatus body 8001*a* and a second portion 8663 that has a flat plate shape and that is disposed in a portion recessed toward the inside of the apparatus body 8001*a* with a drawing process portion 8662 that tilts with respect to the first portion 8661 interposed therebetween, which are formed by performing, for example, press working (a drawing process) on a metal plate. The first portion 8661 of the inner frame 8066 is disposed so as to face the back surfaces of the imaging devices 8010 (Y, M, C, and K) and the intermediate transfer device 8020 for yellow (Y), magenta (M), cyan (C), and black (K). The second portion 8663 of the inner frame 8066 is disposed below the imaging devices 8010 (Y, M, C, and K) and the intermediate transfer device 8020 for yellow (Y), magenta (M), cyan (C), and black (K) so as to face a side surface thereof. The first portion 8661 and the second portion 8663 of the inner frame 8066 are parallel with the exterior covering 8068. A distance D1 between the second portion 8663 and the exterior covering 8068 of the inner frame 8066 is longer than a distance D2 between the first portion 8661 and the exterior covering 8068 (D1 >D2). The lower end portion of the drawing process portion 8662 of the inner frame 8066 tilts at the same angle as the imaging devices 8010 (Y, M, C, and K) for yellow (Y), magenta (M), cyan (C), and black (K).

The first portion 8661 and the second portion 8663 of the inner frame 8066 are not limited to those having a flat plate shape, and examples thereof widely range from a portion having unevenness to a portion including a tilting part. The first portion 8661 and the second portion 8663 of the inner frame 8066 are not necessarily parallel with the exterior covering 8068 but may tilt with respect to the exterior covering 8068.

As for the inner frame 8066, the first portion 8661 and the second portion 8663 are not necessarily integrally formed. The first portion 8661 and the second portion 8663 may be composed of, for example, different metal plates and coupled with each other into a single piece or may be configurated d as separated bodies.

As illustrated in FIG. 8-8, the drive device 8070 has a flat box shape such that a length (thickness) in a depth Y direction of a substantially rectangular shape in a plan view is relatively short (thin). As for the drive device 8070, as illustrated in FIG. 8-7, a device substrate 8701 is disposed on a side surface of the apparatus body 8001*a* with the device substrate 8701 extending in the Z-direction, and an end surface of the apparatus body 8001*a* that faces the back surface is covered by a covering 8701*a*.

Figures 1, 2, 3, 4, 5, 6, 7, 8, 9, 10:
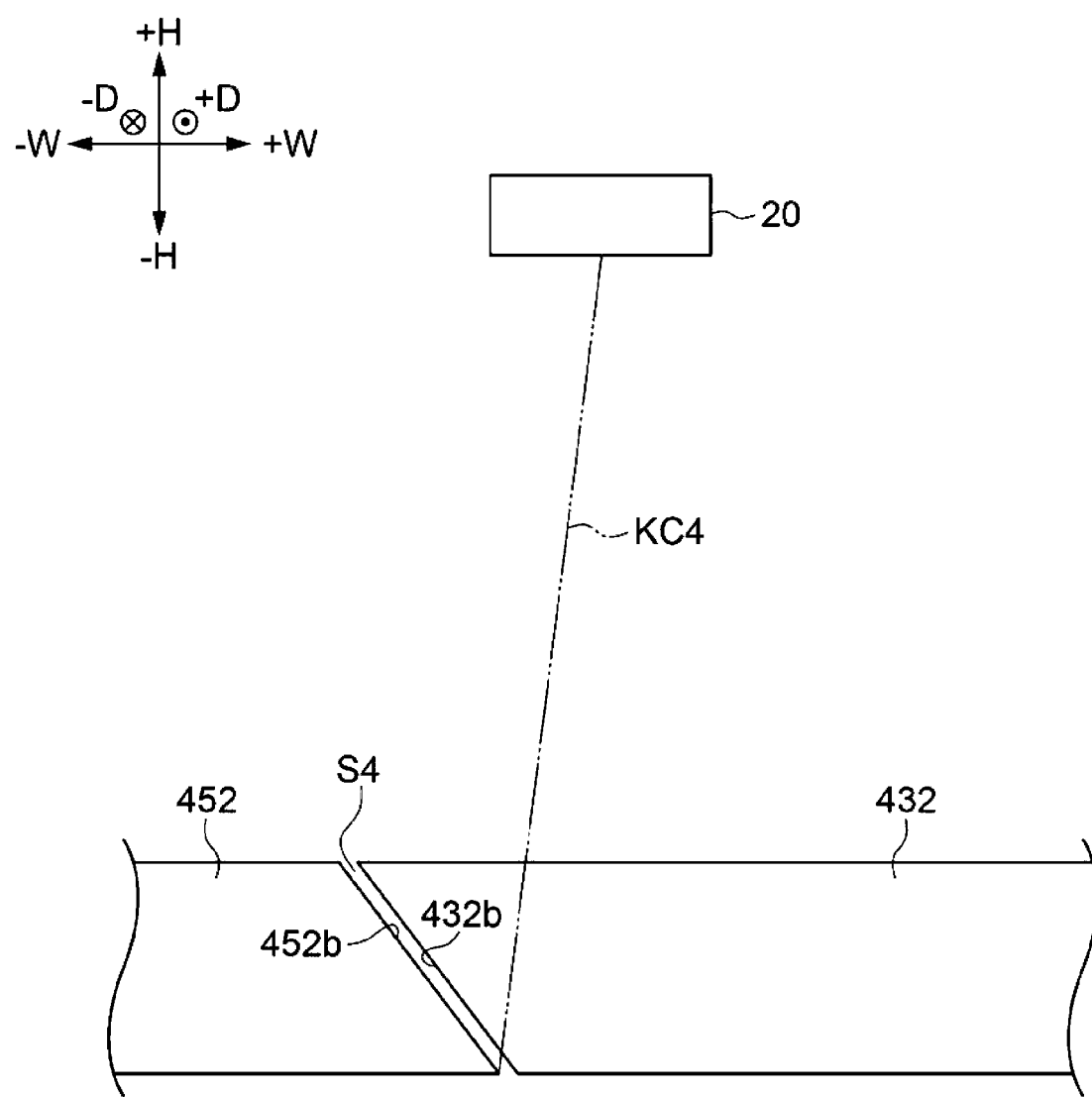
Figures 1, 2, 3, 4, 5, 6, 7, 8, 9, 10, 11:
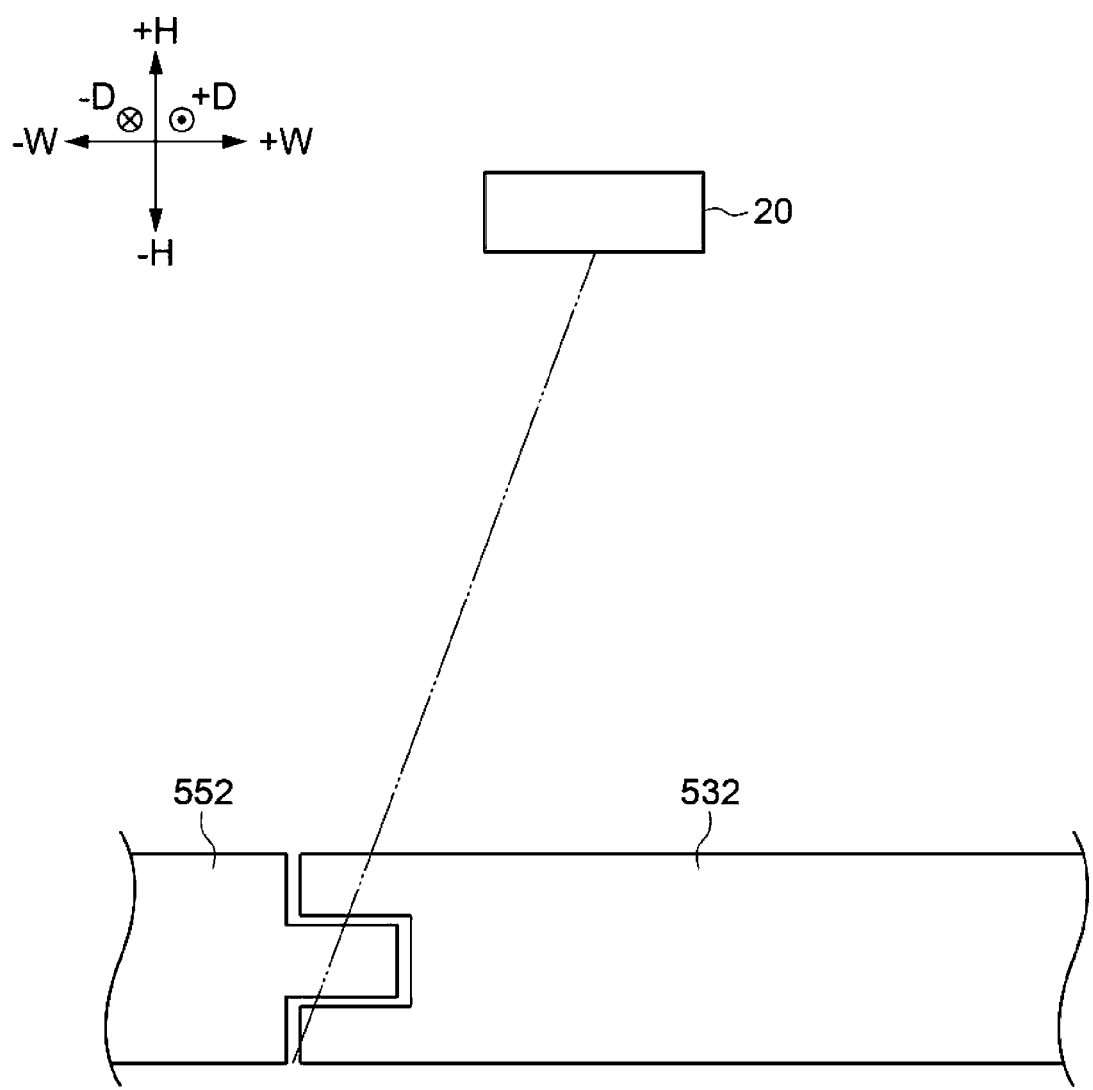
Figures 1, 2, 3, 4, 5, 6, 7, 8, 9, 10, 11, 12:
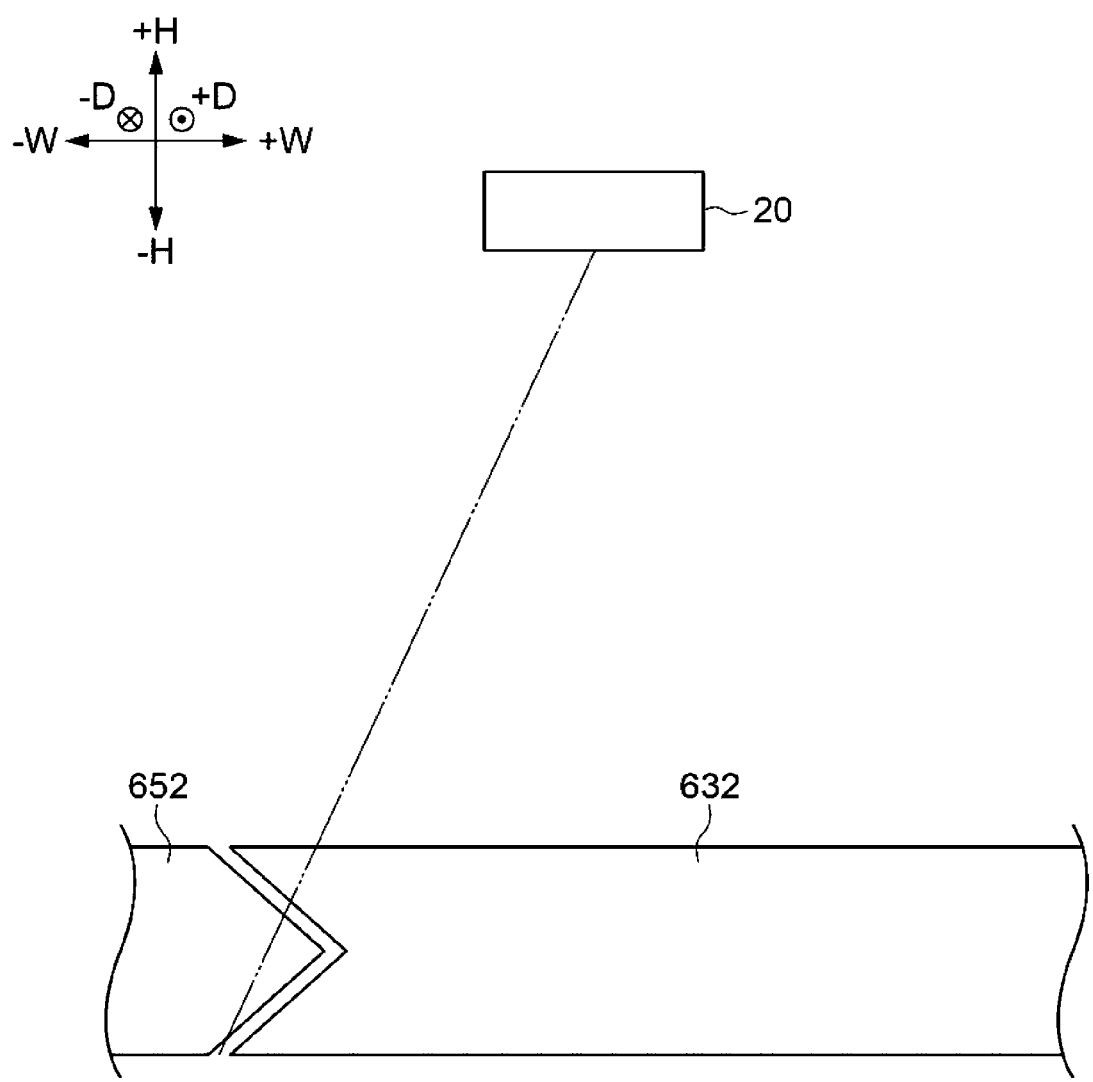
Figures 1, 2:
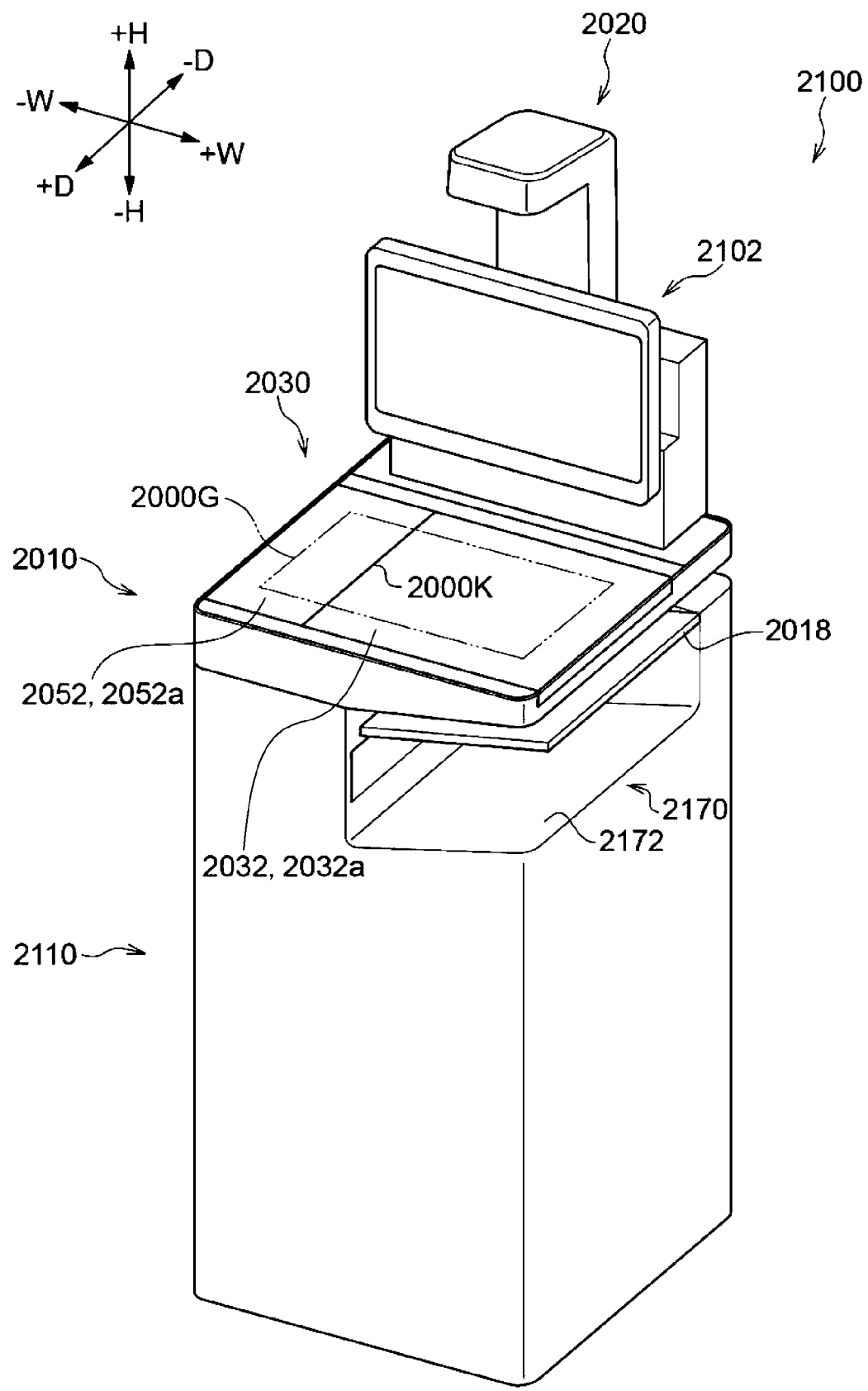
Figure 2:
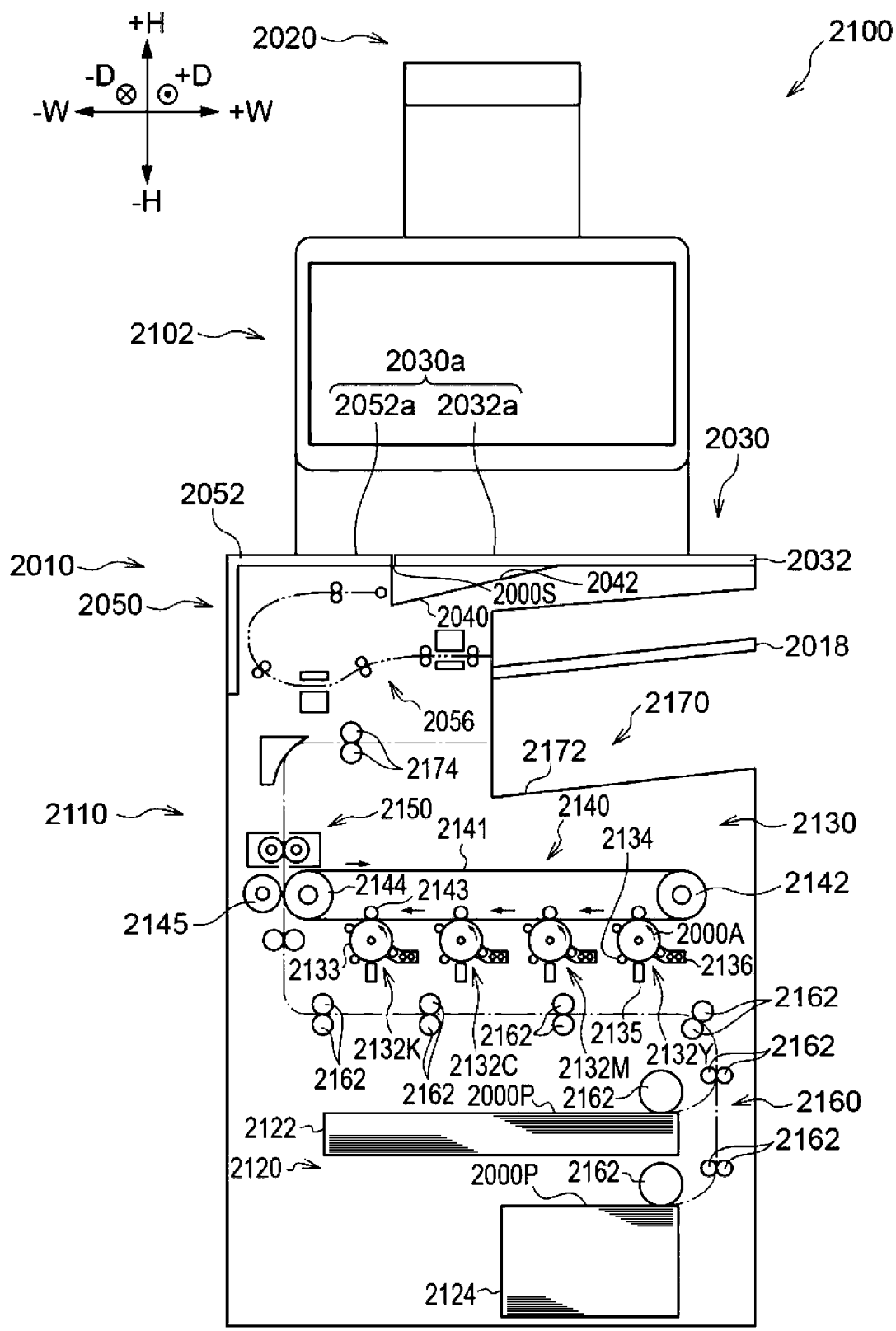
Figures 2, 3:
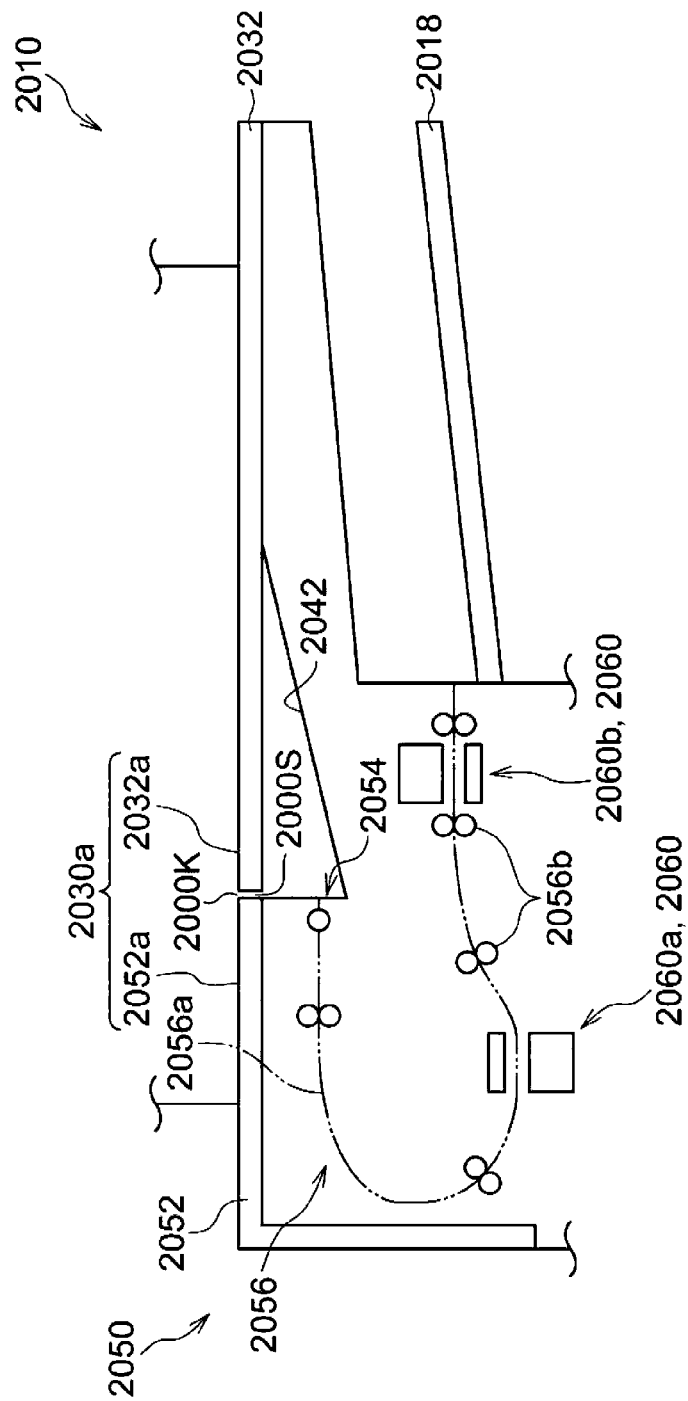
Figures 2, 3, 4:
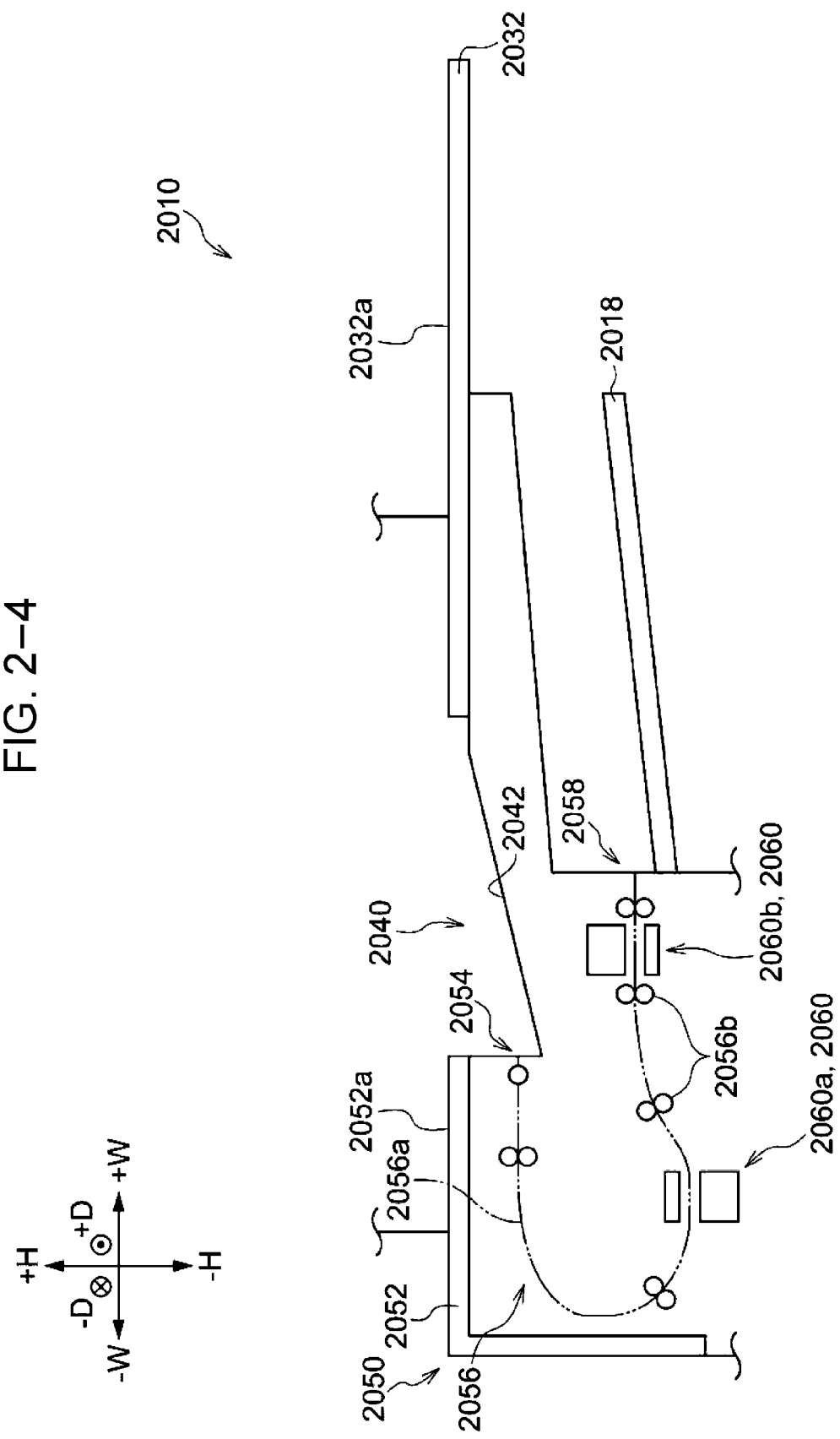
Figures 2, 3, 4, 5:
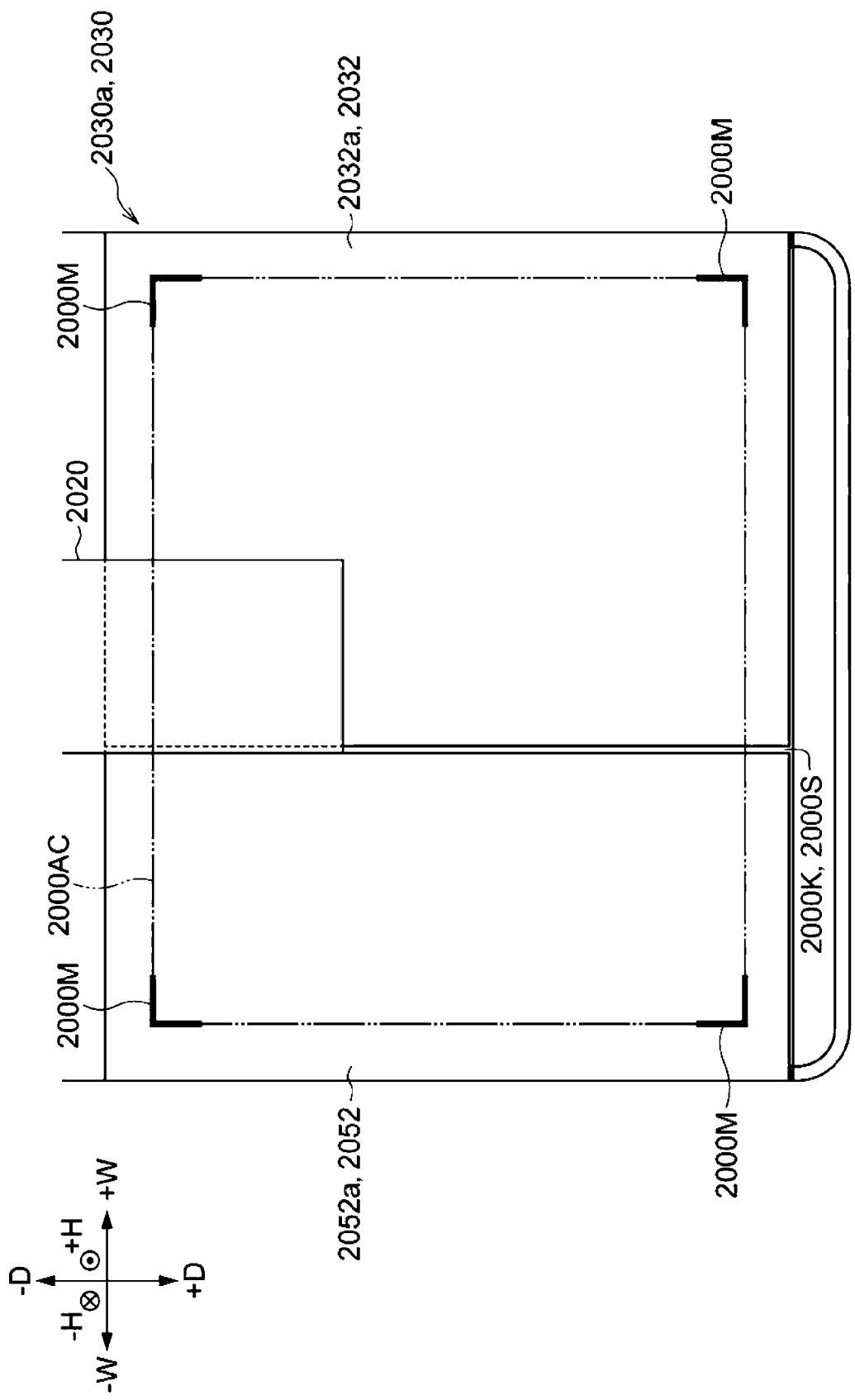
Figures 2, 3, 4, 5, 6:
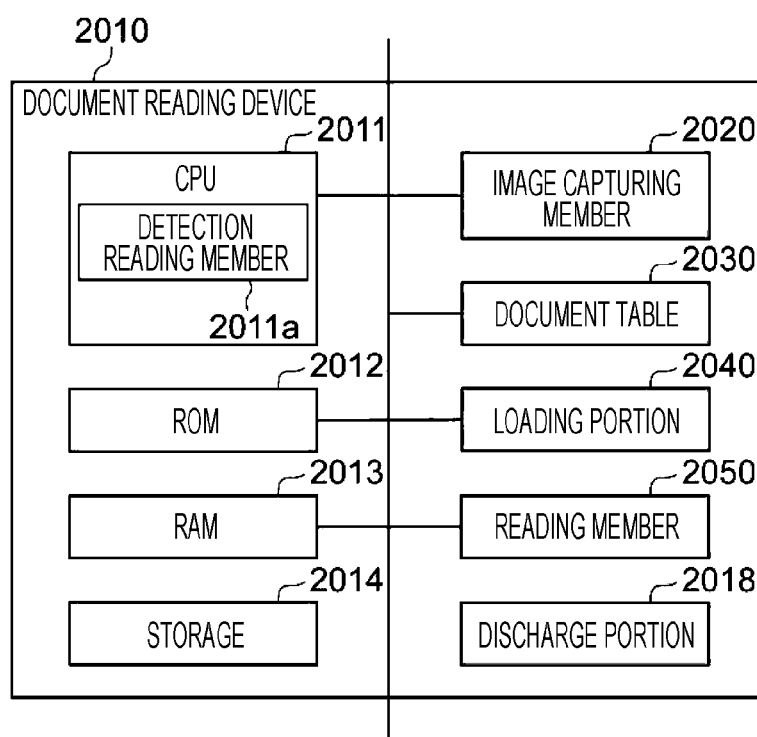
Figures 1, 3:
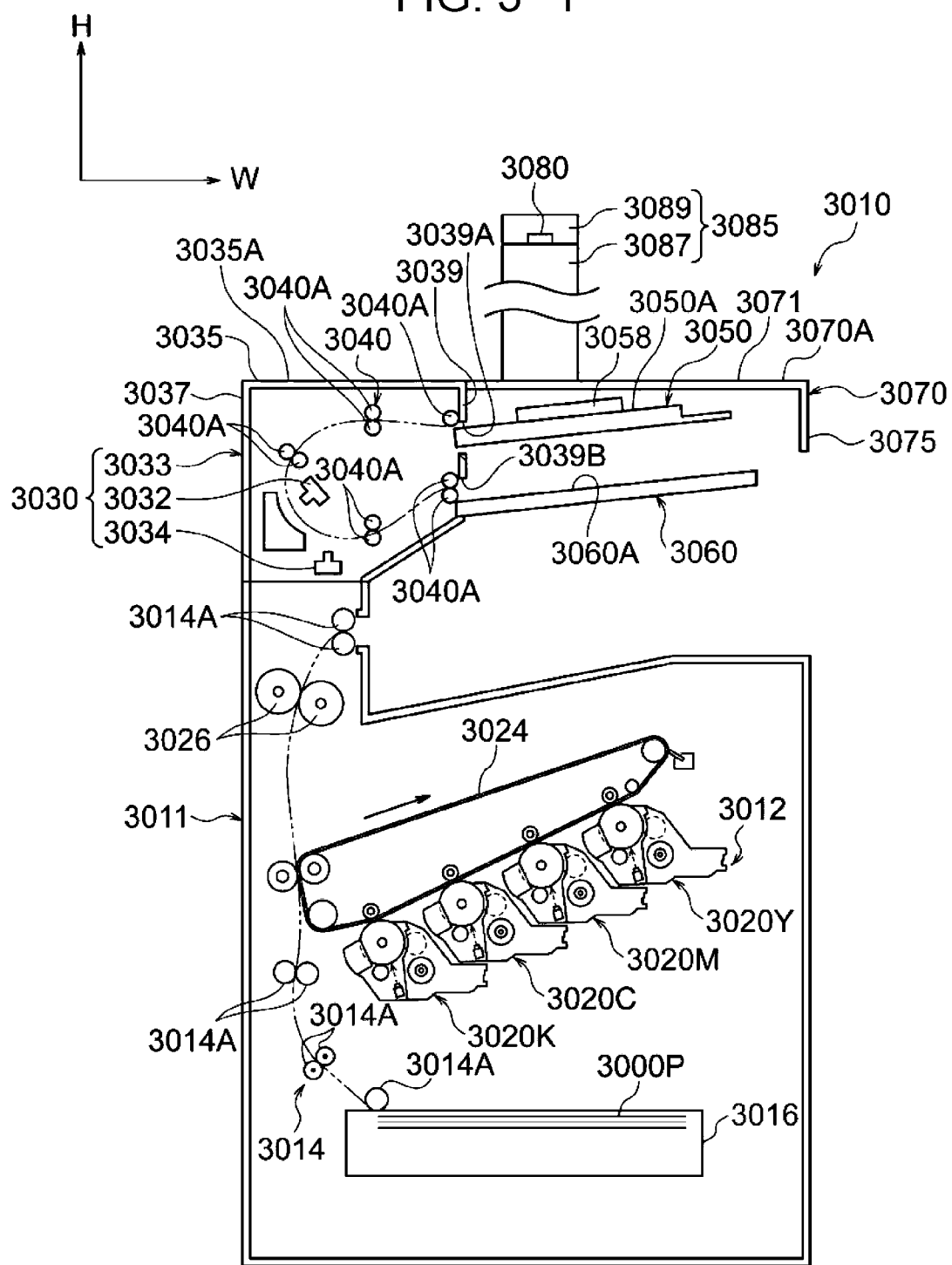
Figures 2, 3:
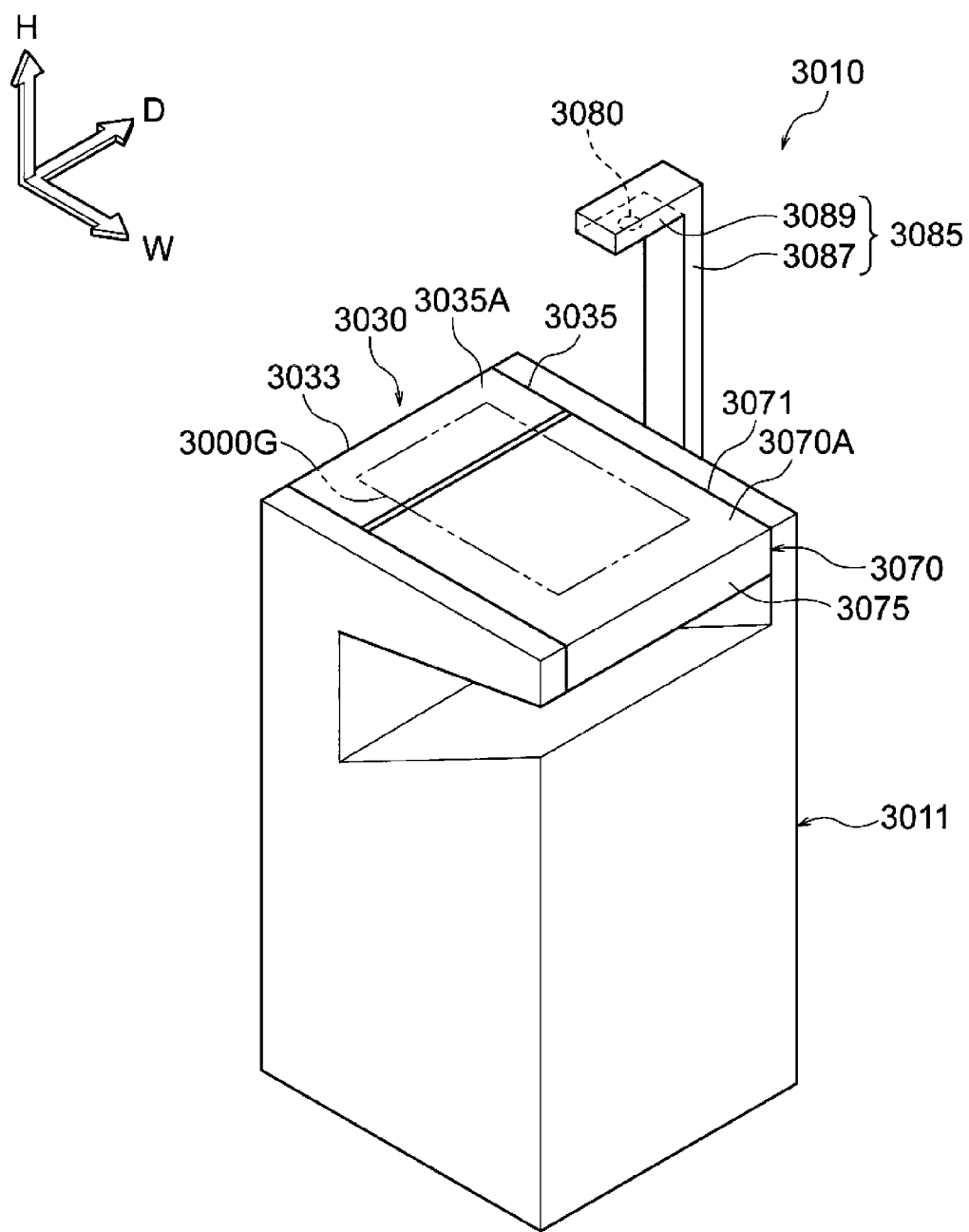
Figure 3:
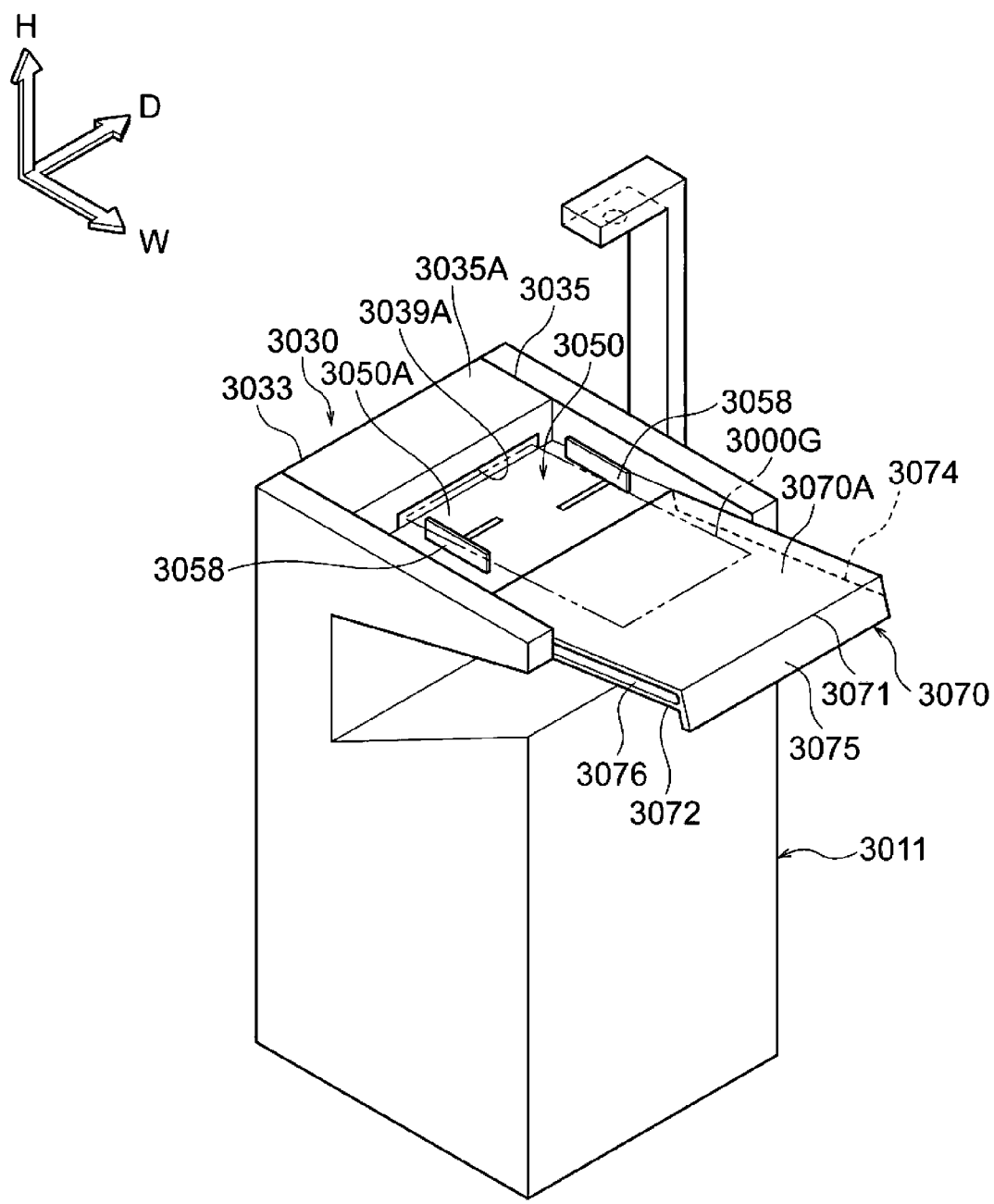
Figures 3, 4:
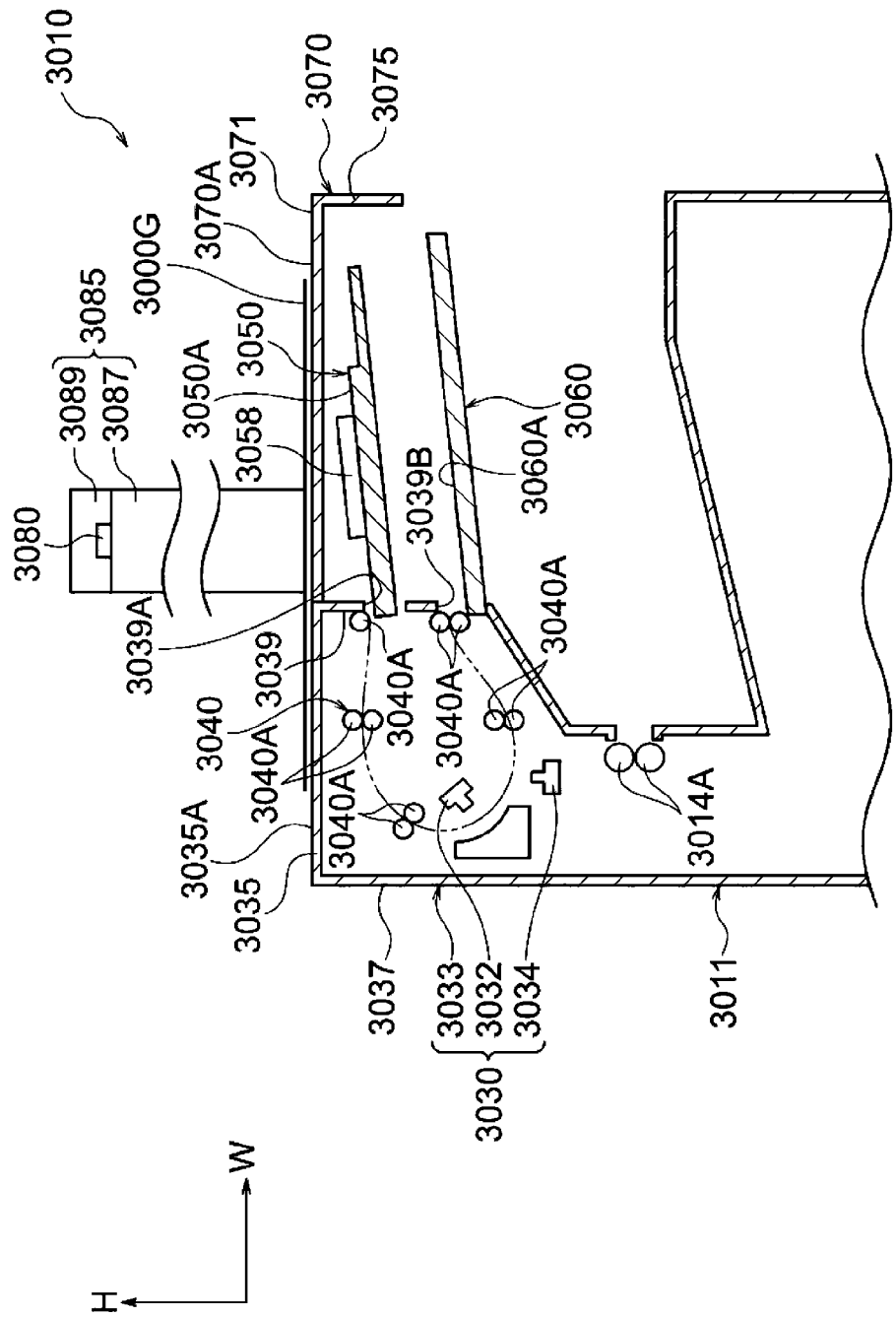
Figures 3, 4, 5:
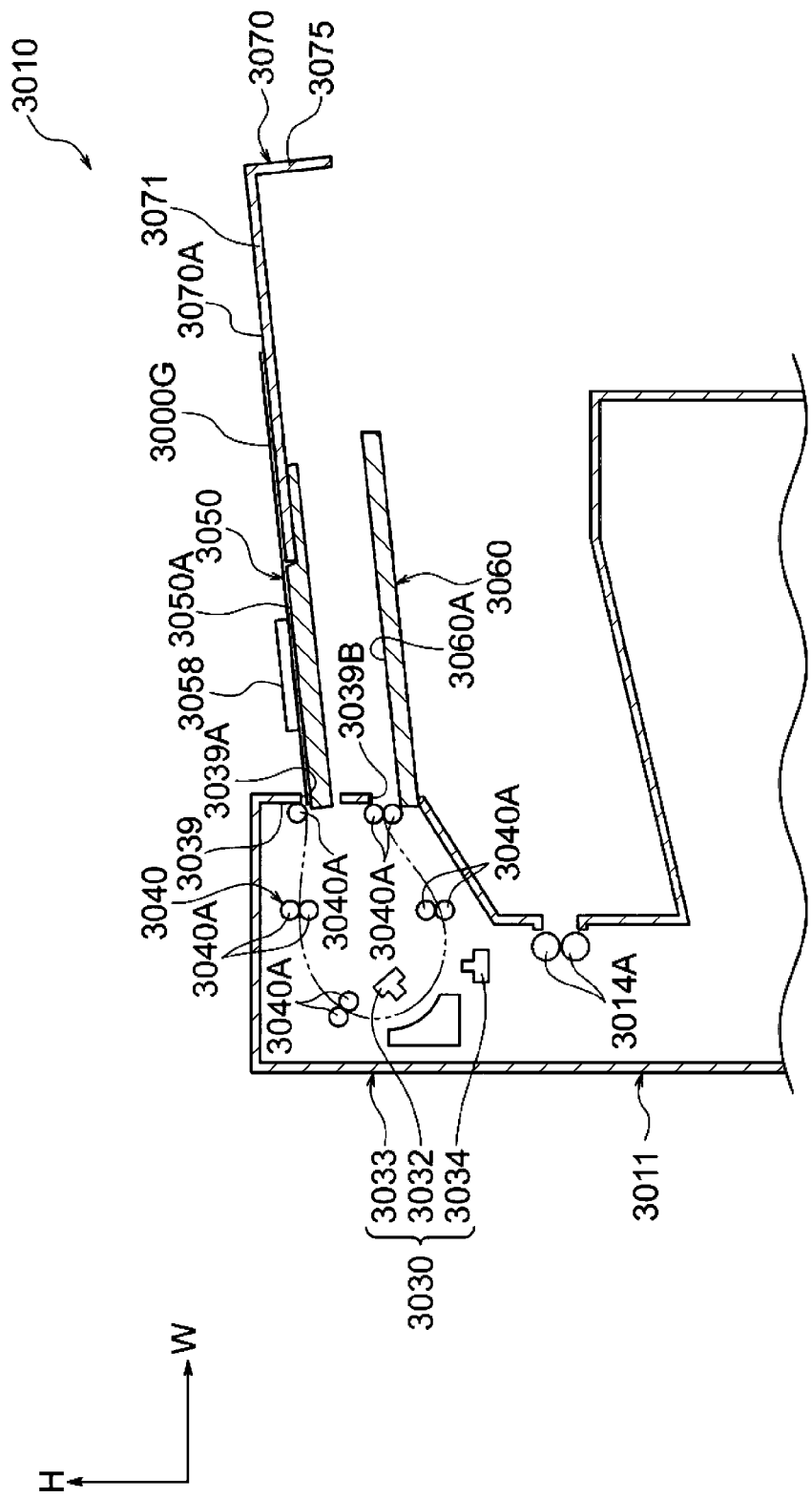
Figures 3, 4, 5, 6:
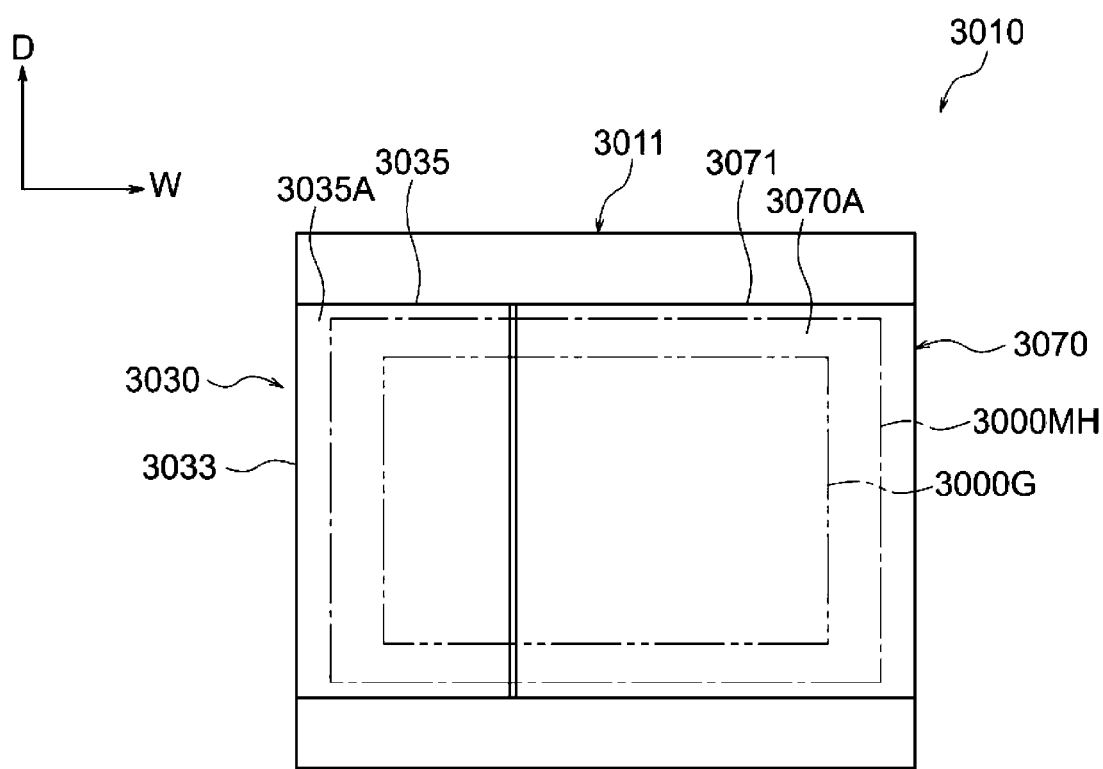
Figures 3, 4, 5, 6, 7:
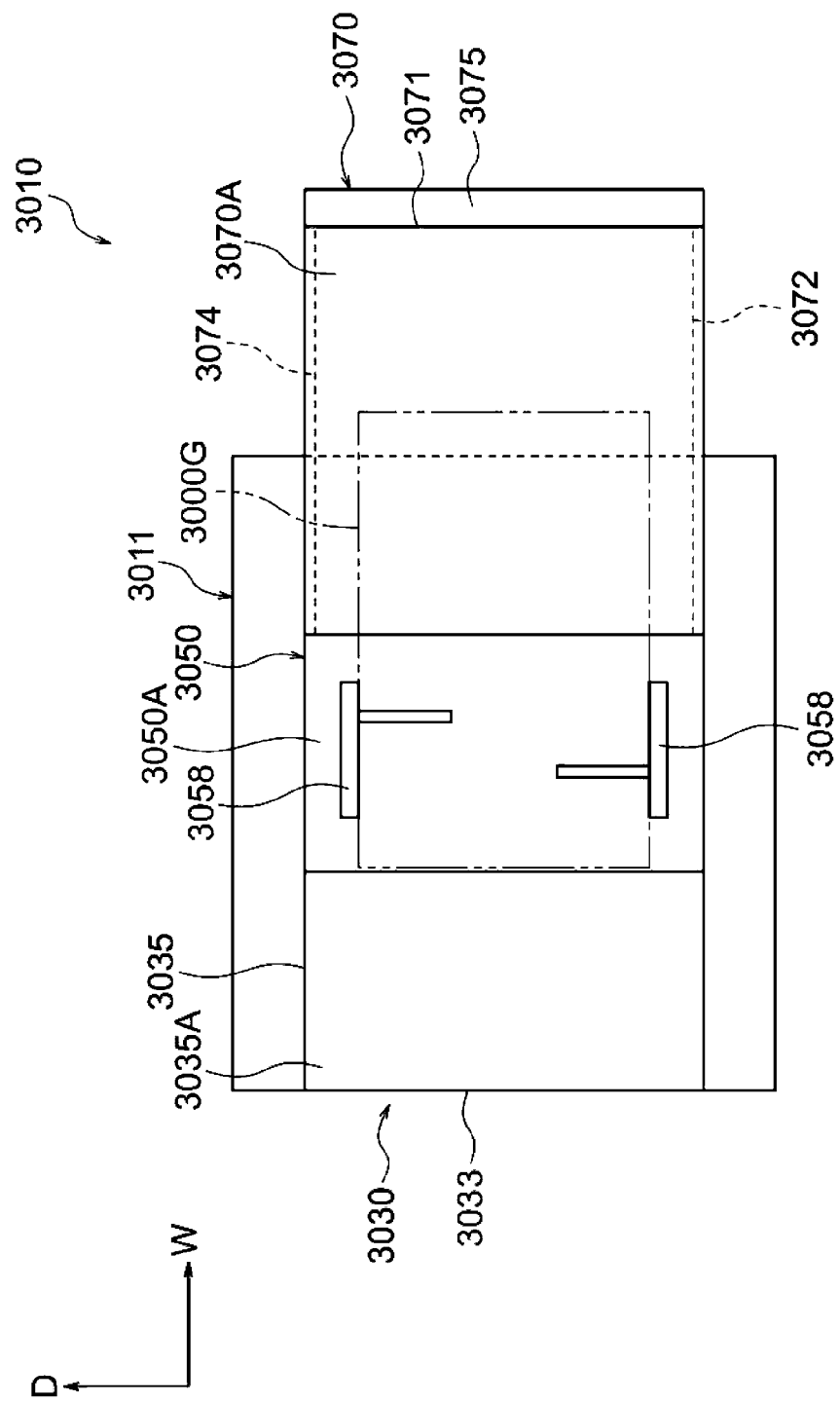
Figures 3, 4, 5, 6, 7, 8:
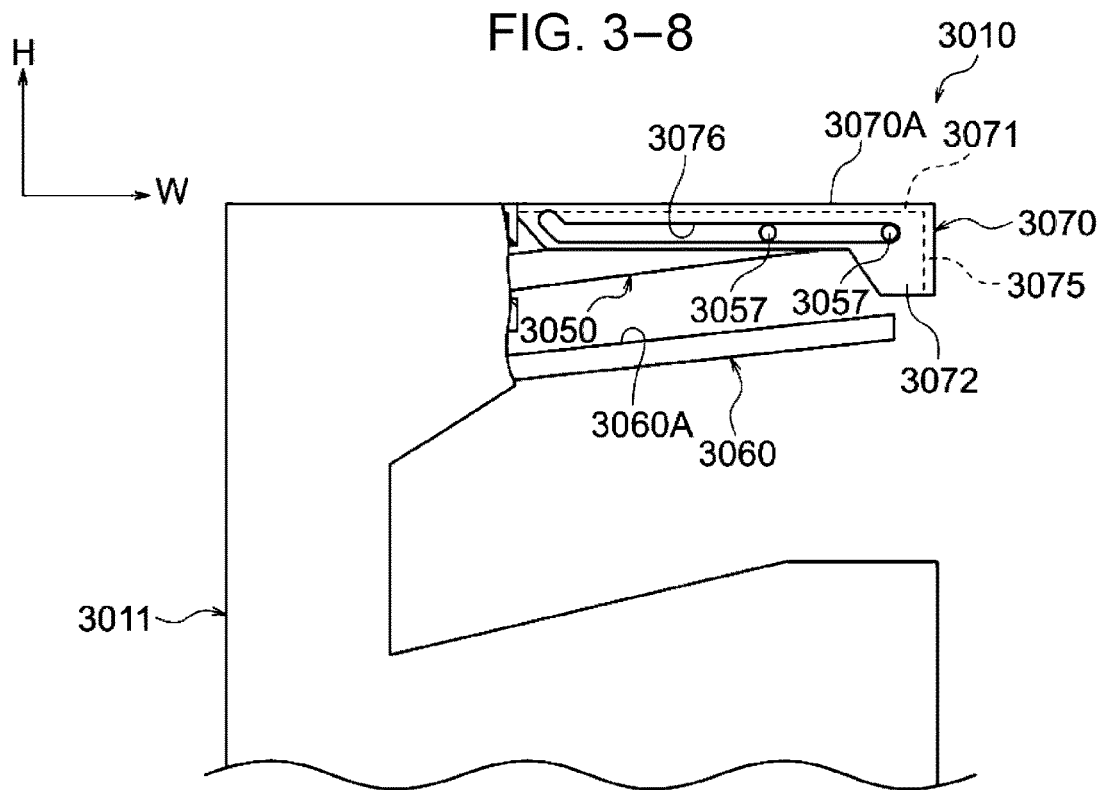
Figures 3, 4, 5, 6, 7, 8, 9:
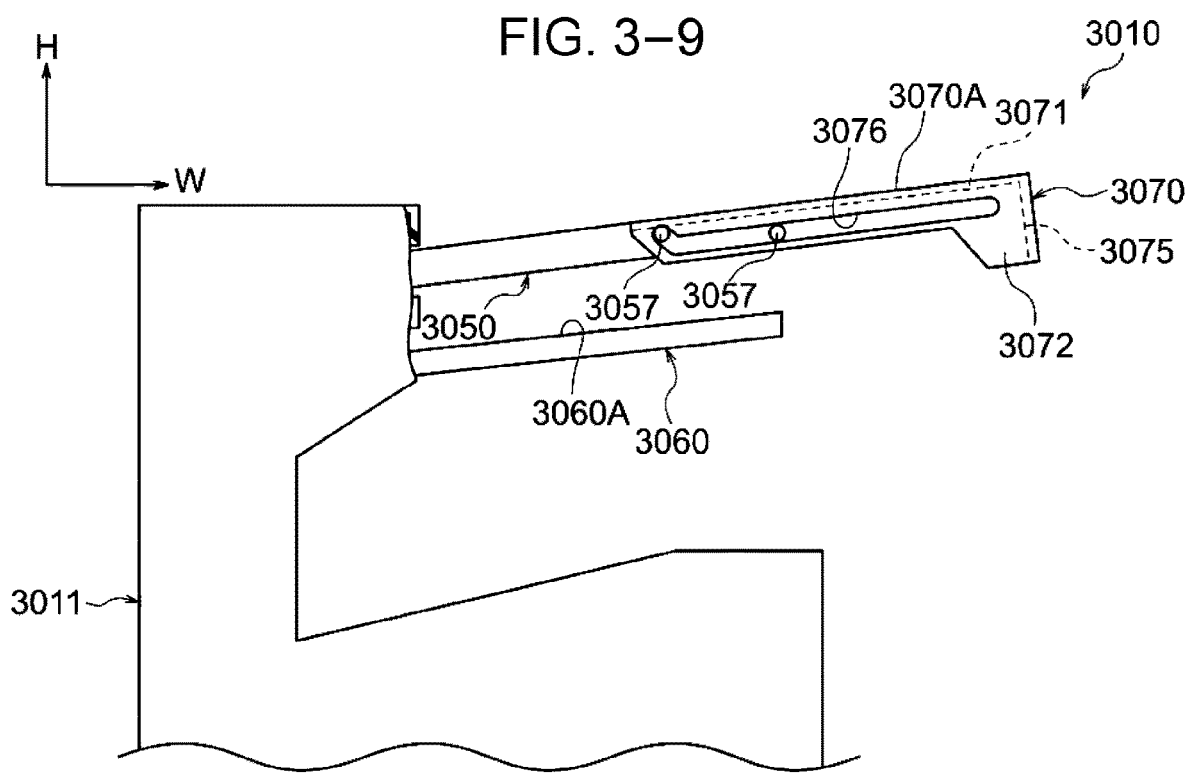

As illustrated in FIG. 8-10, the drive device 8070 includes a first drive motor 8702 that is an example of a drive unit (a drive source) that drives the developing devices 8014 (Y, M, and C) for the colors of yellow (Y), magenta (M), and cyan (C), a second drive motor 8703 that is an example of a drive unit (a drive source) that drives the intermediate transfer belt 8021, the photoconductor drum 8011K for black (K), and the developing device 8014K for black (K), and a third drive motor 8704 that is an example of a drive unit (a drive source) that drives the photoconductor drums 8011 (Y, M, and C) for the colors of yellow (Y), magenta (M), and cyan (C). According to the eighth exemplary embodiment, the first to third drive motors 8702 to 8704 are mounted on the device substrate 8701.

The first to third drive motors 8702 to 8704 are configurated d in the same manner. As illustrated in FIG. 8-11, each of the first to third drive motors 8702 to 8704 includes a substrate 8705 that has a substantially rectangular shape in a plane view. A motor body 8706 that is an example of a drive member body that includes a motor with built-in reduction mechanism is disposed on a back surface of the substrate 8705 so as to project into a short cylindrical shape. A drive shaft 8707 is disposed on a front surface of the substrate 8705 so as to project from the motor body 8706 in a direction. Mounting internal thread portions 8708 for mounting the first to third drive motors 8702 to 8704 are disposed on the outer circumference of the drive shaft 8707 at three positions along a circumferential direction. In FIG. 8-11, reference characters 8709 designate a column boss for positioning each of the first to third drive motors 8702 to 8704.

As for each of the first to third drive motors 8702 to 8704, the rotating shaft of a built-in motor, not illustrated, is rotated, the number of rotation of the rotating shaft is decreased by the built-in reduction mechanism, and the drive shaft 8707 is rotated at a predetermined number of rotation. The first to third drive motors 8702 to 8704 may not include the built-in reduction mechanism.

As illustrated in FIG. 8-9 and FIG. 8-10, the first to third drive motors 8702 to 8704 are disposed on the second portion 8663 of the inner frame 8066. The first drive motor 8702 is disposed so as to face downward on an upper left part of the second portion 8663 of the inner frame 8066 when viewed from the back surface. The second drive motor 8703 is disposed so as to face downward and so as to be adjacent to the first drive motor 8702 slightly below the first drive motor 8702. The third drive motor 8704 is horizontally disposed so as to face the second drive motor 8703 at a position slightly away from the second drive motor 8703 to a central portion below the second drive motor 8703.

As illustrated in FIG. 8-7, the first to third drive motors 8702 to 8704 are disposed with the drive shaft 8707 projecting from the motor body 8706 toward the exterior covering 8068. The first to third drive motors 8702 to 8704 are configured d such that the length of a mountable region in the axial direction of the drive shaft 8707 is longer than the distance D2 between the first portion 8661 of the inner frame 8066 and the exterior covering 8068.

As illustrated in FIG. 8-10, the drive shaft 8707 of the first drive motor 8702 is configured d as a drive gear 8710 that includes, for example, a helical gear or a spur gear. A first transmission gear 8711 that transmits rotation driving force to the developing devices 8014 (Y, M, and C) for the colors of yellow (Y), magenta (M), and cyan (C) is engaged with the drive gear 8710 of the first drive motor 8702. As illustrated in FIG. 8-12, a second transmission gear 8712 that is disposed inside the apparatus body 8001a and that has a relatively large outer diameter is engaged with the first transmission gear 8711. A developing device drive gear 8080Y that faces an end portion of the developing device 8014Y for yellow (Y) in the axial direction is engaged with the second transmission gear 8712. A developing device drive gear 8080M that faces an end portion of the developing device 8014M for magenta (M) in the axial direction is engaged with the second transmission gear 8712 with third and fourth transmission gears 8713 and 8714 that have a relatively small outer diameter interposed therebetween. A developing device drive gear 8080C that faces an end portion of the developing device 8014C for cyan (C) in the axial direction is engaged with the fourth transmission gear 8714 with fifth and sixth transmission gears 8715 and 8716 that have a relatively small outer diameter interposed therebetween.

Accordingly, the drive device 8070 rotates the first drive motor 8702 and consequently rotates the developing device drive gears 8080 (Y, M, and C) that face the respective end portions of the developing devices 8014 (Y, M, and C) for the colors of yellow (Y), magenta (M), and cyan (C) in the axial direction.

As illustrated in FIG. 8-10, the drive shaft 8707 of the second drive motor 8703 is configured d as a drive gear 8717 that includes, for example, a helical gear or a spur gear. A seventh transmission gear 8718 that transmits rotation driving force to the photoconductor drum unit 8200K for black (K), a first transmission pulley 8719 that transmits rotation driving force to the developing device 8014K for black (K), and an eighth transmission gear 8720 that transmits rotation driving force to the belt support roller 8022 of the intermediate transfer device 8020 are engaged with the drive gear 8717 of the second drive motor 8703.

A ninth transmission gear 8721 that has a relatively large outer diameter and a tenth transmission gear 8722 that has a relatively small outer diameter are engaged with the seventh transmission gear 8718. A photoconductor drive gear 8081K that faces an end portion of the photoconductor drums 8011K for black (K) in the axial direction is engaged with the tenth transmission gear 8722. The rotation driving force of the first transmission pulley 8719 is transmitted to a second transmission pulley 8724 via a timing belt 8723. The first and second transmission pulleys 8719 and 8724 are engaged with the timing belt 8723 and include gears. A developing device drive gear 8080K that faces an end portion of the developing device 8014K for black (K) in the axial direction is engaged with the second transmission pulley 8724 with eleventh to thirteenth transmission gears 8725 to 8727 interposed therebetween. The eleventh transmission gear 8725 includes multiple transmission gears that are integrally formed in the axial direction and is configurated d so as to be capable of transmitting driving force also in the axial direction.

An intermediate transfer body drive gear 8082 that faces an end portion of the belt support roller 8022 of the intermediate transfer device 8020 in the axial direction is engaged with the eighth transmission gear 8720 with a fourteenth transmission gear 8728 that has a relatively small outer diameter and fifteenth and sixteenth transmission gears 8729 and 8730 that have an outer diameter smaller than that interposed therebetween.

Accordingly, the drive device 8070 rotates the second drive motor 8703 and consequently rotates the developing device drive gear 8080K that faces the end portion of the developing device 8014K for black (K) in the axial direction, the photoconductor drive gear 8081K that faces an end portion of the photoconductor drum 8011K for black (K) in the axial direction, and the intermediate transfer body drive gear 8082 that faces the end portion of the belt support roller 8022 of the intermediate transfer device 8020 in the axial direction.

As illustrated in FIG. 8-10, the drive shaft 8707 of the third drive motor 8704 is configured d as a drive gear 8731 that includes, for example, a helical gear or a spur gear. A seventeenth transmission gear 8732 that transmits rotation driving force to the photoconductor drums 8011 (Y, M, and C) for the colors of yellow (Y), magenta (M), and cyan (C) is engaged with the drive gear 8731 of the third drive motor 8704. Photoconductor drive gears 8081 (M and C) that face end portions of the photoconductor drums 8011 (M and C) for magenta (M) and cyan (C) in the axial direction are engaged with the seventeenth transmission gear 8732. A photoconductor drive gear 8081Y that faces an end portion of the photoconductor drum 8011Y for yellow (Y) in the axial direction is engaged with the photoconductor drive gear 8081M of the photoconductor drums 8011M for magenta (M) with an eighteenth transmission gear 8734 that has a relatively small outer diameter interposed therebetween.

Accordingly, the drive device 8070 rotates the third drive motor 8704 and consequently rotates the developing device drive gears 8080 (Y, M, and C) that face the end portions of the developing devices 8014 (Y, M, and C) for the colors of yellow (Y), magenta (M), and cyan (C) in the axial direction.

As illustrated in FIG. 8-12, the drive device 8070 includes photoconductor member principal couplings 8810 (Y, M, C, and K) and developing device principal couplings 8830 (Y, M, C, and K) that are examples of first and second connection transmission units that are movable in the axial direction of the photoconductor drive gears 8081 (Y, M, C, and K) and the developing device drive gears 8080 (Y, M, C, and K). The drive device 8070 includes an intermediate transfer device principal coupling 8840 that is an example of a third connection transmission unit that is movable in the axial direction of the belt support roller 8022 of the intermediate transfer device 8020.

As illustrated in FIG. 8-13, each of the photoconductor drive gears 8081 (Y, M, C, and K) includes a shaft core 8811 that projects toward a side surface, that has a cylindrical shape, and that is integrally formed at the center. Each of the photoconductor member principal couplings 8810 is installed on the shaft core 8811 so as to be urged in a projection direction parallel to the rotation axis direction of the side surface of the photoconductor drive gear 8081. The photoconductor member principal coupling 8810 includes a first gear portion 8812 that has a spur gear formed on the outer circumference by using an involute gear and that has a cylindrical shape and a second gear portion 8813 that has a spur gear formed on the outer circumference by using an involute gear, that has an outer diameter smaller than that of the first gear portion 8812, that has a cylindrical shape, and that is at an end of the first gear portion 8812, and these are integrally formed. A tapered portion 8814 that has a tapered shape is disposed at an end of the second gear portion 8813. The photoconductor member principal coupling 8810 includes a first contact portion 8815 that projects into an annular shape outward in a radial direction between the first gear portion 8812 and the second gear portion 8813.

The shaft core 8811 of each photoconductor drive gear 8081 includes an internal gear 8816 that is formed by using a spur gear that is an involute gear that is engage with the first gear portion 8812 of the photoconductor member principal coupling 8810. The photoconductor member principal coupling 8810 is configured d so as to be movable in the axial direction with the first gear portion 8812 engaged with the internal gear 8816 of the photoconductor drive gear 8081 and with the rotation driving force transmitted. As illustrated in FIG. 8-15, the second gear portion 8813 of the photoconductor member principal coupling 8810 is configured d so as to be capable of being engaged (connected) with and separated from a photoconductor member sub-coupling 8850 that is an example of the second connection transmission unit that is disposed at an end portion of the photoconductor drum 8011 of the photoconductor drum unit 8200 in the axial direction. The photoconductor member sub-coupling 8850 includes an internal gear 8817 that is formed on the inner circumferential surface thereof by using a spur gear that is an involute gear that is engaged with the second gear portion 8813 of the photoconductor member principal coupling 8810 and has a cylindrical shape. A tapered portion 8818 the diameter of which increases in the direction toward the end portion is disposed at an opening edge of the internal gear 8817. The photoconductor member sub-coupling 8850 is installed so as to be secured to the end portion of the photoconductor drums 8011 in the axial direction. A protection member 8819 that protects the photoconductor member sub-coupling 8850 and that has a cylindrical shape is disposed on the outer circumference of the photoconductor member sub-coupling 8850 and on a side surface of the photoconductor drum unit 8200 so as to project sideways.

The photoconductor member principal coupling 8810 is not limited to a coupling that has the first and second gear portions 8812 and 8813 that are formed by the involute gears. The photoconductor drums 8011 that are rotated by using the photoconductor member principal coupling 8810 directly affects image quality and may accordingly have a small variation in speed and high rotation precision. The photoconductor member principal coupling 8810 that includes the first and second gear portions 8812 and 8813 that are formed by the involute gears is capable of transmitting rotation driving force to the photoconductor drums 8011 with relatively high rotation precision and may be accordingly used.

As illustrated in FIG. 8-13, the photoconductor member principal coupling 8810 is urged in the projection direction by using a first coil spring 8820 that is an example of a first urging unit that is interposed between an inner end surface of the shaft core 8811 of each photoconductor drive gear 8081 and an inner end surface of the first gear portion 8812. As for the photoconductor member principal coupling 8810, the amount of projection in the axial direction of the photoconductor drive gear 8081 is restricted by a stationary shaft 8821 that is installed on the shaft core 8811 of the photoconductor drive gear 8081.

As illustrated in FIG. 8-16, a developing device principal coupling 8830 is installed on each of the developing device drive gears 8080 (Y, M, C, and K) so as to be movable with the amount of projection restricted in the axial direction of the rotating shaft. The developing device drive gear 8080 includes a drive transmission shaft 8831 that is disposed on a side surface thereof so as to project in the axial direction, that has a substantially column or cylindrical shape, and that is integrally formed. Multiple (three projecting portions in an illustrated example) first projecting portions 8832 that have a substantially semicircular section are integrally formed on the outer circumference of the drive transmission shaft 8831 in the circumferential direction. The three first projecting portions 8832 are disposed on the outer circumference of the drive transmission shaft 8831 and form an angle of 120 degrees therebetween. The first projecting portions 8832 extend over the entire drive transmission shaft 8831 in the axial direction. A first shaft support 8833 that is formed around the outer circumference of the drive transmission shaft 8831 and that has a cylindrical shape is disposed on the developing device drive gear 8080.

The developing device principal coupling 8830 has a substantially cylindrical shape. The developing device principal coupling 8830 has an installation hole 8835, along the inner circumferential surface thereof, including multiple first recessed portions 8834 with which the multiple first projecting portions 8832 of the drive transmission shaft 8831 are engaged. A base end portion of the developing device principal coupling 8830 includes a second contact portion 8836 that projects into an annular shape outward in the radial direction and that is integrally formed. Multiple (three projecting portions in an illustrated example) second projecting portions 8837 that have a substantially semicircular shape are integrally formed at an end of the developing device principal coupling 8830 in the circumferential direction so as to project sideways. The second projecting portions 8837 are disposed at the same positions in the circumferential direction of the developing device principal coupling 8830 as those of the first projecting portions 8832 of the developing device drive gears 8080.

As illustrated in FIG. 8-13, the multiple second projecting portions 8837 of each developing device principal coupling 8830 are configured d so as to be capable of being engaged (connected) with and separated from the developing device sub-coupling 8301 that is an example of a second drive transmission unit that is disposed at an end portion of the development roller 8141 of the development unit 8300 in the axial direction. The developing device sub-coupling 8301 includes the multiple second recessed portions 8302 that are engaged with the multiple first projecting portions 8832 of the developing device principal coupling 8830 and that are formed on the inner circumferential surface thereof. As illustrated in FIG. 8-16, the developing device principal coupling 8830 is urged in the projecting direction by using a second coil spring 8838 that is an example of a second urging unit that is interposed between an end surface of each developing device drive gear 8080 and a lower end surface of the second contact portion 8836. As illustrated in FIG. 8-15, the developing device principal coupling 8830 is in contact with the developing device sub-coupling 8301 of the development roller 8141 and is mounted so as to be rotatable with the position of the projection restricted. The position of the projection of the developing device principal coupling 8830 is restricted by a restriction member, not illustrated.

As illustrated in FIG. 8-12, the intermediate transfer device principal coupling 8840 that is an example of a first connection transmission unit is installed on the intermediate transfer body drive gear 8082 so as to be movable in the axial direction. The intermediate transfer device principal coupling 8840 is configurated d in the same manner as the photoconductor member principal coupling 8810.

Operation of Drive Device

As for the drive device 8070 that is used for the image forming apparatus 8001 according to the eighth exemplary embodiment, in which the drive unit is disposed between the outer wall and the inner frame that supports the photoconductor drums 8011 and the developing devices 8014 that are examples of a unit to be driven, a distance between the inner frame and the outer wall may be smaller than that in the case where the drive unit is disposed between a portion of the inner frame that is nearest to the outer wall and the outer wall, which is achieved in the manner described below.

That is, as illustrated in FIG. 8-7, the drive device 8070 according to the eighth exemplary embodiment is disposed at an end portion that faces the back surface inside the apparatus body 8001a. There is the inner frame 8066 at the end portion that faces the back surface of the apparatus body 8001a.

The supply members 8149 of the developing devices 8014 (Y, M, C, and K) for yellow (Y), magenta (M), cyan (C), and black (K) are disposed on the first portion 8661 of the inner frame 8066 so as to project from the first portion 8661 toward the back surface.

For this reason, as for the drive device 8070 that drives the developing devices 8014 (Y, M, C, and K) and the photoconductor drums 8011 (Y, M, C, and K) for yellow (Y), magenta (M), cyan (C), and black (K), it is necessary for the transmission gears that transmit the driving force of the first to third drive motors 8702 to 8704 to the developing devices 8014 (Y, M, C, and K) and the photoconductor drums 8011 (Y, M, C, and K) to be disposed so as to avoid the supply members 8149 of the developing devices 8014 (Y, M, C, and K) in the past as illustrated in FIG. 8-17.

Consequently, as for an existing drive device, it is necessary for the first to third drive motors 8702 to 8704 to further approach the back surface of the apparatus body 8001a, a distance between the first portion 8661 of the inner frame 8066 and the exterior covering 8068 increases, and the size of the apparatus body 8001a increases.

As for the drive device 8070 according to the eighth exemplary embodiment, however, as illustrated in FIG. 8-7, the first to third drive motors 8702 to 8704 are configurated d so as not to be disposed between the first portion 8661 and the exterior covering 8068 such that the distance from the exterior covering 8068 is shortest in the inner frame 8066, but the first to third drive motors 8702 to 8704 are disposed on the second portion 8663 such that the distance D1 is longer than that in the case of the first portion 8661 that has the shortest distance from the exterior covering 8068 in the inner frame 8066.

For this reason, as for the drive device 8070 that drives the developing devices 8014 (Y, M, C, and K) and the photoconductor drums 8011 (Y, M, C, and K) for yellow (Y), magenta (M), cyan (C), and black (K), as illustrated in FIG. 8-7, the first to third drive motors 8702 to 8704 may be disposed on the second portion 8663 such that the distance D1 is larger than that in the case of the first portion 8661 that has the shortest distance from the exterior covering 8068 in the inner frame 8066 with the drive shaft 8707 projecting from the motor body 8706 toward the exterior covering 8068.

Therefore, as for the drive device 8070 that drives the developing devices 8014 (Y, M, C, and K) and the photoconductor drums 8011 (Y, M, C, and K) for yellow (Y), magenta (M), cyan (C), and black (K), only the transmission gears that transmit the driving force of the first to third drive motors 8702 to 8704 to the developing devices 8014 (Y, M, C, and K) and the photoconductor drums 8011 (Y, M, C, and K) may be disposed so as to avoid the supply members 8149 of the developing devices 8014 (Y, M, C, and K), and the first to third drive motors 8702 to 8704 do not project from the transmission gears toward the back surface.

In this way, the drive device 8070 that is used for the image forming apparatus 8001 according to the eighth exemplary embodiment, in which the first to third drive motors 8702 to 8704 are disposed between the inner frame 8066 that supports the developing devices 8014 (Y, M, C, and K) and the photoconductor drums 8011 (Y, M, C, and K) and the exterior covering 8068, the distance between the inner frame 8066 and the exterior covering 8068 may be smaller than that in the case where the first to third drive motors 8702 to 8704 are disposed between the first portion 8661 that has the shortest distance from the outer wall in the inner frame 8066 and the exterior covering 8068.

The form of the drive device according to the exemplary embodiment of the present disclosure includes not only a form in the case where the drive device is configurated d to be separated from the other components of the image forming apparatus 8001 but also a form in the case where the drive device is configurated d as a part of the image forming apparatus 8001 as described above. The form of the frame according to the exemplary embodiment of the present disclosure includes not only a form in the case where the frame of the drive device is configurated d to be separated from the inner frame 8066 of the image forming apparatus 8001 but also a form in the case where the frame of the inner frame 8066 of the image forming apparatus 8001 is common to the frame of the drive device 8070.

Application to a full color image forming apparatus is described according to the above eighth exemplary embodiment. Needless to say, application to a monochrome image forming apparatus is also acceptable.

Additional Matter of all Exemplary Embodiments

Although the specific exemplary embodiments of the present disclosure are described, it is clear for a person in the art that the present disclosure is not limited to the exemplary embodiments, and various other exemplary embodiments may be achieved within the range of the present disclosure. Modifications, deletions, additions, and combinations may be made without departing from the technical idea of the present exemplary embodiments. For example, a part or all of multiple exemplary embodiments may be appropriately combined for a configuration, or some components described in different exemplary embodiments may be combined for a configuration. For example, an apparatus that includes the boundary line 2000K that is a feature that is described according to the second exemplary embodiment but is not described according to the fourth exemplary embodiment and the container unit 4060 tilting with respect to the horizontal direction that is a component that is described according to the fourth exemplary embodiment but is not described according to the second exemplary embodiment may be configurated d.

(1) A component is described by using different wording in the exemplary embodiments even through the wording has the same meaning, and (2) a component is described by using the same wording in the exemplary embodiments even through the wording has different meanings although this is not particularly described according to the above exemplary embodiments. In the cases of (1) and (2), the interpretation of a component recited in claims is based on the technical significance and/or definition of the component described according to each exemplary embodiment. In the case of (2), interpretation is basically made based on the technical significance of the component such that any meaning is included. However, the case where the related art is included as a result of the interpretation including any meaning is not excluded. The meaning of the "same" described in this paragraph includes not only the meaning of "completely the same" but also the meaning of "substantially the same".

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A sheet containing apparatus comprising:
a first container unit that contains a sheet having a first size and that tilts with respect to a horizontal direction such that a first end and a second end in a width direction of the sheet containing apparatus are located at different heights with the first container unit installed in a sheet containing apparatus body when viewed in a first direction; and
a covering portion that is movable to a covering position at which the covering portion covers a whole of the first container unit in the first direction and an open position at which the covering portion uncovers the first container unit in the first direction,
wherein when viewed in the first direction, a tilting division line is adjacent to the first container unit and tilts with respect to the horizontal direction, and at least a whole of the tilting division line is covered by the covering portion in the first direction with the covering portion positioned at the covering position.

2. The sheet containing apparatus according to claim 1, further comprising:
a second container unit that contains a sheet having a second size,
wherein the covering portion covers at least a part of the second container unit in the first direction with the covering portion positioned at the covering position.

3. The sheet containing apparatus according to claim 2, wherein the covering portion positioned at the open position is located on a side of an upper edge of the first container unit when viewed in the first direction.

4. The sheet containing apparatus according to claim 2, wherein the covering portion that is positioned at the covering position covers a whole of the second container unit in the first direction.

5. The sheet containing apparatus according to claim 1, wherein the covering portion positioned at the open position is located on a side of an upper edge of the first container unit when viewed in the first direction.

6. The sheet containing apparatus according to claim 1, wherein the covering portion positioned at the open position is located on a side of a lower edge of the first container unit when viewed in the first direction.

7. The sheet containing apparatus according to claim 1, wherein a mass of the covering portion is smaller than a mass of the first container unit, and the covering portion that is positioned at the open position is prevented from moving to the covering position with the first container unit separated from the sheet containing apparatus body.

8. An image forming apparatus comprising:
the sheet containing apparatus according to claim 1; and
an image forming member that forms an image on a sheet that is transported from the sheet containing apparatus.

9. The image forming apparatus according to claim 8, wherein the image forming member includes an image formation unit that forms an image, based on image data, and
wherein the covering portion that is positioned at the covering position covers the image formation unit in the first direction, and the covering portion that is positioned at the open position uncovers the image formation unit in the first direction.

10. A sheet containing apparatus comprising:
a first container unit that contains a sheet having a first size and that tilts with respect to a horizontal direction with the first container unit installed in a sheet containing apparatus body such that a first end and a second end in a width direction of the sheet containing apparatus are located at different heights when viewed in a first direction of the sheet containing apparatus body; and
a covering portion that is movable to a covering position at which the covering portion covers the first container unit in the first direction and an open position at which the covering portion uncovers the first container unit in the first direction and that covers a whole of the first container unit in the first direction with the covering portion positioned at the covering position.

11. The sheet containing apparatus according to claim 10, further comprising:
a second container unit that contains a sheet having a second size,
wherein the covering portion covers at least a part of the second container unit in the first direction with the covering portion positioned at the covering position.

12. The sheet containing apparatus according to claim 11, wherein the covering portion positioned at the open position is located on a side of an upper edge of the first container unit when viewed in the first direction.

13. The sheet containing apparatus according to claim 11, wherein the covering portion that is positioned at the covering position covers a whole of the second container unit in the first direction.

14. The sheet containing apparatus according to claim 10, wherein the covering portion positioned at the open position is located on a side of an upper edge of the first container unit when viewed in the first direction.

15. The sheet containing apparatus according to claim 10, wherein the covering portion positioned at the open position is located on a side of a lower edge of the first container unit when viewed in the first direction.

16. A sheet containing apparatus comprising:

a container unit that contains a sheet, that tilts with respect to a horizontal direction such that a first end and a second end in a width direction of the sheet containing apparatus are located at different heights with the container unit installed in a sheet containing apparatus body when viewed in a first direction of the sheet containing apparatus body, and that is separated from the sheet containing apparatus body in the first direction; and a covering portion that is mounted on the sheet containing apparatus body, that is movable to a covering position at which the covering portion covers the container unit that is installed in the sheet containing apparatus body in the first direction and an open position at which the covering portion uncovers the container unit in the first direction, and that uncovers a bottom plate of the container unit that is separated from the sheet containing apparatus body in a thickness direction of the bottom plate with the covering portion positioned at the open position.

17. The sheet containing apparatus according to claim 16, wherein the covering portion that is positioned at the covering position prevents the container unit that is installed in the sheet containing apparatus body from being pulled from the sheet containing apparatus body, and wherein the covering portion that is positioned at the open position allows the container unit that is installed in the sheet containing apparatus body to be pulled from the sheet containing apparatus body.

18. The sheet containing apparatus according to claim 16, wherein the sheet containing apparatus body includes a first side wall and a second side wall that face sideways in the first direction, wherein the first side wall faces an upper edge of the container unit, and the second side wall faces a lower edge of the container unit, and wherein the lower edge of the container unit is nearer than the first side wall to the second side wall when viewed in the first direction.

19. The sheet containing apparatus according to claim 16, further comprising:

a transport unit that feeds the sheet that is contained in the container unit to a transport path for the sheet and that transports the sheet along the transport path; and another covering portion that is mounted on the sheet containing apparatus body, that is movable to a covering position at which the another covering portion covers the sheet containing apparatus body sideways and an open position at which the another covering portion uncovers the sheet containing apparatus body sideways, and that uncovers at least a part of the transport path sideways with the another covering portion positioned at the open position, wherein trajectory of the another covering portion is separated from trajectory of the covering portion.

20. An image forming apparatus comprising:

the sheet containing apparatus according to claim 19;

an image forming member that forms an image on a sheet that is transported from the sheet containing apparatus; and a fixing portion that fixes the image that is formed on the sheet by using the image forming member to the sheet, wherein the another covering portion that is positioned at the covering position covers the fixing portion sideways, and the another covering portion that is positioned at the open position uncovers the fixing portion sideways.

* * * * *